US007070287B2

(12) United States Patent
Foote et al.

(10) Patent No.: US 7,070,287 B2
(45) Date of Patent: Jul. 4, 2006

(54) VEHICULAR MIRROR SYSTEM WITH AT LEAST ONE OF POWER-FOLD AND POWER-EXTEND FUNCTIONALITY

(75) Inventors: Keith D. Foote, Kentwood, MI (US); Kris D. Brown, Lake Odessa, MI (US); Kenneth C. Peterson, Comstock Park, MI (US); James A. Ruse, Allegan, MI (US)

(73) Assignee: Magna Donnelly Mirrors North America L.L.C., Kentwood, MI (US)

( * ) Notice: Subject to any disclaimer, the term of this patent is extended or adjusted under 35 U.S.C. 154(b) by 100 days.

(21) Appl. No.: 10/420,433

(22) Filed: Apr. 22, 2003

(65) Prior Publication Data

US 2003/0218812 A1    Nov. 27, 2003

Related U.S. Application Data

(60) Provisional application No. 60/319,198, filed on Apr. 23, 2002, provisional application No. 60/319,243, filed on May 14, 2002, provisional application No. 60/319,244, filed on May 14, 2002, provisional application No. 60/319,324, filed on Jun. 18, 2002, provisional application No. 60/319,394, filed on Jul. 12, 2002, provisional application No. 60/319,412, filed on Jul. 19, 2002, provisional application No. 60/319,508, filed on Aug. 29, 2002, provisional application No. 60/319,637, filed on Oct. 21, 2002, provisional application No. 60/319,821, filed on Dec. 30, 2002.

(51) Int. Cl.
  *G02B 5/08* (2006.01)
(52) U.S. Cl. .................................... 359/841
(58) Field of Classification Search ................ 359/841, 359/873, 874, 877; 248/476, 479
  See application file for complete search history.

(56) References Cited

U.S. PATENT DOCUMENTS

| 5,339,192 | A | * | 8/1994 | Cho ........................... 359/841 |
| 5,369,530 | A | | 11/1994 | Yamauchi et al. |
| 5,384,660 | A | | 1/1995 | Oishi |
| 5,432,641 | A | | 7/1995 | Mochizuki |
| 5,467,222 | A | | 11/1995 | Oishi |
| 5,594,590 | A | | 1/1997 | Ishiyama |
| 5,636,071 | A | | 6/1997 | Mochizuki et al. |
| 5,703,732 | A | | 12/1997 | Boddy et al. |
| 5,734,517 | A | | 3/1998 | Kang |
| 5,781,354 | A | | 7/1998 | Sakata |
| 5,823,054 | A | | 10/1998 | Brouwer |
| 5,844,733 | A | | 12/1998 | Ravanini |
| 5,864,438 | A | * | 1/1999 | Pace .......................... 359/841 |
| 6,022,113 | A | | 2/2000 | Stolpe et al. |

(Continued)

*Primary Examiner*—Mark A. Robinson
*Assistant Examiner*—Alessandro Amari
(74) *Attorney, Agent, or Firm*—McGarry Bair PC

(57) ABSTRACT

A motorized pivoting and extending mechanism for a vehicular mirror assembly includes, alternatively, a force-reduction mechanism for reducing the friction within the mechanism, and a slip clutch mechanism for reducing overloading of the motor when the limits of mirror extension and retraction have been reached. Mirror power functions receive electrical power and control signals through a circular array of electrical contacts incorporated into the pivot connection irrespective of the pivotal orientation of the mirror. A motor shut-off circuit is able to shut off the motor within a predetermined period of time. The mirror can be angularly adjusted upon movement of the mirror between the retracted and the extended positions to maintain a common field of view for a driver of the vehicle to prevent the extension and/or retraction of the mirror from undesirably repositioning the field of view captured by the mirror.

34 Claims, 133 Drawing Sheets

U.S. PATENT DOCUMENTS

| | | |
|---|---|---|
| 6,116,743 A | 9/2000 | Hoek |
| 6,130,514 A | 10/2000 | Oesterholt et al. |
| 6,133,704 A | 10/2000 | Yoshida et al. |
| 6,213,609 B1 * | 4/2001 | Foote et al. ............... 359/841 |
| 6,239,928 B1 | 5/2001 | Whitehead et al. |
| 6,322,221 B1 | 11/2001 | van de Loo |
| 6,390,630 B1 | 5/2002 | Ochs |
| 6,394,616 B1 | 5/2002 | Foote et al. |

* cited by examiner

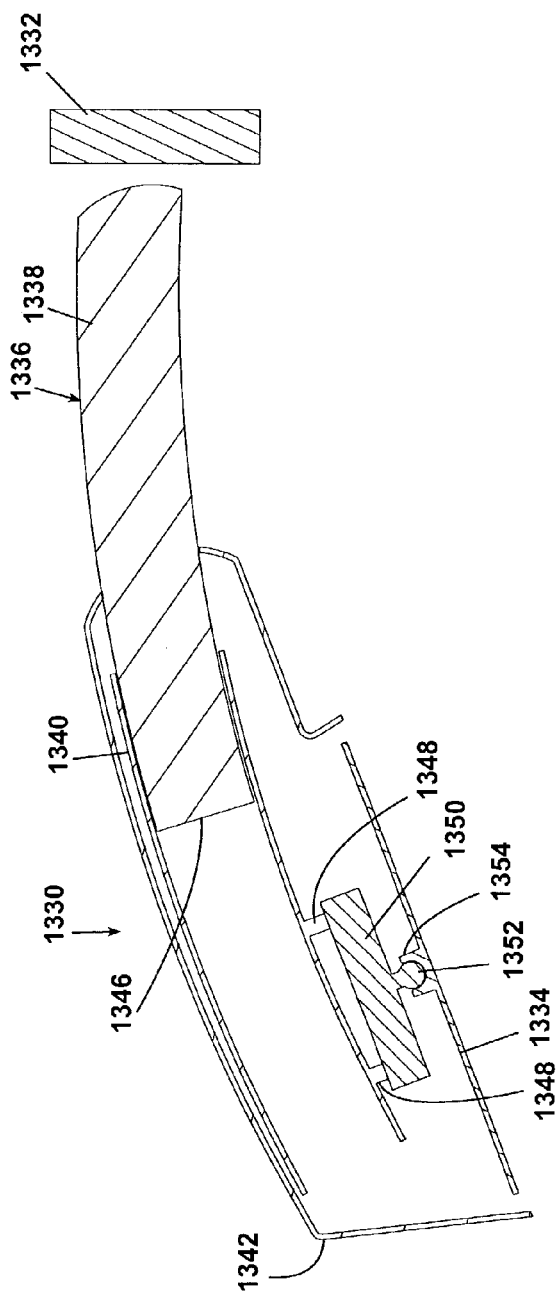
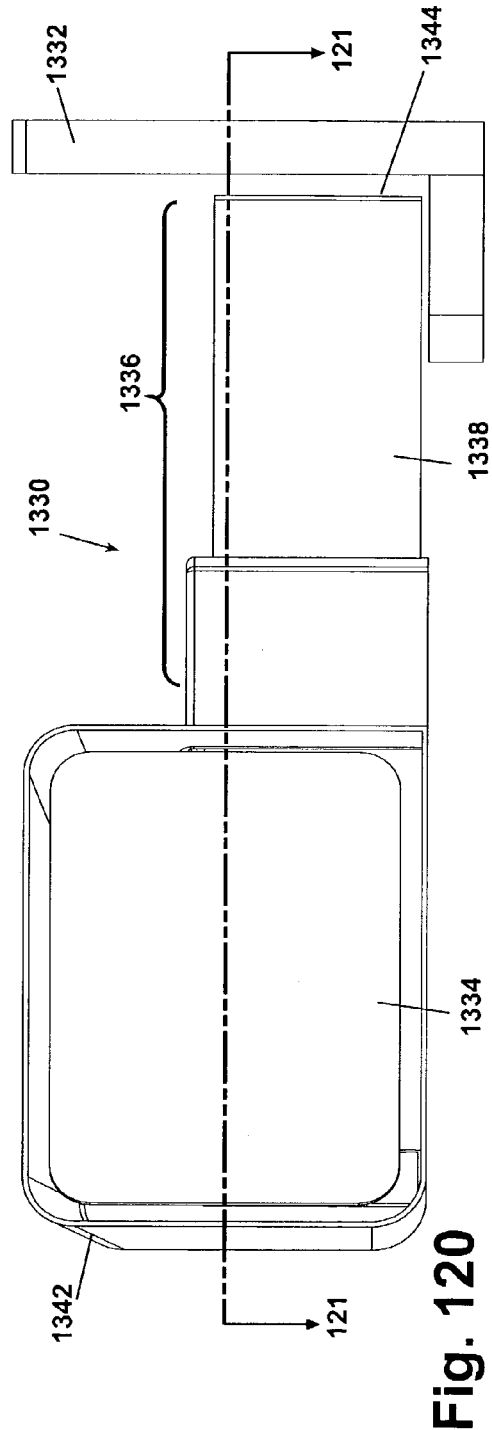

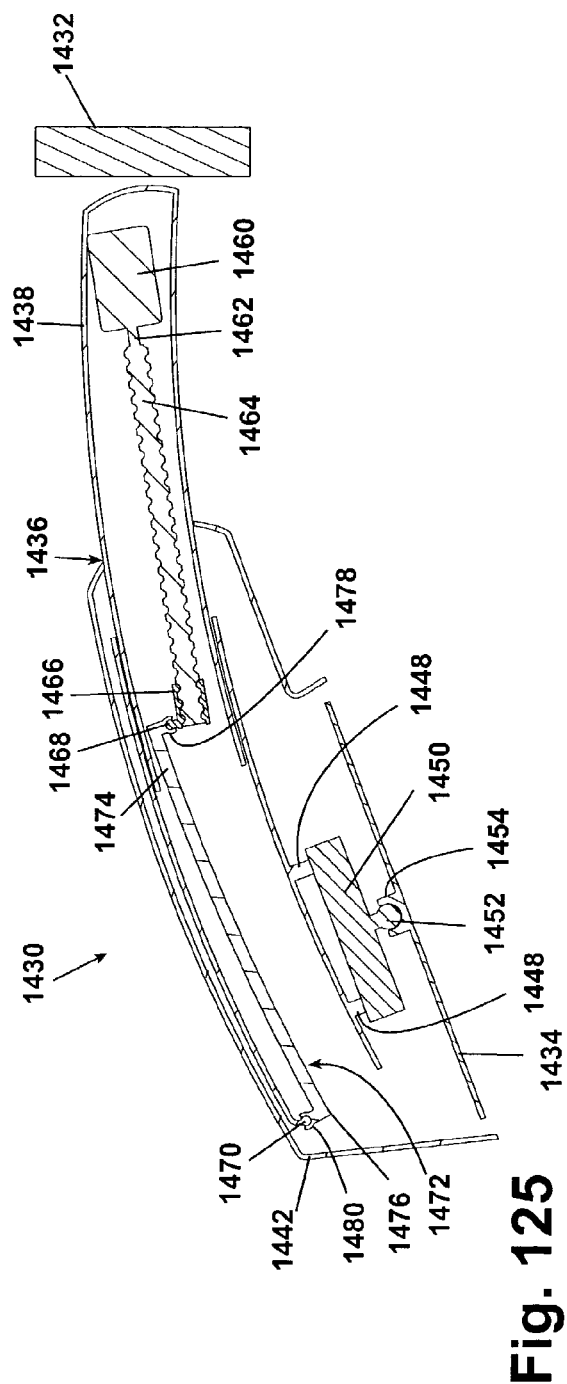
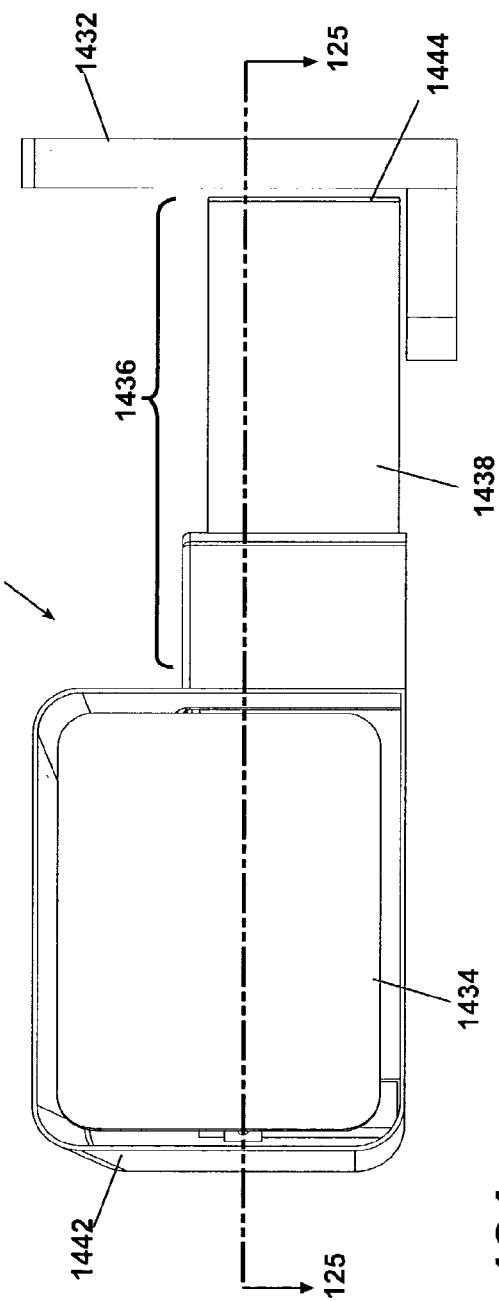
Fig. 125
Fig. 124

VEHICULAR MIRROR SYSTEM WITH AT LEAST ONE OF POWER-FOLD AND POWER-EXTEND FUNCTIONALITY

CROSS-REFERENCE TO RELATED APPLICATION

This application claims the benefit of U.S. provisional applications Ser. Nos. 60/319,198, filed Apr. 23, 2002; 60/319,243, filed May 14, 2002; 60/319,244, filed May 14, 2002; 60/319,324, filed Jun. 18, 2002; 60/319,394, filed Jul. 12, 2002; 60/319,412, filed Jul. 19, 2002; 60/319,508, filed Aug. 29, 2002; 60/319,637, filed Oct. 21, 2002; and 60/319,821, filed Dec. 30, 2002, which are incorporated herein in their entirety.

BACKGROUND OF THE INVENTION

1. Field of the Invention

In one of its aspects, the invention relates to a vehicular mirror assembly adapted to be mounted to a vehicle for movement between an extended and a retracted position. More particularly, the invention relates to a pivoting mechanism for performing the pivotal movement of the vehicular mirror assembly including a mechanism for reducing the friction within the pivoting mechanism. In another aspect, the invention relates to an external vehicle mirror having both powered folding and powered extension functionality accomplished by a single motor. In another aspect, the invention relates to a shut-off circuit for a DC motor and, more particularly, to a shut-off circuit for a motor contained in a vehicular mirror which performs a movable function for the mirror, such as linear extension or pivotal movement. In another aspect, the invention relates to an extendable vehicular mirror in which the mirror is angularly adjusted upon movement of the mirror between the retracted and the extended positions.

2. Description of the Related Art

External mirrors are ubiquitous for contemporary vehicles. External mirrors have long been used to aid the driver in operating the vehicle, especially in improving the rearward view of the driver. Over time, more and more functionality has been incorporated into the external mirrors. For example, it is common to pivot or fold the external mirror against the vehicle body to prevent the jarring of the mirror when the vehicle is not operated. The mirror-folding function can incorporate a power assist, such as that disclosed in U.S. Pat. Nos. 5,684,646 and 5,703,732, which are incorporated herein by reference.

External mirrors are also extendable away from the vehicle, which is useful when towing a trailer. Mirrors incorporating both the powered fold and powered extension functionality are known and have used separate motors for both the folding and extension functions. Examples of such mirrors are disclosed in U.S. Pat. Nos. 6,276,808 and 6,213,609, assigned to the assignee of the current application, and are incorporated by reference.

The power-assist devices for the mirror-folding function typically include a motor which, upon a suitable activating signal from a controller, drives a rotatable column through an output gear assembly attached to the motor. The rotatable column is operably attached to the mirror so that rotation of the column is translated into pivoting of the mirror. The rotational movement of the mirror is controlled in two ways. The mirror assembly is provided with "stops" which define the outermost and innermost limits of travel of the mirror housing between the extended and retracted positions, respectively, and provide a positive limitation of the pivoting of the mirror. Additionally, the controller actuates the motor for a preset time interval at least equal to the time required to pivot the mirror between the fully retracted and fully extended positions. The motor may thus continue to operate after the mirror has reached its limit of movement defined by the stops. The action of continuing the operation of the motor even after the mirror limit of movement has been reached means that the motor may be forced to work against a virtually immovable obstacle in the form of the stops. In such a case, the current load through the motor will typically increase significantly above the normal operating current, leading to overheating and, eventually, premature motor failure. The increased current load can also lead to overloading and premature failure of associated electrical circuitry, such as the controller, or stripping or other mechanical failure of gears and other mechanical components. Any of these failures will require difficult and costly replacement of the failed parts.

A spring is typically provided around the rotatable column to provide a frictional engagement between the mirror housing and a bracket for mounting the mirror housing to the vehicle (and about which the pivotal movement occurs). This frictional engagement is important to ensure that the rotational movement of the mirror does not overtravel beyond the "stops." The spring member insures that the rotatable column is held against the mirror bracket so that, when the extended and retracted positions are approached, a positive engagement occurs with the stops.

While the frictional engagement is important at the outermost and innermost limits of travel of the mirror housing with respect to the vehicle, the friction encountered by the rotatable column during the normal range of movement (i.e., between the extended and retracted positions) requires that the motor draw extra current to overcome this friction to move the mirror between the extended and retracted positions.

The trade-off on these types of prior art vehicular mirror pivoting devices is simple. Increasing the friction between the rotatable column and the mirror bracket, while providing a more desirable holding force, requires a more heavy-duty motor to drive the rotatable column, thus increasing cost. Decreasing the friction between the rotatable column and the mirror bracket permits the use of a lower-torque, and thus lower cost, motor but substantially reduces the holding force of the rotatable column against the mirror bracket at the rotatable column pivot to the innermost and/or the outermost retracted and extended positions, respectively.

The mirror may incorporate other power functions such as a motorized tilt mechanism for the reflective element, puddle lights, or turn signal lights. Each of these functions requires electrical connections to the vehicle power supply and onboard controls. Such electrical connections are typically made through a wiring harness which must necessarily pass through the mirror pivot mechanism. The wiring harness must be constructed and routed in order to accommodate the pivoting movement of the mirror. Thus, the wiring harness must have both flexibility to accommodate the pivoting movement and sufficient durability to withstand the repeated pivoting of the mirror assembly. Nevertheless, the repeated flexing of the wiring harness can lead to breakage of individual wires and failure of one or more of the power functions, necessitating costly replacements. Furthermore, the greater the number of power functions, the larger and heavier the wiring harness required, which can add significant weight to the mirror assembly. Finally, fabrication and routing of the wire harness through the mirror assembly can be complicated, requiring additional steps in the manufacture of the mirror assembly, with consequent additional cost.

The use of separate motors for each function is not desirable because it increases costs and part count, which are undesirable characteristics in the automotive parts supply industry. The extra motor also increases the volume of the mirror housing, which is also typically undesirable since increased volume can lead to increased drag, which negatively impacts fuel mileage, and increased wind-induced noise.

Every mirror to be assembled for use on a vehicle does not need to perform the above-listed functions. For example, one mirror may have only a powered folding function. Another mirror may have only a powered extend function. Yet another may have neither. The costs and labor of maintaining multiple designs and assembling different features into a vehicle mirror are often burdensome. There is a need to reduce cost and time in the assembly of vehicle mirrors with multiple functionalities.

When the motor is actuated, typically a rush of current is supplied to the motor as directed by a motor controller due to the momentum required by the motor to move the power-assist devices. At the end of a full range of travel of a power-assist device, the motor is often forced to stop (typically due to a mechanical stop encountered by the power-assist device) but power is still supplied to the motor. If the power is not cut off, the motor can overheat and become damaged. It is also desirable to be able to control a motor that is operable in more than one direction since motors of this type must typically be able to move components in both directions (e.g., between retracted and extended positions).

Current attempts to solve this problem have typically fallen short of a desirable solution. For example, U.S. Pat. No. 6,078,160, issued Jun. 20, 2000, discloses a bi-directional motor control circuit. However, it has been found that this motor control circuit is temperature-sensitive, causing undesirable results when the circuit is used through a wide range of ambient temperatures. It has also been found that a resetable fuse can be provided in series with the motor, however, this arrangement can provide an undesirable recovery time (i.e., waiting for the fuse to reset).

FIGS. 112 and 113 illustrate a vehicle 1310 having a prior art extendable mirror 1312 comprising a base 1314 mounted to the vehicle 1310 with an arm 1316 movable between a retracted position (see FIG. 112) and an extended position (see FIG. 113). A schematic of a driver 1318 is shown in each of FIGS. 112–113 in which the driver's field of view is illustrated by first view field 1320 emanating from the driver 1318 to a mirror 1322 mounted to the arm which, in turn, is reflected and extends therefrom as a second field of view 1324. As can be seen in the extended position shown in FIG. 113, the second field of view 1324 is positioned outwardly of that shown in FIG. 112 due to the extension of the mirror 1322.

This can create a potential "blind spot" as shown by the shaded region in FIG. 113 which could cause the driver 1318 to not be able to see adjacent vehicles, creating a dangerous driving condition. On a more practical level, it can also be annoying for the driver to re-position the mirror manually by either manual manipulation of the mirror 1322 or by using on-board controls (not shown) for repositioning the mirror as is conventionally known in the art.

SUMMARY OF THE INVENTION

In one aspect, the invention relates to an external mirror system for a vehicle comprising: a fixed portion adapted to be mounted to the vehicle; a moveable portion pivotally mounted to the fixed portion through a normal range of movement between a folded position and an unfolded, retracted position defined by a pair of terminal ends, the moveable portion having a reflective element mounted therein defining a rearwardly-directed field of view for a driver of the vehicle; an actuator including a motor having at least one output shaft adapted for bi-directional rotational movement, wherein driven rotation of the output shaft of the motor causes the movable portion to be pivoted with respect to the fixed portion; and at least one of: a force-modifying device operably interconnected to the actuator for reducing a drive force required to pivot the movable portion relative to the fixed portion within the normal range of movement corresponding to the folded and unfolded, retracted positions and increasing the drive force required to pivot the movable portion relative to the fixed portion beyond one of the terminal ends of the normal range of movement; a transmission operably interconnected to the actuator, the actuator operably interconnected to the moveable portion for continuous movement in a first stage and a second stage, wherein the transmission operably cooperates with the actuator for movement between the first stage and the second stage, wherein in the first stage rotational movement of the motor pivots the movable portion between a folded position to an unfolded, retracted position and in the second stage translates the moveable portion between the unfolded, retracted position and an extended position; and an adjuster operably interconnected to the reflective element, wherein the reflective element is positioned at a first angle of reflectance and the adjuster positions the reflective element at a second angle of reflectance as the reflective element is moved between the unfolded, retracted and an extended position to adjust the field of view of the reflective element for the driver of the vehicle.

In various embodiments of the invention, one of the fixed portion and the non-rotatable portion of the actuator can have one of a detent thereon and a recess therein defining the terminal ends of the normal range of movement corresponding to the folded and unfolded positions, and one of the moveable portion and the rotatable portion of the actuator can have the other of the detent and the recess. At least one spring can bias the detent and the recess together. The force-modifying device can comprise a pin interconnected to the actuator for preventing contact between the detent and the recess during the normal range of movement. At least one output shaft of the motor can have a proximal portion thereof interconnected to a first linkage for pivoting the movable portion between the folded position and the unfolded, retracted position.

The first linkage can comprise a rack gear operably connected to a spur gear, and the spur gear can be prevented from movement relative to the fixed portion during the first stage. The fixed portion can include a first conductor located along a pivotal movement region; the moveable portion can include a second conductor maintained in operable interaction with the first conductor in the pivotal movement region along the normal range of movement; and the actuator can have at least one terminal operably interconnected to the second conductor. Operable interconnection is thereby maintained between the actuator and the first conductor during pivotal movement of the moveable portion relative to the fixed portion throughout at least the normal range of movement thereof.

At least one of the first and second conductors can comprise a conductive material deposited onto the surface of the corresponding fixed portion and moveable portion. The adjuster can define an arcuate path between the retracted and extended positions and the adjustment of the field of view of the reflective element between the first angle of reflectance and the second angle of reflectance occurs as the reflective element is moved along the arcuate path.

The adjuster can further comprise one of a cam and a cam follower operably interconnected to one of the reflective element and the moveable portion, and the other of the cam and cam follower operably interconnected to the fixed portion, wherein following movement of the cam follower with the cam can position the reflective element between the first angle of reflectance and the second angle of reflectance when the movable portion is moved between the unfolded, retracted and extended positions.

The adjuster can also comprise: a first arm mounted to the fixed portion and adapted to extend laterally-outwardly from a vehicle having one of a cam and cam follower thereon; and a second arm mounted to one of the movable portion and the reflective element and received by the first arm for lateral extendable and retractable movement therewith, the second arm having the other of the cam and cam follower thereon.

In another aspect of the invention, an external mirror system for a vehicle comprises: a fixed portion adapted to be mounted to the vehicle; a moveable portion pivotally mounted to the fixed portion through a normal range of movement between a folded position and an unfolded position defined by a pair of terminal ends, the moveable portion having a reflective element mounted therein; an actuator having a non-rotatable portion mounted to the fixed portion and a rotatable portion mounted to the movable portion, wherein relative rotation of the rotatable portion of the actuator with respect to the non-rotatable portion causes the movable portion to be pivoted with respect to the fixed portion; and a force-modifying device operably interconnected to the actuator for reducing a drive force required to pivot the movable portion relative to the fixed portion within the normal range of movement corresponding to the folded and unfolded positions and increasing the drive force required to pivot the movable portion relative to the fixed portion beyond one of the terminal ends of the normal range of movement.

Various embodiments of the invention are also contemplated. One of the fixed portion and the non-rotatable portion of the actuator can have one of a detent thereon and a recess therein defining the terminal ends of the normal range of movement corresponding to the folded and unfolded positions, and one of the moveable portion and the rotatable portion of the actuator can have the other of the detent and the recess. At least one spring can bias the detent and the recess together. The force-modifying device can comprise a pin interconnected to the actuator for preventing contact between the detent and the recess during the normal range of movement. The force-modifying device can comprise a ring interconnected to the actuator for preventing contact between the detent and the recess during the normal range of movement. The ring can be C-shaped.

The actuator can further comprise a motive element for driving the rotatable portion of the actuator to pivot the moveable portion between the folded and unfolded positions. The motive element can comprise a motor. The force-modifying device can further comprise a clutch disposed between the motor and the rotatable portion of the actuator. The clutch can engage the rotatable portion of the actuator within the normal range of movement and can disengage therefrom when the moveable portion is forced beyond one of the terminal ends. The clutch can comprise a drive surface and a driven surface. The drive surface and the driven surface can be biased together by at least one spring.

In another aspect of the invention, the invention relates to an external vehicular mirror system for a vehicle comprising: a fixed portion adapted to be mounted to the vehicle; a moveable portion adapted for a normal range of movement including a reflective element mounted therein; an actuator including a motor having at least one output shaft adapted for bi-directional rotational movement, the actuator operably interconnected to the moveable portion for continuous movement in a first stage and a second stage, wherein in the first stage rotational movement of the motor pivots the movable portion between a folded position to an unfolded, retracted position and in the second stage translates the moveable portion between the unfolded, retracted position and an extended position; and a transmission for transitioning rotational movement of the motor between the first and second stages.

Various embodiments of the invention are also contemplated. The at least one output shaft of the motor can have a proximal portion thereof interconnected to a first linkage for pivoting the movable portion between the folded position and the unfolded, retracted position. The first linkage can comprise a rack gear operably connected to a spur gear, and the spur gear is prevented from movement relative to the fixed portion during the first stage. The spur gear can be moveable relative to the fixed portion when the fixed portion is forced beyond the normal range of movement. The external mirror can further comprise at least one spring for biasing the spur gear and the fixed portion together.

The at least one output shaft of the motor can have a distal portion thereof interconnected to a second linkage for translating the movable portion between the unfolded, retracted position and the extended position. The second linkage can comprise a drive nut operably connected to a catch, and the drive nut can move along the output shaft for translational movement of the catch during the second stage. The transmission can comprise the drive nut wherein the drive nut is operably engaged to the at least one output shaft of the motor, a first bracket comprising a first slot, and a second bracket comprising a second slot wherein, when the motor reaches a point between the proximal and distal portions of the jackscrew, the drive nut oscillates from the first slot to the second slot between the first linkage and the second linkage to transfer movement of the moveable portion between pivotal movement and extension movement.

The motor can be pivotally mounted to the fixed portion. The spur gear can be associated with the fixed portion and the rack gear can be associated with the moveable portion, and the rack gear can be operably engaged with both the spur gear and the drive nut during the first stage. The drive nut can be disengaged from the rack gear and operably engaged with the reflective element during the second stage for extendable movement along the jackscrew.

A shut-off circuit can be provided for controlling the operation of the motor. The shut-off circuit can comprise a first switch for selecting one of operation of the first stage and operation of the second stage. The shut-off circuit can comprise a second switch for controlling the operation of the first stage. The shut-off circuit can comprise a third switch for controlling the operation of the second stage. The transmission can comprise a clutch mounted to the at least one output shaft of the motor and to the actuator, wherein the clutch can driveably interconnect the at least one output shaft of the motor to drive the actuator in the first stage at a first motor speed, and wherein the clutch can driveably interconnect the at least one output shaft of the motor to drive the actuator in the second stage at a second motor speed.

The clutch can comprise a drive surface and a driven surface. The drive surface and the driven surface can be biased together by at least one spring. The motor can comprise a first output shaft connected to the actuator to drive the actuator in the first stage for pivotal movement of the moveable portion and a second output shaft connected to the actuator to drive the actuator in the second stage for extension movement of the moveable portion. The clutch can be disposed between the first output shaft and the actuator. The drive surface can be operably engaged with the driven surface when the first output shaft is rotated at a first speed, and can be operably disengaged with the driven surface when the first output shaft is rotated at a second speed which is slower than the first speed. The second output shaft can be operably disengaged from the actuator when the second output shaft is operated at a first speed, and can be operably engaged with the actuator when the second output shaft is rotated at a second speed which is slower than the first speed.

In an addition aspect, the invention relates to an external mirror system for a vehicle comprising: a fixed portion adapted to be mounted to the vehicle; a moveable portion including a reflective element mounted therein; and a functionality module mounted at one part to the fixed portion and at another part to the moveable portion, the functionality module including a plurality of mounts for operably mounting one of the movement functionality components in universal interconnection fashion selected from the group consisting of: a powered-fold, powered-extend mechanism; a powered-fold, manual-extend mechanism; a manual-fold, powered-extend mechanism; a manual-fold, manual-extend mechanism; a powered-fold mechanism; a powered-extend mechanism; a manual-extend mechanism; and a manual-fold mechanism. The functionality module is thereby capable of operably mounting a plurality of the movement functionality components.

The movement functionality component corresponding to the manual-fold, powered-extend mechanism can comprises at least one motive element, a first linkage interconnected to the at least one motive element for pivoting the moveable portion between a folded position and a retracted, unfolded position, and a second linkage interconnected to the at least one motive element for translating the moveable portion between the retracted, unfolded position and an extended, unfolded position.

The movement functionality component corresponding to the powered-fold, manual-extend mechanism can comprise at least one motive element, a first linkage interconnected to the at least one motive element for pivoting the moveable portion between a folded position and a retracted, unfolded position, and a second linkage responsive to an externally-applied manual force for translating the moveable portion between a retracted, unfolded position and an extended position.

The movement functionality component corresponding to the manual-fold, powered-extend mechanism can comprise at least one motive element, a first linkage responsive to an externally-applied manual force for pivoting the moveable portion between a folded position and a retracted, unfolded position, and a second linkage interconnected to the at least one motive element for translating the moveable portion between a retracted, unfolded position and an extended position.

The movement functionality component corresponding to the manual-fold, manual-extend mechanism can comprise a first linkage responsive to an externally-applied manual force for pivoting the moveable portion between a folded position and a retracted, unfolded position, and a second linkage responsive to an externally-applied manual force for translating the moveable portion between a retracted, unfolded position and an extended position.

The movement functionality component corresponding to the powered-fold mechanism can comprise at least one motive element, and a linkage interconnected to the at least one motive element for pivoting the moveable portion between a folded position and a unfolded position.

The movement functionality component corresponding to the powered-extend mechanism can comprise at least one motive element, and a linkage interconnected to the at least one motive element for translating the moveable portion between a retracted position and an extended position.

The movement functionality component corresponding to the manual-extend mechanism can comprise a linkage responsive to an externally-applied manual force for translating the moveable portion between a retracted position and an extended position.

The movement functionality component corresponding to the manual-fold mechanism can comprise a linkage responsive to an externally-applied manual force for pivoting the moveable portion between a folded position and an unfolded position.

In an additional aspect, the invention relates to a method for assembling an external mirror system for a vehicle comprising the steps of: providing a fixed portion adapted to be mounted to the vehicle; providing a moveable portion; providing a plurality of movement functionality components selected from the group consisting of: a powered-fold, powered-extend mechanism, a powered-fold, manual-extend mechanism, a manual-fold, powered-extend mechanism, a manual-fold, manual-extend mechanism, a powered-fold mechanism, a powered-extend mechanism, a manual-extend mechanism, and a manual-fold mechanism; providing a universal mounting module adapted to receive one of each of the group of movement functionality components; selecting one of the movement functionality components from the group; mounting the selected movement functionality component to the universal mounting module; and mounting the universal mounting module at one part to the fixed portion and at another part to the moveable portion.

Various embodiments of the invention are also contemplated. The method can also comprise the step of mounting a reflective element within the moveable portion. The method can also comprise the step of removing the universal mounting module from the external mirror system and removing the selected movement functionality component therefrom. The method can also comprise the step of selecting another of the movement functionality components from the group. The method can also comprise the step of mounting the newly-selected movement functionality component to the universal mounting module. The method can also comprise the step of remounting the universal mounting module at one part to the fixed portion and at another part to the moveable portion.

In yet another aspect, the invention relates to an external mirror system for a vehicle comprising: a fixed portion adapted to be mounted to the vehicle including a first conductor located along a pivotal movement region; a moveable portion pivotally mounted to the fixed portion through a normal range of movement between folded position and an unfolded position, the moveable portion including a second conductor maintained in operable interaction with the first conductor in the pivotal movement region along the normal range of movement, the moveable portion including a reflective element mounted therein; and an actuator operably interconnected to the reflective element for adjustment of the position of the reflective element, the actuator having at least one terminal operably interconnected to the second conductor. Operable interconnection is thereby maintained between the actuator and the first conductor during pivotal movement of the moveable portion relative to the fixed portion throughout at least the normal range of movement thereof.

The at least one of the first and second conductors can comprise a conductive material deposited onto the surface of the corresponding fixed portion and moveable portion. The first conductor and the second conductor can each comprise a plurality of conductive tracks in operable communication with the plurality of conductive tracks on the other of the first conductor and the second conductor. The plurality of conductive tracks can be isolated from one another. The first and second conductors can conduct electricity. A heater can be operably interconnected to the reflective element and can have at least one terminal thereon. A third conductor can be operably interconnected at one portion to at least one of the actuator and the second conductor and at another portion to the at least one terminal of the heater. The movable portion can have a first pivot portion and the reflective element can have a back side with a second pivot portion, the first and second pivot portions can be received by one another to form a universal pivot between the movable portion and the reflective element.

A third conductor can be operably interconnected at one portion to at least one of the actuator and the second conductor and can terminate at another portion at the first pivot portion. A fourth conductor can be operably interconnected at one portion to a mirror system component and can terminate at another portion at the second pivot portion. The third and fourth conductors can be operably interconnected to one another through the universal pivot. The mirror system component can be at least one of a heater, an illumination device, a reflective element dimming device, an actuator for performing a mirror function, a mirror positioning device, a mirror position feedback device, a blind zone indicator and a mirror function sensor.

In another aspect, the invention relates to an external mirror system for a vehicle comprising: a first portion having a first mounting portion adapted to be mounted to the vehicle, a second mounting portion, and a first conductor extending between the first mounting portion and the second mounting portion, wherein the first conductor has a first terminal end in register with the vehicle mounting portion and a second terminal end in register with the second mounting portion; a second portion with a mounting portion thereon and having a reflective element mounted therein, the second portion having a second conductor extending from the mounting portion, wherein the second conductor has a first terminal end in register with the mounting portion and a second terminal end; wherein, when the mounting portion of the second portion is mounted to the second mounting portion of the first portion, the first terminal end of the second conductor is brought into operable communication with the second terminal end of the first conductor thus operably interconnecting the second terminal end of the second conductor with the first terminal end of the first conductor simply by virtue of the mounting between the first and second portions of the external mirror system.

At least one of the first and second conductors can comprise a conductive material deposited onto the surface of the corresponding first and second portions. The first conductor and the second conductor can each comprise a plurality of conductive tracks in operable communication with the plurality of conductive tracks on the other of the first conductor and the second conductor. The plurality of conductive tracks can be isolated from one another. The first and second conductors conduct electricity. The second terminal end of the second conductor can be interconnected to a functional mirror component to supply power thereto. The mirror component can comprise at least one of a heater, an illumination device, a reflective element dimming device, an actuator for performing a mirror function, a mirror positioning device, a mirror position feedback device, a blind zone indicator and a mirror function sensor.

In yet an additional aspect, the invention relates to an external mirror system for a vehicle comprising: a fixed portion adapted to be mounted to the vehicle; a moveable portion movably mounted to the fixed portion between a retracted position and a laterally-extended position relative to the fixed portion; a reflective element movably mounted to the moveable portion at a first angle of reflectance with respect to a driver of the vehicle for providing a rearwardly-directed field of view; an adjuster operably interconnected to the reflective element to position the reflective element at a second angle of reflectance as the reflective element is moved between the retracted and extended positions to adjust the field of view of the reflective element for the driver of the vehicle.

Various embodiments of the invention are also contemplated. The adjuster can define an arcuate path between the retracted and extended positions and the adjustment of the field of view of the reflective element between the first angle of reflectance and the second angle of reflectance occurs as the reflective element is moved along the arcuate path. The adjuster can comprise a first arcuate arm mounted to the fixed portion and adapted to extend laterally-outwardly from a vehicle; and a second arcuate arm mounted to the movable portion and received by the first arcuate arm for lateral extendable and retractable movement therewith. The reflective element can be mounted to the second arcuate arm.

A motive element, actuatable from a signal, can be provided for moving the second arm between the retracted and extended positions. The motive element can further comprise a motor with a threaded output shaft, and a nut threadingly received on the output shaft and operably interconnected to the reflective element for moving the reflective element between the extended and retracted positions. The adjuster can comprise a first arcuate arm mounted to the fixed portion and adapted to extend laterall-outwardly from a vehicle; and a second arcuate arm mounted to the movable portion and received by the first arcuate arm for lateral extendable and retractable movement therewith.

The adjuster can comprise one of a cam and cam follower operably interconnected to the reflective element, and the other of the cam and cam follower operably interconnected to one of the fixed portion and the moveable portion. The cam and cam follower can be operably interconnected to one another to position the reflective element between the first angle of reflectance and the second angle of reflectance when the movable portion is moved between the retracted and extended positions. The adjuster can comprise a first arm mounted to the fixed portion and adapted to extend laterally-outwardly from a vehicle having one of the cam and cam follower thereon; and a second arm mounted to the movable portion and received by the first arm for lateral extendable and retractable movement therewith, the second arm having the other of the cam and cam follower thereon.

One of a cam and a cam follower can be operably interconnected to one of the reflective element and the moveable portion, and the other of the cam and cam follower can be operably interconnected to the fixed portion, wherein following movement of the cam follower with the cam can position the reflective element between the first angle of reflectance and the second angle of reflectance when the movable portion is moved between the retracted and extended positions. The adjuster can comprise a first arm mounted to the fixed portion and adapted to extend laterally-outwardly from a vehicle having one of a cam and cam follower thereon; and a second arm mounted to one of the movable portion and the reflective element and received by the first arm for lateral extendable and retractable movement therewith, the second arm having the other of the cam and cam follower thereon.

BRIEF DESCRIPTION OF THE DRAWINGS

In the drawings:

FIG. 119 is a cross-sectional view of the vehicle mirror of FIG. 116 taken along lines 119—119 of FIG. 118.

FIG. 120 is a front elevational view of the vehicle rearview mirror of FIG. 117 in an extended position.

FIG. 121 is a cross-sectional view of the vehicle mirror of FIG. 117 taken along lines 121—121 of FIG. 120.

FIG. 122 is a front elevational view of an alternative embodiment of the vehicle mirror shown in FIGS. 114–117 in a retracted position.

FIG. 123 is a cross-sectional view of the vehicle mirror of FIG. 122 taken along lines 123—123 thereof.

FIG. 124 is a front elevational view of the alternative embodiment of the vehicle mirror shown in FIG. 122 in an extended position.

FIG. 125 is a cross-sectional view of the vehicle mirror of FIG. 124 taken along lines 125—125 thereof.

FIG. 126 is a cross-sectional view of another embodiment of the vehicle mirror according to the invention in a retracted position.

FIG. 127 is a cross-sectional view of the embodiment of the vehicle mirror shown in FIG. 126 in an extended position.

FIG. 128 is an exploded view of a tenth embodiment of a rearview mirror assembly illustrating the major components thereof including a drive assembly connecting a mirror assembly to a support bracket with a pivot mechanism for rotating and an extension mechanism for extending the mirror assembly relative to a vehicle.

FIG. 129 is a perspective view of an outer housing comprising a portion of the pivot mechanism of FIG. 128.

FIG. 130 is a perspective view of the interior of the outer housing of FIG. 129.

Figure 128:
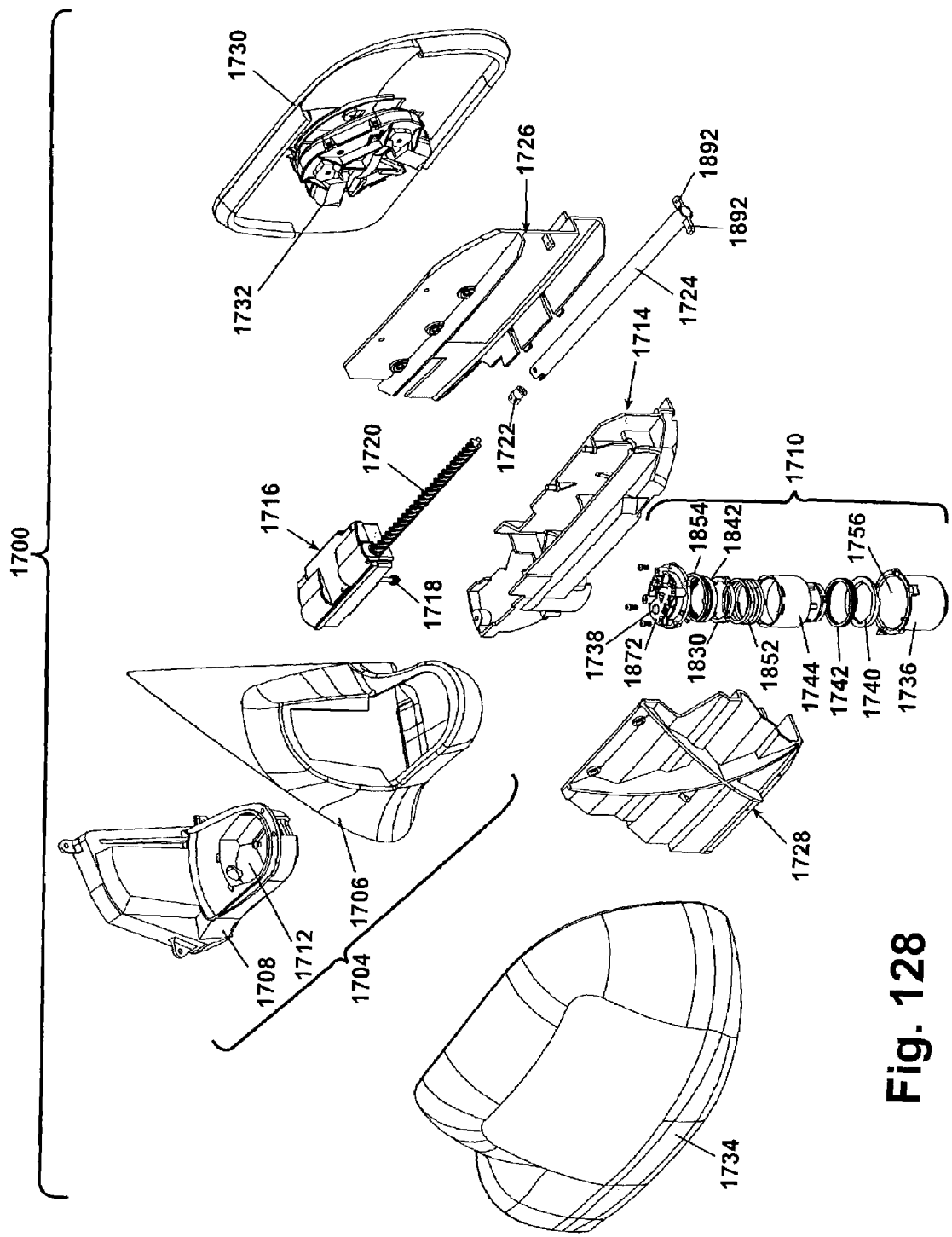
Figure 131:
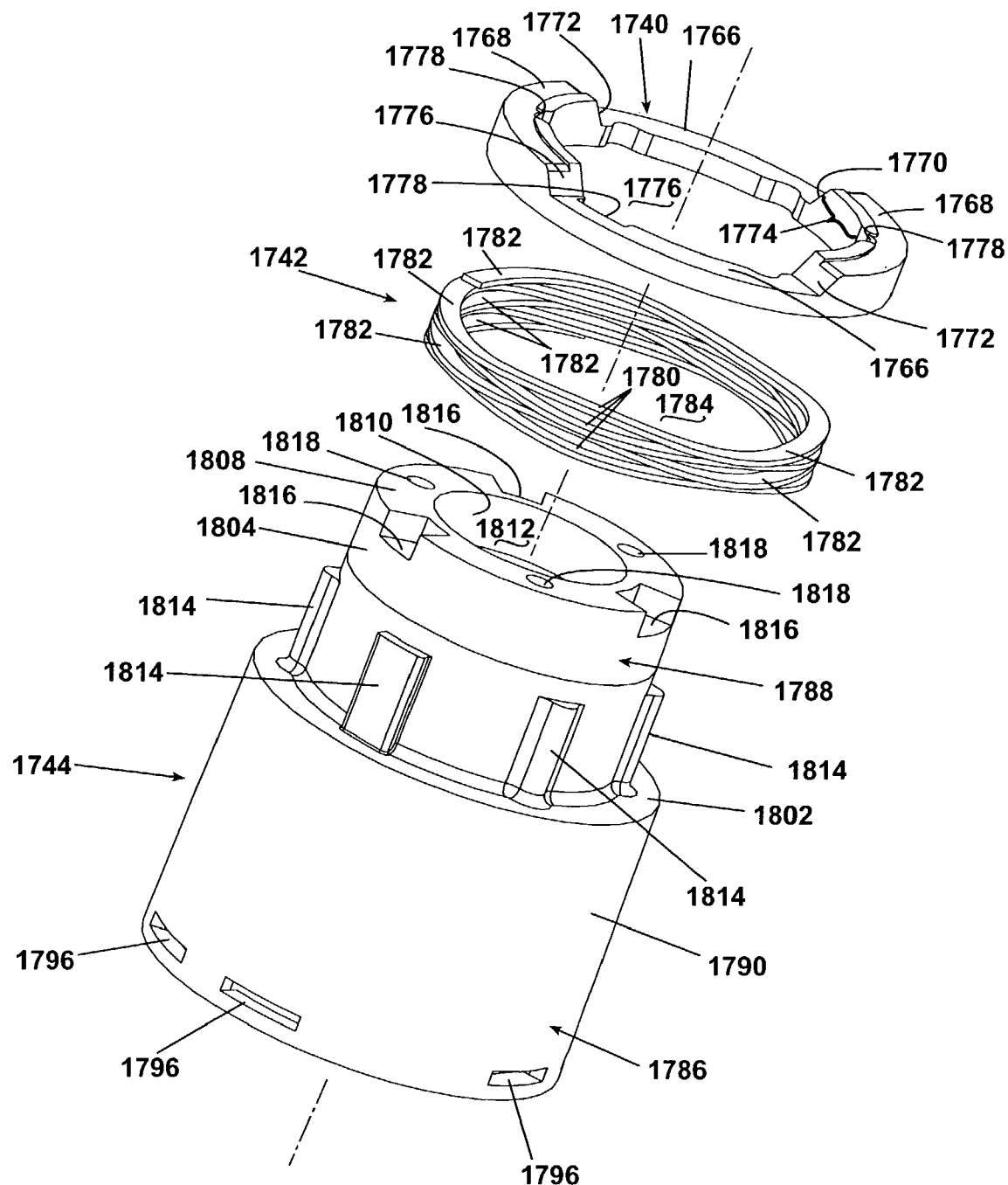

FIG. 131 is an exploded view of a ramp, a wave spring, and an actuator sub comprising a portion of the pivot mechanism of FIG. 128.

Figure 132:
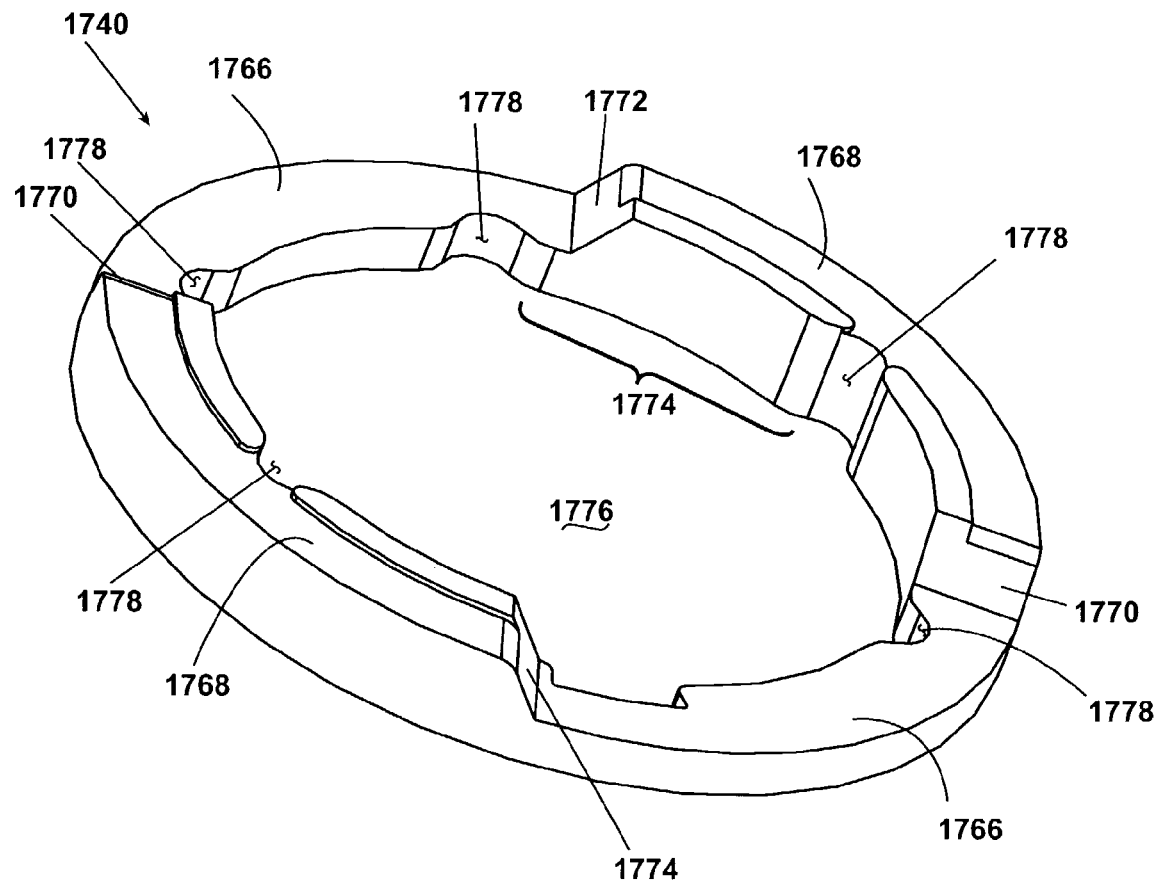

FIG. 132 is a perspective view of the ramp of FIG. 131.

Figure 133:
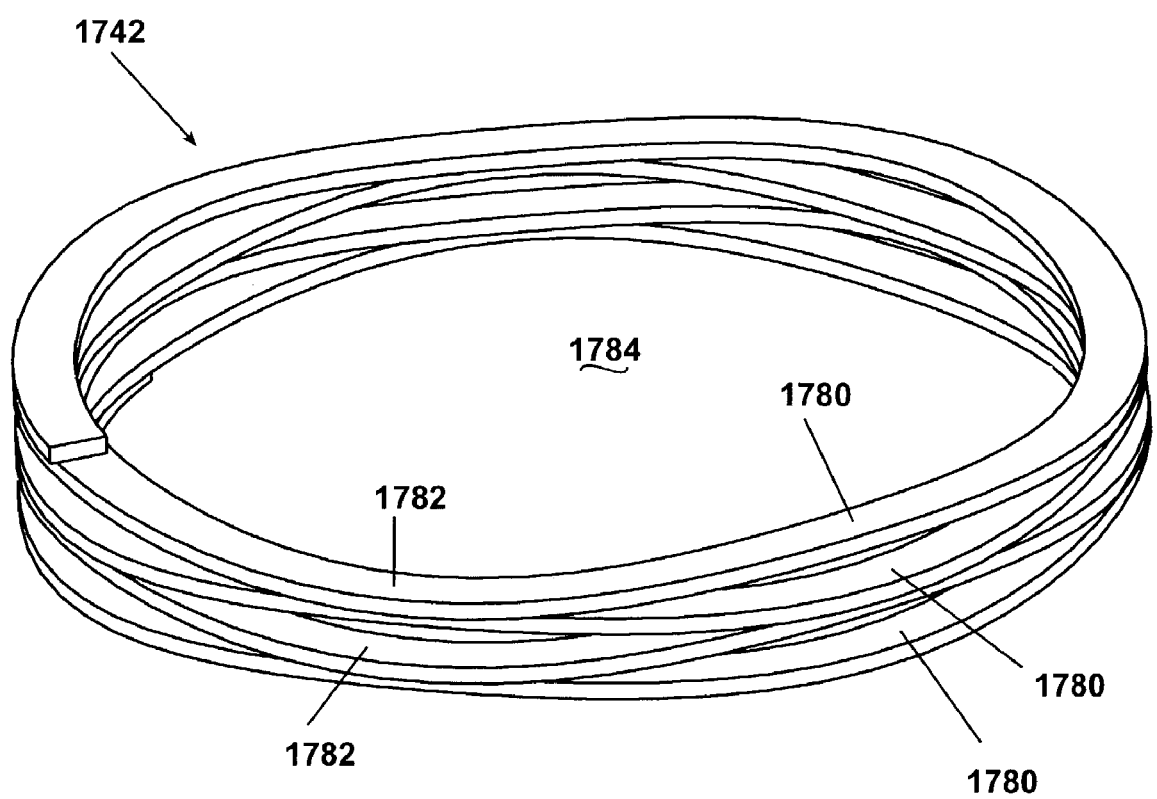

FIG. 133 is a perspective view of the wave spring of FIG. 131.

Figure 134:
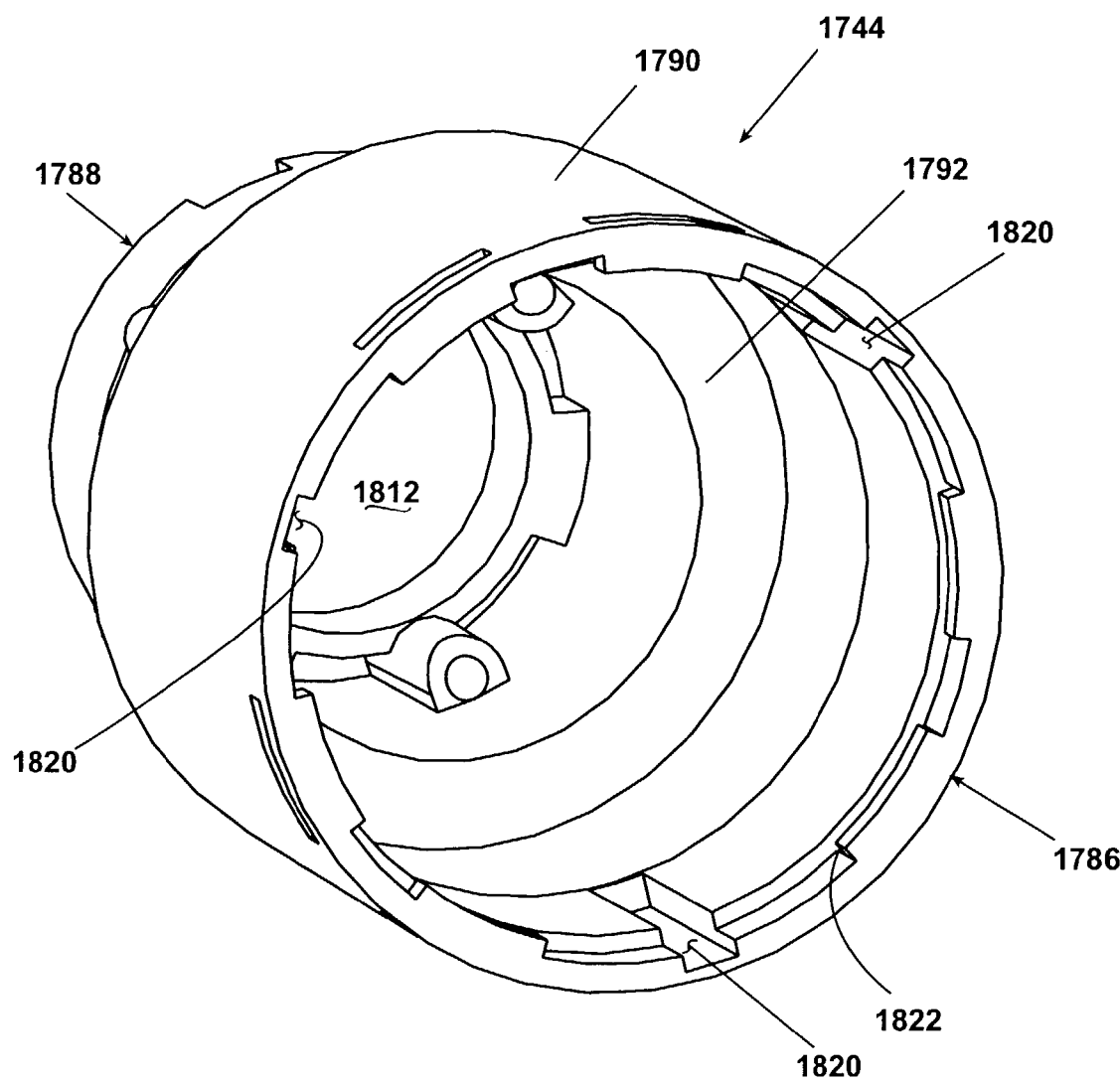

FIG. 134 is a perspective view of the interior of the actuator sub of FIG. 131.

Figure 135:
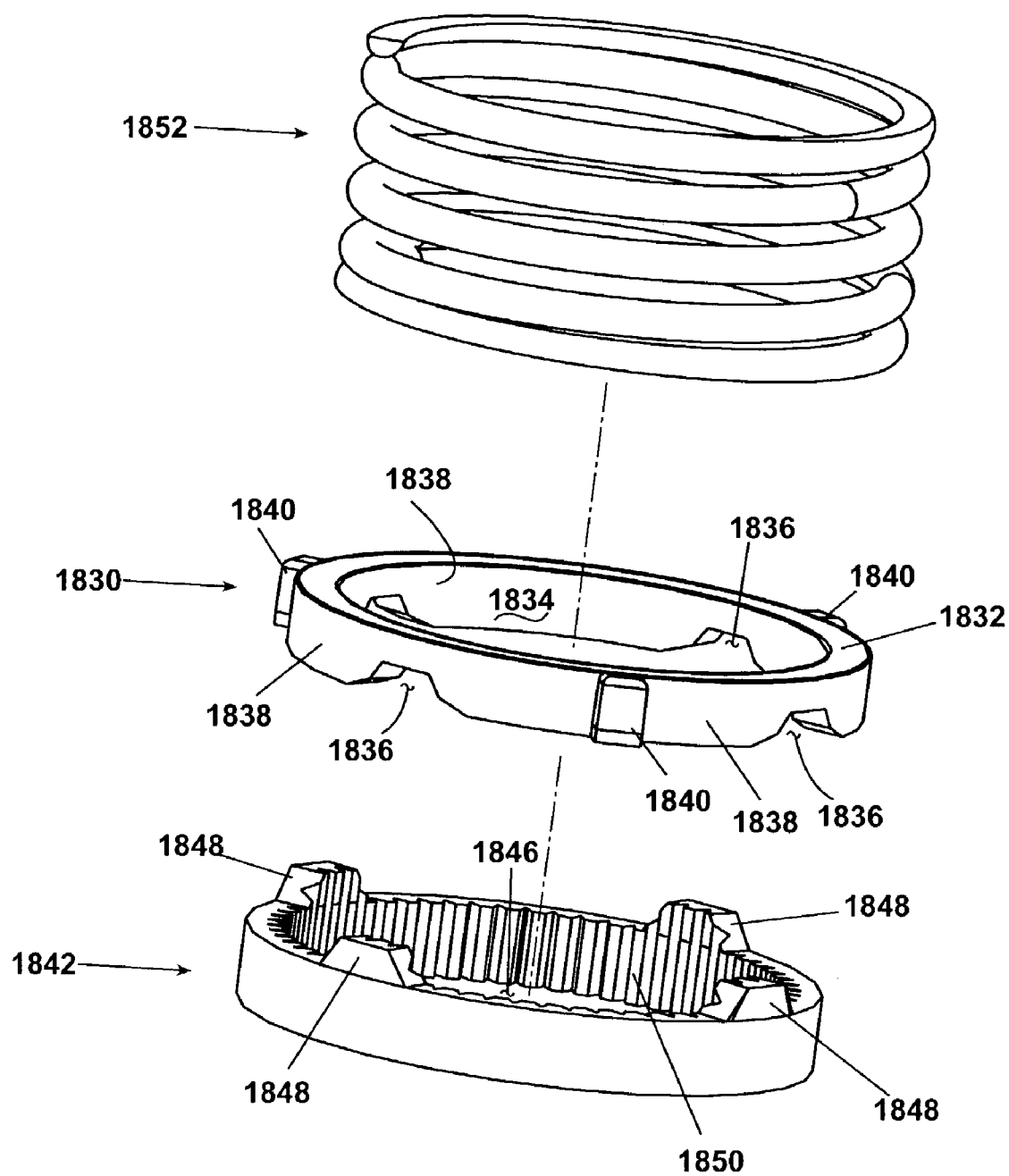

FIG. 135 is an exploded view of a spring, an actuator sub ring, and a ring gear comprising a portion of the pivot mechanism of FIG. 128.

Figure 136:
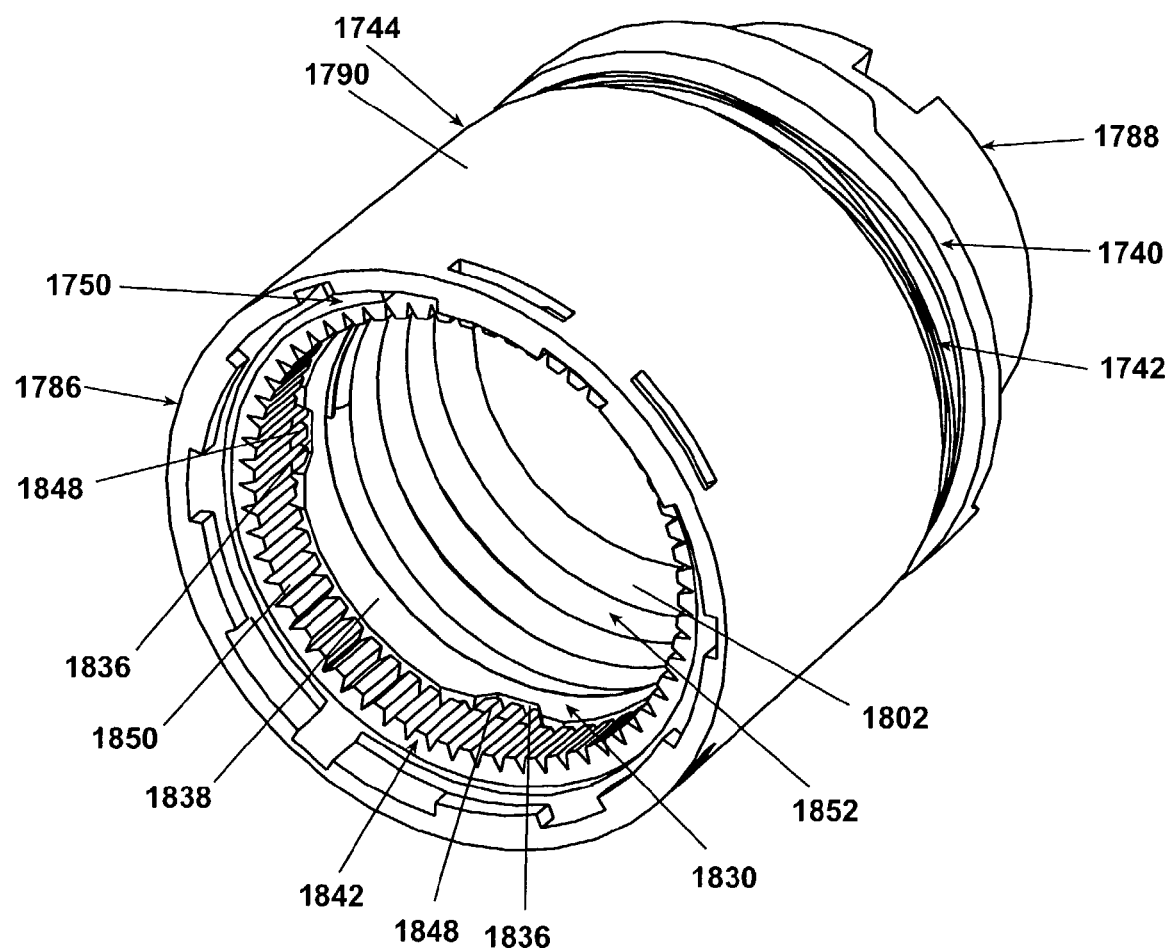

FIG. 136 is a perspective view of the interior of the actuator sub of FIG. 131 showing the spring, the actuator sub ring, the ring gear, and a C-ring installed therein.

Figure 137:
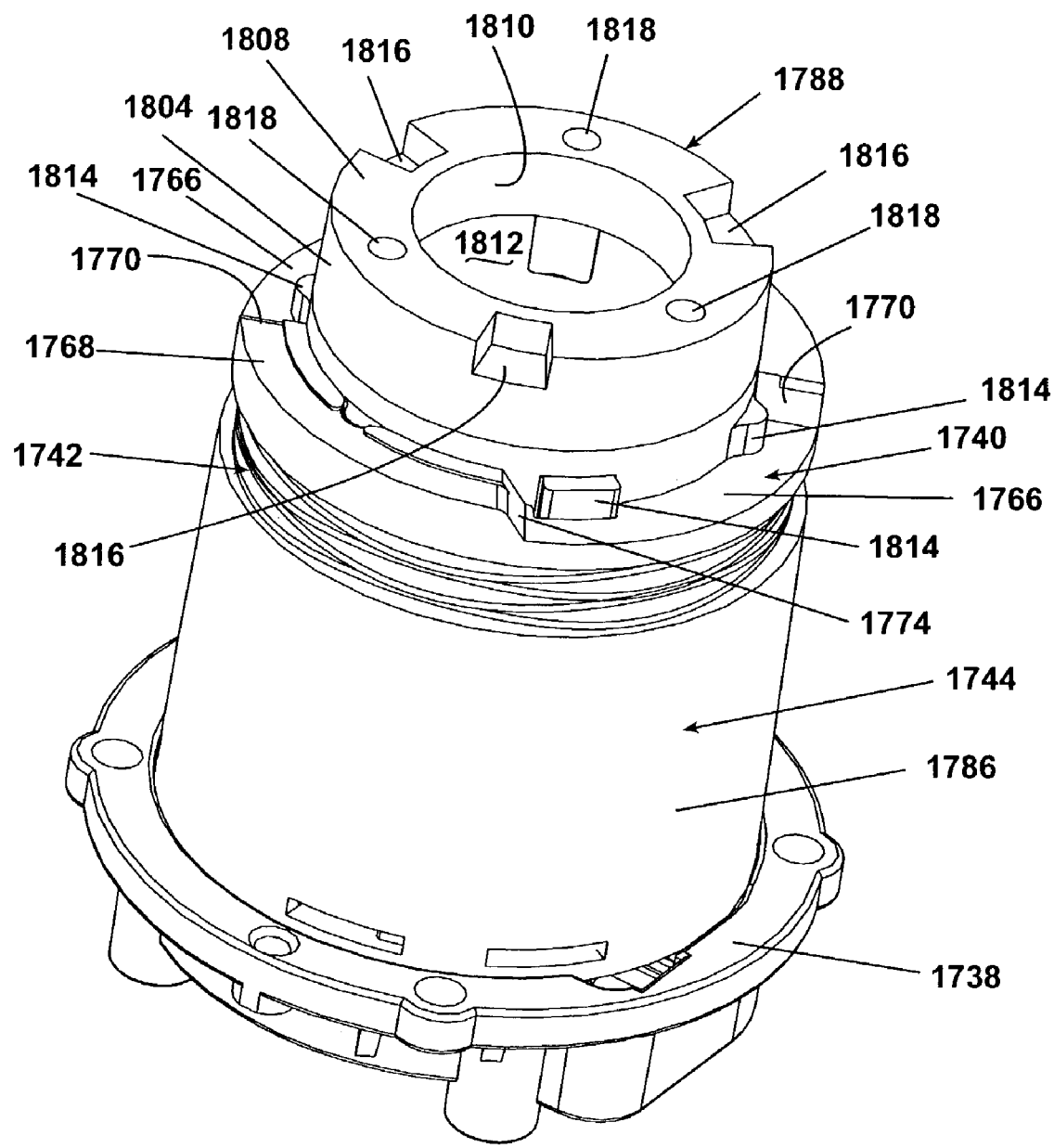

FIG. 137 is a perspective view of the assembled pivot mechanism of FIG. 128.

Figure 138:
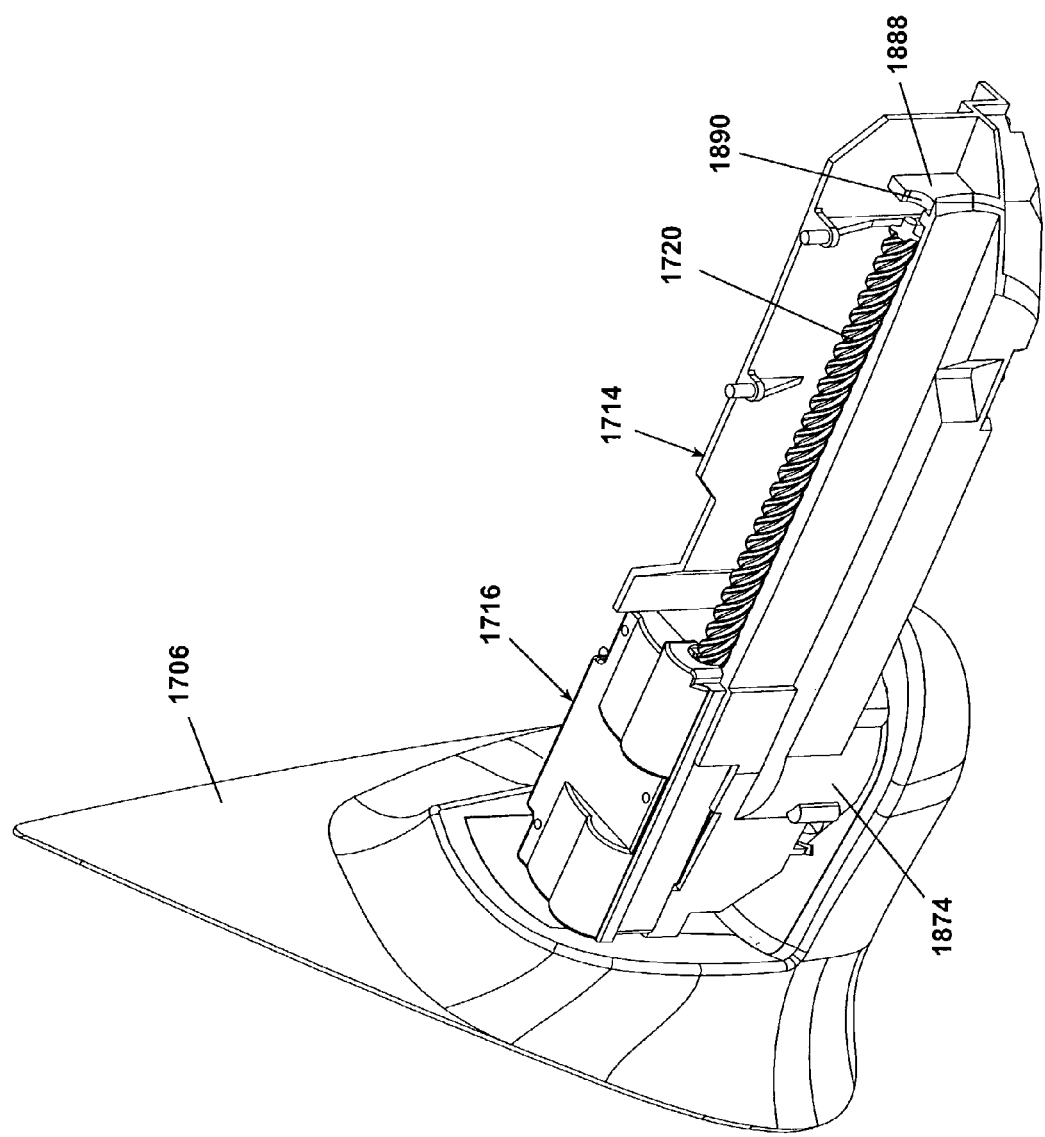

FIG. 138 is a perspective view of a portion of the drive assembly of FIG. 128 related to the extend function.

Figure 139:
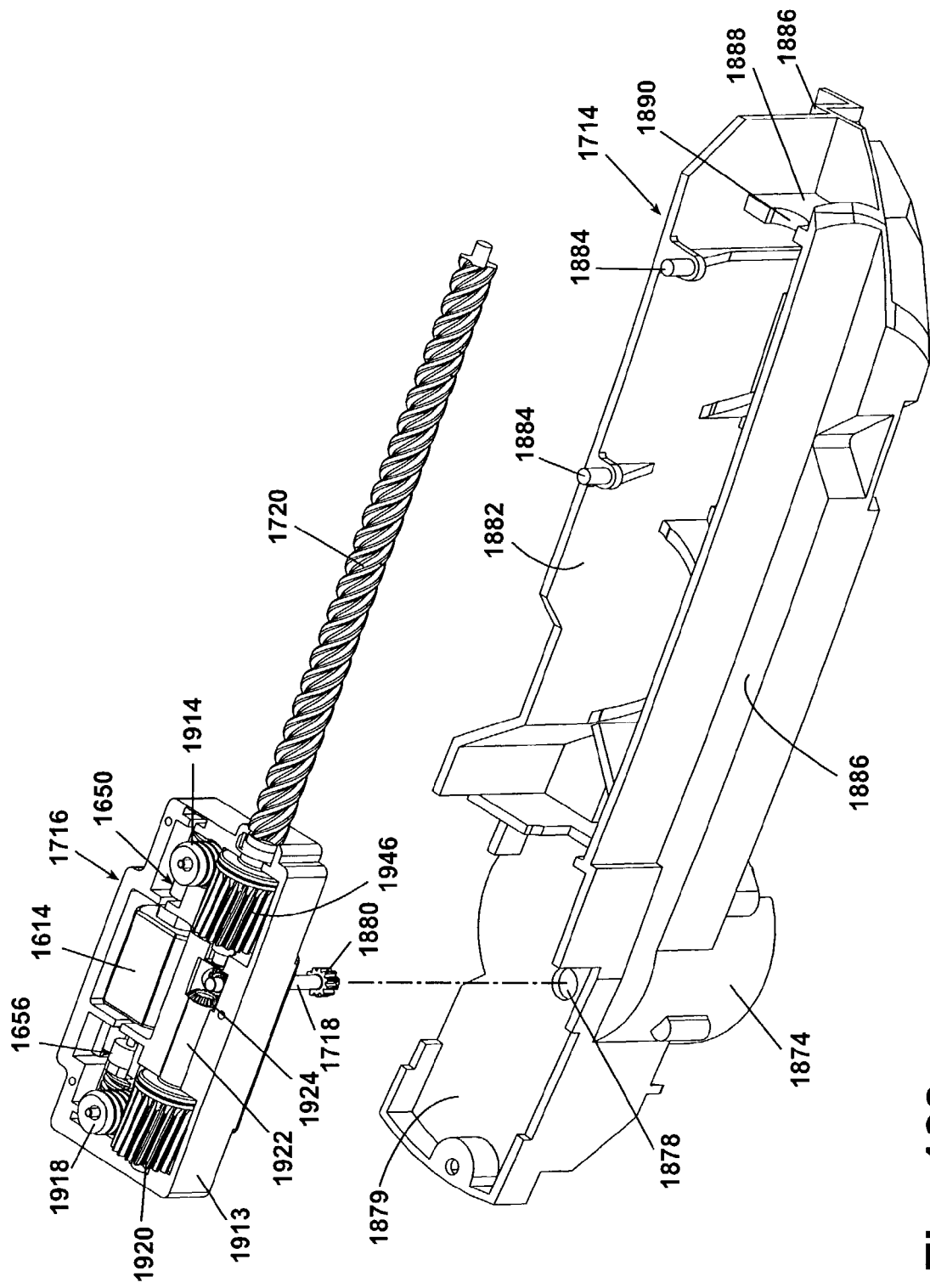

FIG. 139 is a perspective exploded view of some of the components shown in FIG. 137, including the motor according to the invention with the cover removed in relation to the drive assembly.

Figure 140:
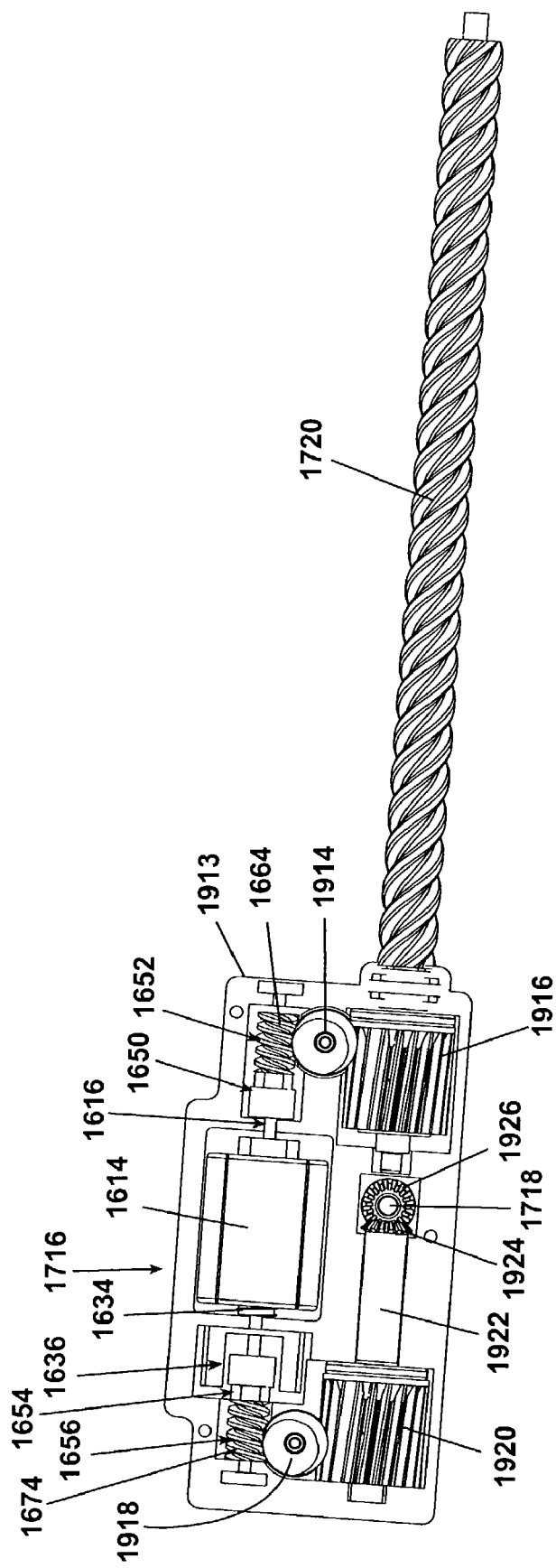

FIG. 140 is a plan view of the motor assembly of FIGS. 138 and 139 with the extend output screw.

Figure 141:
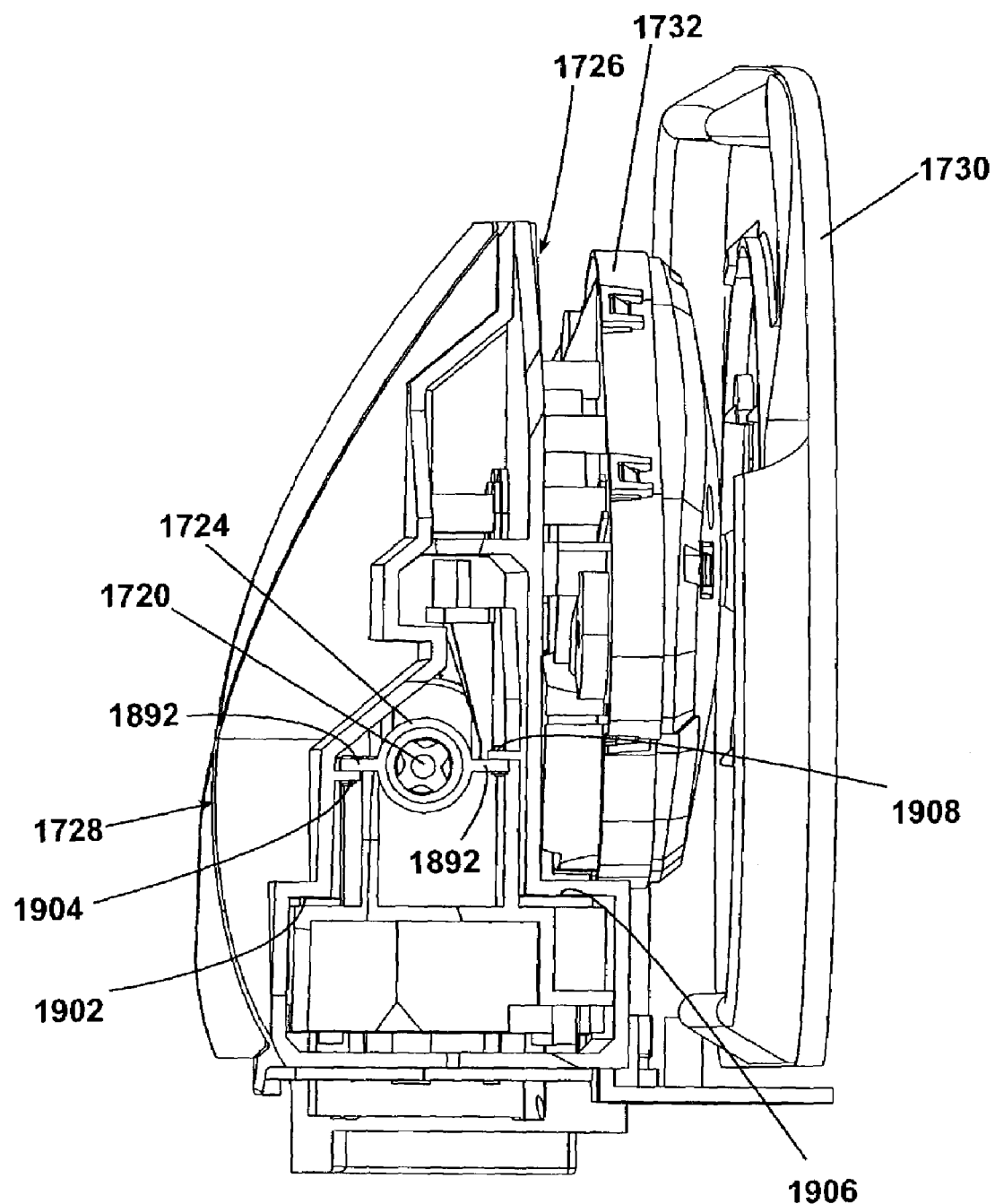

FIG. 141 is an end view of the rearview mirror assembly of FIG. 128 with the housing removed for clarity.

DESCRIPTION OF THE PREFERRED EMBODIMENTS

Several embodiments of a pivotably foldable and linearly extendable mirror are described herein. The embodiments comprise a functionality module comprising one or more of a powered-fold, powered-extend mechanism; a powered-fold, manual-extend mechanism; a manual-fold, powered-extend mechanism; a manual-fold, manual-extend mechanism; a powered-fold mechanism; a powered-extend mechanism; a manual-extend mechanism; and a manual-fold mechanism, as more fully disclosed herein.

Many of the elements of the mirror are common to more than one embodiment, and thus like numerals will be use to identify like elements in the several embodiments, except where otherwise indicated.

Referring now to the drawings and to FIGS. 1–4 in particular, a first embodiment of a vehicular mirror assembly 10 is shown comprising a mirror housing 12 pivotally and extendably mounted to a base 14, and driven by a motive element such as a 12-volt DC motor. The mirror housing 12 preferably carries a reflective element, such as a mirror, as identified by reference number 16. It will be understood that alternative and additional accessories for the mirror housing 12, base 14, and reflective element 16 can be included without departing from the scope of this invention. For example, the reflective element 16 can also include a wide view portion 18 as would be known to one skilled in the art. Other optional accessories include illumination devices such as a turn signal, or an assist light, and the like.

Figure 1:
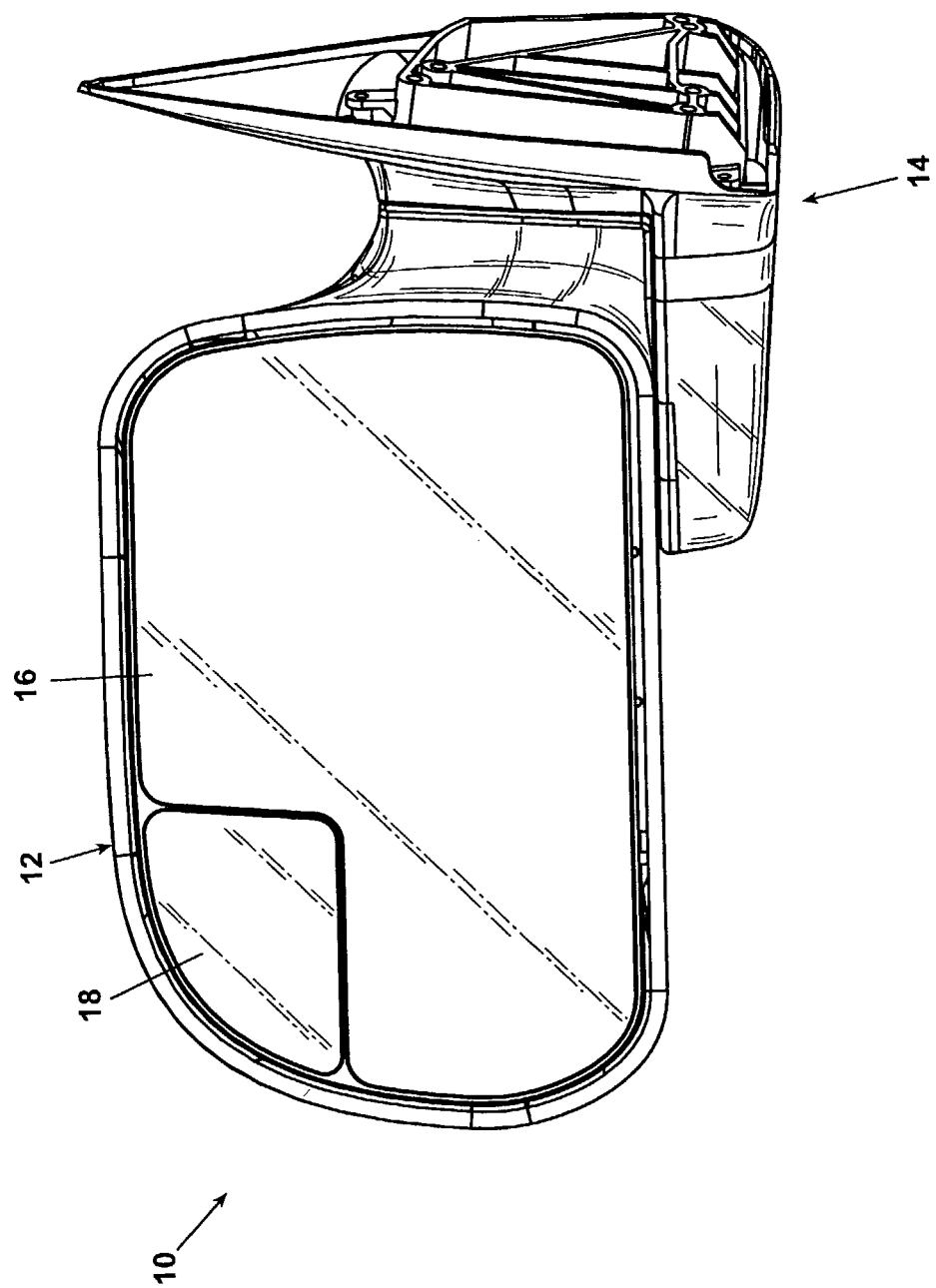
FIG. 1 is a front, elevational view of a first embodiment of a vehicular mirror assembly located in an extended, use position comprising a mirror housing pivotally connected to a base which, in turn, is adapted to be mounted to a vehicle, the mirror assembly being pivotally connected to the base by a first embodiment of a pivot mechanism including a pivoting force reduction mechanism according to the invention.
Figure 2:
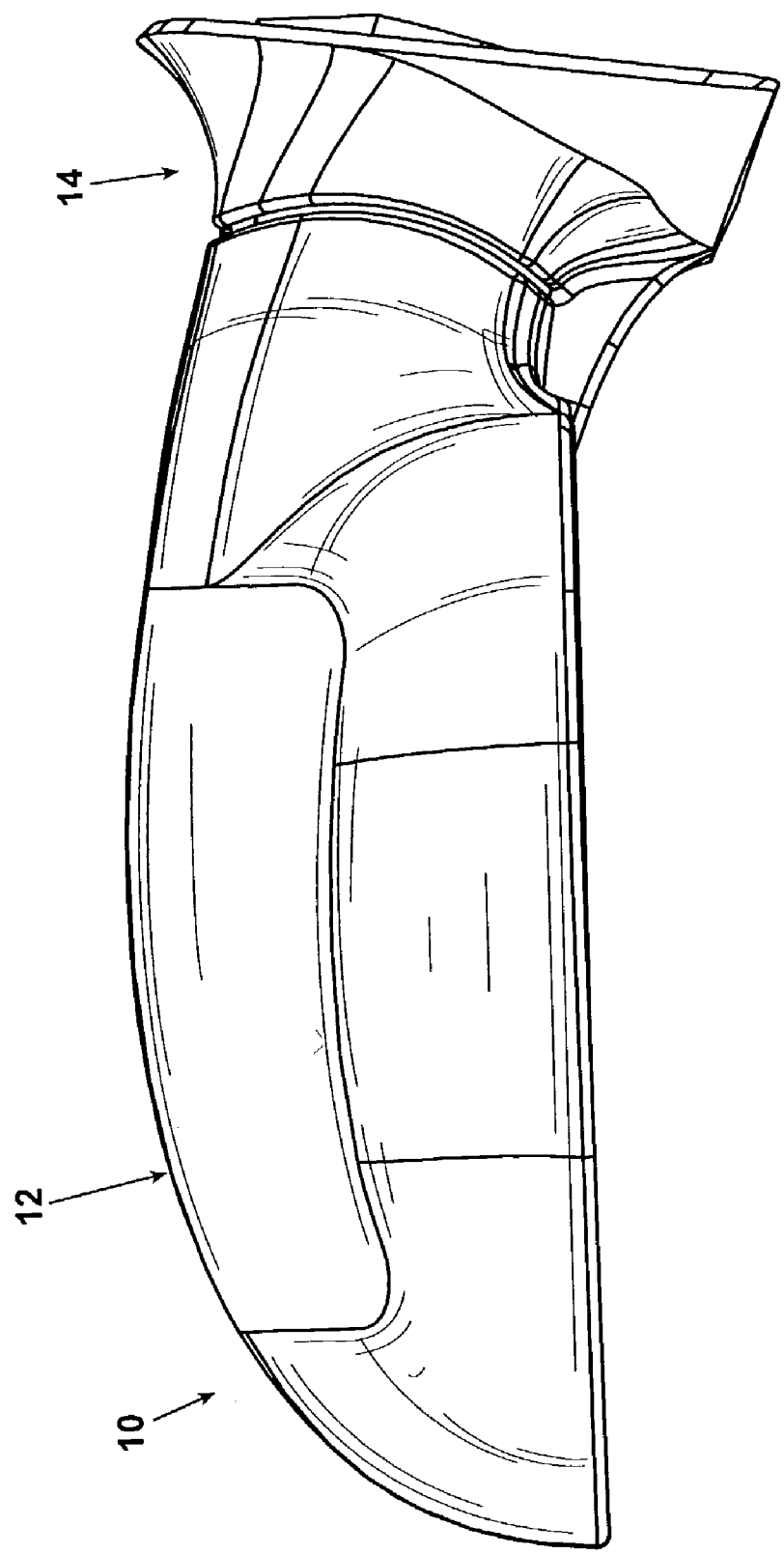
FIG. 2 is a top plan view of the vehicular mirror assembly of FIG. 1 in the extended, use position.

FIGS. 1 and 2 show the vehicular mirror assembly 10 located in an unfolded, use position wherein the mirror housing 12 is pivoted radially outwardly from the base 14 (i.e., adjacent the vehicle) so that the reflective element 16 is positioned for viewing by an occupant of the vehicle.

Figure 3:
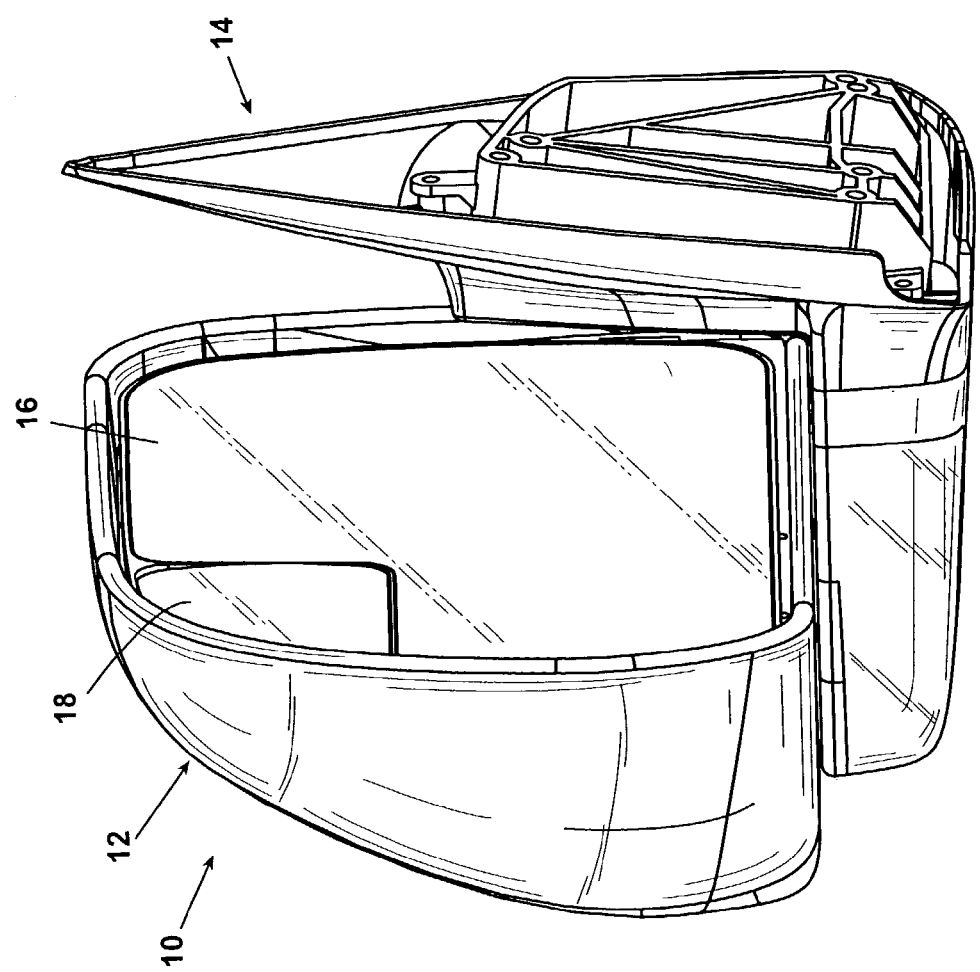
FIG. 3 is a front, elevational view of the vehicular mirror assembly of FIG. 1 showing the mirror housing pivoted relative to the base to a retracted, stored position.
Figure 4:
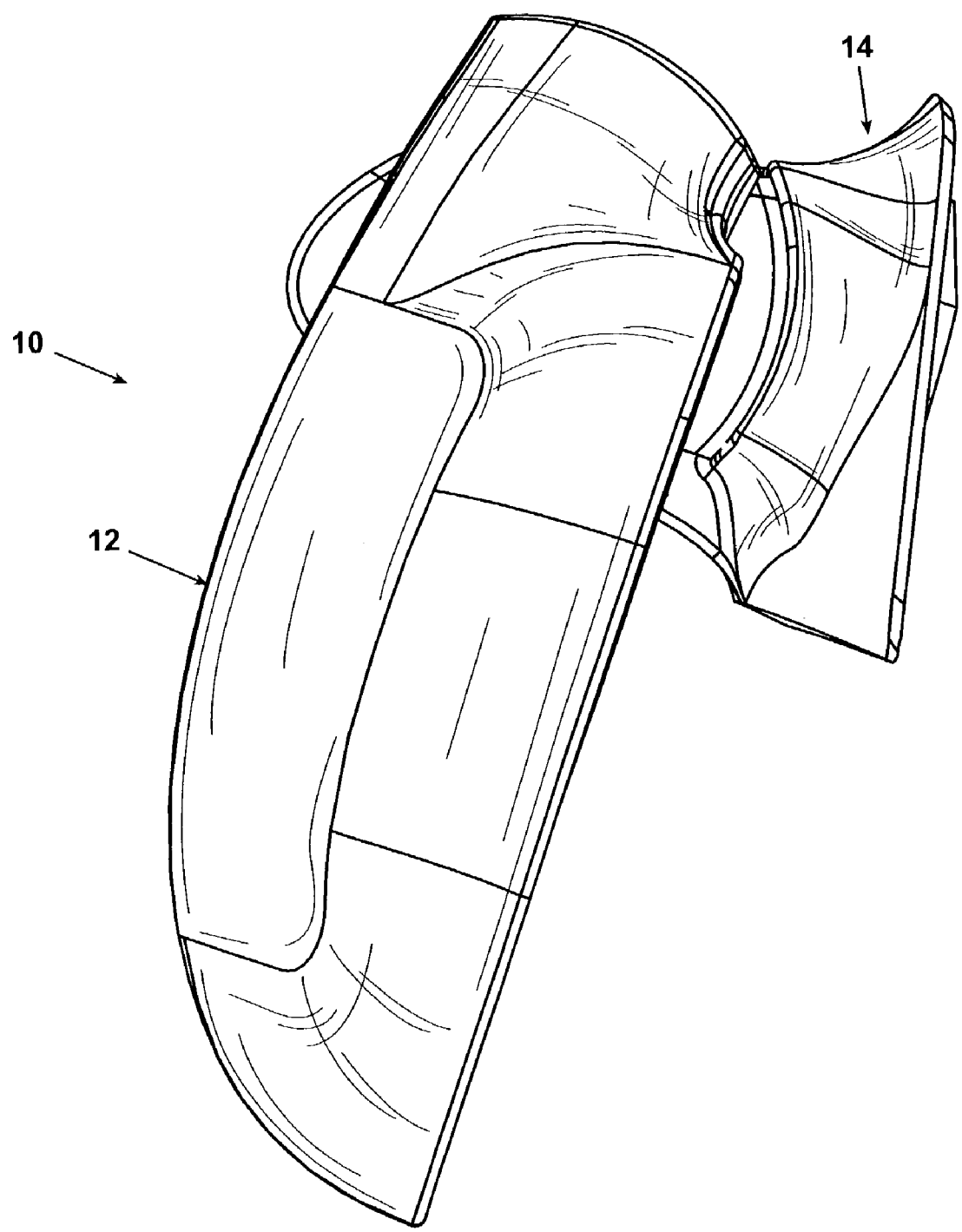
FIG. 4 is a top plan view of the vehicular mirror assembly of FIG. 1 in the retracted, stored position.

FIGS. 3 and 4 show the vehicular mirror assembly 10 located in a folded, stored position wherein the mirror housing 12 is pivoted radially inwardly toward the base 14 so that the reflective element 16 is stored adjacent to the vehicle and is less likely to be damaged by events external to the vehicle, such as passers by, other vehicles, carwashes, and the like.

Figure 58:
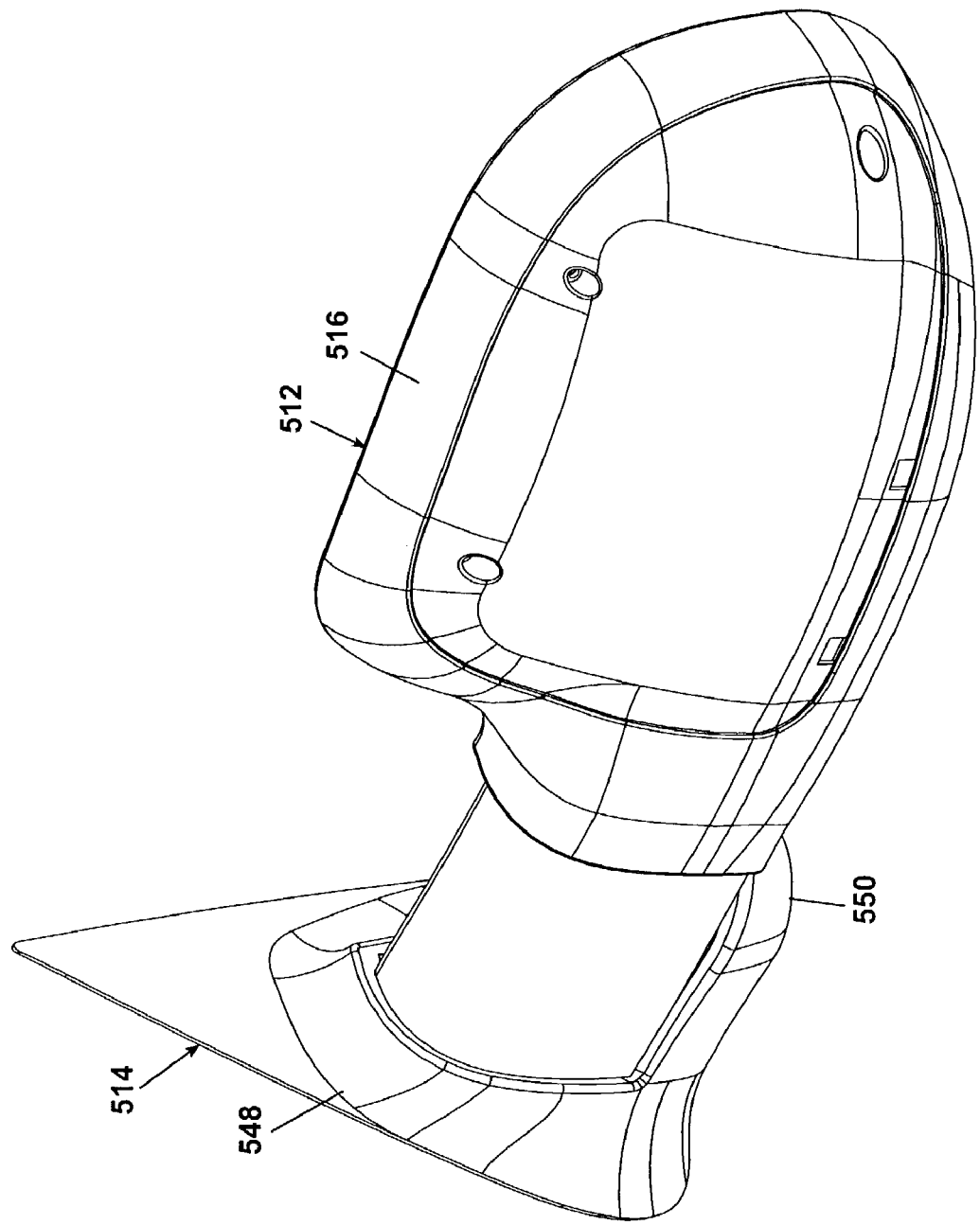
FIG. 58 is a top-right perspective view of the power fold mirror shown in the unfolded and extended position.
Figure 59:
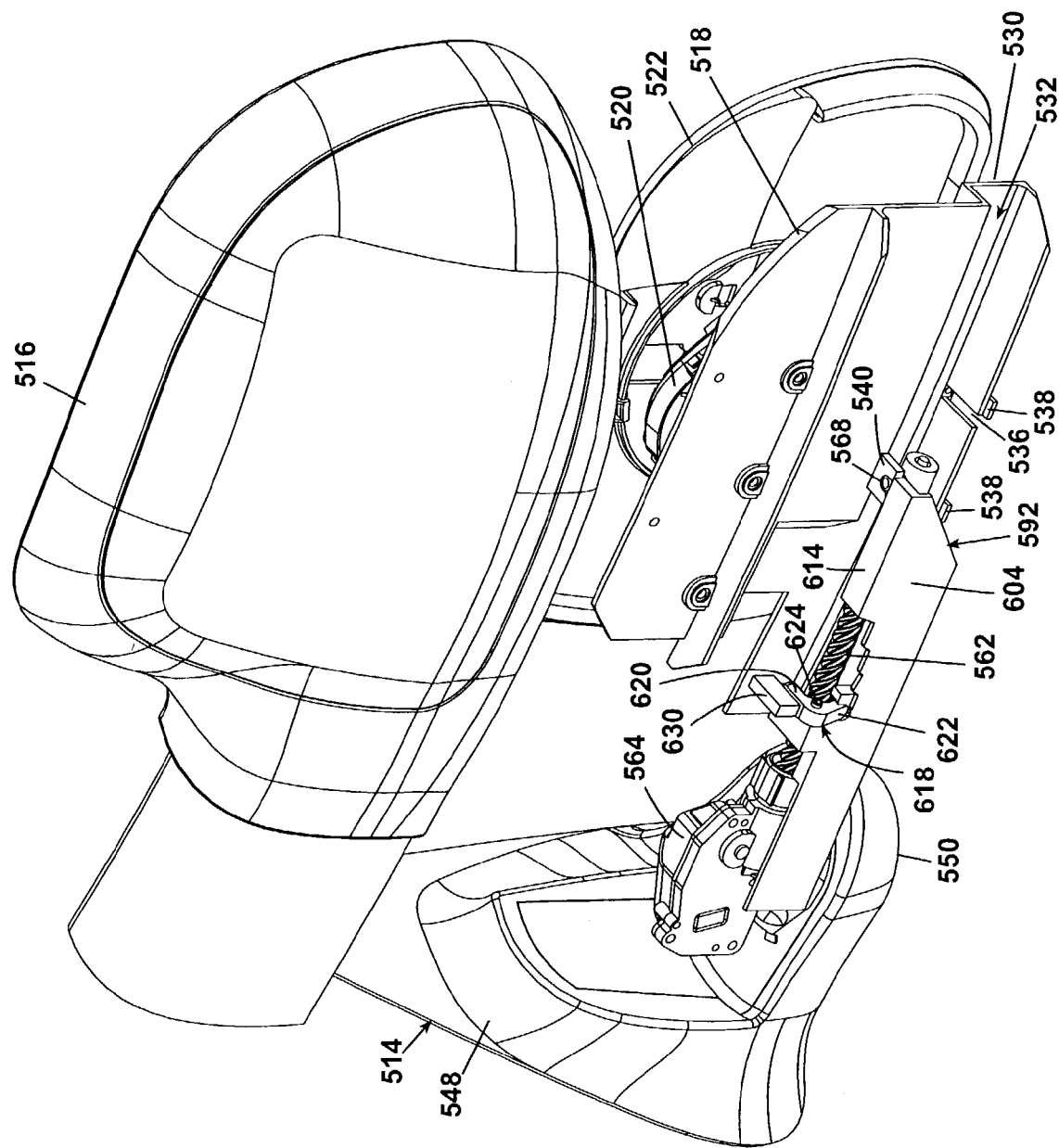
FIG. 59 is similar to FIGS. 47, 51 and 55 except that the drive nut is located on the drive screw at a position corresponding to the extended position of the mirror assembly.
Figure 60:
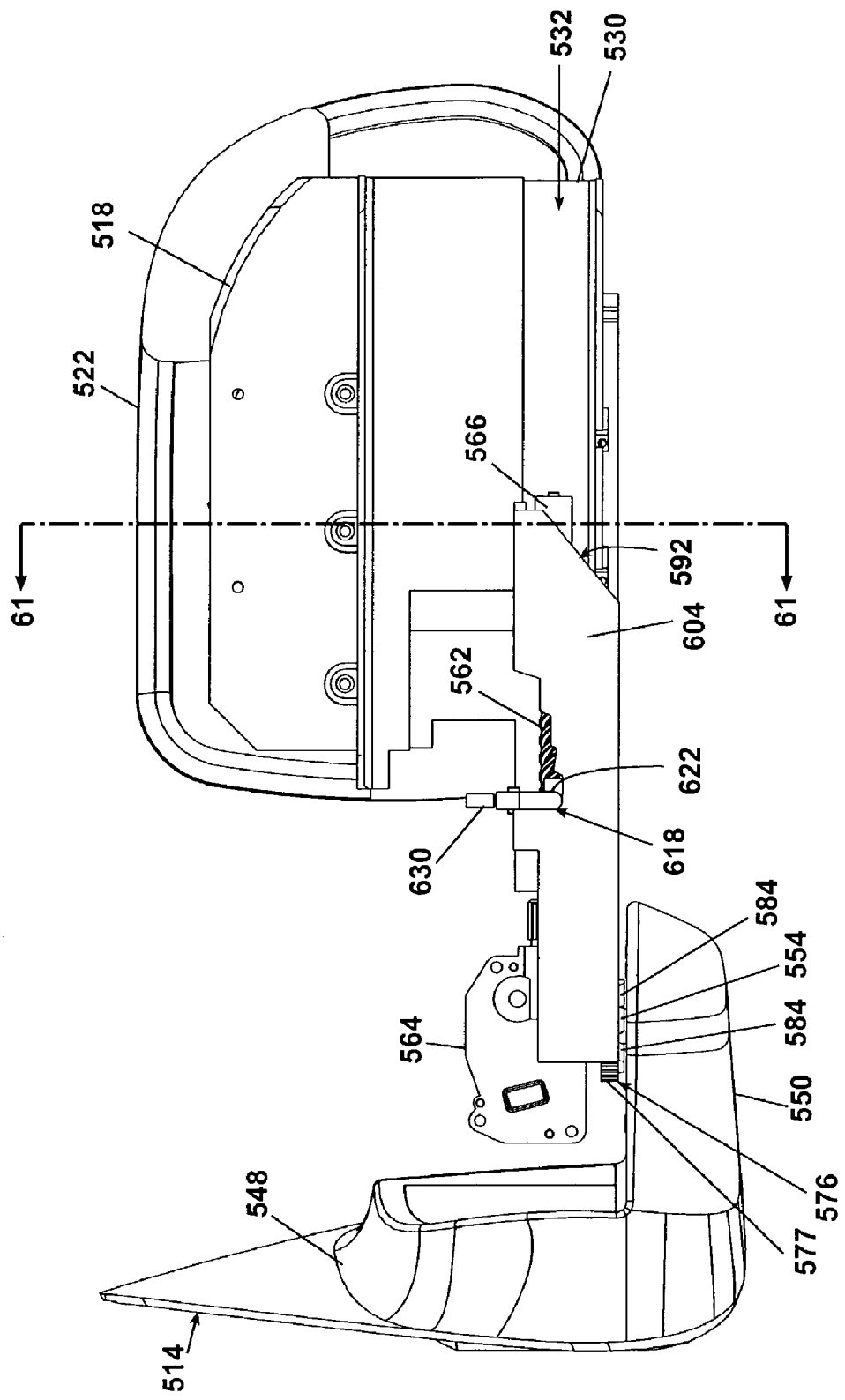
FIG. 60 is a view perpendicular to the mirror bracket of the mirror assembly of FIG. 59 with the mirror housing removed for clarity.

FIG. 58 shows a vehicular mirror assembly 10 located in an unfolded, extended, use position wherein the mirror housing 12 is pivoted radially and extended linearly outwardly from the base 14 so that the reflective element 16 is positioned for viewing by an occupant of the vehicle when an enhanced field of view is desired, such as when the vehicle is towing a trailer.

Figure 5:
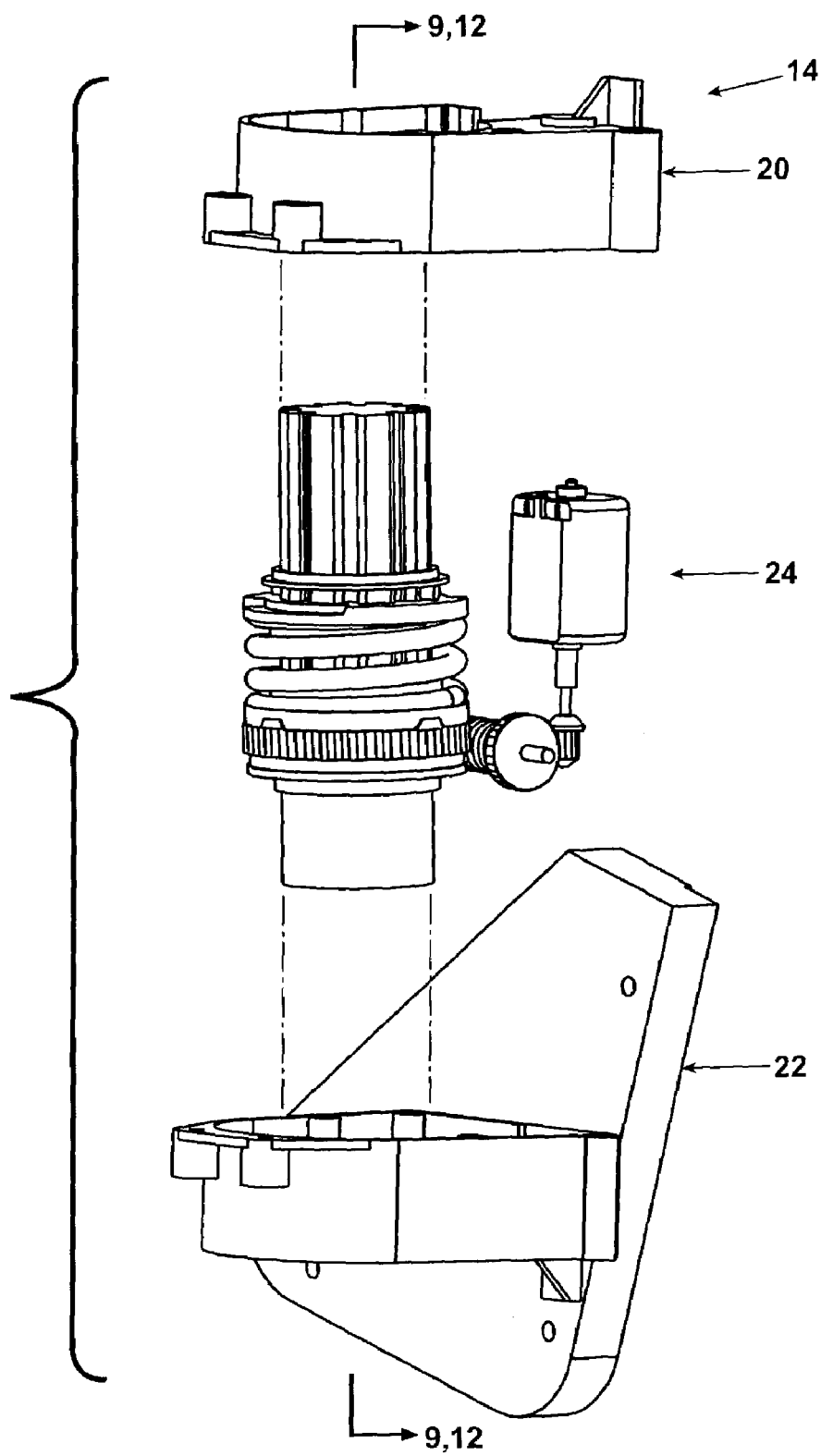
FIG. 5 is an exploded, perspective view of the vehicular mirror assembly of FIG. 1 showing an upper portion of the base, the pivot mechanism including the pivoting force reduction mechanism according to the invention, and a lower portion of the base.

A first embodiment of a pivot mechanism according to the invention will now be described. Turning to FIG. 5, the base 14 is shown comprising an upper portion 20 which functions as a cover and a lower portion 22 which functions as a support bracket for both mounting the base 14 to a vehicle and receiving a pivot mechanism 24. The pivot mechanism 24 is preferably fixedly mounted within the upper and lower portions 20 and 22 of the base 14 and includes a rotatable column which is mounted to the mirror housing 12 to effect the pivotal movement of the mirror housing 12 relative to the base 14.

Figure 6:
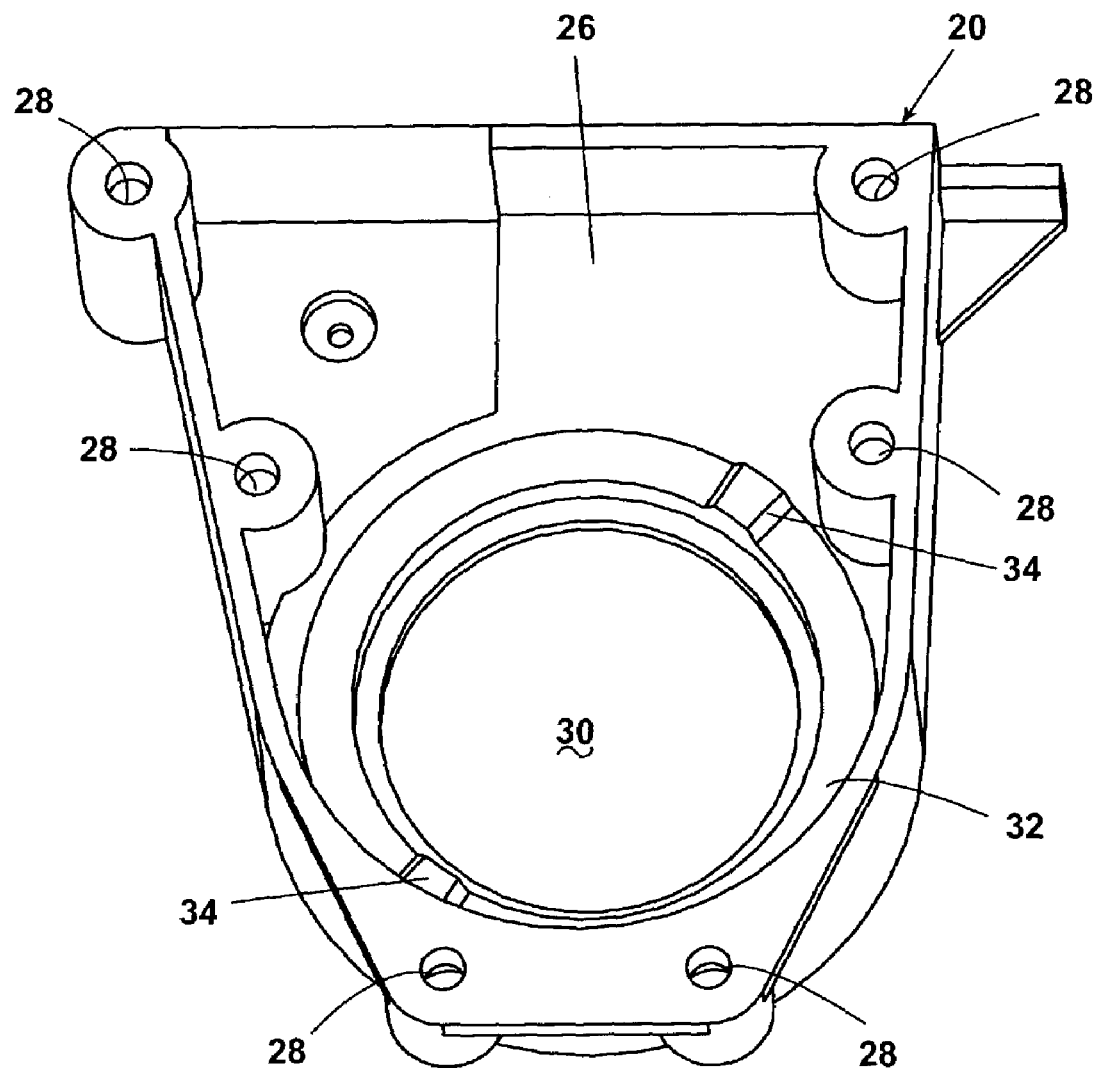
FIG. 6 is a perspective view of the upper portion of the base of FIG. 5 detailing an underside portion thereof.

Turning to FIG. 6, an underside 26 of the upper portion 20 of the base 14 is shown in greater detail. In addition to several mounting bosses 28 for receiving fasteners to mount the upper portion 20 to the lower portion 22, the upper portion 20 also includes a recess 30 adapted to receive an upper portion of the pivot mechanism 24 and to journal the same therein. The recess 30 is surrounded by an annular track 32 having a pair of diametrically opposed detents 34 having a generally trapezoidal configuration. The detents 34 are adapted to engage the pivot mechanism 24 in a manner that will be more fully described below.

Figure 7:
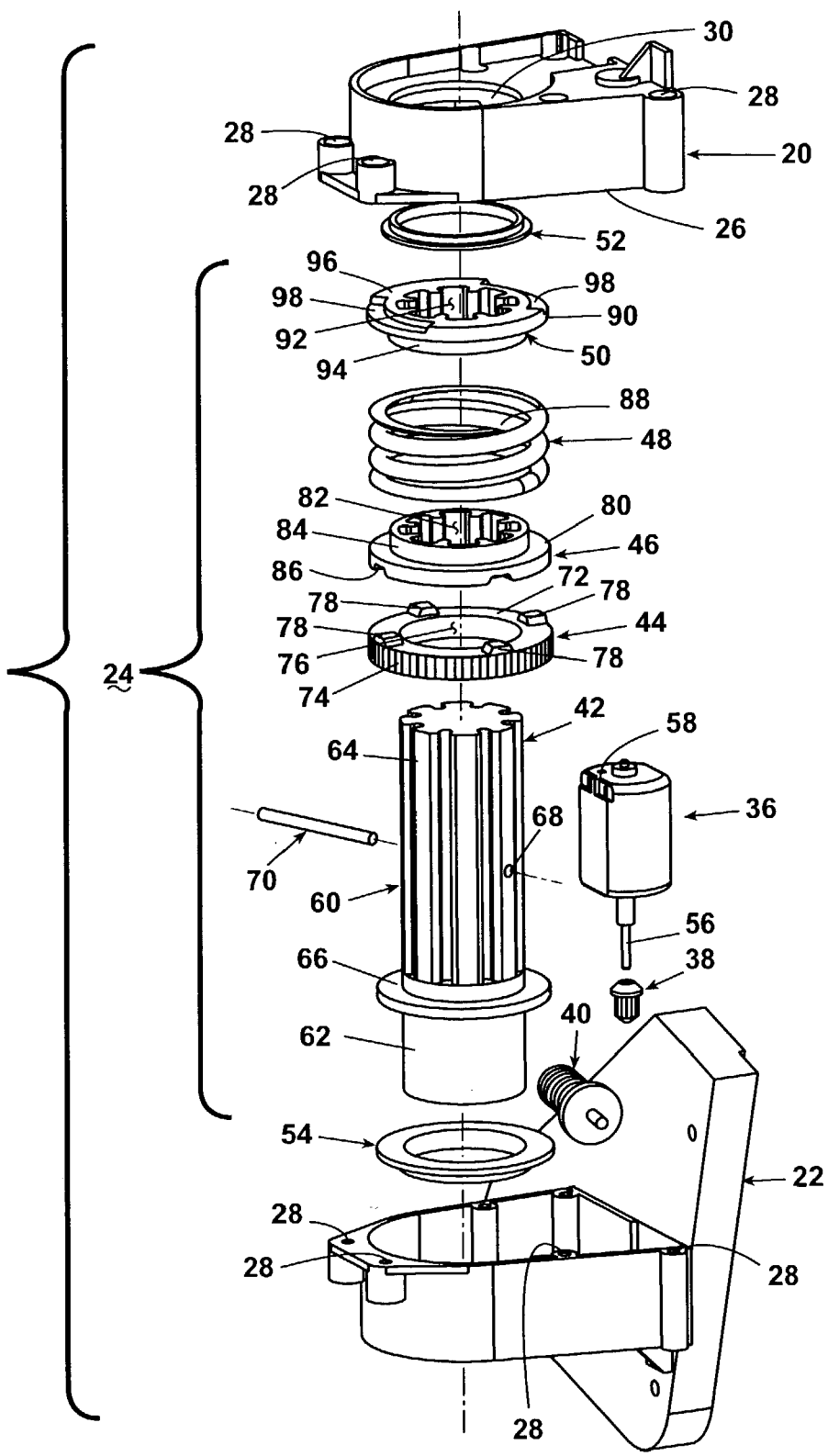
FIG. 7 is an exploded, perspective view of the components of FIG. 5, specifically exploding the pivot mechanism shown therein.

FIG. 7 shows the upper and lower portions 20, 22, respectively, and the pivot mechanism 24 in greater detail. Other than the specific features of the upper portion 20 called out with respect to the description of FIG. 6, the upper and lower portions 20 and 22 of the base 14 to be of any suitable configuration to be both mounted to a vehicle and to carry the mirror housing 12 for pivotal movement via the pivot mechanism 24. In general, the upper and lower portions 20 and 22 of the base 14 provide a housing for the pivot mechanism 24.

The structure of the components making up the pivot mechanism 24 will now be described in greater detail with respect to FIG. 7. The pivot mechanism 24 comprises a motor assembly 36, a pair of transfer gears 38 and 40, a rotatable column 42, an output gear 44, a release ring 46, a spring 48, a control ring 50 and upper and lower bushings 52 and 54, respectively.

The motor assembly 36 can be any of several well-known DC motors as would be known to one skilled in the art. It will be understood that, although a DC motor having a heavy-duty motor rating would have been used with prior art mirror pivoting devices, a DC motor having lighter duty characteristics can be used herein as a result of the pivoting force reduction mechanism embodied in the pivot mechanism 24 as will be more fully described herein. Alternatively, a motor rated the same as that used in the prior art can also be employed herein as well with the additional incidental benefits of lower power consumption and a longer motor life as a result of the force-reducing mechanism of the invention. As to be seen from FIG. 7, the motor assembly 36 preferably has an output shaft 56 that is rotatable upon any suitable signal and/or current applied to terminals 58 of the motor assembly 36.

The transfer gears 38 and 40 can be any acceptable gear in any of a number of well-known configurations for transferring the rotational output of the shaft 56 of the motor assembly 36 to the output gear 44 of the pivot mechanism 24. An example shown, a simple worm makes up the transfer gear 38 which, in turn, is meshed with the transfer gear 40 (shown generally as a spool-type gear). In turn, the transfer gear 40 can be operably interconnected with the output gear 44.

The rotatable column 42 comprises an elongated body 60 having a lower bearing portion 62 and an upper engagement portion 64 rotatably mounted thereto, separated by a radially-extending shoulder 66. The upper engagement portion 64 of the elongated body 60 preferably has a discontinuous cross section, such as the sprocket-type cross section shown in FIG. 7. In this embodiment, the upper engagement portion 64 has an outer diameter and an inner diameter. It will be understood that the discontinuous cross section of the upper engagement portion 64 preferably functions as a "key" for the release ring 46 and the control ring 50 as will be more fully described below. The upper engagement portion 64 also includes a diametrical bore 68 which is adapted to receive a pin 70 therethrough.

The output gear 44 comprises an annular body 72 having a peripheral surface 74, preferably provided with gear teeth of a pitch and diameter generally corresponding to that of the transfer gears 38 and 40. A central recess 76 is defined within the interior of the annular body 72. Further, an upper surface of the annular body 72 includes a number of detents 78, preferably at spaced radial locations thereon.

The release ring 46 comprises an annular body 80 having a central recess 82. A lower portion of the annular body 80 preferably has an outer diameter corresponding to that of the output gear 44. An upper portion of the annular body 80 preferably has a reduced-diameter neck portion 84 extending upwardly therefrom. The lower portion of the annular body 80 has an underside surface with indentations 86 preferably corresponding in spacing and alignment with the detents 78 on the output gear 44. An inner wall defining the central recess 82 preferably has a cross section adapted to be received on the upper engagement portion 64 of the rotatable column 42 for slidable but non-rotatable engagement therewith.

The spring 48 can be any suitable biasing member for placing the pivot mechanism 24 in tension. By way of example and not in limitation of the invention, a coil spring is shown as the spring 48 in the drawings associated with this embodiment of the invention. Substitute types of biasing members for the coil spring include leaf springs, ramp springs, and the like. Preferably, the spring 48 has a central recess 88 adapted to be received on the upper engagement portion 64 in a slidable manner and adapted to seat on the reduced-diameter neck portion 84 of the release ring 46.

The control ring 50 comprises an annular body 90 having a central recess 92. An inner wall defining the central recess 92 preferably has a cross section adapted to be received on the upper engagement portion 64 of the rotatable column 42 for slidable but non-rotatable engagement therewith. A lower portion of the annular body 90 preferably has a reduced-diameter neck portion 94 of similar configuration to the neck portion 84 of the release ring 46. The annular body 90 preferably extends radially outwardly to a greater extent than the neck portion 94. An upper surface 96 of the annular body 90 of the control ring 50 preferably includes a pair of opposed grooves 98 having terminal ends which preferably define a normal range of movement of the mirror housing 12 between the retracted and extended positions with respect to the base 14. As can be seen from FIG. 7, the grooves 98 extend inwardly from a peripheral edge of the annular body 90, preferably having a radial width generally corresponding to the detents 34 on the upper portion 20 of the base 14. The grooves 98 also preferably have a depth being slightly less than the vertical height of the detents 34.

The upper and lower bushings 52 and 54 are preferably any suitable annular member for securing the pivot mechanism 24 within the recess 30 in the upper portion 20 and a similar recess (not shown) in the lower portion 22 of the base 14.

The assembly of the pivot mechanism 24 from the components 36–50 will now be described. The lower bushing 54 is mounted within the suitable recess in the lower portion 22 of the base 14. The lower bearing portion 62 of the rotatable column is placed within the lower bushing 54 and is fixedly mounted to the lower portion 22 of the base 14 such as with one or more conventional fasteners (not shown). The transfer gear 38 is fixedly mounted on the output shaft 56 of the motor assembly 36 and the transfer gear 40 is mounted for rotation within the lower portion 22 of the base 14. The motor assembly 36 (with the attached transfer gear 38) is preferably mounted within the lower portion 22 of the base 14 in a manner that enmeshes the teeth of the transfer gear 38 with the teeth of the transfer gear 40.

The output gear 44 is placed onto the upper engagement portion 64 of the rotatable column 42. It will be understood that, since the central recess 76 of the output gear 44 has a smooth inner surface, the output gear 44 can rotate freely with respect to the upper engagement portion 64. The gear teeth on the peripheral surface 74 of the output gear 44 are preferably enmeshed with the teeth of the transfer gear 40 when the output gear rests atop the shoulder 66 on the rotatable column 42.

The release ring 46 is placed onto the upper engagement portion 64 so that the discontinuous central recess 82 of the release ring 46 is keyed for rotation with the sprocket-type cross section of the upper engagement portion 64 of the rotatable column 42. In addition, the indentations 86 on the underside of the release ring 46 preferably receive the corresponding detents 78 on the upper surface of the output gear 44.

The spring 48 is placed onto the upper engagement portion 64 of the rotatable column 42 so that a bottom surface of the spring 48 rests on the annular body 80 of the release ring 46 and the reduced-diameter neck portion 84 of the release ring 46 is received within the central recess 88 of the spring 48.

The control ring 50 is placed onto the upper engagement portion 64 of the rotatable column 42 so that the reduced-diameter neck portion 94 of the control ring 50 seats within the central recess 88 of the spring 48. In addition, the discontinuous central recess 92 of the control ring 50 is preferably keyed for rotation with the sprocket-type cross-section section of the upper engagement portion 64 of the rotatable column 42.

Once these components are placed on the upper engagement portion 64 of the rotatable column 42, the control ring 50 is depressed against the bias of spring 48 until an upper surface of the annular body 90 of the control ring 50 traverses past the bore 68 located in the upper engagement portion 64 of the rotatable column 42. Once the control ring 50 is depressed beneath the bore 68, the shaft 70 is inserted within the bore 68 and the downward pressure on the control ring 50 is released. The spring 48 attempts to return to its unbiased position and bears the upper surface of the annular body 90 of the control ring 50 against ends of the shaft protruding from the bore 68. The assembly serves as a force-modifying device by reducing the force between the detents 34 and the grooves 98, thus reducing the force needed to rotate the mirror housing relative to the base 14. The assembled pivot mechanism 24 can be seen in FIG. 8.

The upper bushing 52 is placed within the recess 30 and the upper end of the upper engagement portion 64 is passed through the recess 30 in the upper portion 20 of the base 14 where it is mounted, preferably fixedly, to the mirror housing 12. Rotation of the upper engagement portion 64 relative to the lower bearing portion 62 of the rotatable column 42 causes rotation of the mirror housing 12 relative to the base 14, and vice versa.

Figure 8:
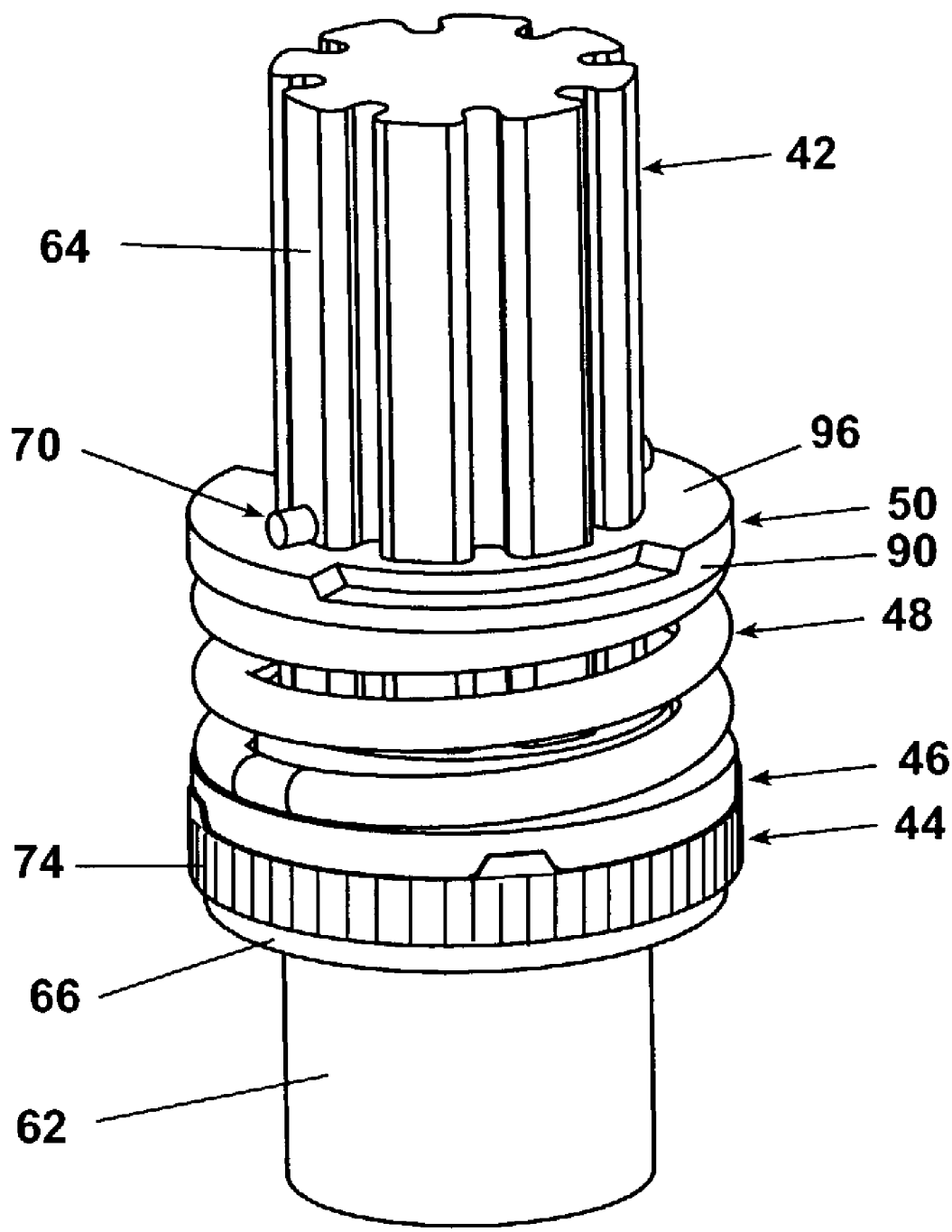
FIG. 8 is a perspective view of the pivot mechanism including the pivoting force reduction mechanism of FIG. 5.
Figure 9:
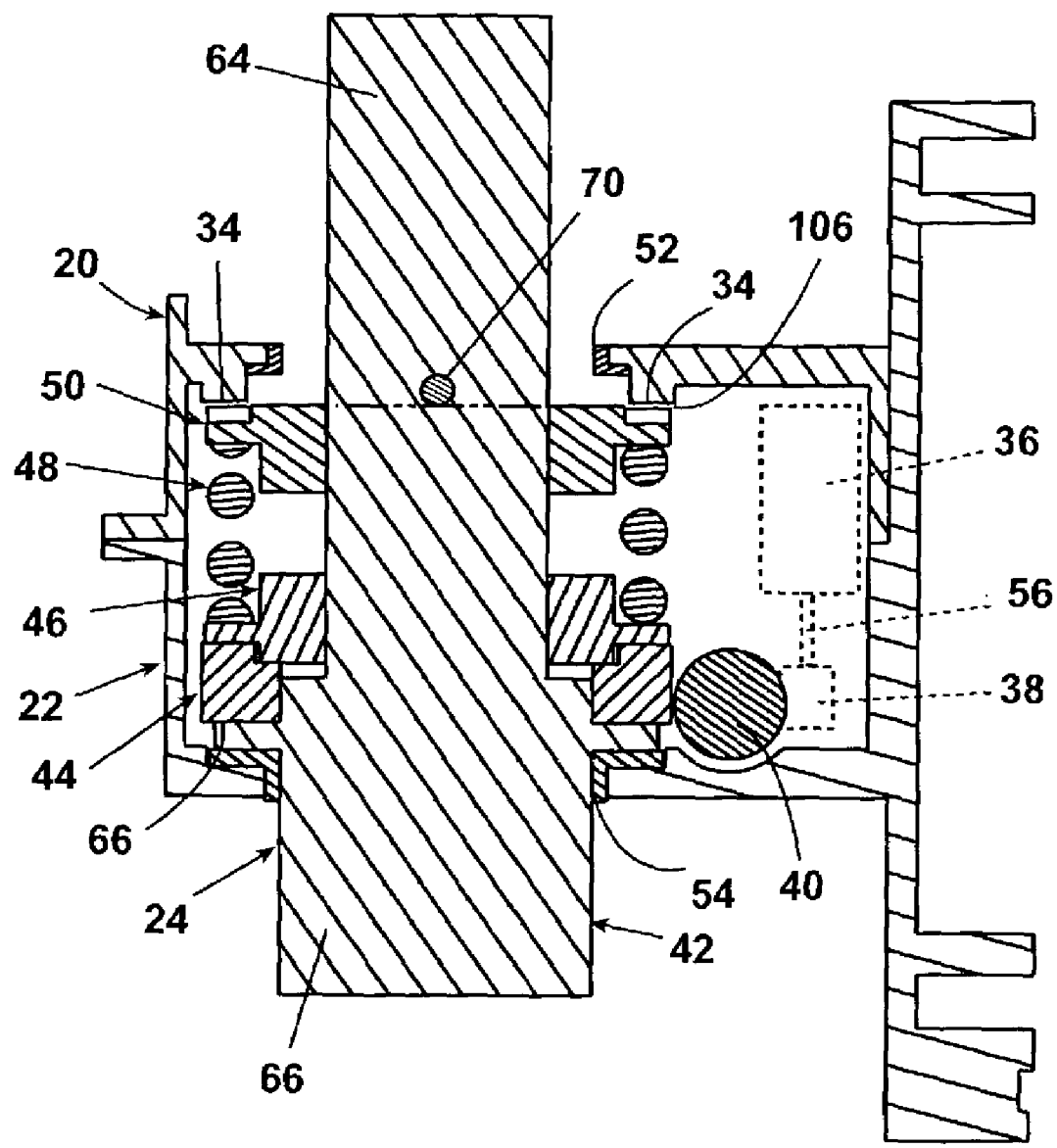
FIG. 9 is a cross-sectional view taken along line 9—9 of FIG. 5 showing the assembled pivot mechanism having the pivoting force reduction mechanism in an activated state.
Figure 10:
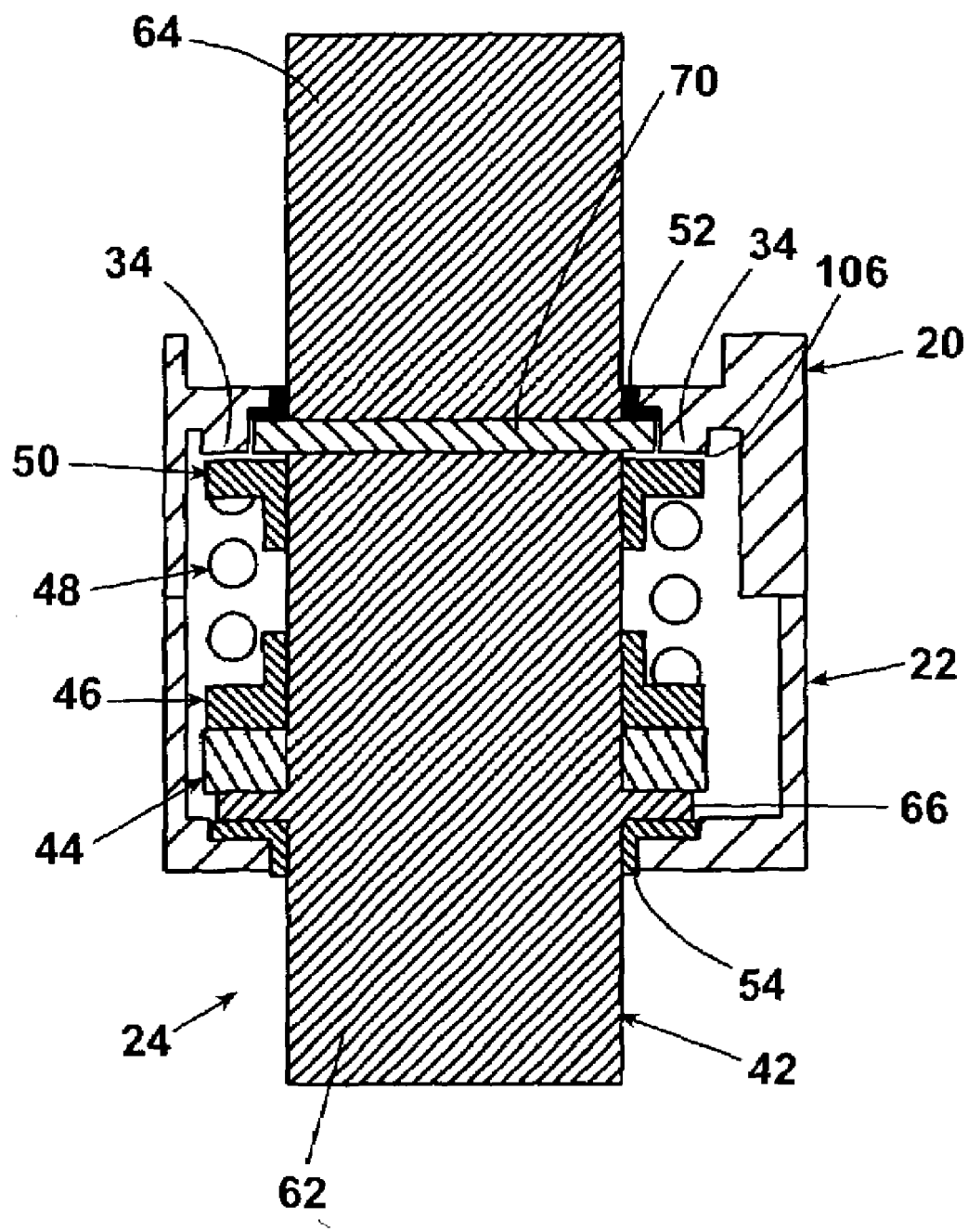
FIG. 10 is a cross-sectional view orthogonal to the view taken along line 9—9 of FIG. 5 showing the pivot mechanism having the pivoting force reduction mechanism in the activated state.
Figure 11:
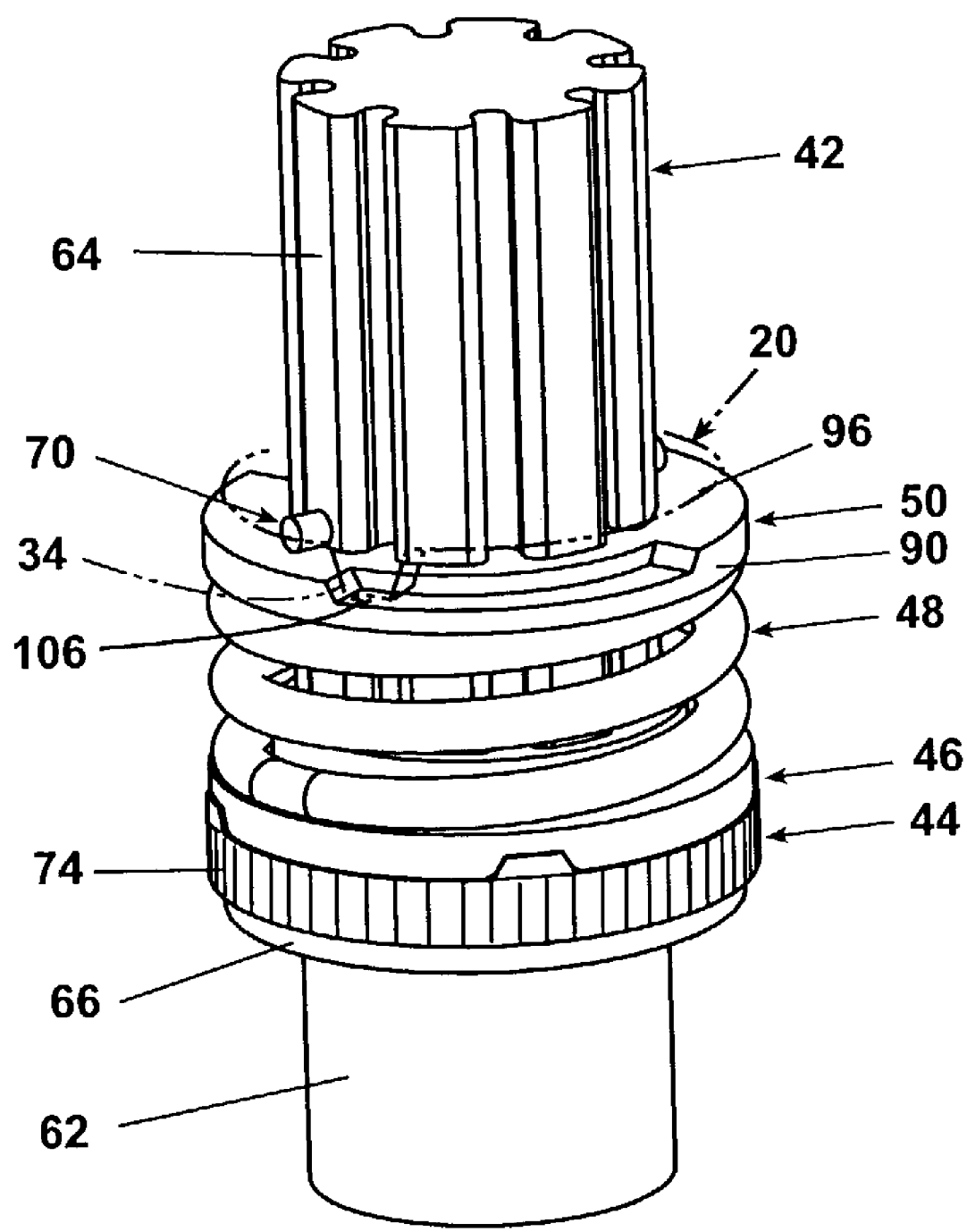
FIG. 11 is a perspective view in a similar orientation as FIG. 8 showing the pivot mechanism including the pivoting force reduction mechanism in the activated state.
Figure 12:
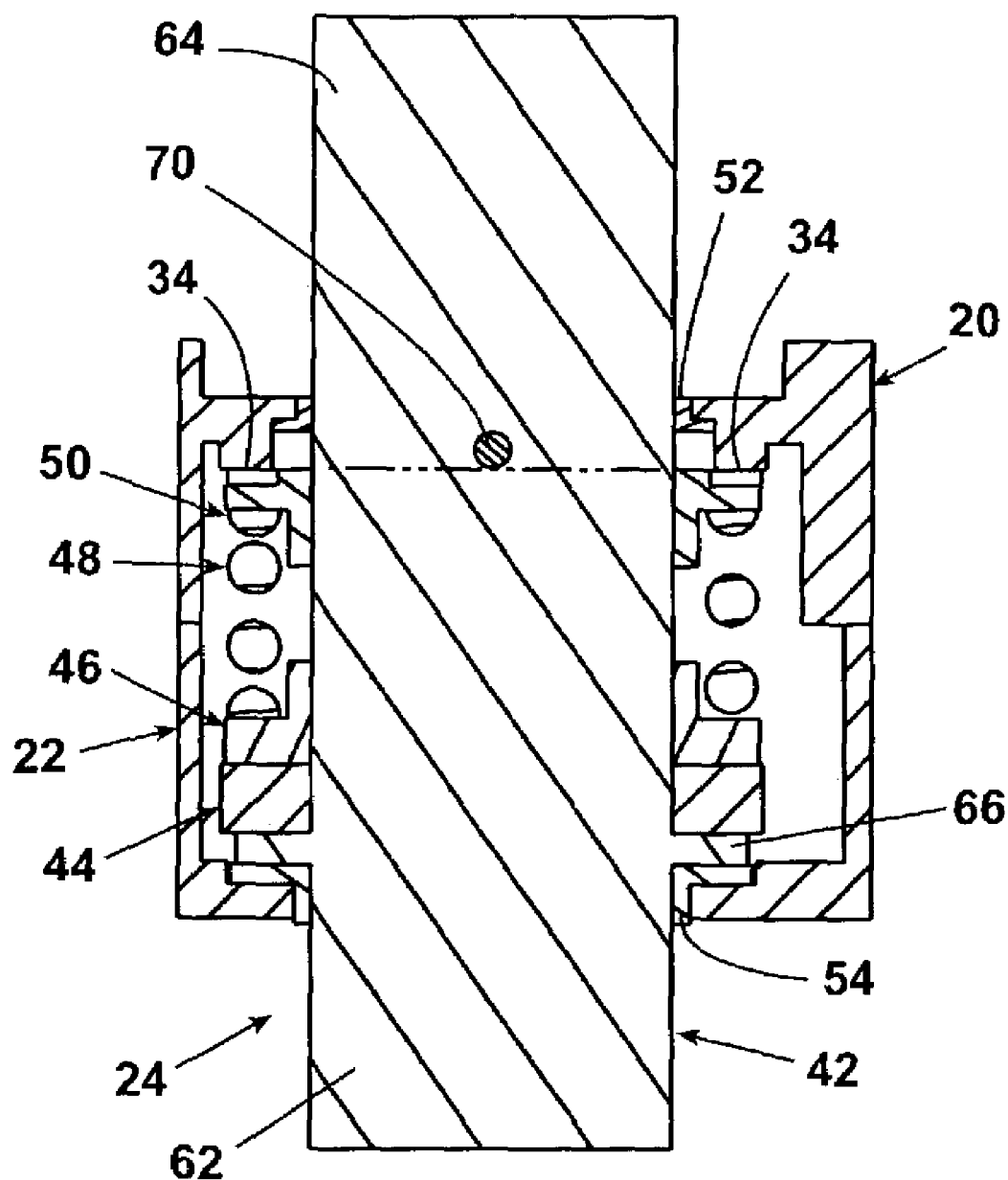
FIG. 12 is a cross-sectional view taken along line 12—12 of FIG. 5 showing the pivot mechanism having the pivoting force reduction mechanism in a deactivated state.
Figure 13:
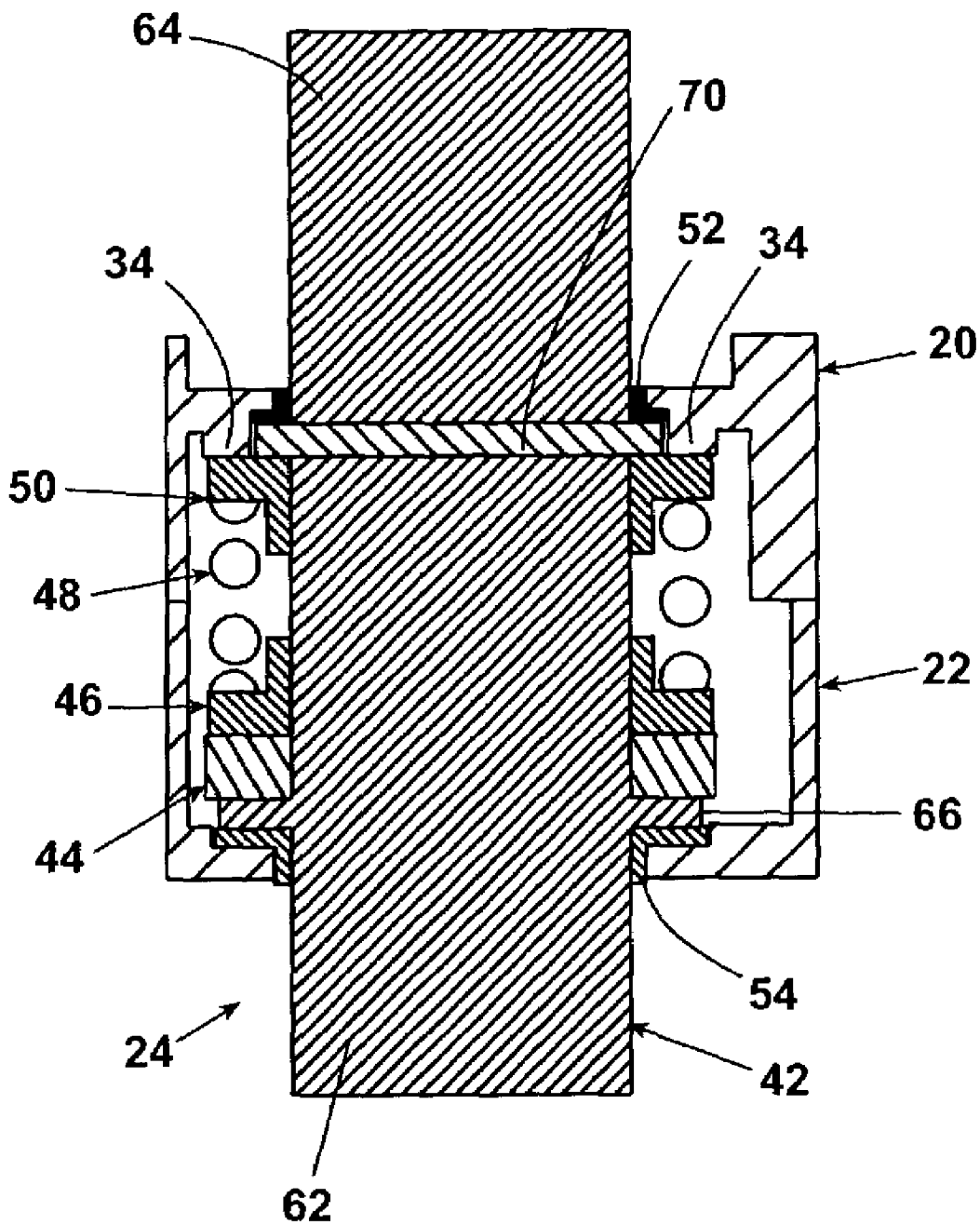
FIG. 13 is a cross-sectional view orthogonal to the view taken along line 12—12 of FIG. 5 showing the pivot mechanism having the pivoting force reduction mechanism in the deactivated state.
Figure 14:
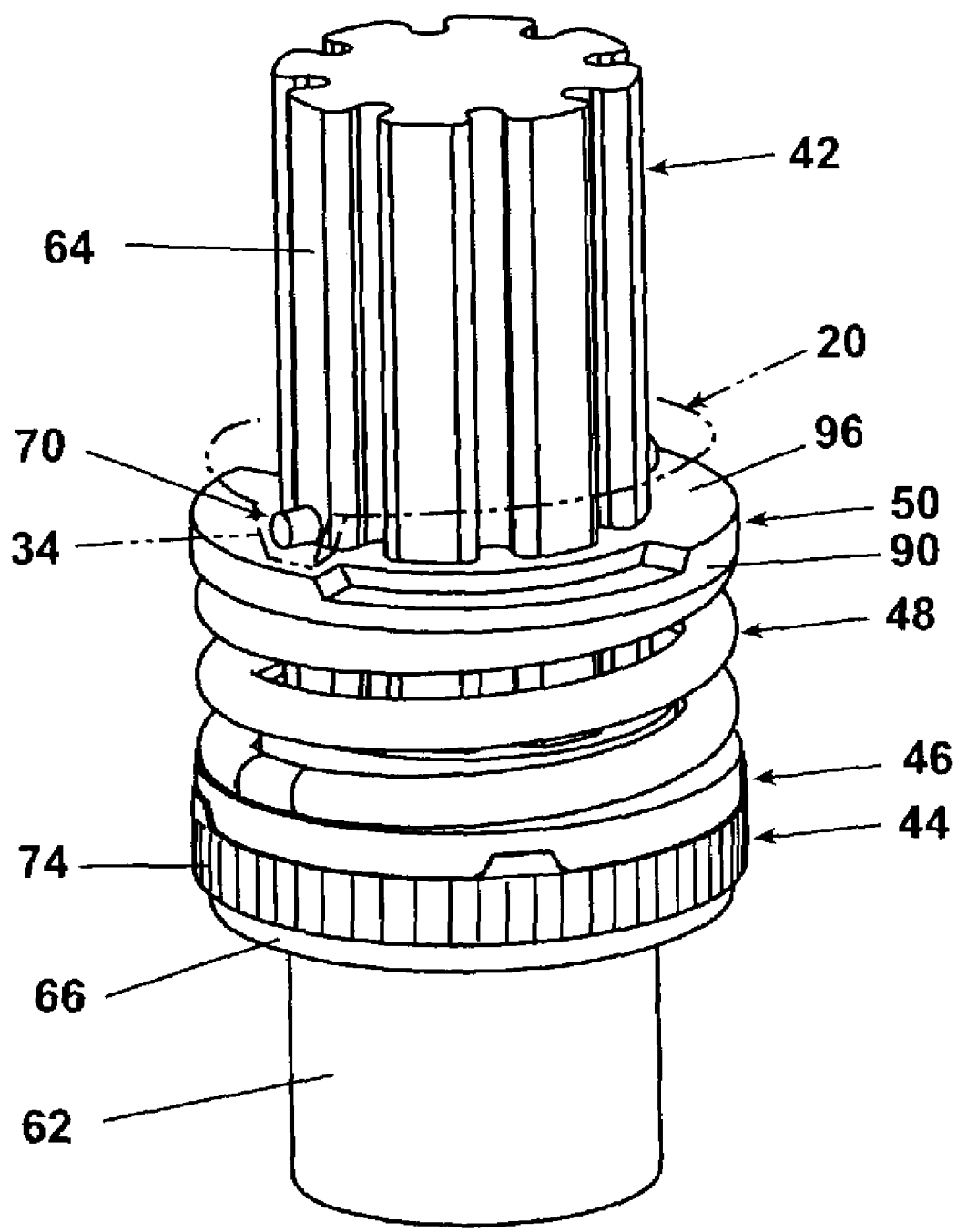
FIG. 14 is a perspective view in a similar orientation as FIG. 8 showing the pivot mechanism including the pivoting force reduction mechanism in the deactivated state.
Figure 15:
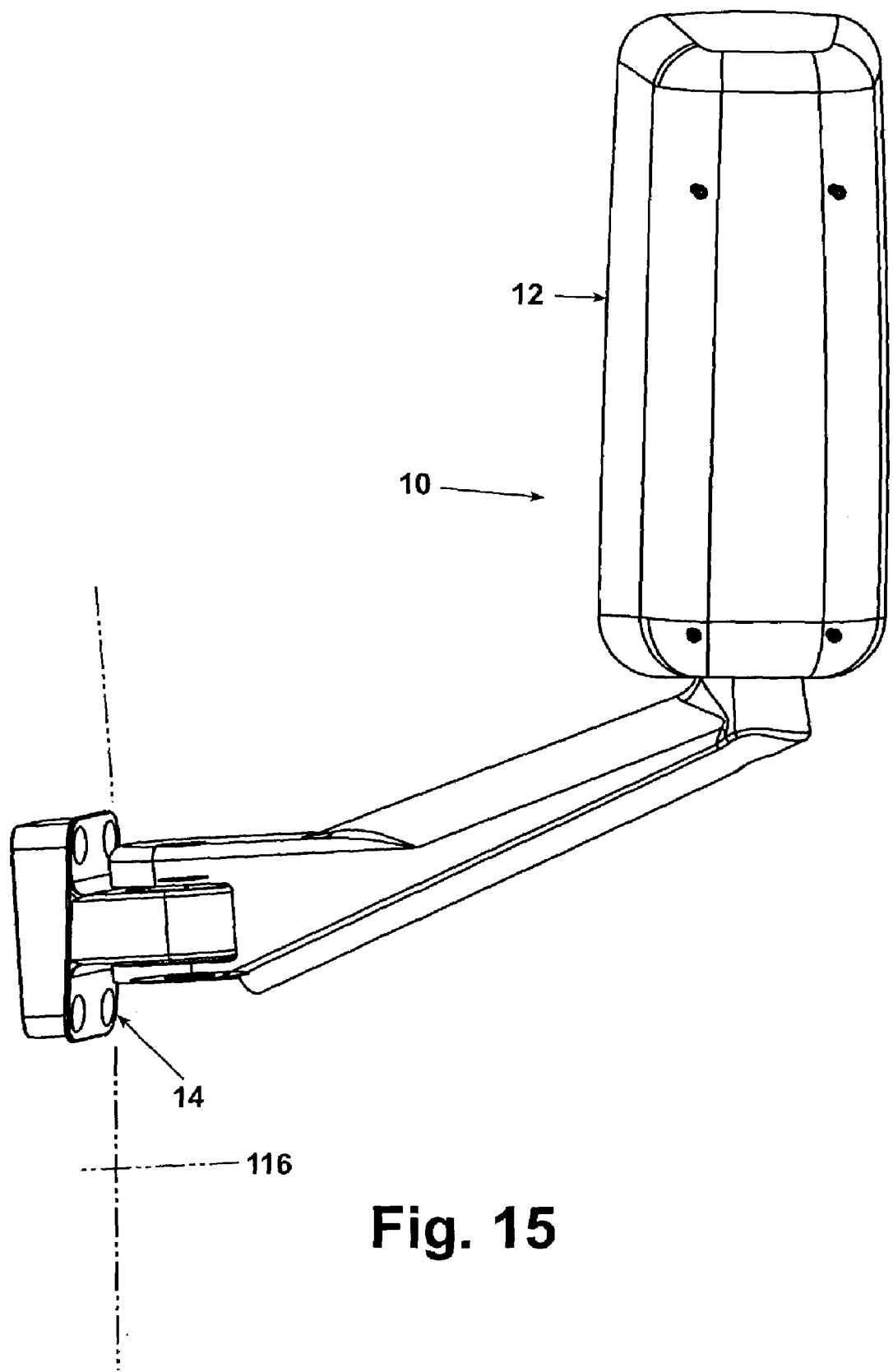
FIG. 15 into a perspective view of a second embodiment of a vehicular mirror assembly located in an extended, use position also comprising a mirror housing pivotally connected to a base which, in turn, is adapted to be mounted to vehicle, the mirror housing being pivotally connected to the base by a second embodiment of a pivot mechanism having a pivoting force reduction mechanism therein.
Figure 16:
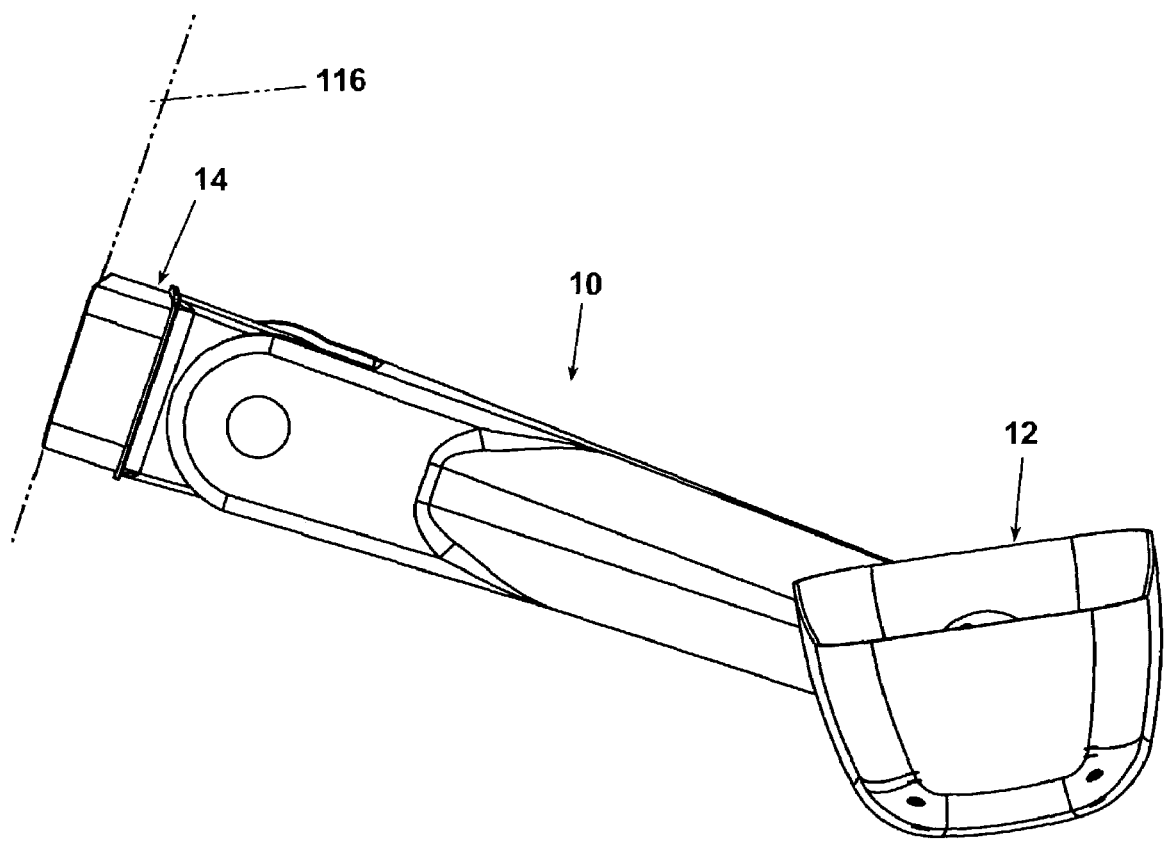
FIG. 16 is a top plan view of the vehicular mirror assembly of FIG. 15 shown in the extended, use position.
Figure 17:
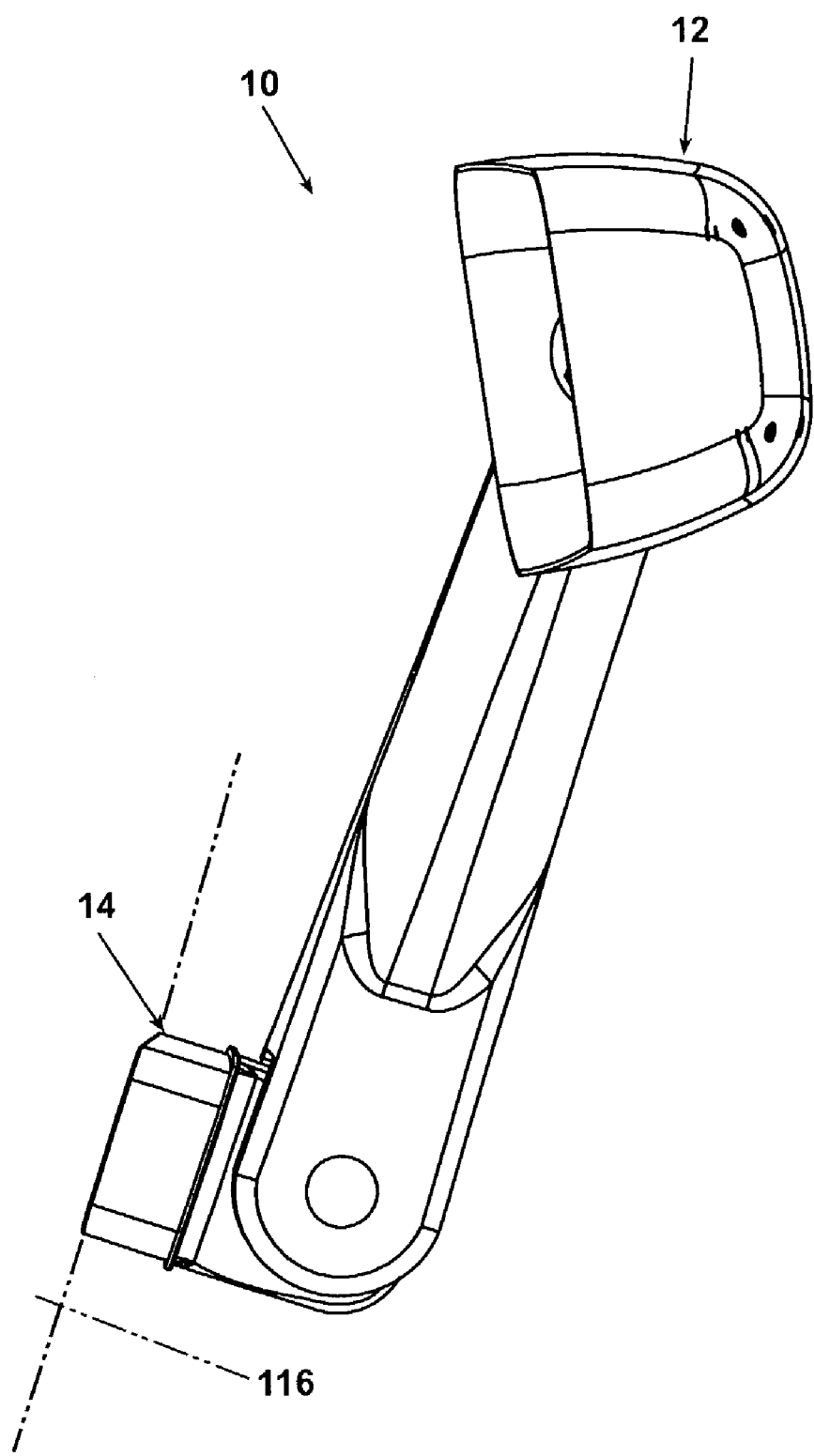
FIG. 17 is a top plan view of the vehicular mirror assembly of FIG. 15 shown pivoted by the pivot mechanism to a retracted, stored position.
Figure 18:
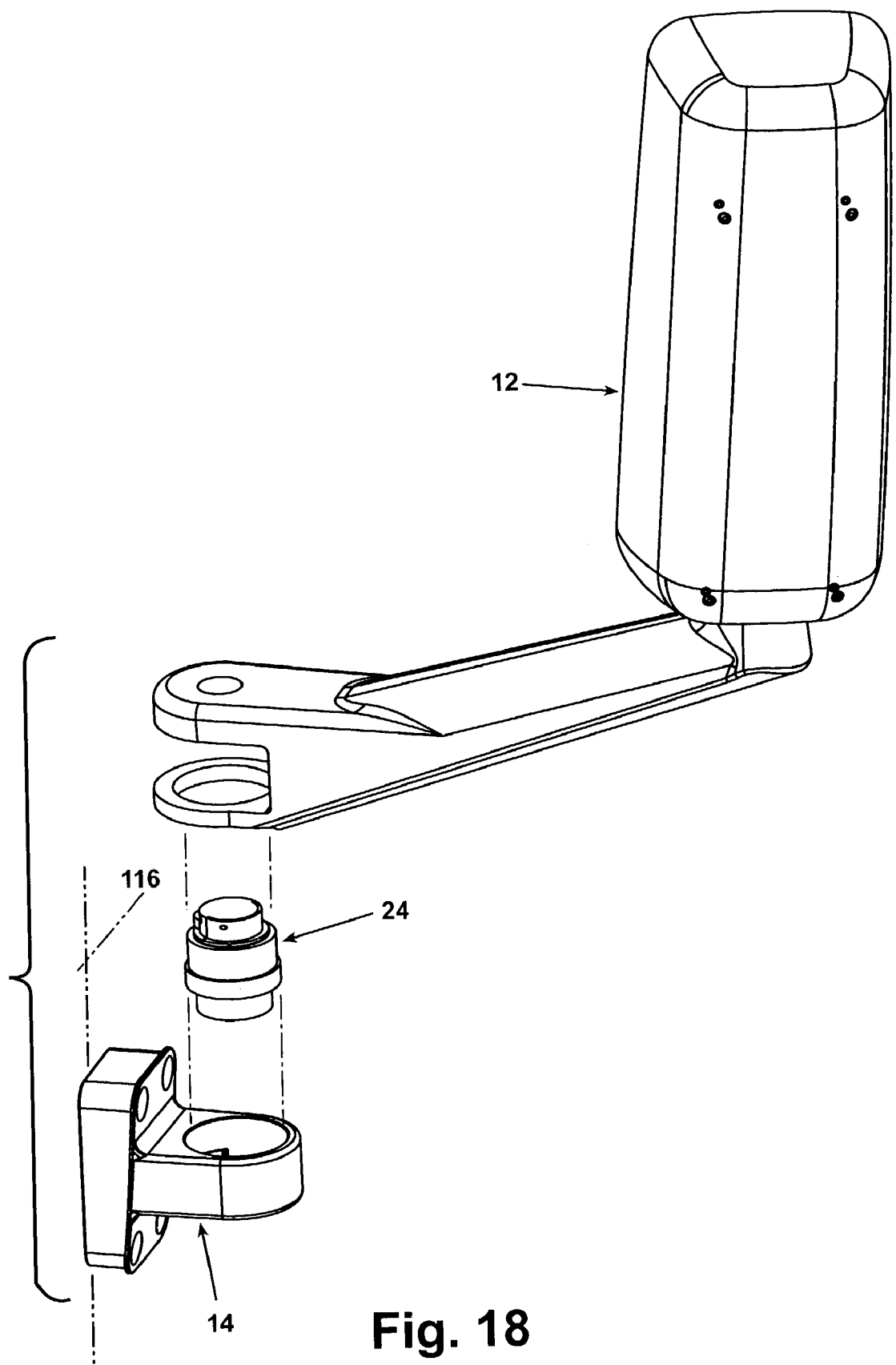
FIG. 18 is an exploded, perspective view of the vehicular mirror assembly of FIG. 15 showing a bracket on the mirror housing aligned with the pivot mechanism and with a corresponding recess on the base.
Figure 19:
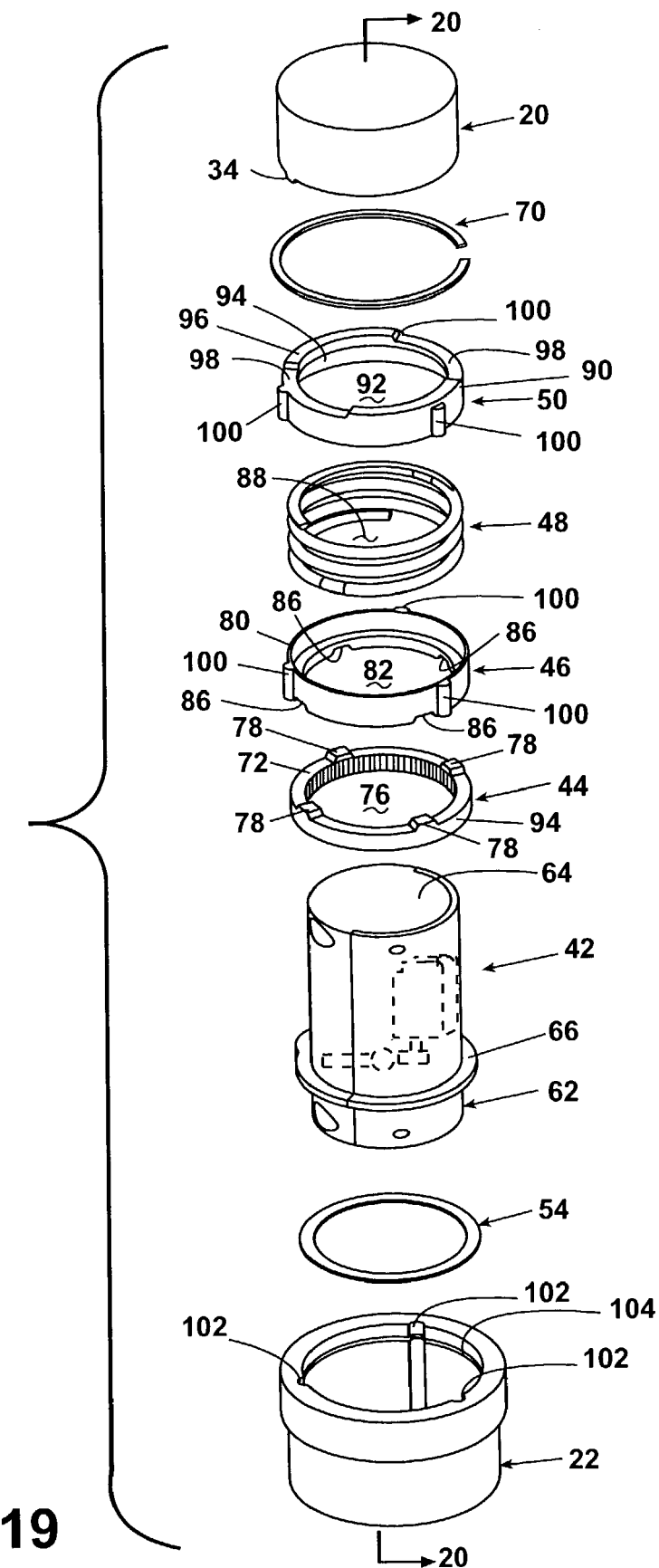
FIG. 19 is an exploded perspective view of the pivot mechanism shown in FIG. 18 with the remaining components of the vehicular mirror assembly of FIG. 15 removed for purposes of clarity.
Figure 20:
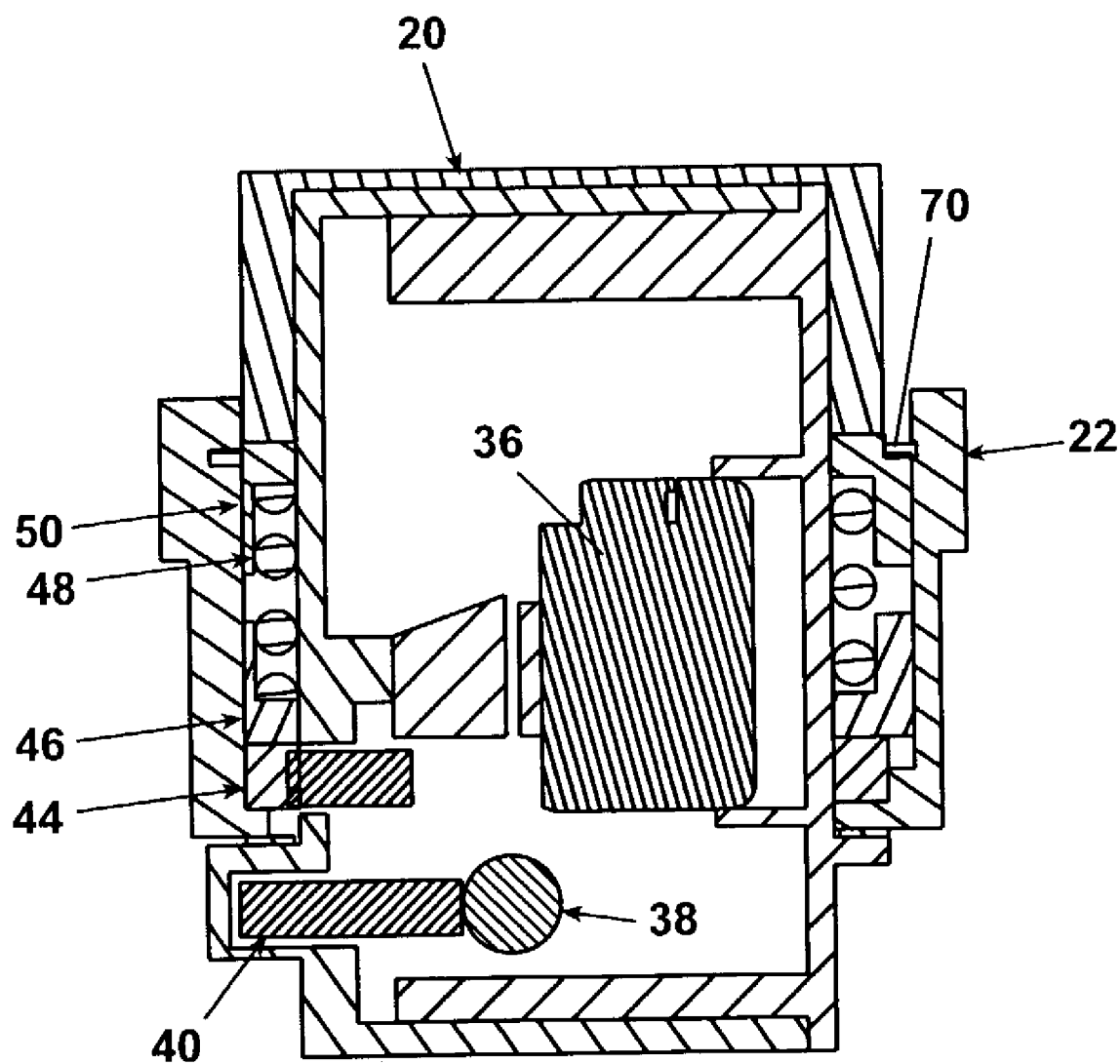
FIG. 20 is a cross-sectional view taken along line 20—20 of FIG. 19.

With reference to the pivot mechanism 24 shown in FIG. 8, the operation of the pivot mechanism 24 for pivotally moving the mirror housing 12 with respect to the base 14 will now be described with respect to FIGS. 9–14. FIGS. 9–11 are illustrative of a "normal range of operation" condition in which the motor assembly 36 drives the rotatable column 42 between the extended and retracted positions. FIGS. 12–14 are illustrative of an "overtravel range of operation" condition in which a user has manually pivoted the mirror housing 12 either past the normal extended position or past the normal retracted position and has thereby implicated the overtravel accommodation features of the pivot mechanism 24.

The operation of the pivot mechanism 24 with respect to the normal range of movement of the mirror housing 12 with respect to the base 14 will now be described with respect to FIGS. 9–11. In the normal range of movement, the detents 34 are located within, but do not contact, the grooves 98 on the control ring 50 as a result of the bias of the pin 70 against the non-grooved portion of the upper surface 96 of the control ring 50. In this manner, the pin 70 holds the control ring 50 a sufficient downward distance from the detents 34 on the upper portion 20 of the base 14 to prevent the detents 34 from contacting the surfaces making up the grooves 98 on the control ring 50. Thus, the motor assembly 36 does not need to overcome any friction between the control ring 50 and the detents 34 throughout the normal range of movement of the mirror housing 12 with respect to the base 14.

For example, to impart motorized movement of the mirror housing 12 with respect to the base 14 via the pivot mechanism 24, a suitable signal is sent to the terminals 58 on the motor assembly 36 which rotates the output shaft 56 in the desired direction. This, in turn, imparts rotary motion to the first transfer gear 38 and to the second transfer gear 40. The rotation of the second transfer gear 40 rotates the output gear 44 of the pivot mechanism 24 which, in turn, rotates the release ring 46 as a result of the engagement of the detents 78 on the output gear 44 with the indentations 86 of the release ring 46. Since the central recess 82 of the release ring 46 is keyed for rotation with the upper engagement portion 64 of the rotary column 42, the rotatable column 42 rotates with the release ring 46 and thus provides the appropriate rotation to the mirror housing 12 attached thereto.

The limits of this rotational movement of the mirror housing 12 with respect to the base 14 via the pivot mechanism 24 are defined by the position of the detents 34 of the upper portion 20 of the base 14 with respect to the terminal ends of the grooves 98 on the control ring 50. Although the detents 34 do not touch the surfaces making up the grooves 98 on a control ring 50 as a result of the positioning of the pin 70, the detents 34 do contact the control ring 50 at the innermost and outermost limits of the normal range of travel of the mirror housing 12 with respect to the base 14. Once a corresponding detent 34 contacts a terminal end of the grooves 98, the rotation of the rotatable column 42 stops. Preferably, the motor assembly 36 is not sufficiently strong (i.e., has sufficient torque) to force the control ring 50 to overrotate against the end of the grooves 98.

In addition to the motorized travel of the mirror housing 12 with respect to the base 14 as defined by the pivot mechanism 24, the inventive pivot mechanism 24 described herein also allows a manual override of the motorized travel permitted by the motor assembly 36. For example, when a user grasps the mirror housing 12 and manually rotates the mirror housing 12 with respect to the base 14, the pivot mechanism 24 described herein permits this movement without damage to the interior components thereof.

As would be apparent to one skilled in the art, manual rotation of an output gear (such as output gear 44) with respect to a driven gear (such as the output shaft 56 and its associated transfer gears 38 and 40) often causes the gear assembly to lock up. In this case, the pivot mechanism 24 includes a clutch-type mechanism that releases the output gear 44 from the release ring 46 to allow this manual rotation. As can be seen from the drawings, when a user manually rotates the mirror housing 12, the upper engagement portion 64 of the rotatable column 42 rotates with the mirror housing 12 in response to the manual rotation imparted by the user. In this case, the output gear 44 locks against the second transfer gear 40 and does not rotate. However, since the release ring 46 is keyed for motion with the upper engagement portion 64 of the rotatable column 42, the release ring 46 continues to rotate, causing the indentations 86 to release from engagement with the detents 78, thus causing separation of the release ring 46 from the output gear 44. The bottom surface of the release ring 46 thereby travels along the top surfaces of the detents 78, rotating the release ring 46 with respect to the output gear 44.

Depending upon the position of the mirror housing 12 with respect to the base 14, one of three scenarios occurs.

First, if the mirror housing 12 is within the normal range of movement with respect to the base 14, the mirror housing 12 can be rotated easily with respect to the base 14 since the detents 34 on the upper portion 20 of the base 14 are withheld from contact from the control ring 50 because of their location within the grooves 98 thereof. This feature is illustrated in FIGS. 9–11 by gap 106 shown between control ring 50 and the detents 34 on the base 14.

Second, if the mirror housing 12 is at the end (i.e., either the innermost or outermost) of the normal range of movement of the mirror housing 12 with respect to the base 14, additional force imparted by the user causes the detents 34 to be biased against the corresponding terminal end of the grooves 98 on the control ring 50 and causes the detents 34 to bias the control ring 50 downwardly against the force of the spring 48. In this manner, the control ring 50 is urged downwardly and the detents 34 now frictionally engage the upper surface of the control ring 50. When the mirror housing 12 is at rest at the innermost or outermost range of travel, backlash (i.e., unintended movement of the mirror housing 12 with respect to the base 14) is prevented by the abutment of the detents 34 against the corresponding end of the grooves 98.

Third, once the mirror housing 12 is urged past the end of the normal range of movement of the mirror housing 12 with respect to the base 14 and the detents 34 are now located on the upper surface of the control ring 50, rotation of the mirror housing 12 with respect to the base 14 is now more difficult because the user must overcome the bias of the spring 48 against the detents 34 through the control ring 50 (i.e., the pivoting force reduction mechanism of the pin 70 as in the first scenario is no longer in effect).

As can be seen, a motor assembly 36 having lighter duty characteristics (i.e., a lower characteristic torque) can be used because the motor assembly 36 does not have to overcome the friction caused by the abutment of the control ring 50 against the detents 34 during the normal range of movement of the mirror housing 12 with respect to the base 14.

A second embodiment of the pivot mechanism 24 is shown in FIGS. 15–20. It will be understood that common elements between the embodiment shown in FIGS. 1–14 and the second embodiment shown in FIGS. 15–20 are referred to with common reference numerals and a duplicate description of the second embodiment of FIGS. 15–20 need not be provided in great detail. Rather, it will be understood that the differentiating features of the second embodiment of FIGS. 15–20 mainly relate to the provision of the motor assembly and transfer gears within the interior of the rotatable column 42 rather than adjacent thereto as in the first embodiment of FIGS. 1–14. In addition, the "keying" of the rotation of the elements to the lower portion 22 of the base 22 is caused by the engagement of keys 100 of components 46 and 50 within the grooves 102 of the lower portion 22 of the base 14. The function of the pin 70 is accomplished by a split ring retainer 70 which snaps into a groove 104 in the lower portion 22 of the base 14 to compress the spring 48 and perform the force-reducing function of a force-modifying device during the normal range of movement. Otherwise, the structure, assembly and operation of the second embodiment of FIGS. 15–20 is virtually identical to that described with respect to the embodiment shown in FIGS. 1–14.

Figure 21:
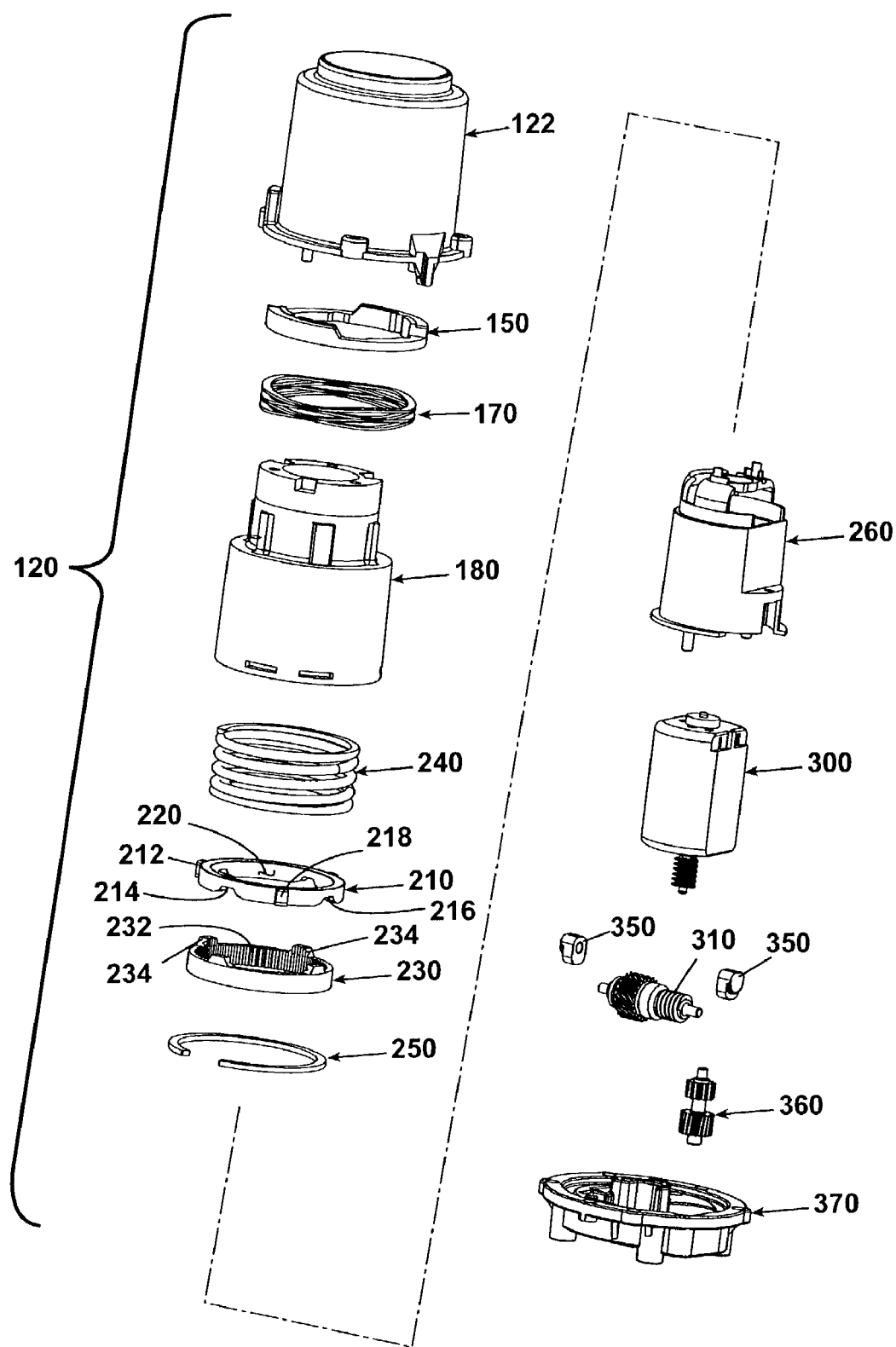
FIG. 21 is an exploded view of a third embodiment of a pivot mechanism for use with the vehicular mirror assembly of FIGS. 1 and 15.

FIG. 21 illustrates a third embodiment of the pivot mechanism 120. The pivot mechanism 120 is preferably fixedly mounted within the base 14 and includes a rotatable column hereinafter described which is mounted to the mirror housing 12 to effect the pivotal movement of the mirror housing 12 relative to the base 14.

Figure 22:
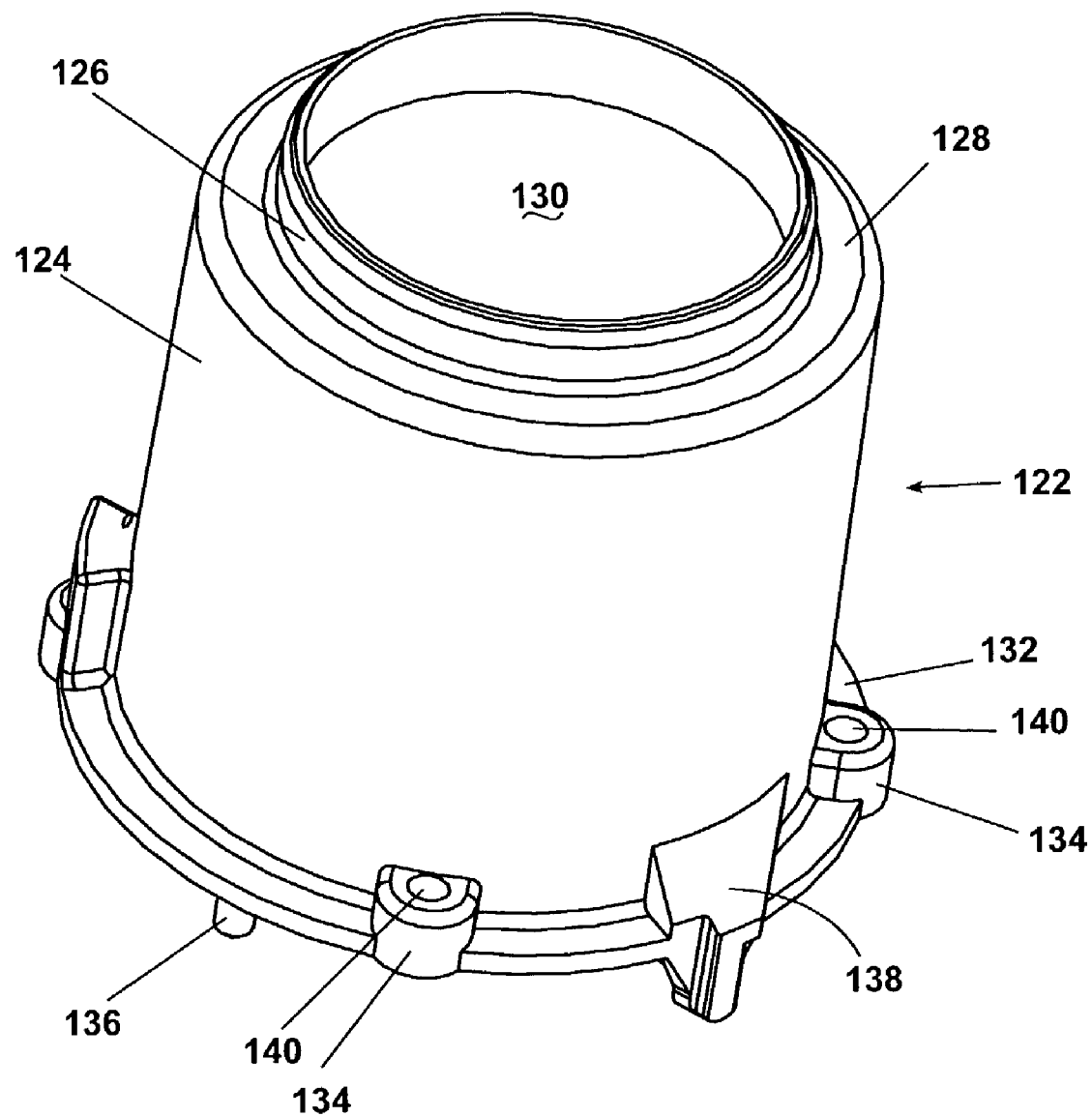
FIG. 22 is a perspective view of an outer housing comprising a portion of the pivot mechanism of FIG. 21.
Figure 23:
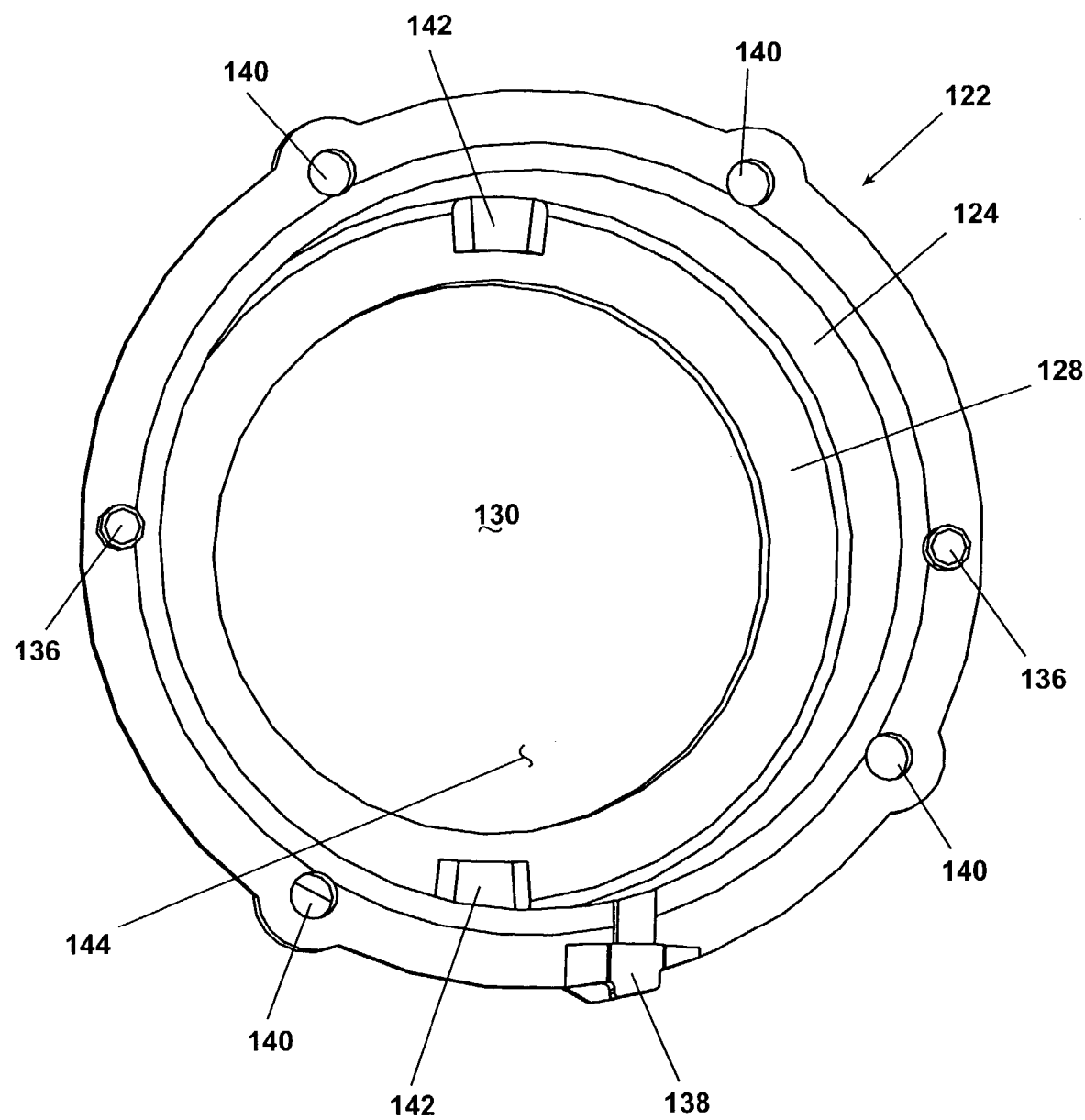
FIG. 23 is a perspective view of the interior of the outer housing of FIG. 22.

The pivot mechanism 120 comprises an outer housing 122 and a base 370 which enclose a ramp 150, a wave spring 170, an actuator sub 180, a motor housing 260, a motor 300, and gear assemblies 310, 360. Referring also to FIGS. 22 and 23, the outer housing 122 is a generally cylindrically-shaped body comprising a cylindrical wall 124 and a collar 126 connected to the cylindrical wall 124 by an annular wall 128 and coaxial therewith. The annular wall 124 extends orthogonally inwardly from the cylindrical wall 124 to the collar 126. Referring to FIG. 23, the inner surface of the annular wall 128 is provided with a pair of diametrically-opposed inner bosses 142 extending downwardly from the annular wall 128. The collar 126 comprises a generally ring-shaped structure defining an circular opening 130. The cylindrical wall 124 defines a cylindrical chamber 144. Extending orthogonally outwardly from the cylindrical wall 124 at an opposite end from the collar 126 is a base ring 122 circumscribing the cylindrical wall 124. The base ring 122 is provided with a plurality of mounting bosses 134 spaced above the periphery of the cylindrical wall 124 and having a mounting bore 140 extending therethrough generally parallel to the longitudinal axis of the outer housing 122. Extending downwardly from the base ring 132 are a pair of diametrically-opposed mounting pegs 136 generally parallel to the longitudinal axis of the outer housing 122, and a pedestal 138 for holding a mounting bearing (later described with reference numeral 350) into place.

Figure 24:
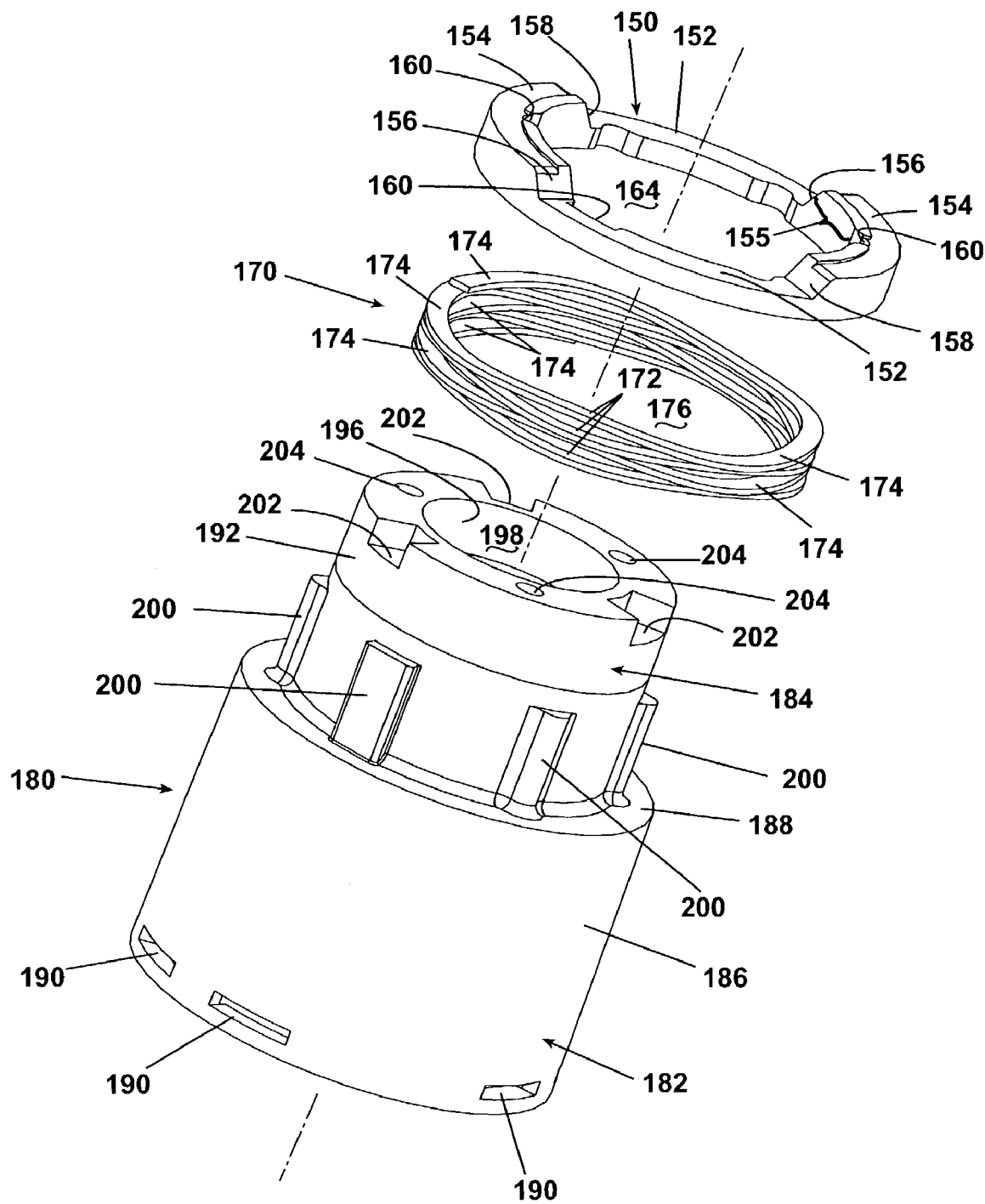
FIG. 24 is an exploded view of a ramp, a wave spring, and an actuator sub comprising a portion of the pivot mechanism of FIG. 21.
Figure 25:
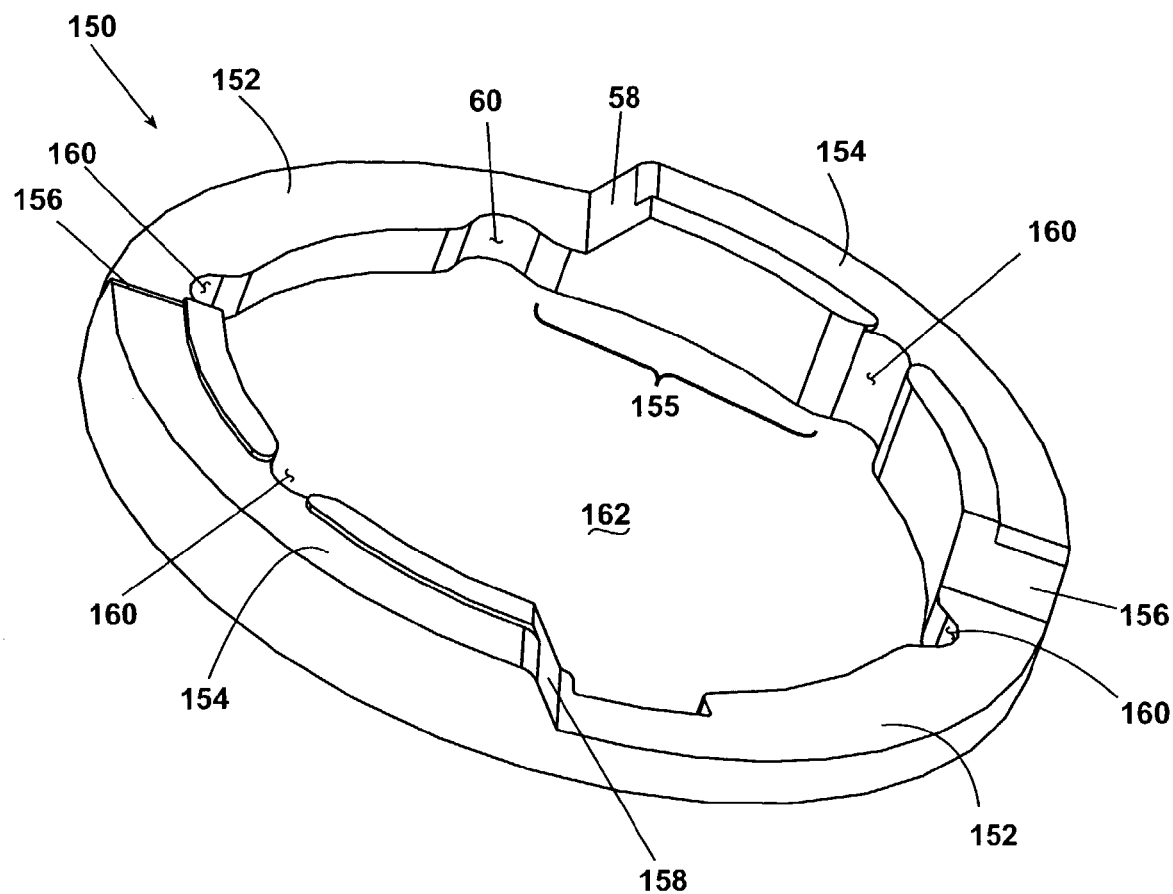
FIG. 25 is a perspective view of the ramp of FIG. 24.
Figure 26:
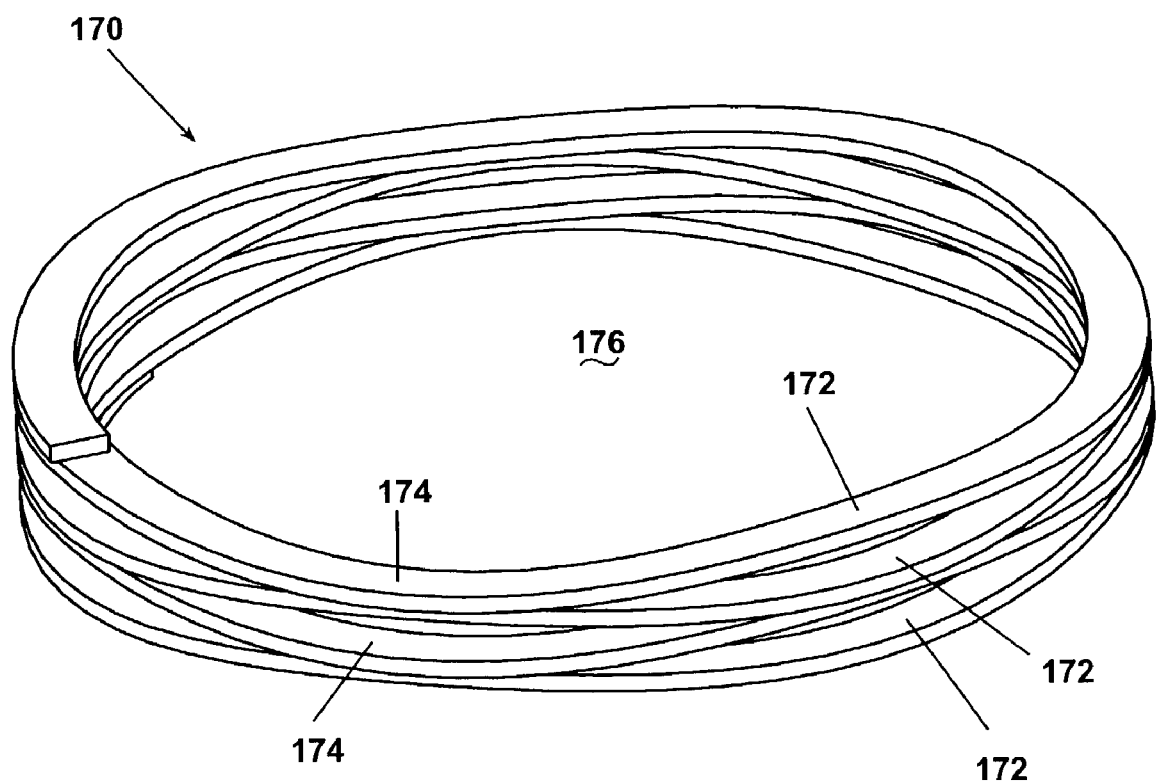
FIG. 26 is a perspective view of the wave spring of FIG. 24.

Referring now to FIGS. 24–26, a ramp 150 is a ring-like body comprising a pair of diametrically-opposed thin ring segments 152 in alternating juxtaposition with a pair of diametrically-opposed raised segments 154. The raised segments 154 transition to the thin ring segments 152 through terminal ends defined by a first inclined face 156 and a second inclined face 158. The thin ring segments 152 and the raised segments 154 define a circular inner wall 155 defining a generally circular center opening 162. Regularly spaced along the inner wall 155 are a plurality of notches 160. In the preferred embodiment shown in FIG. 24, six notches 160 are shown in diametrically-opposed pairs. One pair of notches 160 bisect the raised segments 154, the remaining notches 160 are formed at each end of the thin ring segments 152.

A wave spring 170 is a generally helical spring formed of a flat ribbon of metal, preferably spring steel having alternating crest portions 172 and trough portions 174. The spring 170 is formed so that the trough portions 174 of one coil contact the trough portions 174 of the adjoining coil. Preferably, the trough portions 174 in contact with one another are fixedly connected, such as by spot welding. The spring 170 defines a circular center opening 176.

An actuator sub 180 is a generally cylindrically-shaped body comprising a generally cylindrical lower housing 182 and a generally cylindrical upper housing 184. The lower housing 182 comprises a lower cylindrical wall 186 transitioning to an inwardly-extending annular wall 188 which, in turn, transitions to an upper cylindrical wall 192 of the upper housing 184. The lower cylindrical wall 186 is provided with a plurality of peripheral slots 190 spaced thereabout at an opposite end from the upper housing 184. The upper cylindrical wall 192 transitions to an annular top wall 194 having a depending inner peripheral wall 196 defining a circular opening 198. The upper cylindrical wall 192 is provided with a plurality of regularly-spaced ribs 200 extending longitudinally along the upper cylindrical wall 192 from the annular wall 188. The ribs 200 are adapted to slidably engage the notches 160 in the ramp 150 when the upper housing 184 is inserted through the center opening 162. A plurality of seats 202 are spaced regularly around the upper housing 184 at the inner face of the top wall 194 and the upper cylindrical wall 192. Preferably, the seats 202 are spaced at 120 degrees around the periphery of the upper cylindrical wall 192. Upper housing sockets 204 comprise circular apertures through the top wall 194 at regularly-spaced intervals. Preferably, the sockets 204 are spaced at 120 degrees around the top wall 194.

Figure 38:
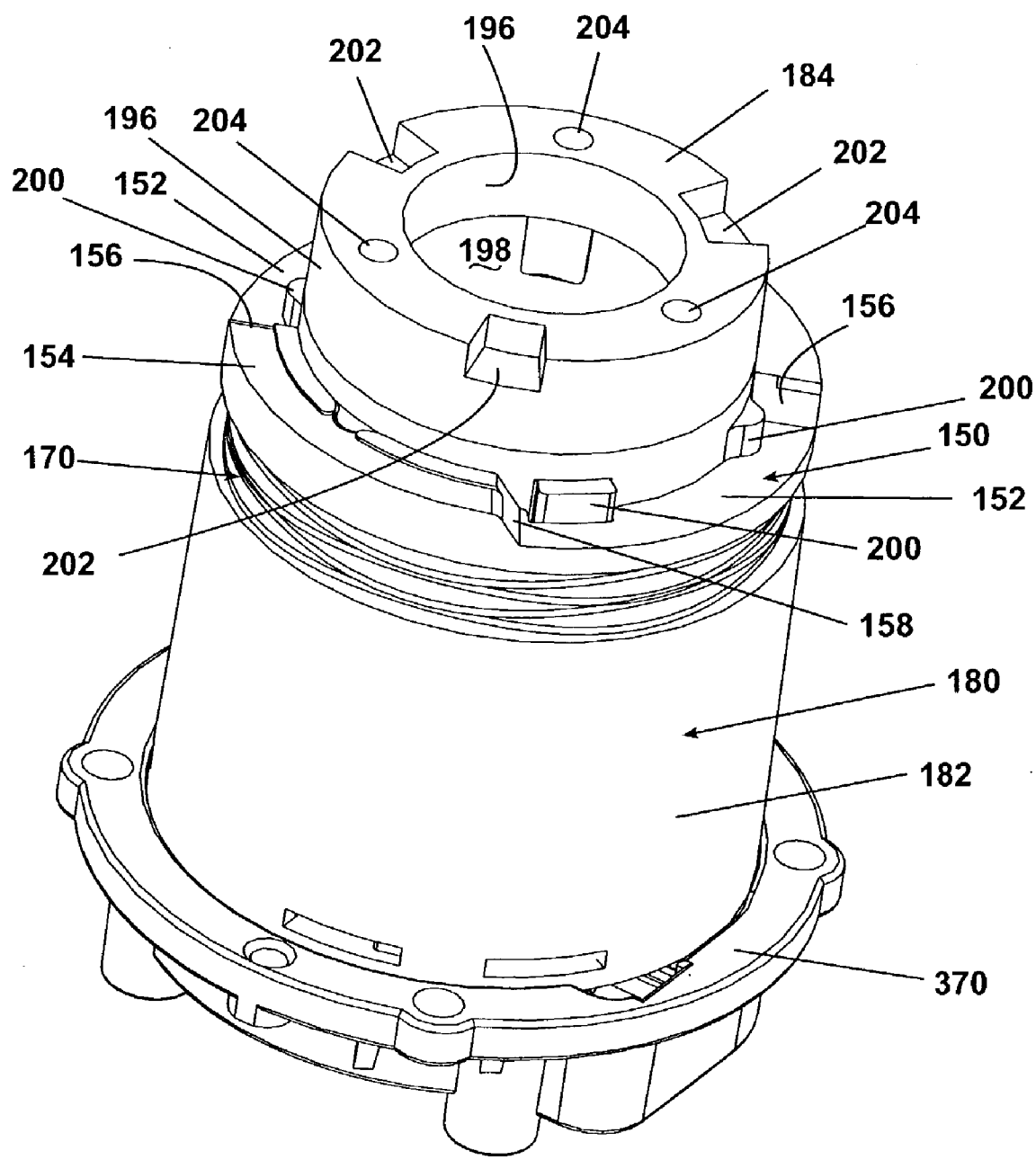
FIG. 38 is a perspective view of the assembled pivot mechanism of FIG. 21.

As shown in FIG. 38, the wave spring 170 is placed over the upper housing 184 so that the upper housing 184 extends through the center opening 176. The ramp 150 is then placed over the upper housing 184 to abut the wave spring 170 so that the upper housing 184 extends through the center opening 162. The wave spring 170 will urge the ramp 150 in a direction away from the annular wall 188.

Figure 27:
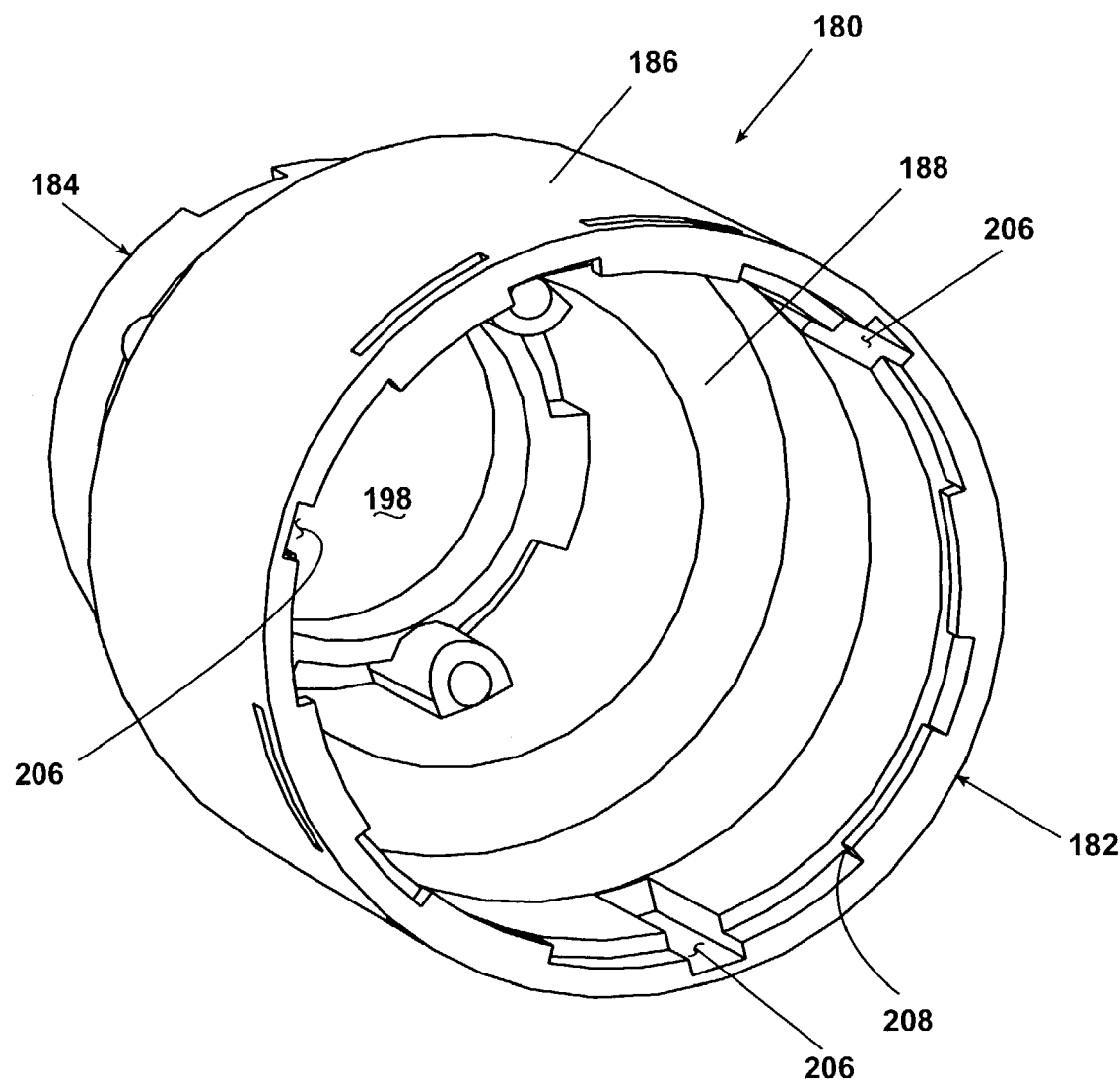
FIG. 27 is a perspective view of the interior of the actuator sub of FIG. 24.

Referring to FIG. 27, a plurality of actuator sub ring channels 206 comprise longitudinal channels in the inner portion of the lower cylindrical wall 186 generally parallel to the longitudinal axis of the actuator sub 180. The channels 206 extend along the lower cylindrical wall 186 from the open end of the actuator sub 180. In the preferred embodiment, three channels 206 are spaced at 120 degrees along the interior of the lower cylindrical wall 186. A circumferential C-ring channel 208 extends around the periphery of the lower cylindrical wall 186 along the inner surface thereof adjacent the opening to the actuator sub 180.

Figure 28:
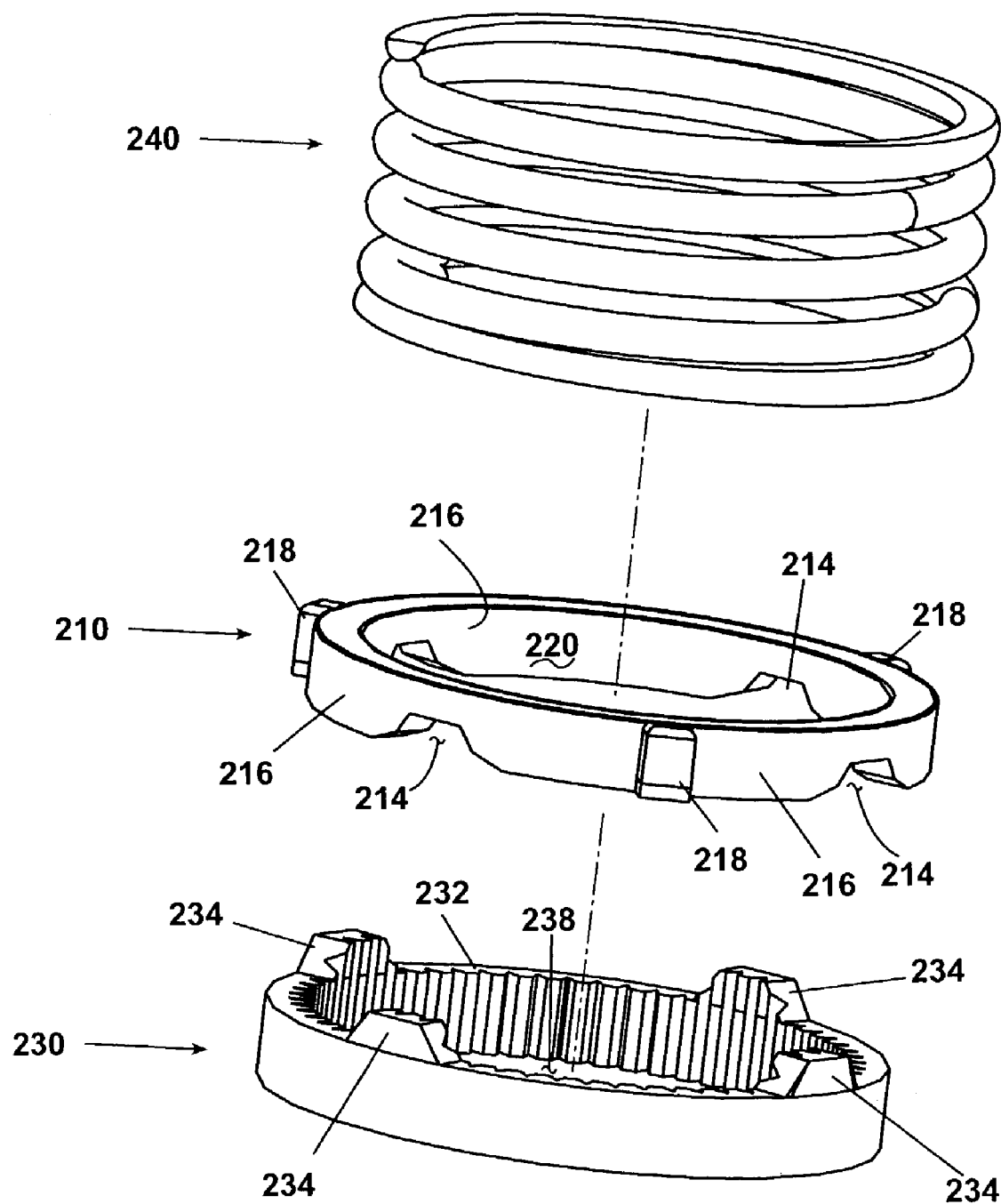
FIG. 28 is an exploded view of a spring, an actuator sub ring, and a ring gear comprising a portion of the pivot mechanism of FIG. 21.
Figure 29:
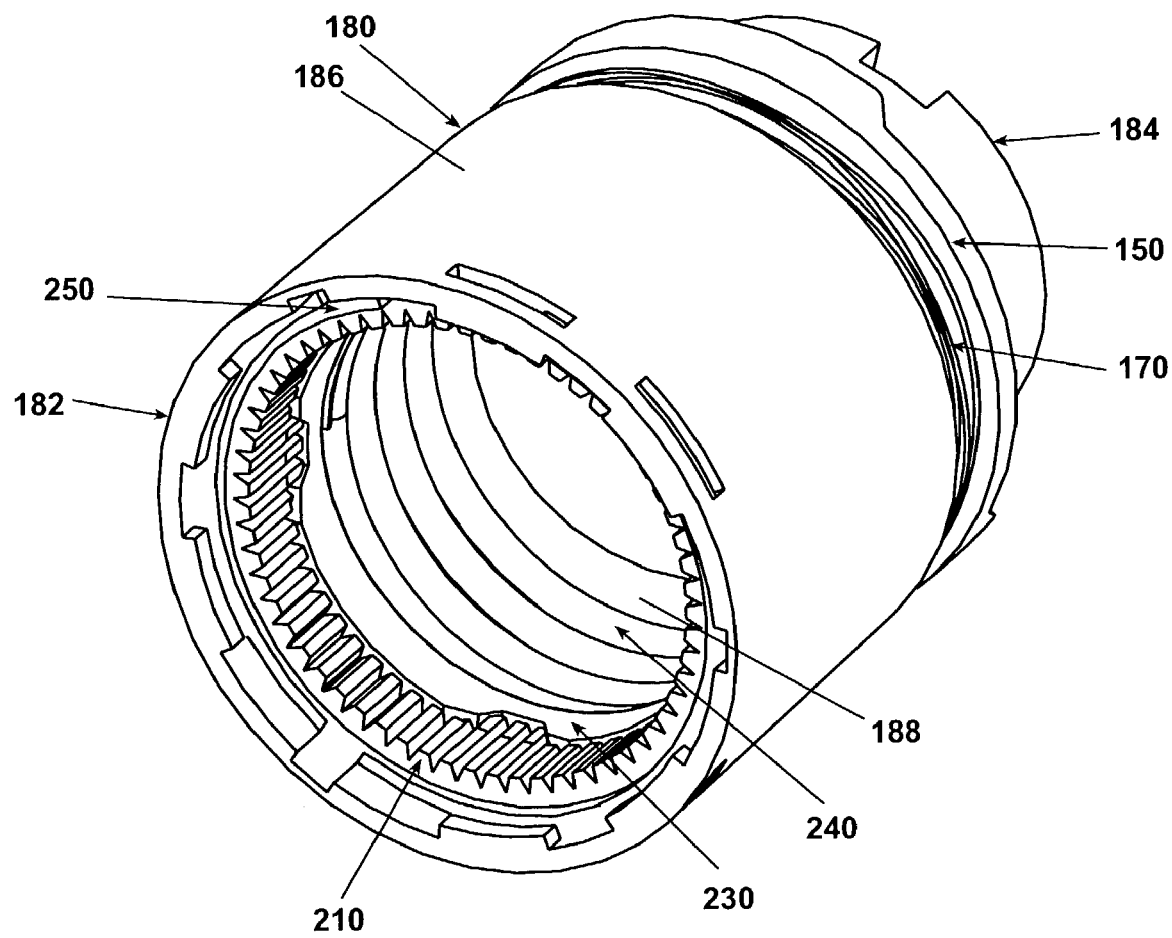
FIG. 29 is a perspective view of the interior of the actuator sub of FIG. 24 showing the spring, the actuator sub ring, the ring gear, and a C-ring installed therein.

Referring now to FIGS. 28–29, an actuator sub ring 210 is a generally ring-like body comprising an annular wall 212 defining a circular opening 220. Slots 214 are cut into the ring 210 at regularly spaced intervals, preferably 90 degrees, to define segments 216. A plurality of outwardly-extending ribs 218 is spaced about the outer periphery of the ring 210, preferably at 120 degrees. The actuator sub ring 210 is adapted to be slidably inserted into the actuator sub 180 and the ribs 218 are adapted to be slidably inserted into the actuator sub ring channels 206 as shown in FIG. 29.

A ring gear 230 comprises an annular body 232 defining a circular opening 238. An upper surface of the annular body 232 includes a plurality of bosses 234, preferably at regularly-spaced radial locations thereon. In the preferred embodiment, four bosses 234 are spaced at an interval of 90 degrees. The inner surface of the annular body 232 is provided with a plurality of teeth 236 in longitudinal alignment with the axis of the ring gear 230. The bosses 234 are adapted to slidably engage the slots 214 in the actuator sub ring 210. The ring gear 230 is adapted to be slidably inserted into the actuator sub 180, as shown in FIG. 29.

As also shown in FIG. 29, a spring 240 comprises a generally conventional helical spring adapted to be slidably inserted into the actuator sub 180 and abut the annular wall 188 and of the actuator sub ring 210. A conventional C-ring 250 is adapted to be retained within the C-ring channel 208 in a generally conventional manner. As shown in FIG. 29, the spring 240 is slidably inserted into the actuator sub 180 to abut the annular wall 188. The actuator sub ring 210 is then inserted into the actuator sub 180 so that the ribs 218 slidably communicate with the actuator sub ring channels 206, to abut with the slots 214 extending away from the spring 240. The ring gear 230 is then slidably inserted into the actuator sub 180 so that the bosses 234 engage the slots 214. The spring 240, the actuator sub ring 210, and the ring gear 230 are retained in the actuator sub 180 by compressively inserting the C-ring 250 into the C-ring channel 208.

Figure 30:
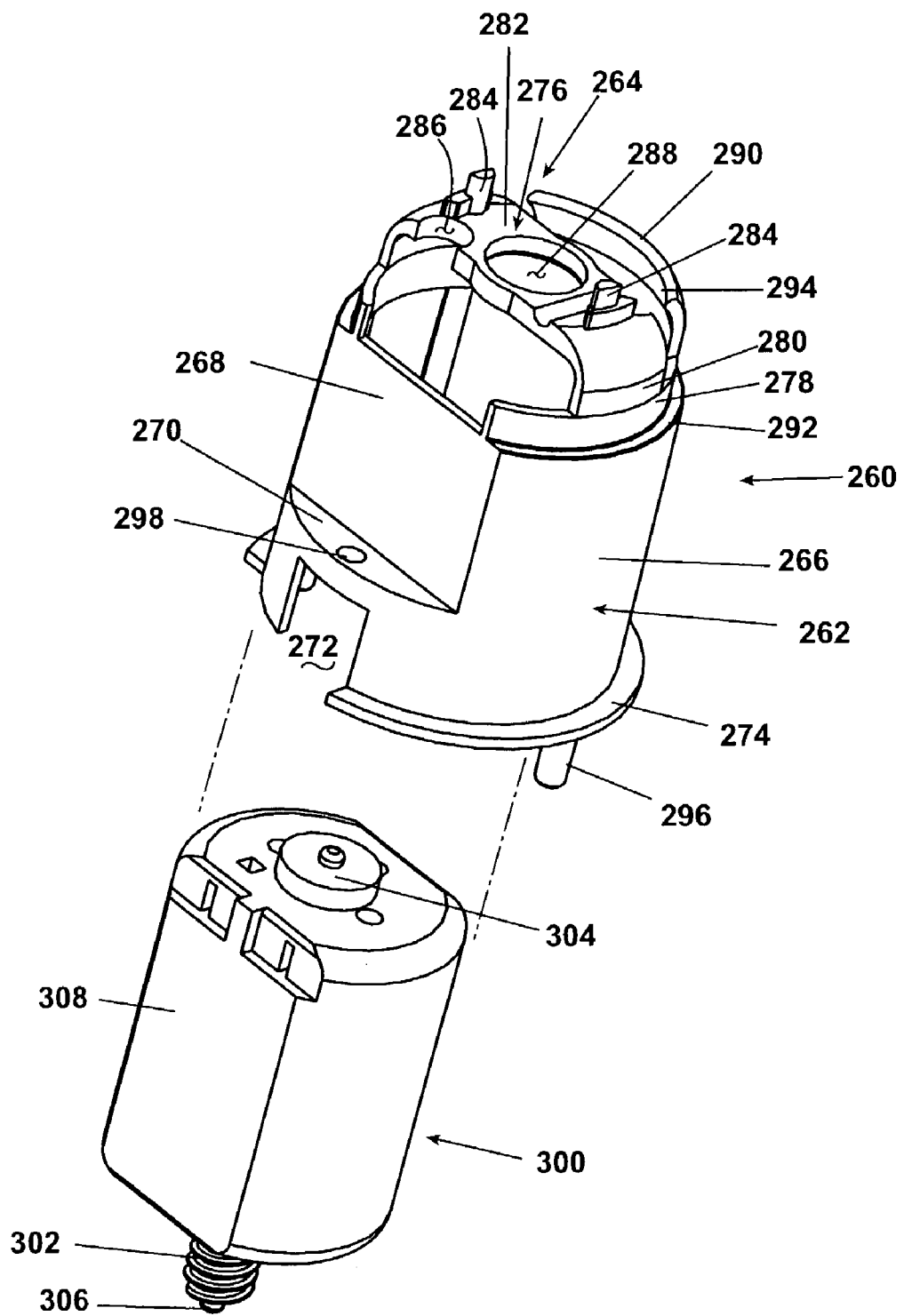
FIG. 30 is an exploded view of a motor housing and a motor comprising a portion of the pivot mechanism of FIG. 21.
Figure 31:
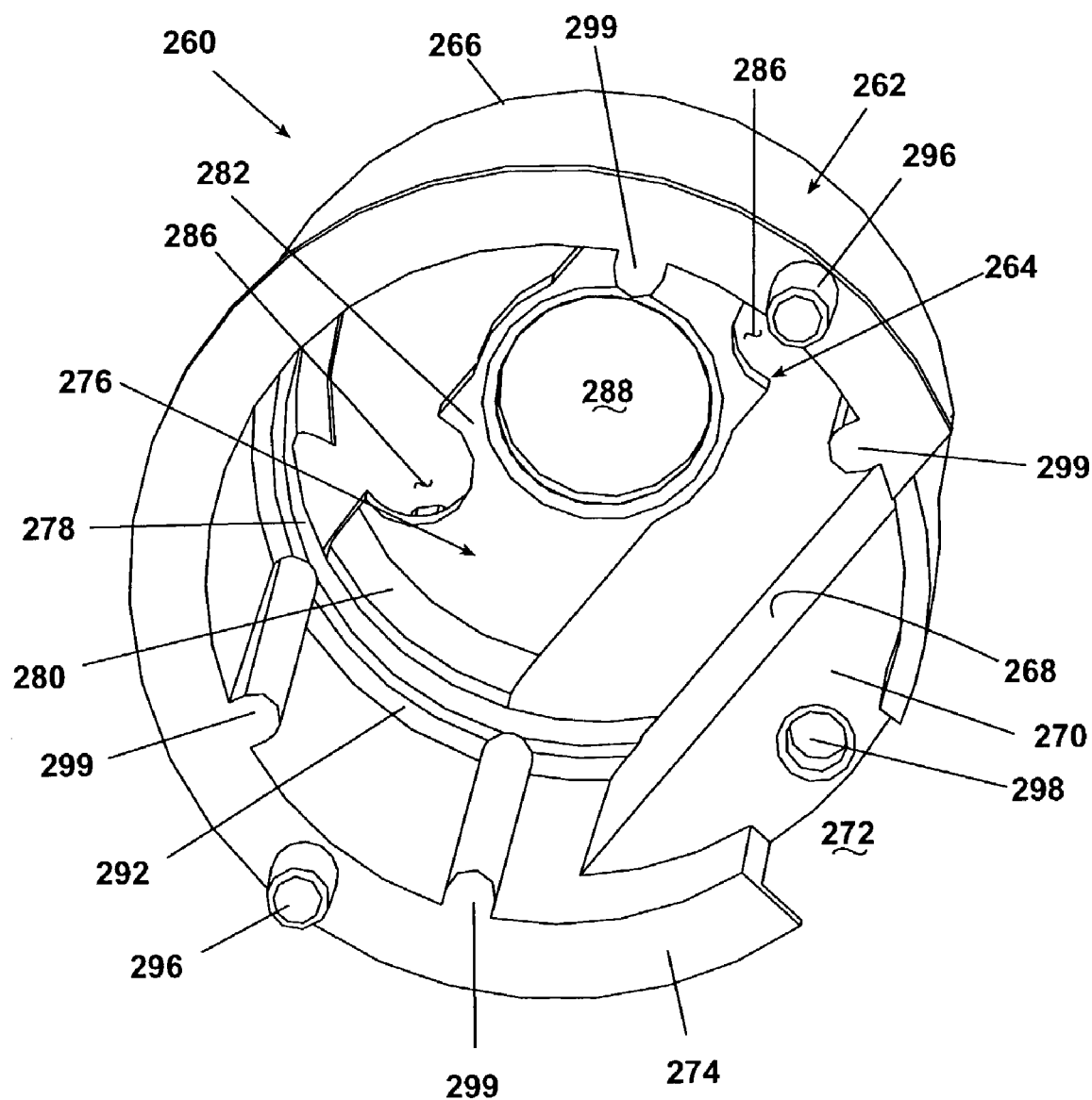
FIG. 31 is a perspective view of the interior of the motor housing of FIG. 30.

Referring now to FIGS. 30 and 31, a motor housing 260 is a hollow, generally cylindrically shaped body, comprising a housing body 262 and a motor cradle 264. The housing body 262 comprises a lower cylindrical wall 266 transitioning, in part, to a chord wall 268 and a segment wall 270 orthogonal thereto. The lower cylindrical wall 266 is interrupted by a gear opening 272 at a lower portion thereof adjacent the segment wall 270. The lower cylindrical wall 266 terminates in an outwardly-extending lower annular wall 274.

The motor cradle 264 comprises a motor yoke 276 attached to an upper cylindrical wall 278. The upper cylindrical wall 278 extends longitudinally from an upper annular wall 292 extending inwardly from the lower cylindrical wall 266. The motor yoke 276 comprises a pair of diametrically-opposed yoke supports 280 extending longitudinally from the upper cylindrical wall 278 and joined by a diametrically-extending crosspiece 282. Extending outwardly from the crosspiece 282 and an outer portion thereof are a pair of generally parallel, spaced-apart pegs 284. The crosspiece 282 is provided near each end with an arcuate cutout 286. The crosspiece 282 is also provided with a circular yoke aperture 288 in coaxial alignment with the housing body 262.

Diametrically opposite the chord wall 268 is an extension wall 290 extending longitudinally from the upper cylindrical wall 278, terminating in a curved section 294 which acts as a strain relief for motor wires. The lower annular wall 274 is provided with a pair of diametrically-opposed mounting posts 296 in generally parallel alignment with the longitudinal axis of the housing body 262. The segment wall 270 is provided with an output shaft seat 298 penetrating therethrough. The inner surface of the lower cylindrical wall 266 is provided with diametrically-opposed pairs of parallel, longitudinally spaced-apart motor mounting ribs 299.

A motor 300 comprises a generally conventional 12-volt DC electric motor suitable for the use described herein. Preferably, the motor 300 comprises a shaft 306 to which is attached a worm gear 302. At an end opposite the worm gear 302 is a bearing 304. The motor 300 is generally cylindrical in the overall configuration, but having at least one motor casing face 308.

Figure 32:
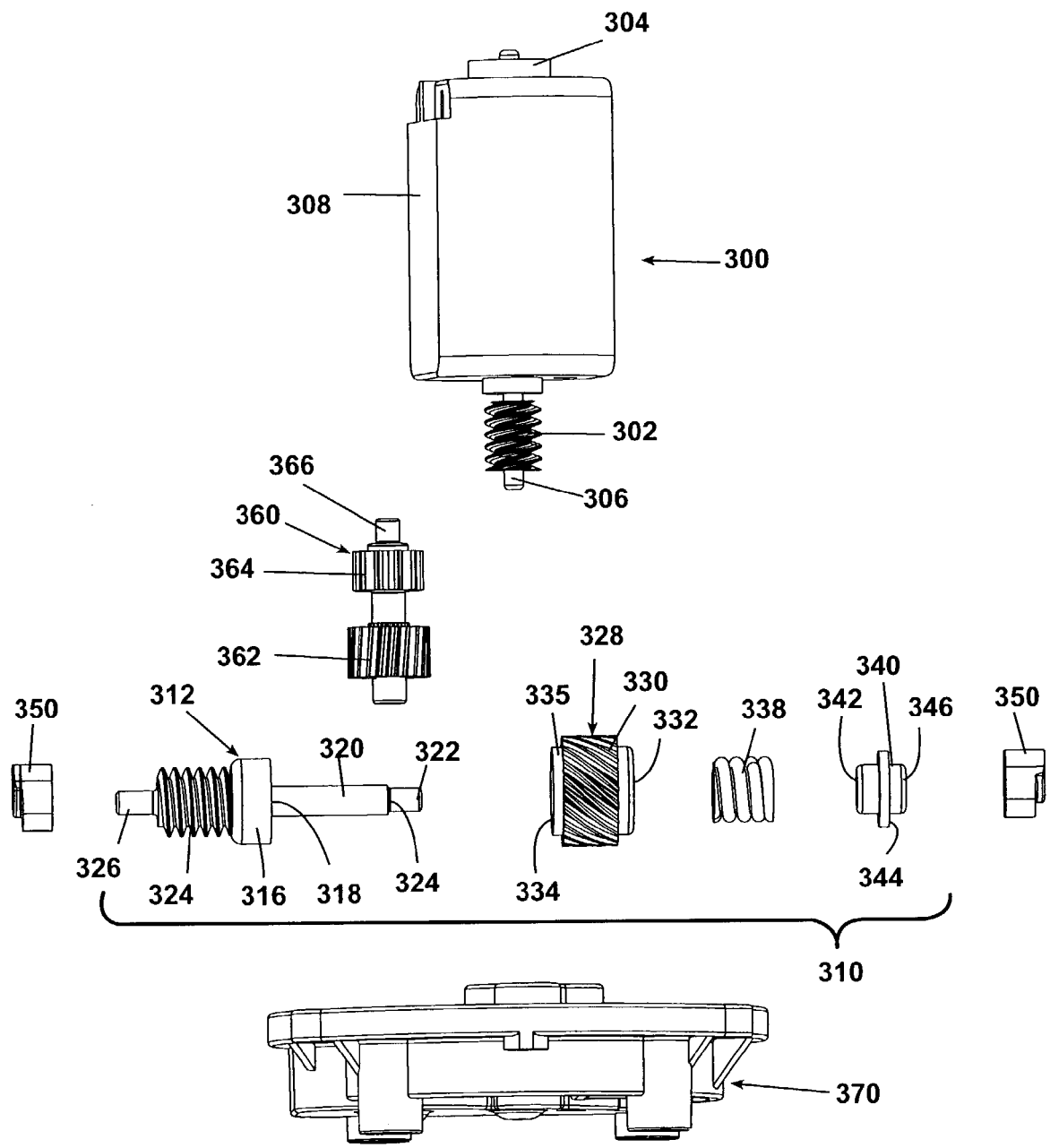
FIG. 32 is an exploded view of the motor, a gear assembly, and an actuator sub base comprising a portion of the pivot mechanism of FIG. 21.
Figure 33:
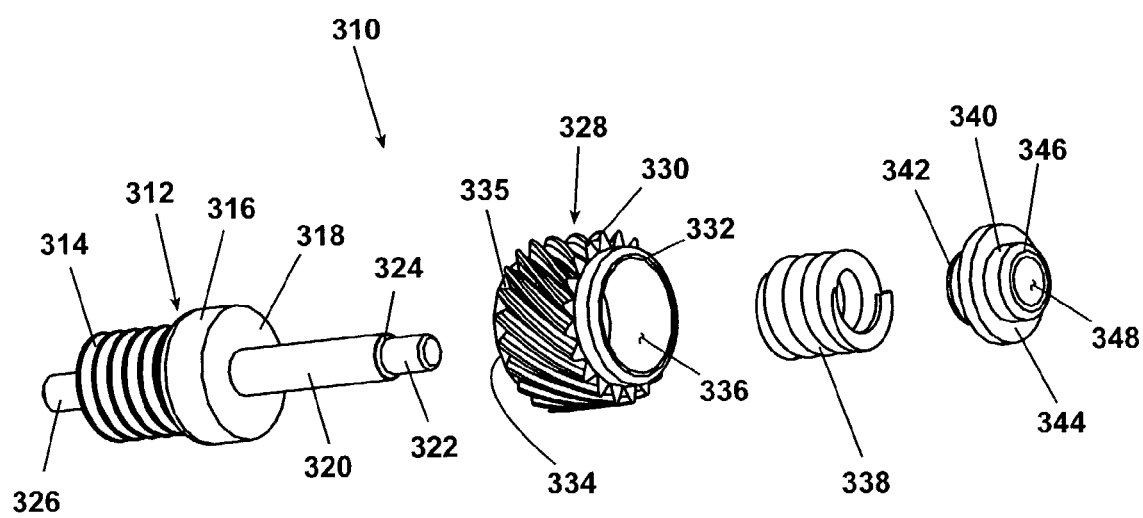
FIG. 33 is an exploded view of a portion of the gear assembly of FIG. 32.

Referring to FIGS. 32 and 33, an intermediate shaft assembly 310 comprises a secondary gear 312, a primary gear 328, a spring 338, and a spring retainer 340. The secondary gear 312 comprises a helical gear portion 314 (such as a worm), a wheel portion 316 in abutment thereto and having a clutch drive surface 318, with a major shaft 320 extending from the clutch drive surface 318 coaxial therewith, a coaxially-aligned shaft extension 322 extending from the major shaft 328, and a minor shaft 326 extending from the helical gear portion 314 in axial alignment with the major shaft 328 and shaft extension 322.

Figure 35:
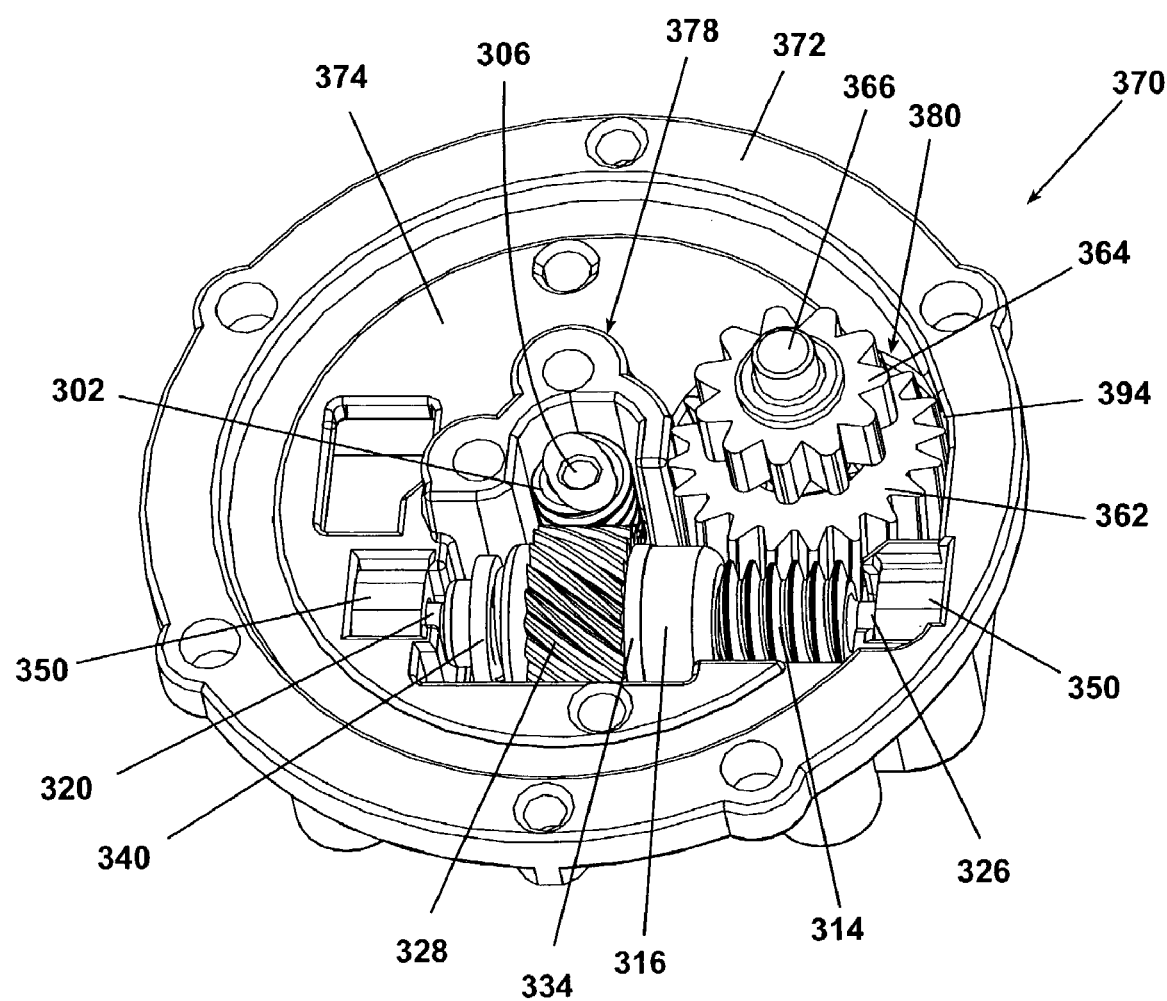
FIG. 35 is a perspective view of the actuator sub base of FIG. 34 showing the gear assembly installed.

Referring also to FIG. 35, the primary gear 328 (e.g., a helical gear) comprises a toothed portion 330 terminating in a cylindrical wall 332. Opposite the cylindrical wall 332, the toothed portion 330 terminates in a clutch driven surface 334 having a shaft aperture 335 extending axially therethrough. The primary gear 328 encloses a spring receptacle 336 for slidable insertion of a conventional helical spring 338. The spring 338 is retained in the spring receptacle 336 by the spring retainer 340. The spring retainer 340 comprises an inner hub 342 transitioning to a flange 344 which, in turn, transitions to an outer hub 346. The spring retainer 340 is provided with a shaft aperture 348 coaxially therethrough. The shaft extension 322 and the minor shaft 326 are journaled into bearings 350 for rotational movement therewithin. The clutch driving surface 318 and the clutch driven surface 334 together comprise a force-modifying device which will enable relative rotation of the two surfaces 318, 334 when a predetermined frictional force has been exceeded.

An output shaft 360 is an elongated body comprising a drive gear 362 and a driven gear 364, in spaced-apart relationship having a shaft 366 extending therethrough in coaxial alignment therewith.

Figure 34:
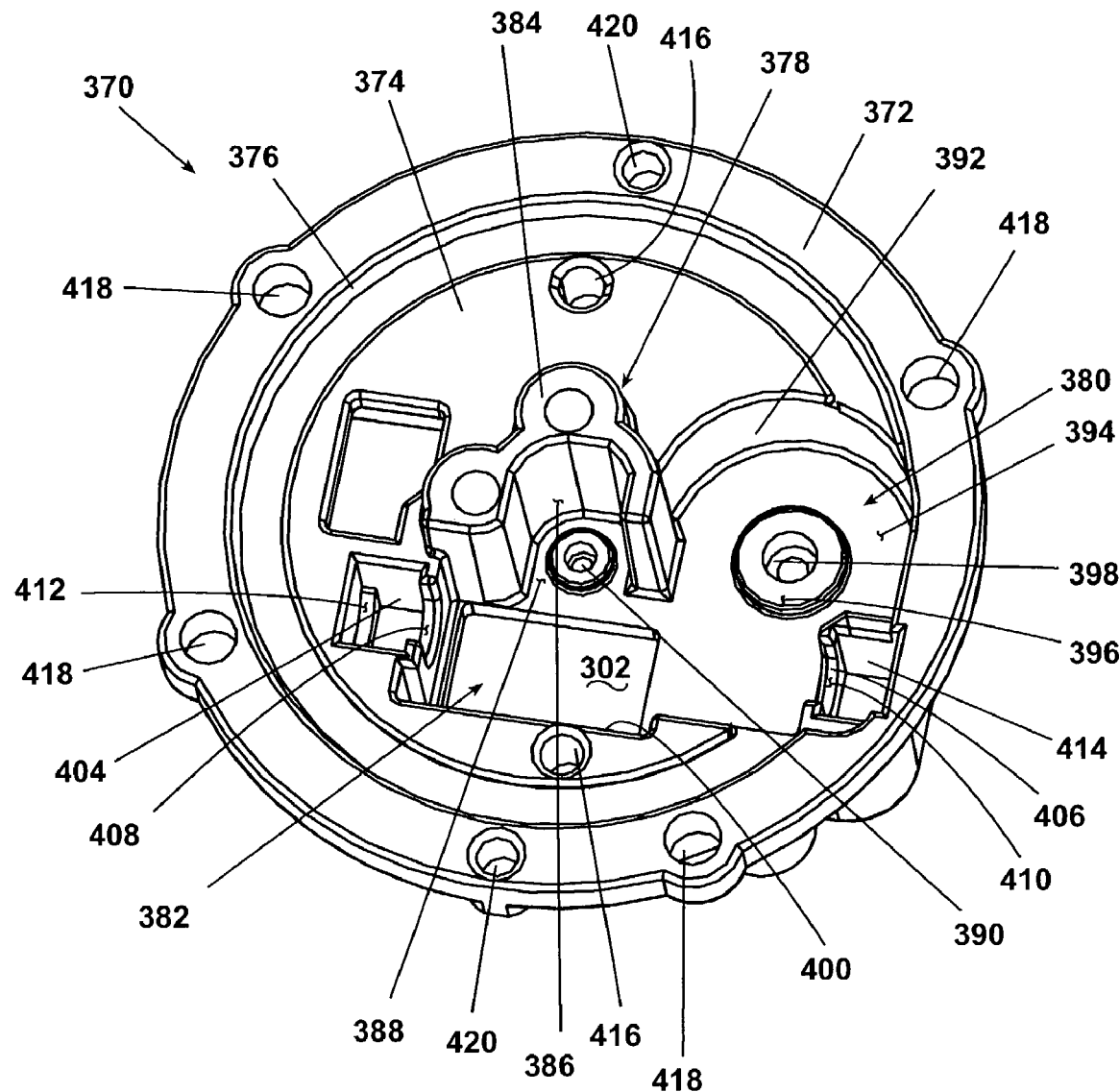
FIG. 34 is a perspective view of the actuator sub base of FIG. 32.

Referring also to FIG. 34, the base 370 is a generally circular-shaped body comprising an annular portion 372 and a floor portion 374. The annular portion 372 transitions to the floor portion 374 through a downwardly depending annular wall 376. Extending upwardly from the center of the floor portion 374 is a worm gear housing 378 for surrounding the motor worm and supporting the motor 300 comprising a generally semi-cylindrical upwardly-extending wall 384 coaxial with the base 370 and defining a worm gear cavity 386. The wall 384 is provided with a side opening 388. The floor of the worm gear cavity 386 is provided with a circular axle seat 390 in coaxial alignment with the wall 384.

Adjacent the worm gear housing 378, an output shaft housing 380 is formed integrally with the floor portion 374 by a downwardly depending curved wall 392 defining an output shaft cavity 394. The wall 392 is provided with a side opening 396. The floor of the cavity 394 is provided with a circular axle seat 398 in coaxial alignment with the wall 392.

In operable juxtaposition with the side openings 388, 396 is an intermediate shaft assembly housing 382 formed in the floor portion 374 by a downwardly depending housing wall 400 defining an intermediate shaft assembly cavity 402. The intermediate shaft assembly housing 382 is provided with a first bearing wall 404 adjacent a first end thereof, and a second bearing wall 406 adjacent a second end thereof. The first bearing wall 404 is provided with an arcuate first shaft opening 408. The second bearing wall 406 is provided with an arcuate second shaft opening 410. A first bearing seat 412 is formed at the first end of the intermediate shaft assembly cavity 402 by the first bearing wall 404. A second bearing seat 414 is formed at the second end of the intermediate shaft assembly cavity 402 by the second bearing wall 406.

A pair of diametrically-opposed mounting post sockets 416 are provided in the floor portion 374 and adapted for slidable communication with the mounting posts 296 of the motor housing 260. A pair of diametrically-opposed mounting peg sockets 420 are provided in the annular portion 372 and adapted for slidable communication with the mounting pegs 136 of the outer housing 122. A plurality of mounting bores 418 are provided through the annular portion 372 for coaxial alignment with the mounting bores 140 of the outer housing 122.

Figure 36:
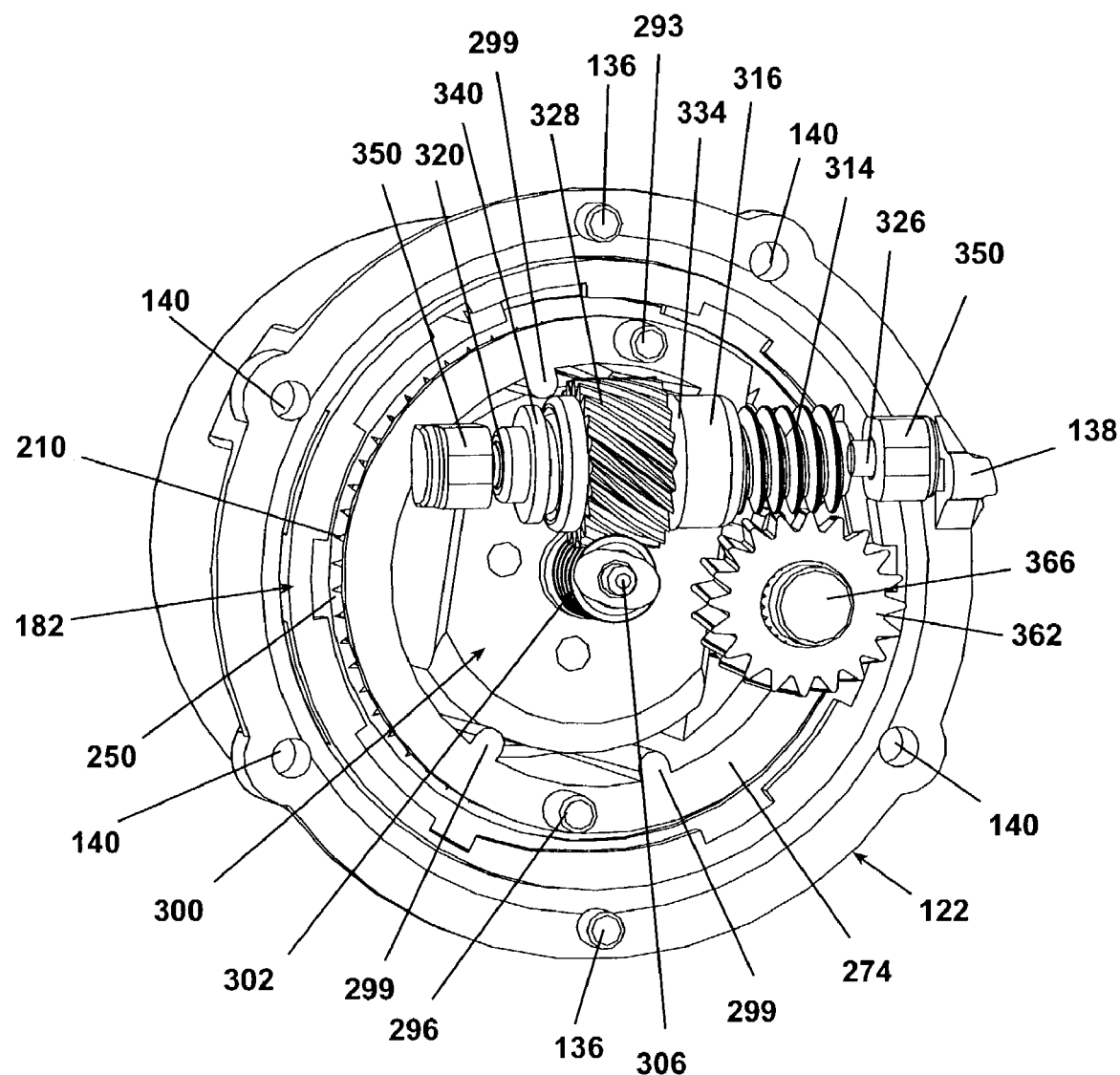
FIG. 36 is a first perspective view of the pivot mechanism of FIG. 21 with the actuator sub base removed showing the relative locations of the motor, the gear assembly and the actuator sub.
Figure 37:
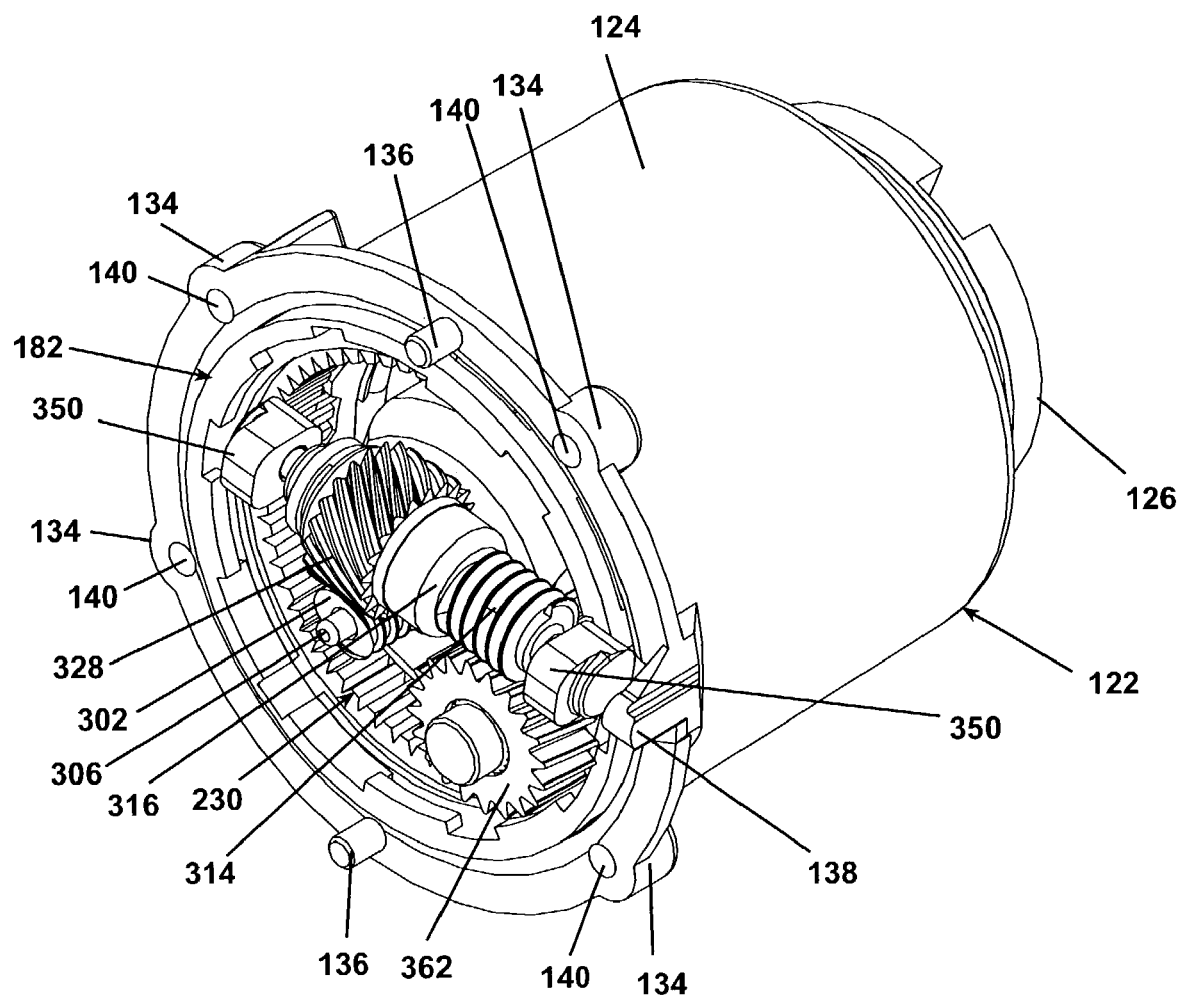
FIG. 37 is a second perspective view of the pivot mechanism of FIG. 36.
Figure 39:
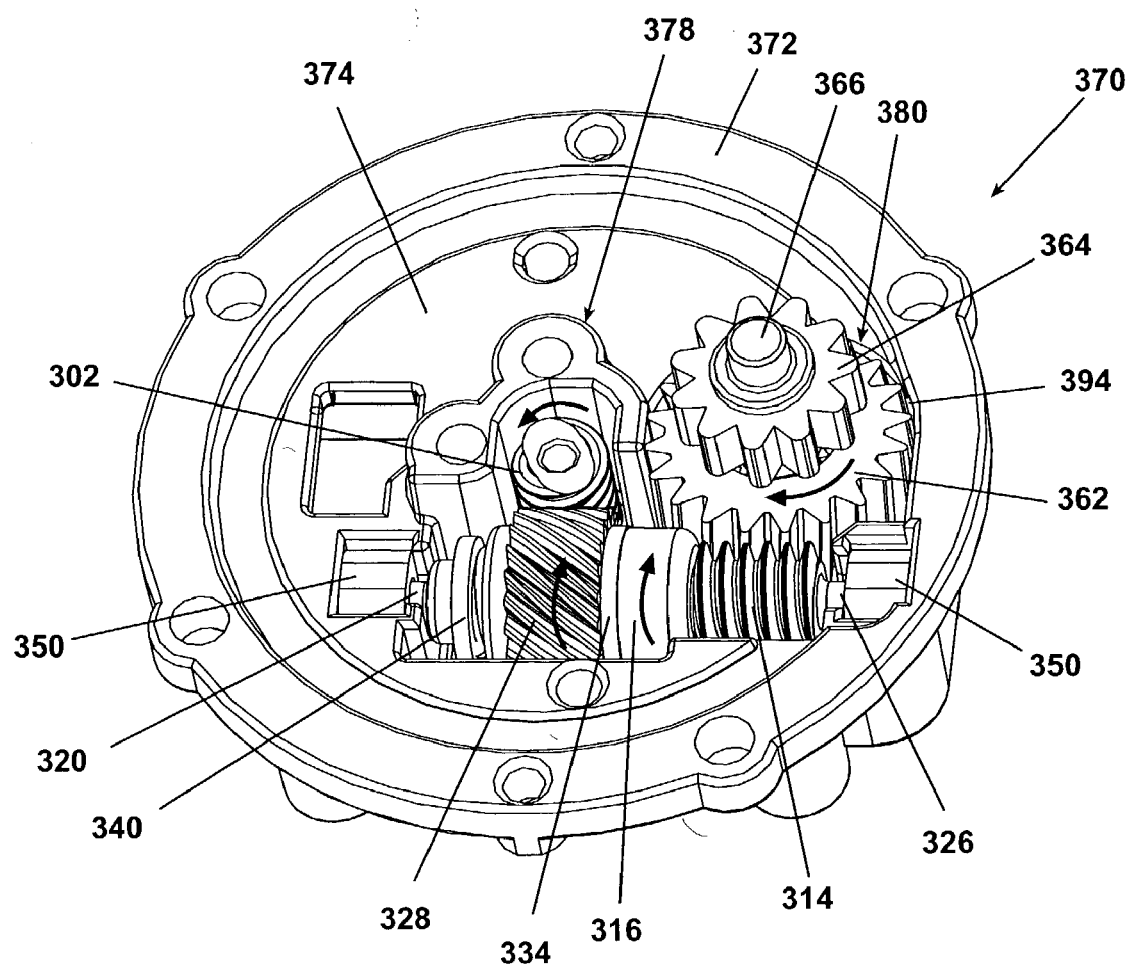
FIG. 39 is a first perspective view of the actuator sub base and the gear assembly of FIG. 35 showing the rotation of the gears during operation of the pivot mechanism for pivoting the vehicular mirror assembly.
Figure 40:
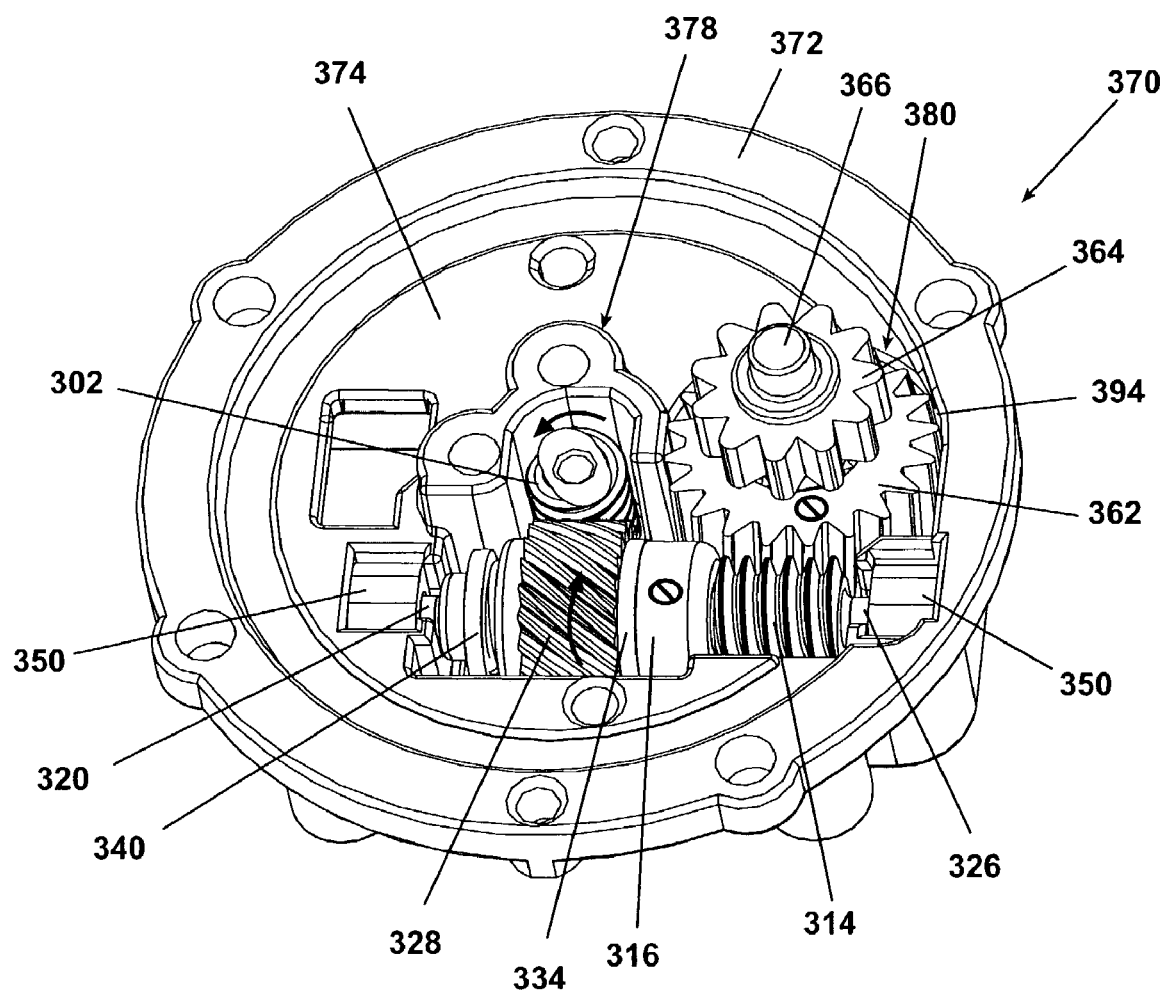
FIG. 40 is a second perspective view of the actuator sub base and the gear assembly of FIG. 35 showing the operation of the slip clutch according to the invention.

As shown in FIGS. 35–37, the worm gear shaft 306 is journaled into the axle seat 390. The intermediate shaft assembly 310 is retained in the intermediate shaft assembly cavity 302 by journaling the shaft extension 322 and the minor shaft 326 into the bearings 350 which are retained in the bearing seats 412, 414, with the shaft extension 322 and the minor shaft 326 extending through the shaft openings 408, 410. As so assembled, the primary gear 328 operably engages the worm gear 302 so that rotation of the worm gear 302 urges the primary gear 328 into horizontal rotation as shown in FIG. 39.

The output shaft 366 is journaled into the axle seat 398 so that the drive gear 362 occupies the output shaft cavity 394 and operably engages the gear portion 314 of the intermediate shaft assembly 310. The output shaft 366 adjacent the driven gear 364 is journaled into the output shaft seat 298 in the motor housing 260 to operably engages the ring gear 230. As so assembled, rotation of the worm gear 302 will urge the horizontal rotation of the primary gear 328. Frictional engagement of the clutch drive surface 318 with the clutch driven surface 334 will urge the rotation of the gear portion 314. Rotation of the gear portion 314 will urge the drive gear 362 and the driven gear 364 into rotation. The rotation of the driven gear 364 will urge rotation of the ring gear 230 as shown in FIG. 39.

The pivot mechanism 120 is assembled as shown in FIGS. 21, 36, and 38. The wave spring 170 is inserted over the upper housing 184 of the actuator sub 180. The ramp 150 is then inserted over the upper housing 184 of the actuator sub 180 to abut the wave spring 170 so that the raised segments 154 extend axially away from the lower housing 182. The spring the 240, the actuator sub ring 210, and the ring gear 230 are assembled into the lower housing 182 of the actuator sub 180 as previously described and retained therein with the C-ring 250. The assembled actuator sub 180 is then inserted into the outer housing 122 so that the upper housing 184 extends through the opening 130 and the actuator sub 180 is in slidable communication with the outer housing 122 for rotational movement therewithin.

The motor 300 is inserted into the motor housing 260 so that the bearing 304 is retained in the yoke aperture 288. The motor housing 260 is then inserted through the C-ring 250, the spring 240, the ring gear opening 238, and the actuator sub ring opening 220 into the assembled actuator sub 180. The worm gear 302, the intermediate shaft assembly 310, and the output shaft 360 are assembled into the base 370 as previously described, and the base 370 is then assembled to the outer housing 122 so that the mounting posts 296 of the motor housing 260 are inserted into the mounting post sockets 416 of the base 370, and the mounting pegs 136 of the outer housing 122 are inserted into the mounting peg sockets 420 of the base 370. As so assembled, the motor housing 260, the motor 300, and the outer housing 122 will be fixedly attached to the base 370. The actuator sub 180 can rotate within the outer housing 122 between the outer housing 122 and the motor housing 400.

As shown in FIG. 39, actuation of the motor 300 will turn the worm gear 302, which will urge rotation of the primary gear 328. The frictional engagement of the clutch driven surface 334 with the clutch drive surface 318 will urge rotation of the helical gear portion 314. This will urge rotation of the drive gear 362 and the driven gear 364. Rotation of the driven gear 364 will then urge rotation of the ring gear 230. The engagement of the ring gear bosses 234 with the slots 214 in the actuator sub ring 210 will urge the rotation of the actuator sub 180. Thus, the upper housing 184 will rotate relative to the outer housing 122. With the outer housing 122 operably connected to the mirror housing 112, the mirror housing 112 will be selectively moved inwardly or outwardly of the vehicle.

If the mirror assembly 110 reaches its fully extended or retracted position before the motor 300 has stopped turning, further rotation of the actuator sub 180 will be prevented. This will prevent further rotation of the output shaft 360 and the helical gear portion 314. The frictional engagement of the clutch drive surface 318 with the clutch driven surface 334 will be overcome so that the clutch driven surface 334 will continue to rotate relative to the clutch drive surface 318 until the motor 300 no longer turns. Similarly, if the mirror assembly 112 is forcibly moved from an extended position to a retracted position, such as would occur if the mirror assembly 112 strikes an immovable object, the ring 210 is separated from engagement with ring 230 because the output shaft 360 is locked against manual rotation. The ring 210 can ride against the underside of the ring 230 against the bias of the spring 240 until the detents 234 re-engage with the slots 214 on the ring 210 and the motor 300 can once again drive the rotation of the mirror housing 112.

The herein-described invention provides a robust, compact pivot assembly for selectively pivoting a vehicular mirror assembly to an extended or a retracted position. The unique slip clutch enables the motor powering the pivot assembly to continue to operate after the mirror assembly has reached its fully extended or fully retracted position without the increased current load and heat generation otherwise experienced if the motor were to attempt to operate the gearing that is prevented from rotating. Furthermore, the slip clutch enables the mirror to be forcibly extended or retracted without damaging the gears or the motor, thus extending the life of the pivot assembly. The use of the slip clutch also avoids the use of sophisticated and expensive electronics for sensing an increase in load on the motor, such as would occur when the mirror assembly reaches its fully extended or retracted position, and turning off the motor in response.

Figure 41:
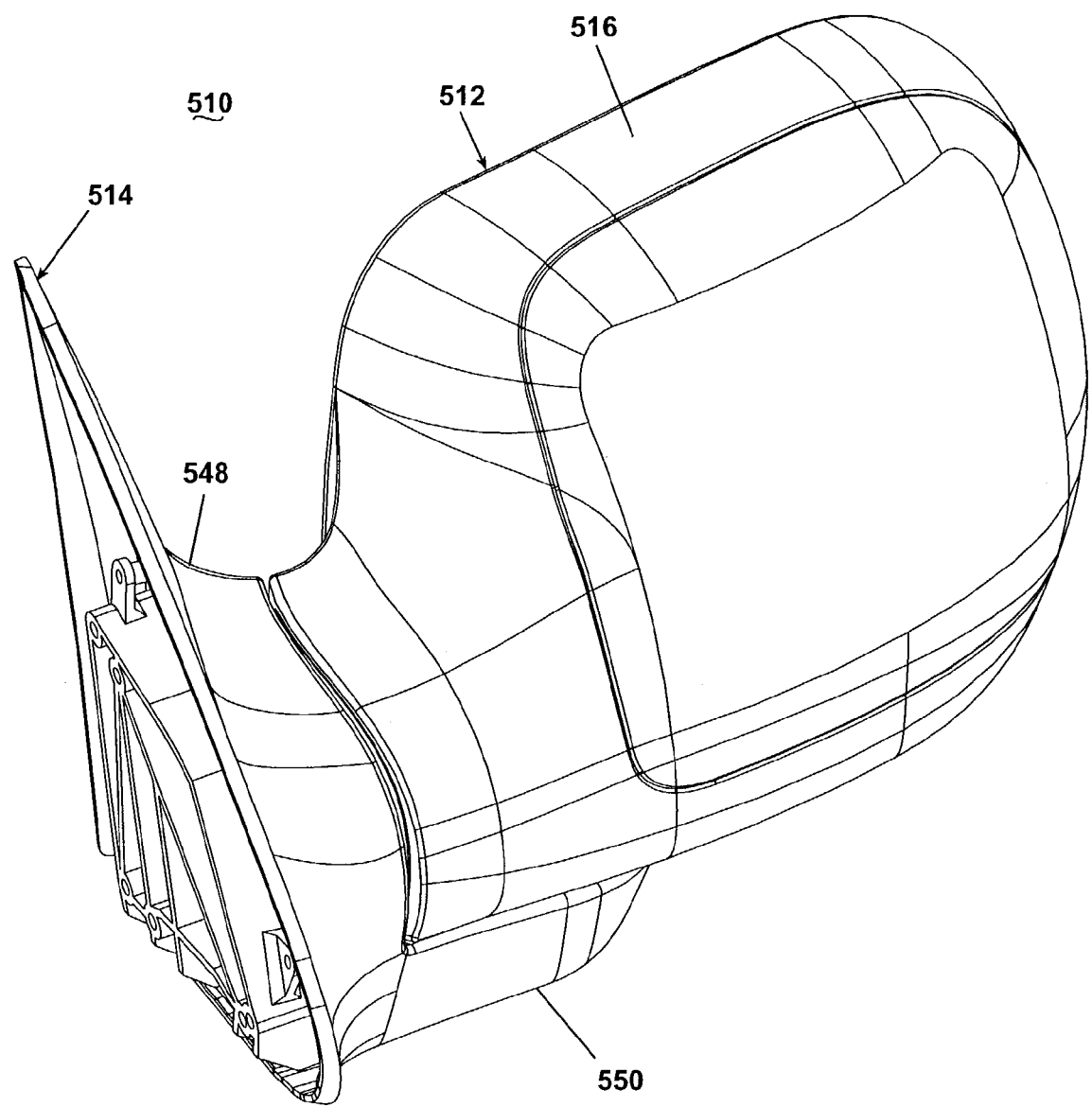
FIG. 41 is a left-front perspective view of a fourth embodiment of a vehicular mirror assembly comprising power fold and power extend functions according to the invention and comprising a mirror assembly rotatably mounted to a support bracket adapted to mount to a vehicle, with the mirror assembly shown in an unfolded and retracted position.
Figure 42:
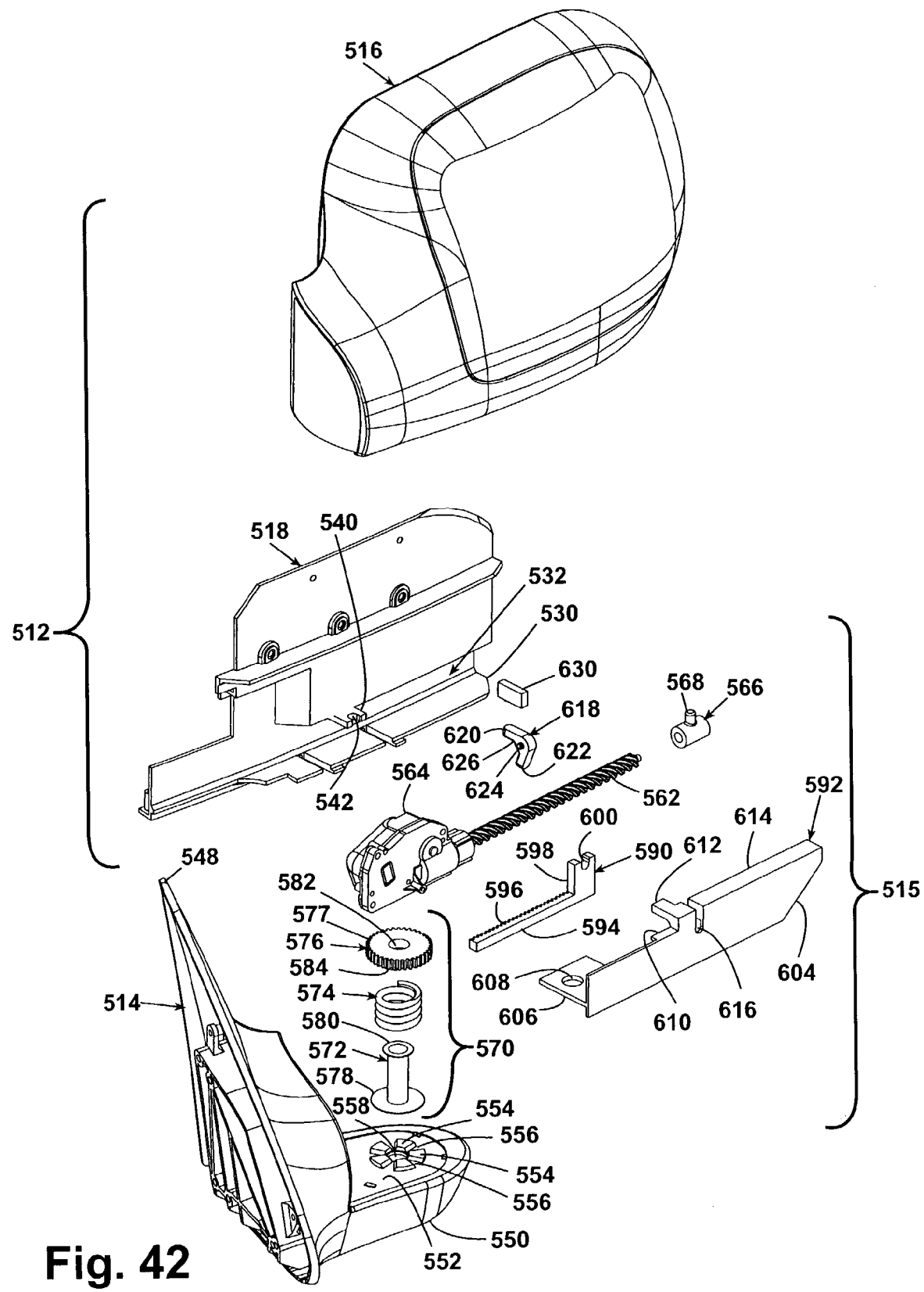
FIG. 42 is an exploded view of the power fold mirror of FIG. 41 and illustrates the major components comprising a drive assembly connecting the mirror assembly to the support bracket and for rotating and extending the mirror assembly relative to the vehicle, with the drive assembly comprising a drive screw having a drive nut guided by a guide bracket and that couples with either a rack gear to rotate the mirror housing or a mirror bracket to extend the mirror housing.

FIG. 41 illustrates a fourth embodiment of a vehicle mirror 510 having both a power fold and a power extend function according to the invention. The vehicle mirror 510 comprises a mirror assembly 512 and is mounted to a vehicle by a support bracket or arm 514. Referring to FIG. 42, the mirror assembly 512 is connected to the support arm 514 by a drive assembly or transmission 515, which is used to rotate the mirror assembly between folded and unfolded positions and extend the mirror assembly between retracted and extended positions.

Referring to FIGS. 41–44, the mirror assembly 512 comprises a mirror housing 516 in which is received a mirror bracket 518 that supports a mirror drive 520 for adjusting the position of the mirror 522 mounted to the mirror drive 520. The mirror drive 520 and mirror 522 are well known and will not be described in further detail.

Figure 43:
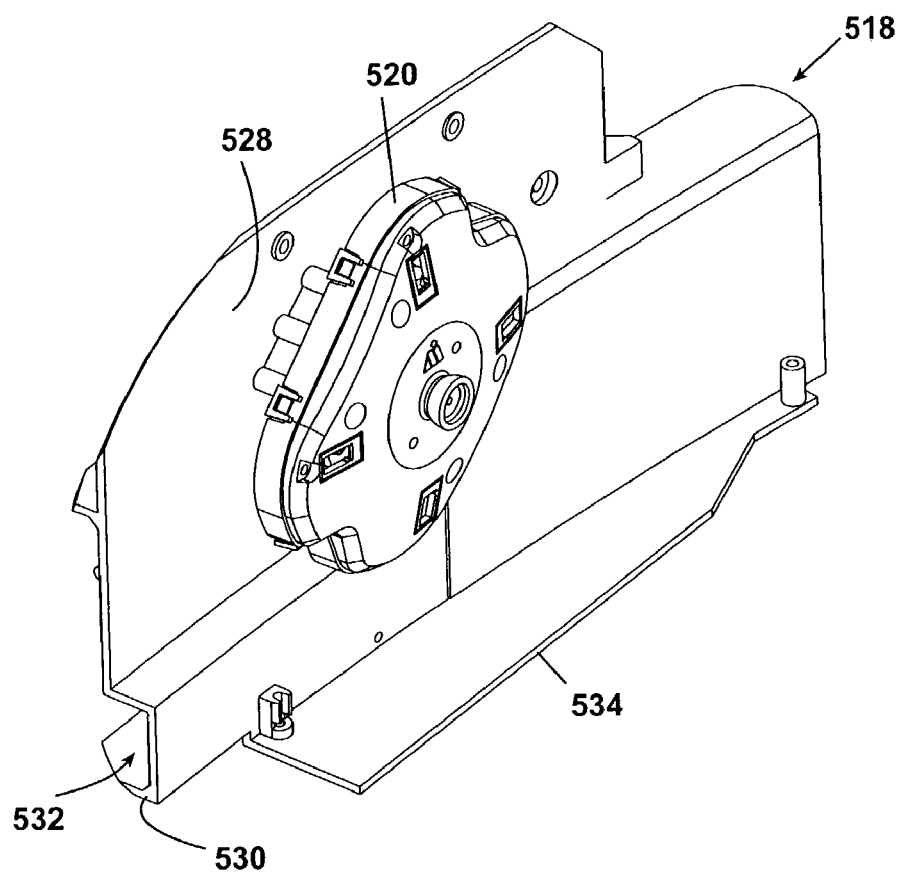
FIG. 43 is a upper-rear perspective view of the mirror bracket of the mirror assembly of FIG. 42 and which is adapted to support the mirror for rotatable movement.

Referring specifically to FIG. 43, the mirror bracket 518 comprises a generally planar upper face 528 on which the mirror drive 520 is mounted. A C-shaped flange 530 extends away from the planar face 528 and defines a forward-facing channel 532. A laterally extending plate 534 extends from the lower end of the flange 530.

Figure 44:
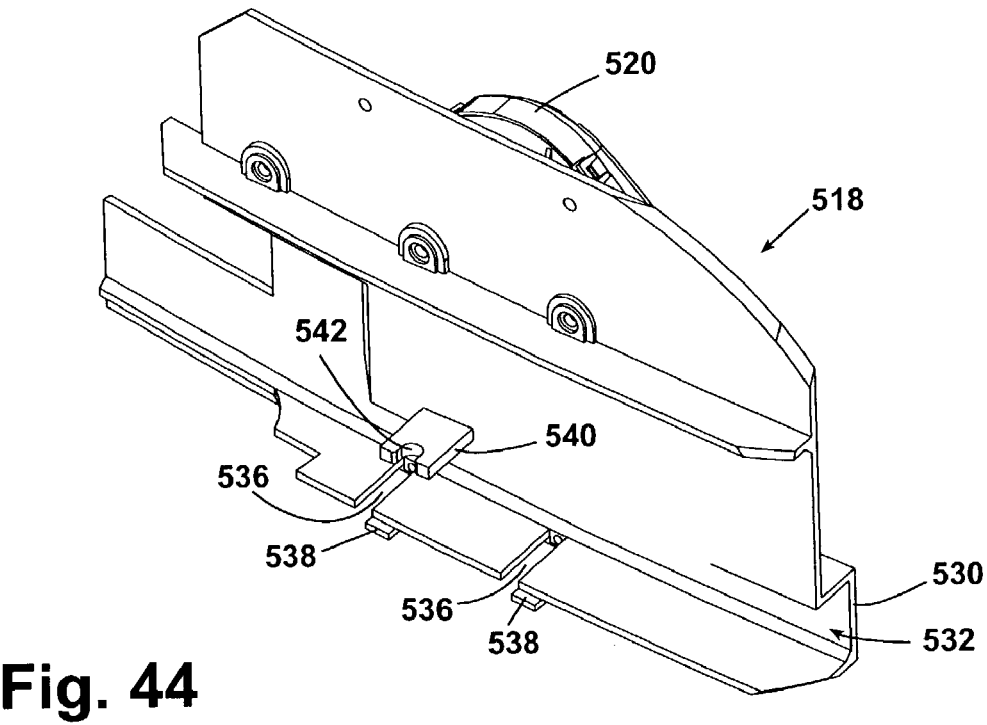
FIG. 44 is an upper-front perspective view of the mirror bracket of FIG. 43.

Referring specifically to FIG. 44, slots 536 are formed in the lower wall of the flange 530. Tabs 538 extend from the lower edge of the flange 530 and are adjacent the slots 536. A catch 540 extends laterally from the planar face 528 on the side opposite the mirror drive 520 and has a U-shaped notch 542.

Referring to FIGS. 41 and 42, the support arm 514 comprises a shoulder 548 adapted to mount to the vehicle and a base 550 extending laterally from the shoulder. The base 550 has a generally flat upper surface 552 from which extend a series of radially spaced projections 554, with the intervening spaces forming detents 556. An opening 558 is located at the center of the projections 554 and extends through the base 550.

Figure 45:
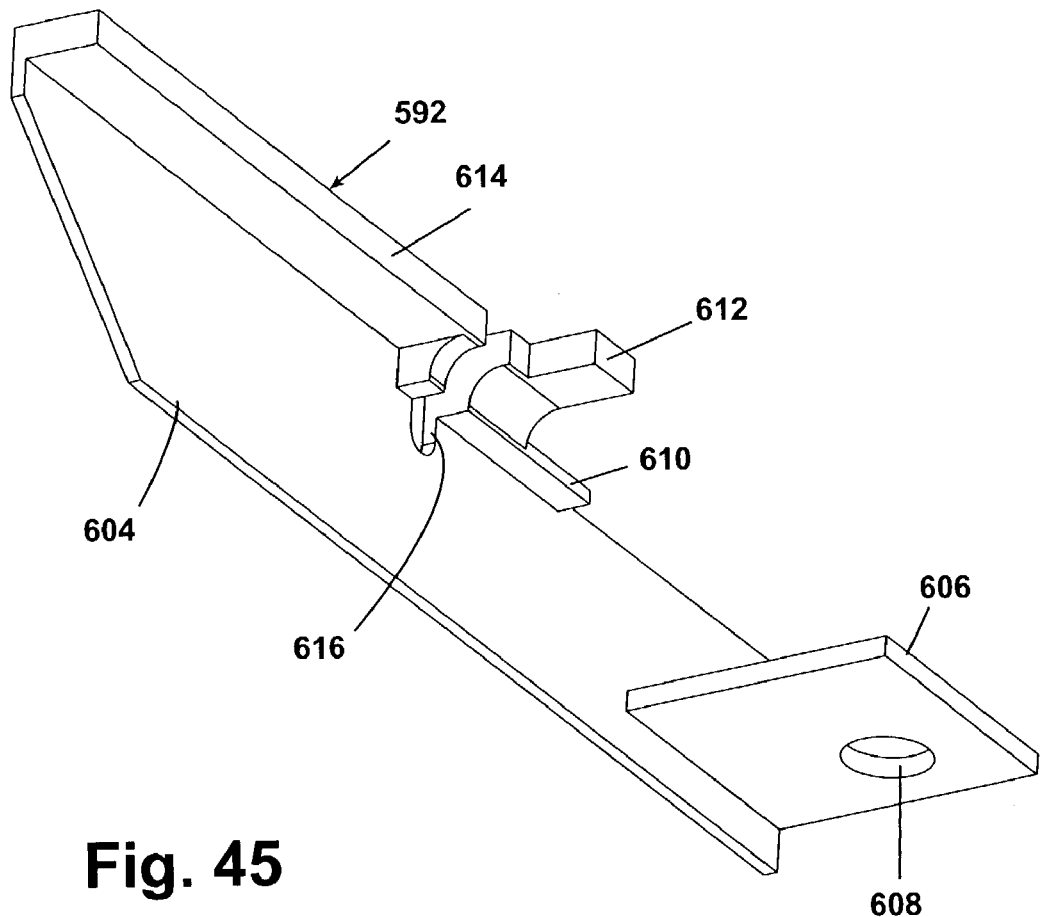
FIG. 45 is a lower-rear perspective view of a guide bracket for the mirror assembly illustrated in FIG. 42.
Figure 46:
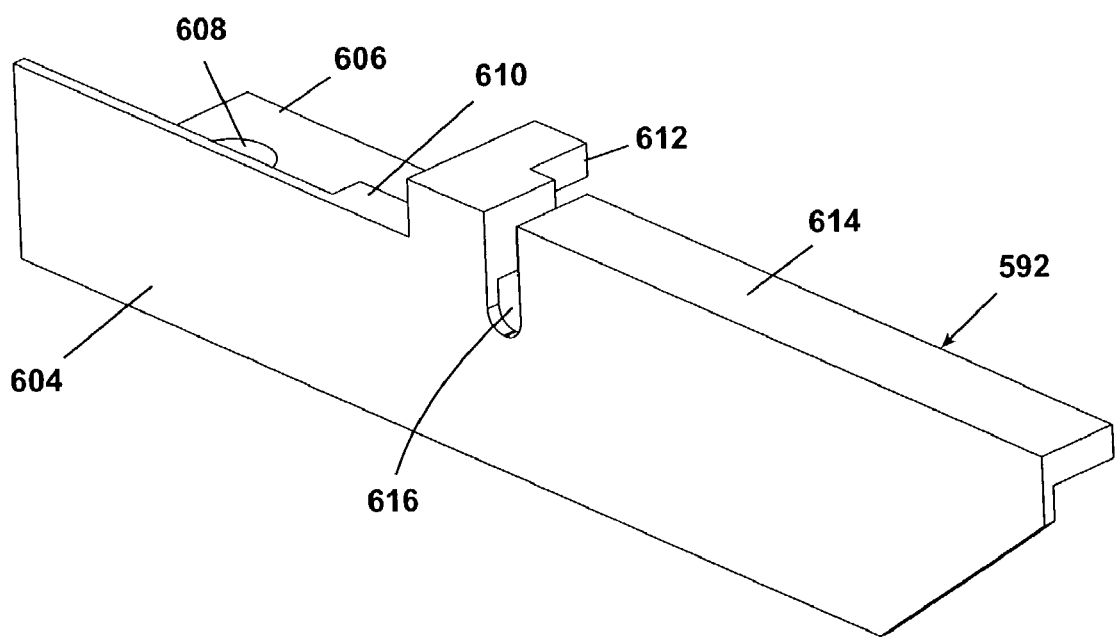
FIG. 46 is an upper-front perspective view of the guide bracket of FIG. 45.

Referring to FIGS. 42 and 45–46, the drive assembly 515 comprises a drive screw 562 coupled to an electric motor 564, which rotates the drive screw 562 about the longitudinal axis of the drive screw 562. An internally threaded drive nut 566 is threadably received on the drive screw 562 and comprises a pin 568 extending laterally from the drive nut 566 along an axis that is perpendicular to the longitudinal axis of the drive screw 562 adapted to form a linkage with the catch 540.

A detent assembly 570 mounts the electric motor 564 and a first linkage such as a guide bracket 590 to the base 550 of the support arm 514. The detent assembly 570 comprises an axle 572, a coil spring 574, and a spur gear 576. The axle 572 has an end plate 578 on one end and a cap 580 on the other end. Spur gear 576 comprises teeth 577 disposed about its periphery, a central opening 582, and multiple dogs 584 extending downwardly from the bottom surface of the spur gear 576. The dogs 584 are complementary in shape to the detents 556 on the base upper surface 552.

The drive assembly 515 further comprises a rack gear 590 and a guide bracket 592. The rack gear 590 comprises a rail 594 having a series of teeth 596 on an inner surface thereof sized to match with the teeth 577 of the spur gear 576. The rail 594 terminates in a tab 598 having a notch 600.

The guide bracket 592 comprises a main plate 604 from which extends a mounting tab 606 having an opening 608 for coupling the guide bracket 592 to the axle 572 of the detent assembly 570. The mounting tab 606 supports the electric motor 564. A limit flange 610 extends laterally from an upper end of the plate 604 and ends at a post 612, which transitions into a guide flange 614 having a slot 616 formed therein.

A slightly V-shaped cam 618 comprising upper and lower fingers 620, 622 is mounted to the post 612 by a pin 624 received within the post 612. A cam surface 626 is formed between the upper and lower fingers 620, 622. When the cam 618 is mounted to the post 612, the lower finger 622 is aligned with the slot 616. A limit switch 630 is mounted to post 612 such that the switch overlies the notch 542.

When the drive assembly 515 is mounted to the base 550, the coil spring 574 is mounted on the axle 572, the axle 572 is inserted upwardly through the opening 558, the spur gear 576 is mounted to the axle 572 adjacent the upper surface 552, and the axle 572 is inserted through the opening 608 so that the cap 580 abuts the upper surface of the mounting tab on the guide bracket 592. The coil spring lower end will abut the axle end plate 578, the coil spring upper end will abut an underside of the base top surface 552, and the dogs 584 will be received within the detents 556. In such an orientation, the coil spring 574 draws the spur gear 576 toward the base top surface 552 to comprise a force-modifying device, and the spur gear can only be rotated relative to the base opening 558 by overcoming the spring force of the coil spring 574 such that the dogs 584 ride up and over the adjacent projections 554 and are received within the next radially positioned detents 556.

As assembled, the teeth 596 of the rack gear 590 mesh with the spur gear teeth 577 and the rail 594 rests on the tab 606. The electric motor 564 is sandwiched between the main plate 604 of the guide bracket and the mirror bracket 518 such that any rotation of the electric motor will result in a corresponding rotation of the mirror bracket 518.

Figure 47:
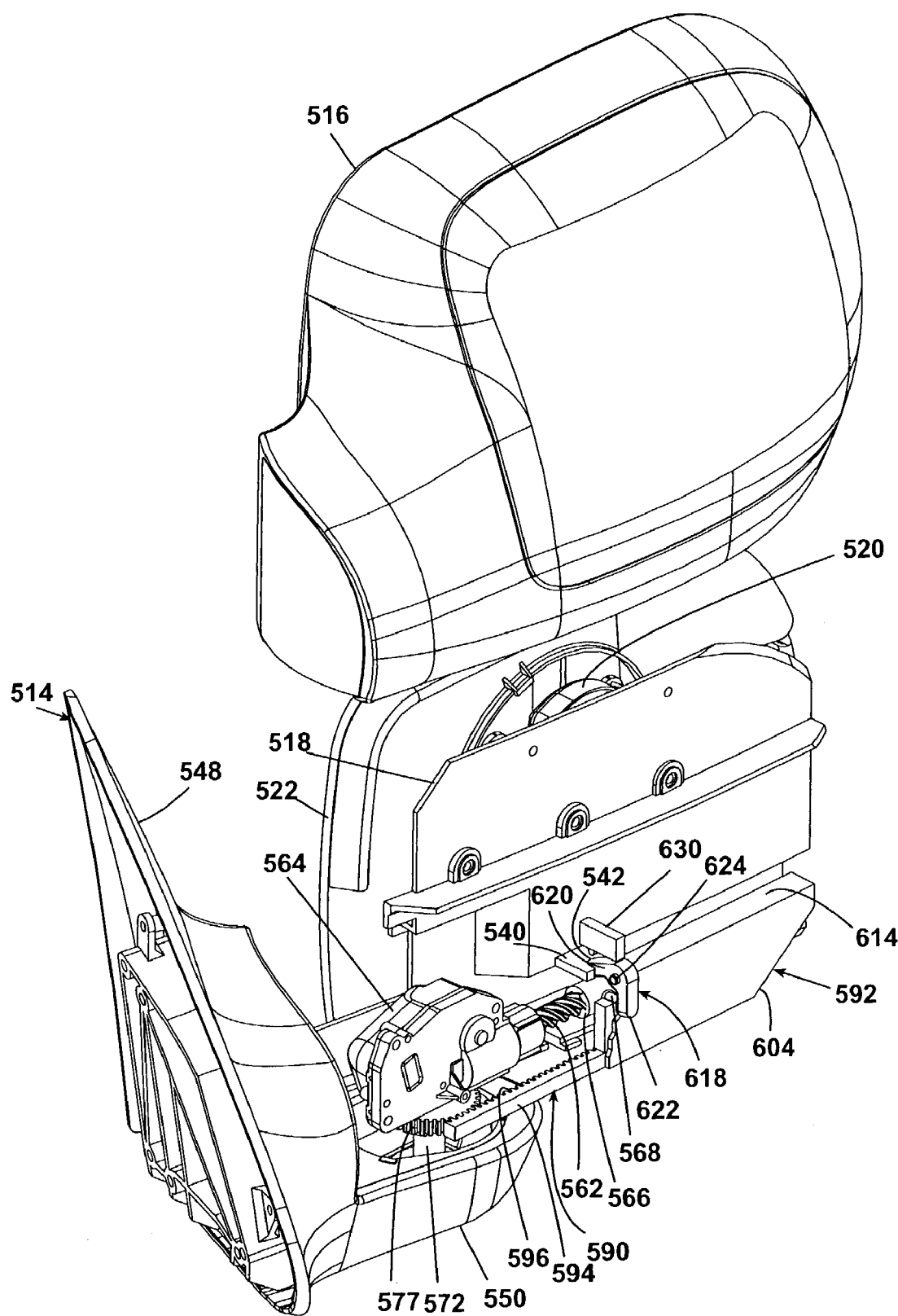
FIG. 47 is a perspective view similar to FIG. 41 and illustrating a mirror housing of the mirror assembly partially exploded from the mirror assembly to illustrate the relationship of the drive assembly to the mirror assembly and the support bracket.
Figure 48:
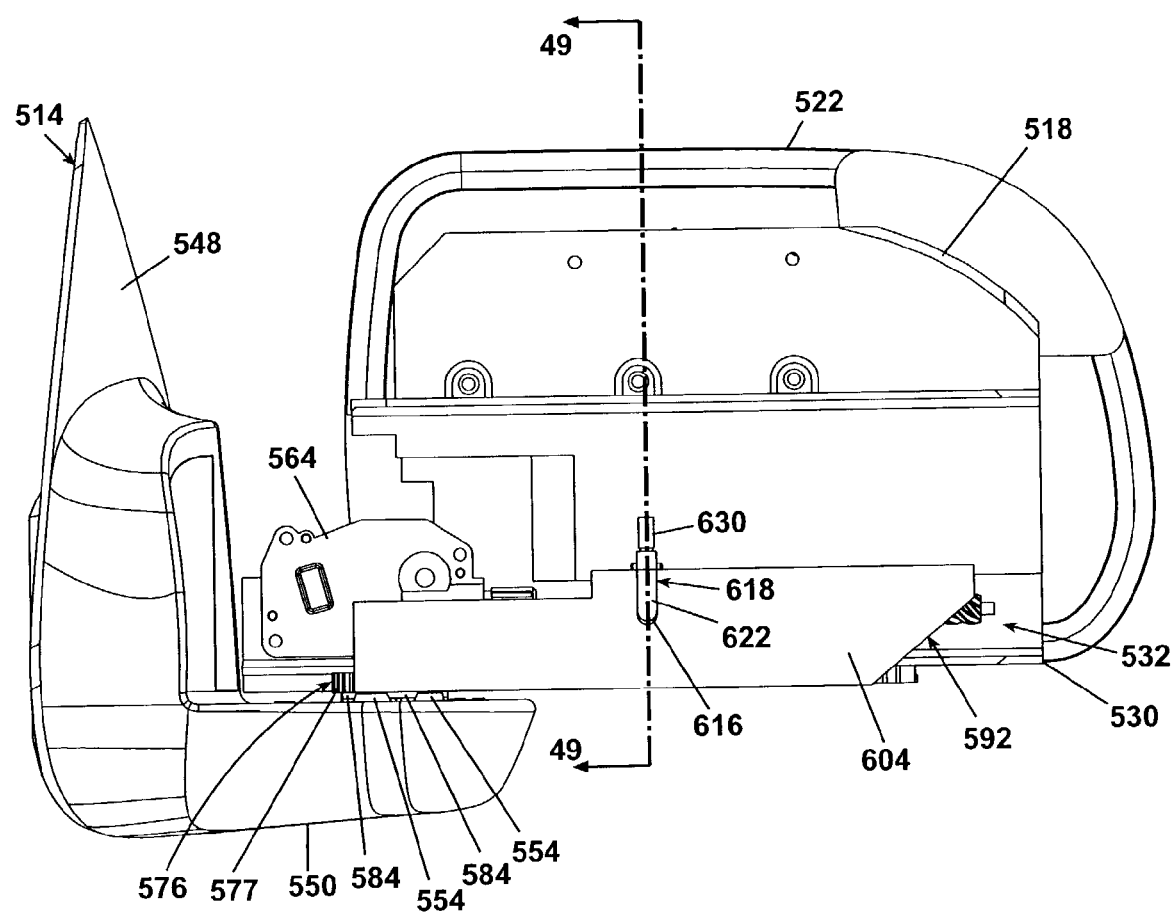
FIG. 48 is a view perpendicular to the mirror bracket of the power fold mirror of FIG. 53 with the mirror housing removed for clarity.
Figure 49:
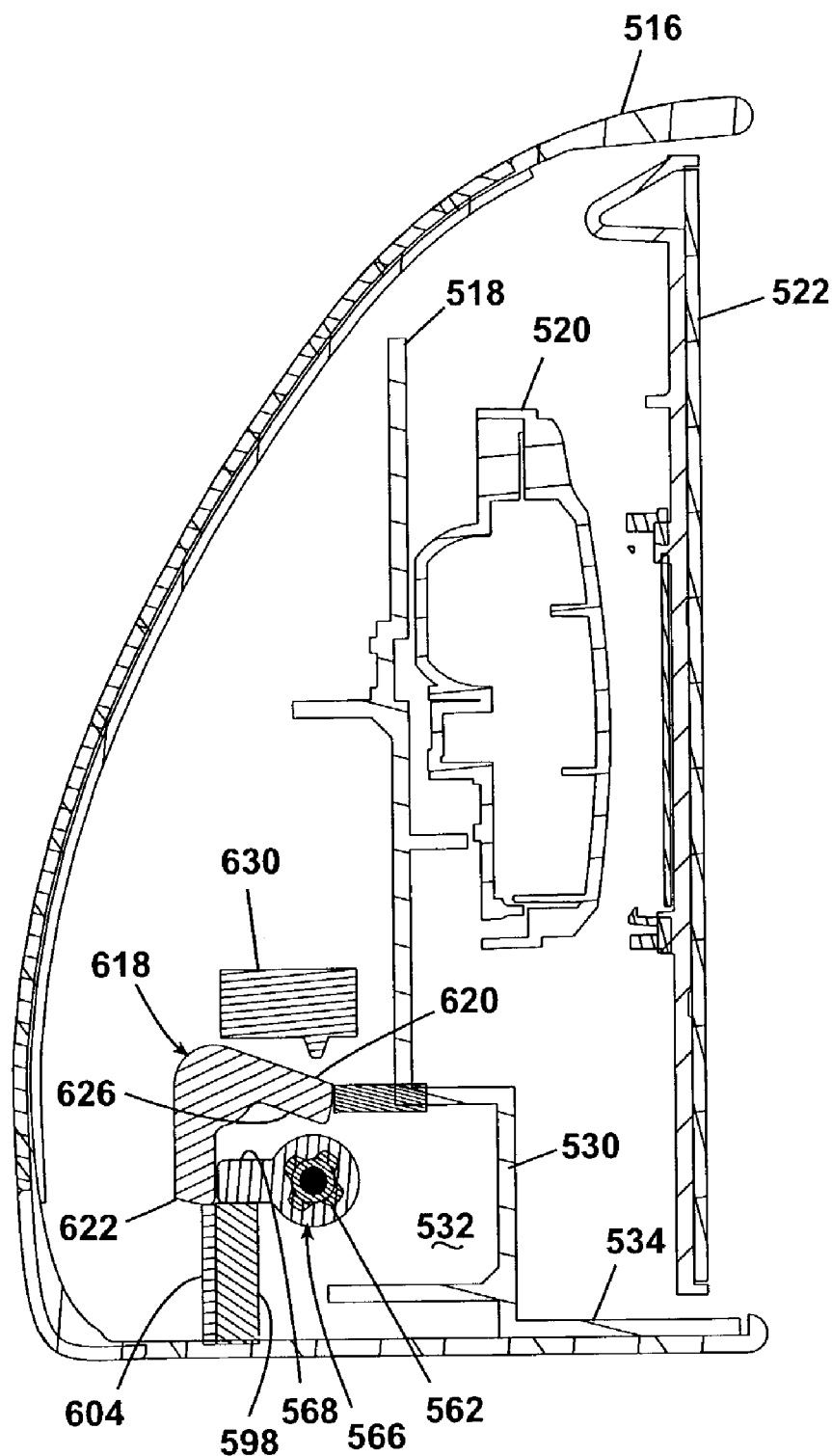
FIG. 49 is a sectional view taken along line 49—49 of FIG. 48 and illustrating the relative position of the drive nut and a cam pivotally mounted to the guide bracket as the drive nut is located on the drive screw at the position corresponding to the unfolded position and ready to transition from contact with the rack gear to the mirror bracket to initiate the extension of the mirror housing upon further rotation of the drive screw.
Figure 50:
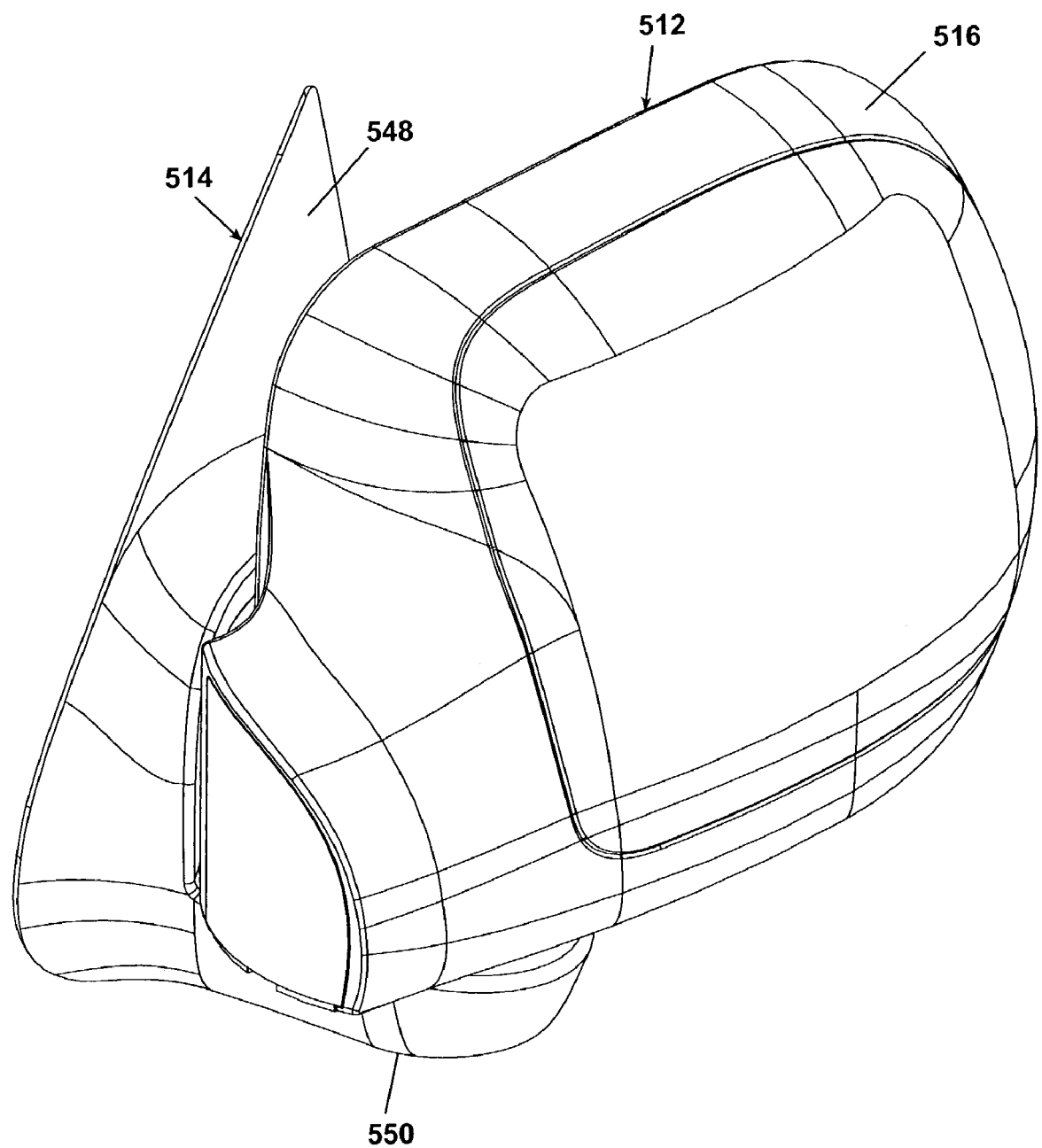
FIG. 50 is a front perspective view of the power fold mirror of FIG. 41 shown in a folded and retracted position.
Figure 51:
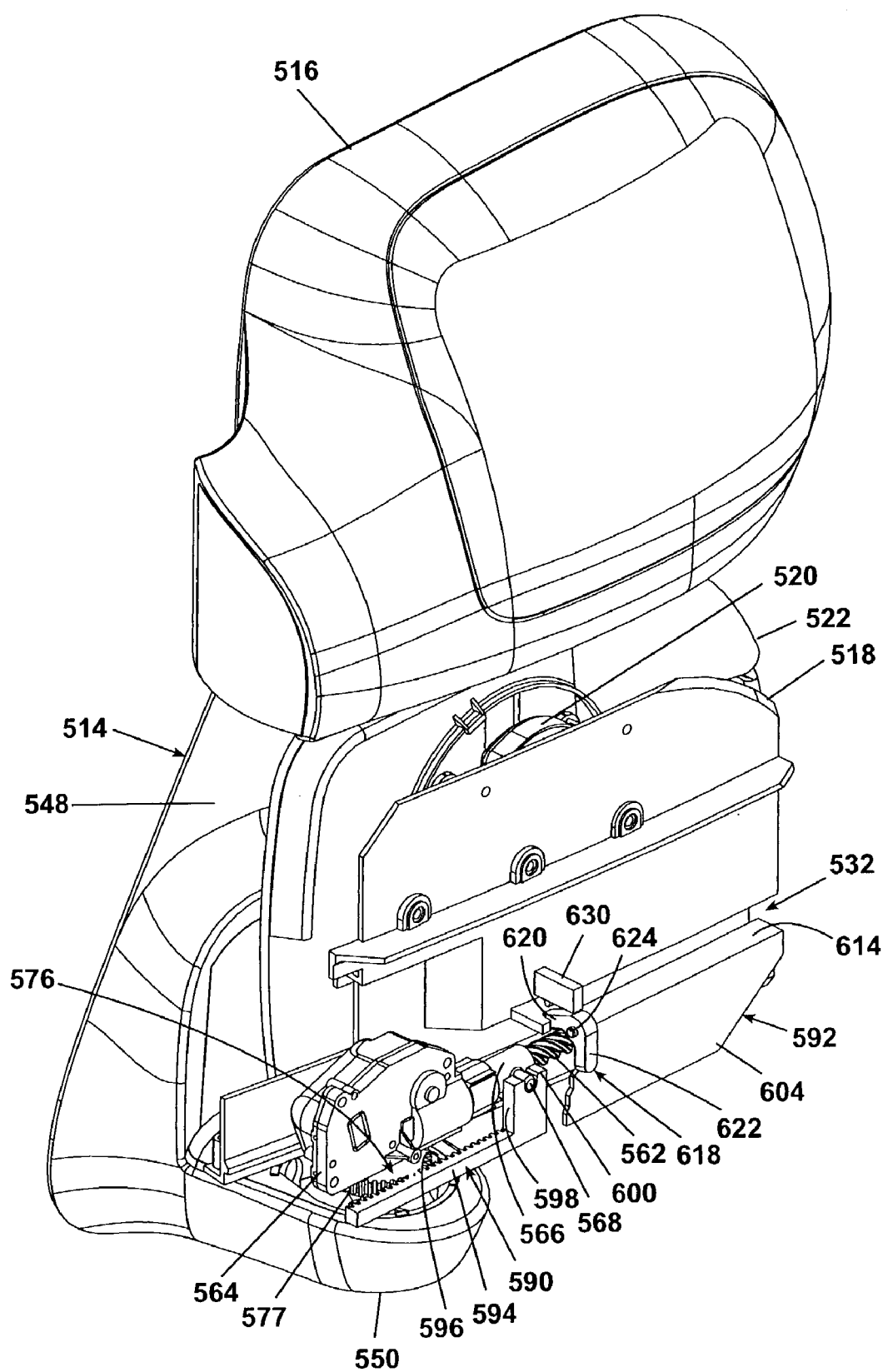
FIG. 51 is a partial exploded view similar to FIG. 47 and illustrating the mirror housing partially exploded from the mirror assembly to illustrate the relationship of the drive assembly to the mirror assembly and the support bracket when the mirror assembly is in the folded and retracted position, with the guide bracket partially broken away to show the connection between the drive nut and the rack gear.
Figure 52:
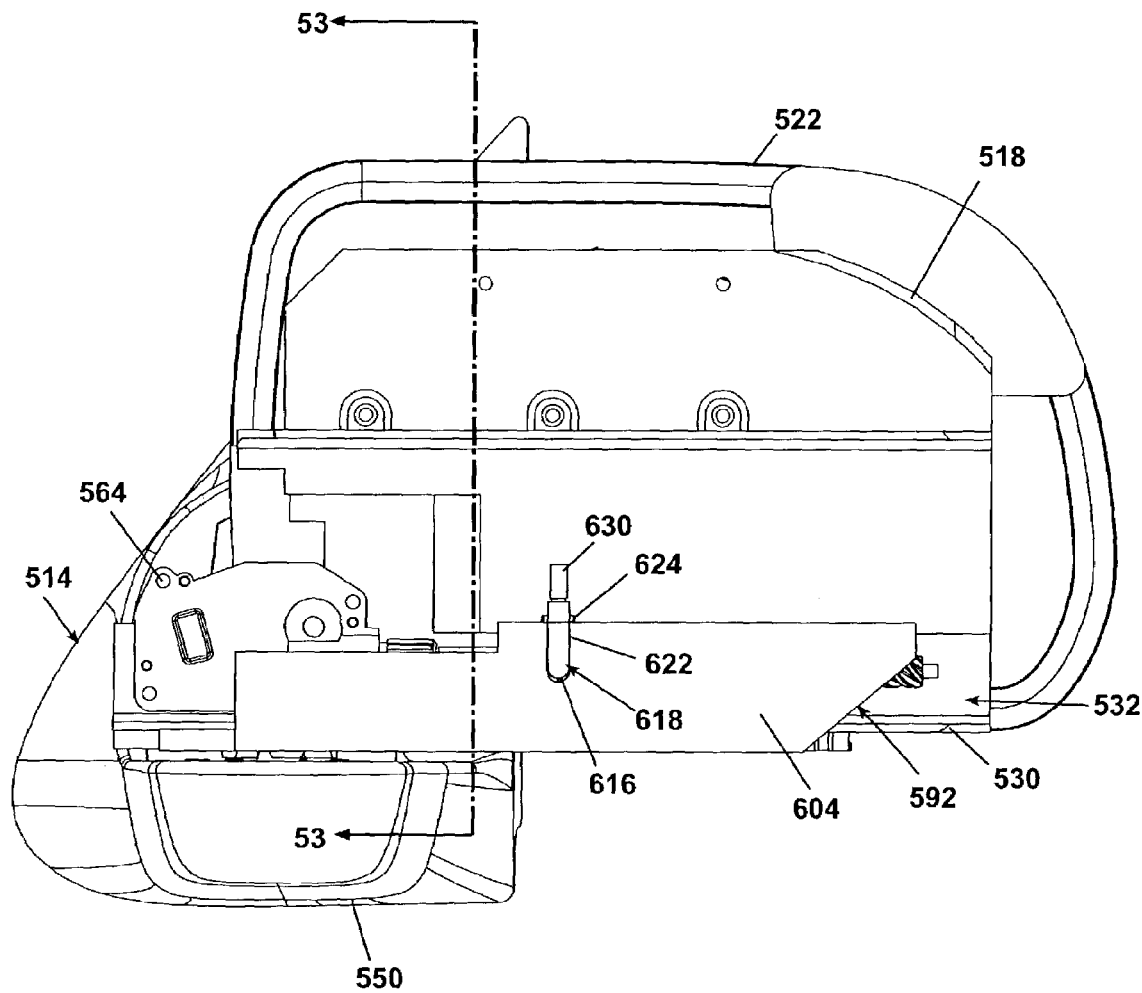
FIG. 52 is a view perpendicular to the mirror bracket of the mirror assembly of FIG. 49 with the mirror housing removed for clarity.

For convenience, the operation of the vehicle mirror 510 will be described beginning with the mirror 510 in the initially unfolded and retracted position as illustrated in FIGS. 47–49. In this position, the pin 568 of the drive nut 566 is received within the notch 600 of the rack gear 590, and the drive screw 562 has been rotated by the electric motor 564 a sufficient amount that the drive nut 566 is positioned longitudinally along the drive screw 562 such that the pin 568 lies beneath the cam surface 626 formed by the upper and lower fingers 620, 622 and in alignment with the slot 6116. The lower finger 622 is rotated exteriorly of the slot 616, and the upper finger 620 is received within the notch 542 on the catch 540 of the mirror bracket 518. The upper finger 620 is also spaced from the switch 630, leaving the switch 630 in its naturally open state.

From the initial unfolded and retracted position as illustrated in FIGS. 47–49, the reverse operation (counter-clockwise rotation of the drive screw 562 as seen in FIG. 49) of the electric motor 564 will ultimately cause the mirror to rotate from the unfolded position to the folded position as illustrated in FIGS. 50–53, and the forward operation (clockwise rotation as seen in FIG. 49) of the electric motor will initially transition the drive nut 566 from coupling with the rack gear 590 to coupling with the mirror bracket 518 as illustrated in FIGS. 54–57 and ultimately cause the mirror assembly 512 to extend from the retracted position to the extended position as illustrated in FIGS. 58–61. The reverse operation of the electric motor 564 results in the drive nut 566 moving towards the electric motor 564 and the forward operation of the electric motor 564 results in the drive nut 566 moving away from the electric motor 564.

Referring to FIGS. 50–53, the movement of the mirror assembly 52 from the unfolded to the folded position will be described in further detail. Upon the reverse operation of the electric motor 564, the drive nut 566, whose pin 568 is still received within the notch 600, is drawn toward the electric motor 564, which, in turn, urges the rack gear 590 toward the shoulder 548 of the support arm 514. If the spur gear 576 were free to rotate and not releasably constrained by the detent assembly 570, the urging of the rack gear 590 toward the shoulder 548 would rotate the spur gear 576 relative to the base 550 in a direction that would rotate the mirror housing 516 forwardly, instead of rearwardly as desired. However, since the detent assembly 570 does releasably fix the spur gear 576 to the base 550, for the rack gear 590 to rotate the spur gear 576, the force applied by the rack gear 590 must overcome the compressive force of the coil spring 574, which it does not. Since the force applied by the rack gear 590 to the spur gear 576 is not enough to overcome the coil spring 574, the rack gear 590 will instead traverse the exterior of the spur gear 576, causing the rack gear 590 to rotate rearwardly carrying with it the electric motor 564 and, thus, the mirror bracket 518 to rotate the mirror assembly 512 into the folded position.

Figure 53:
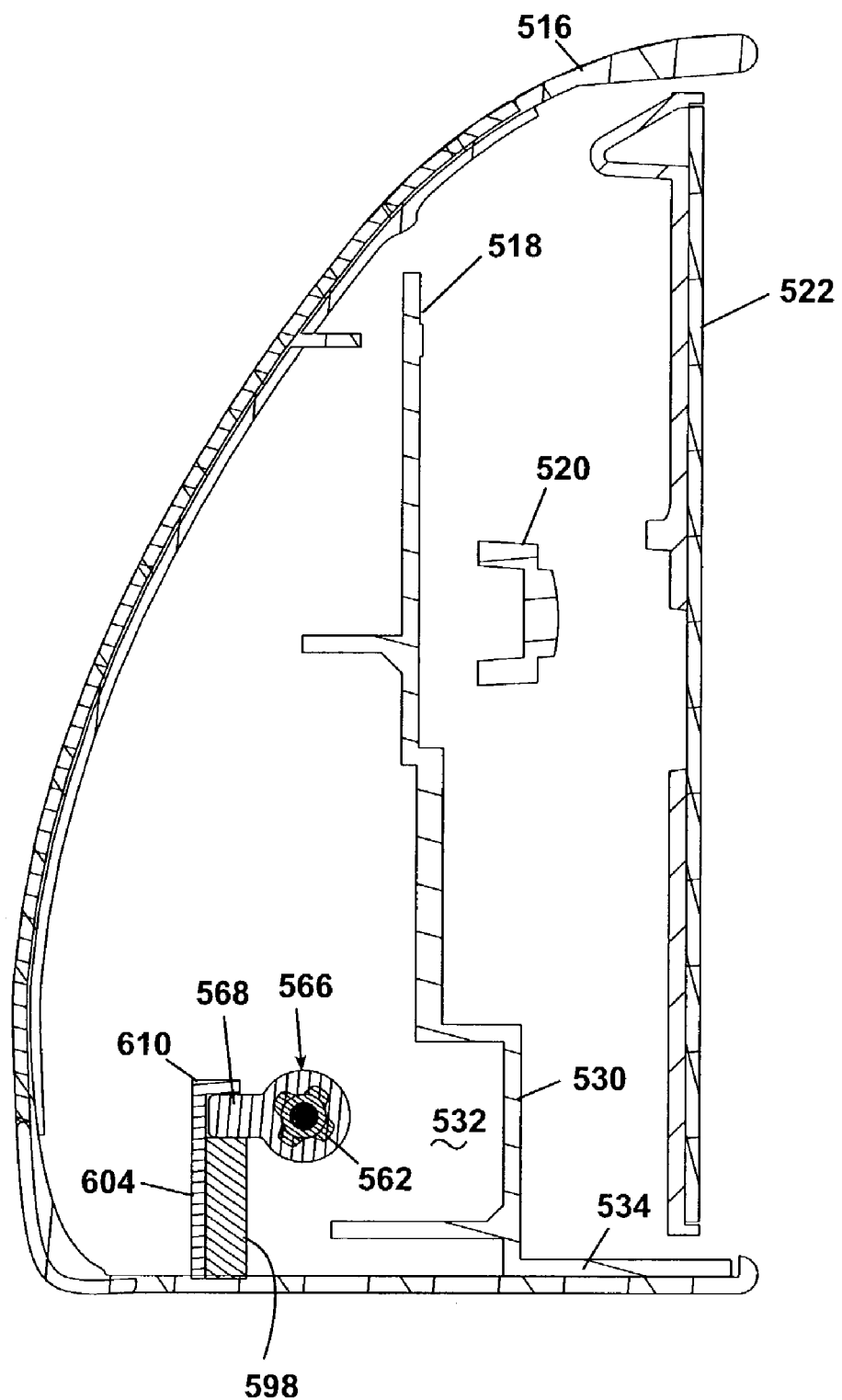
FIG. 53 is a sectional view taken along line 53—53 of FIG. 52 and illustrating the position of the drive nut relative to the guide bracket when the mirror is in the folded and retracted position.
Figure 54:
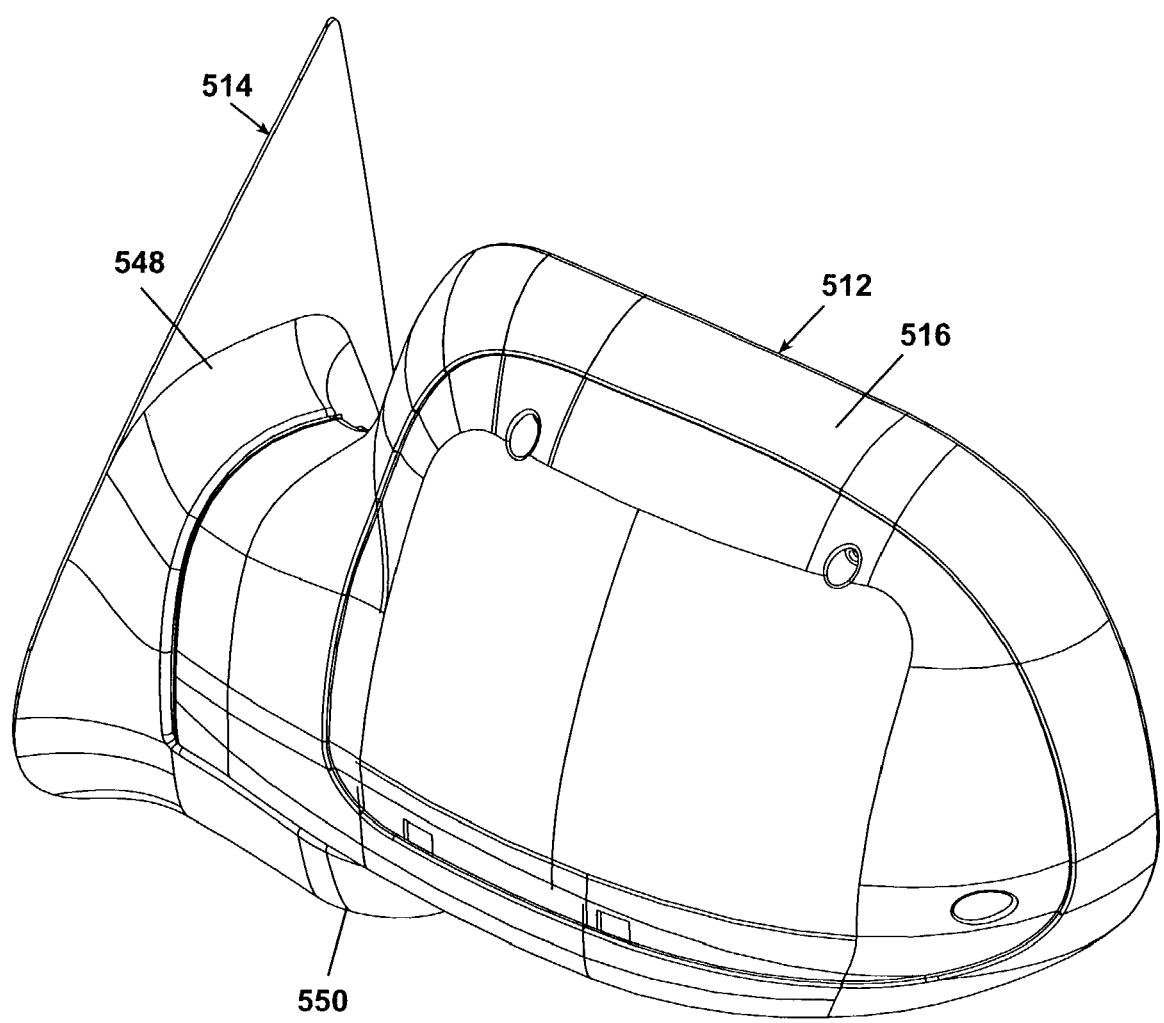
FIG. 54 is a top-right perspective view of the power fold mirror shown in the unfolded and retracted position.

Referring specifically to FIG. 53, when the drive screw 562 is rotated to effect the longitudinal movement of the drive nut 566 relative to the drive screw 562, the pin 568 is retained within the notch 600 by the limit flange 610. The limit flange 610 acting on the pin 568 prevents the nut 566 from rotating with the drive screw 562 as it naturally would instead of traversing along the drive screw 562 as desired. The combination of the notch 600 and the limit flange 610 effectively limits or prevents the relative rotation of the drive nut 566 to the drive screw 562, which causes the drive nut 566 to traverse the drive screw 562 upon the rotation of the drive screw 562.

To return the mirror assembly 512 from the folded position to the unfolded position, the electric motor 560 is operated in a forward direction causing the rack gear 590 to once again traverse the exterior of the spur gear 576 and rotate in a forward direction, thereby rotating the mirror assembly 512 from the folded to the unfolded position. The forward and reverse operation of the electric motor can therefore be used to cycle the mirror housing 512 between the folded and unfolded positions as described.

Referring to FIGS. 47 and 54–57, the transition of the drive nut 566 from coupling with the rack gear 590 to coupling with the mirror bracket 518 for initiating the extension and retraction of the mirror assembly 512 will be described in further detail. As previously described, in the unfolded and retracted position as illustrated in FIG. 47, the pin 568 of the drive nut 566 is received within the notch 600 of the rack gear 590 to couple the drive nut 566 to the rack gear 590. However, the further forward operation of the drive screw 562 will not yield an extension of the mirror assembly 512, since the drive nut 566 is not directly coupled to the mirror bracket 518 or indirectly coupled to the mirror bracket through another structural item such as the guide bracket 592. Therefore, the drive nut 566 must be coupled to the mirror bracket 518 to effect the movement of the mirror assembly 512 from the retracted position to the extended position.

The forward operation of the drive screw 562 accomplishes the uncoupling of the drive nut 566 from the rack gear 590 and the coupling of the drive nut 566 to the mirror bracket 518. When the mirror assembly 512 is in the unfolded and retracted position illustrated in FIG. 47, the pin 568 is aligned with the slot 616 in the guide bracket 592. Since the pin 568 is no longer rotationally constrained by the limit flange 610, the, continued forward operation of the drive screw 562 will result in the drive nut 566 rotating along with the drive screw 562 instead of longitudinally traversing the drive screw 562 until the pin 568 is received within the notch 542 of the catch 540 extending from the mirror bracket 518 to couple the drive nut 566 to the mirror bracket 518. As the drive nut 566 rotates with the drive screw 562, the pin 568 follows the cam surface 626 of the cam 618 causing the cam 618 to rotate, resulting in the lower finger 622 entering the slot 616 and the upper finger 620 moving out to the notch 542 and activating the limit switch 630 to indicate that the drive assembly 515 is now positioned for extension and retraction of the mirror assembly 512.

Figure 55:
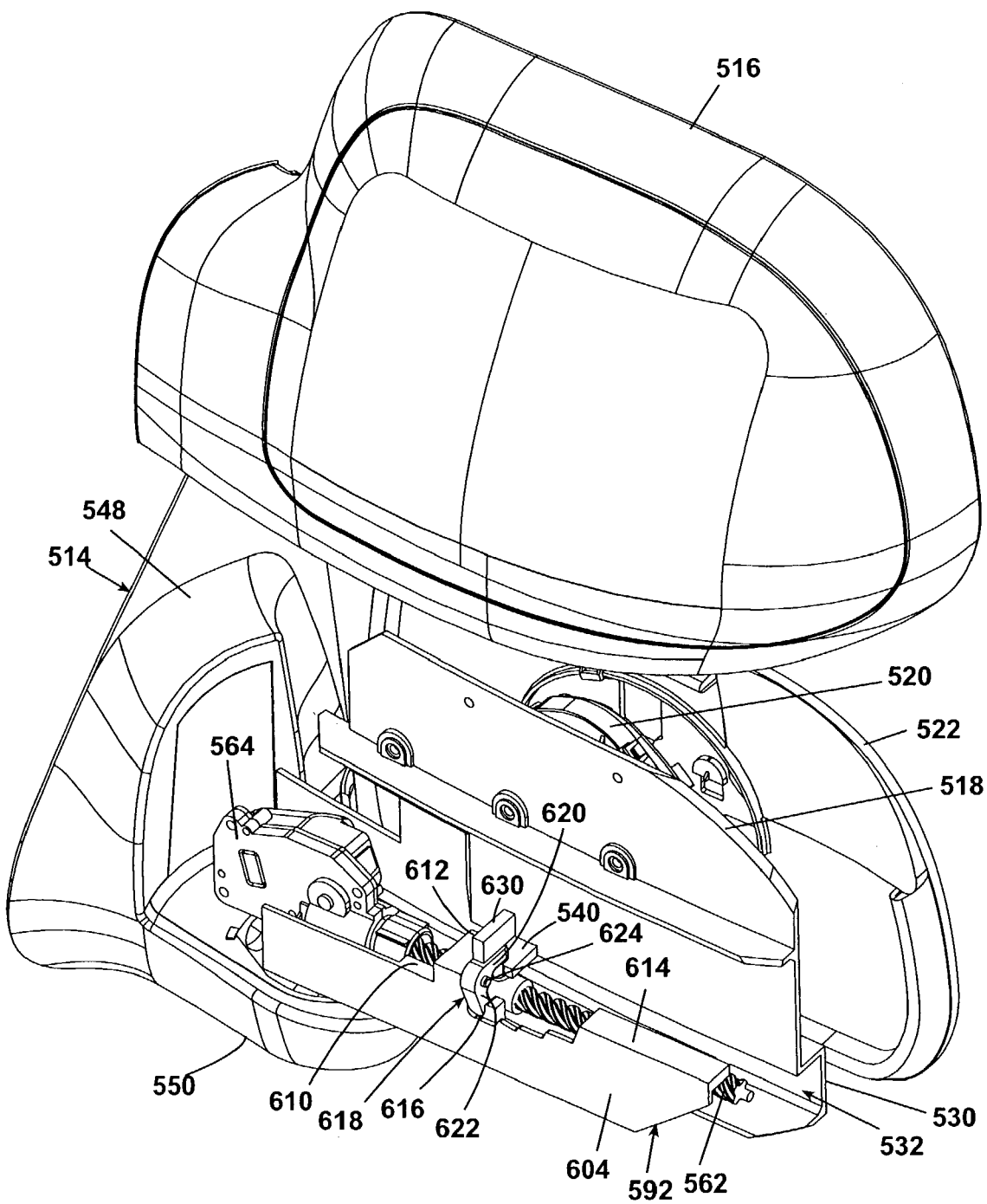
FIG. 55 is similar to FIGS. 47 and 51 except that the drive nut has transitioned from contact with the rack gear to contact with the mirror bracket to position the drive gear at the beginning of the extension of the mirror assembly.
Figure 56:
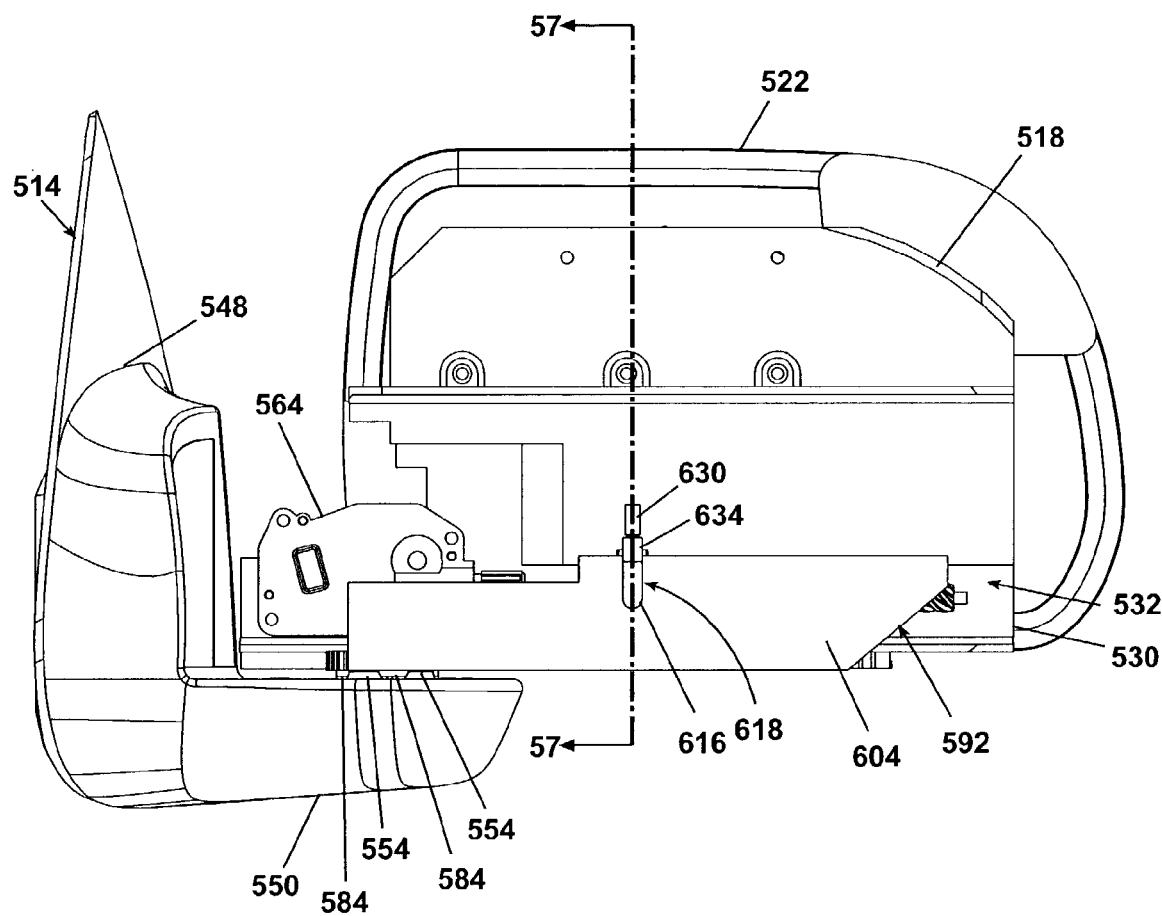
FIG. 56 is a view perpendicular to the mirror bracket of the mirror assembly of FIG. 55 with the mirror housing removed for clarity.
Figure 57:
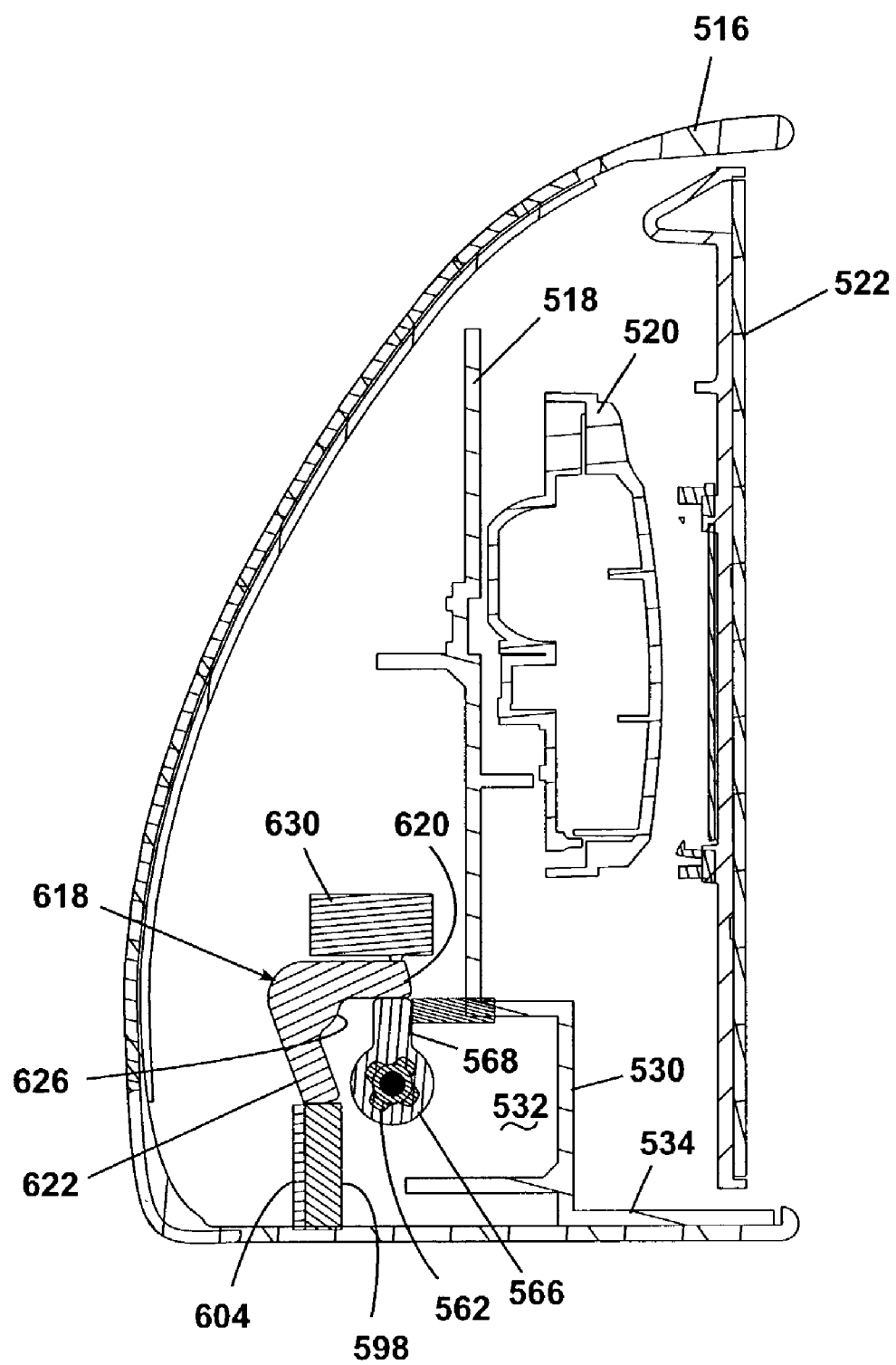
FIG. 57 is a sectional view taken along line 57—57 of FIG. 56 and illustrating the position of the drive nut relative to the mirror bracket at the initiation of the extension of the mirror from the retracted to extended position.

It should be noted that for convenience and to simplify the description of the invention, the mirror assembly is described as being in the unfolded and retracted position when the drive nut 566 is still coupled to the rack gear 90 as shown in FIG. 47, however, the unfolded and retracted position equally applies to when the drive nut 566 is initially coupled to the mirror bracket as shown in FIG. 55. During a normal driving position, the unfolded and retracted position is preferably defined with the drive nut 566 coupled to the mirror bracket 518 as shown in FIGS. 54–57 since the coupling of the drive nut 566 to the mirror bracket 518 allows for manual (or inadvertent) repositioning of the mirror housing with respect to the base.

Returning to the description of the extension of the mirror assembly 512 with reference to FIGS. 58–61, once the drive nut 566 is coupled to the mirror bracket 518 by the receipt of the pin 568 in the notch 542, the continued forward operation of the drive screw 562 causes the drive nut 566 to traverse along the length of the drive screw 562, which causes the mirror assembly 512 to also move along with the drive nut 566 and move the mirror assembly 512 from the retracted position to the extended position shown in FIG. 58.

Figure 61:
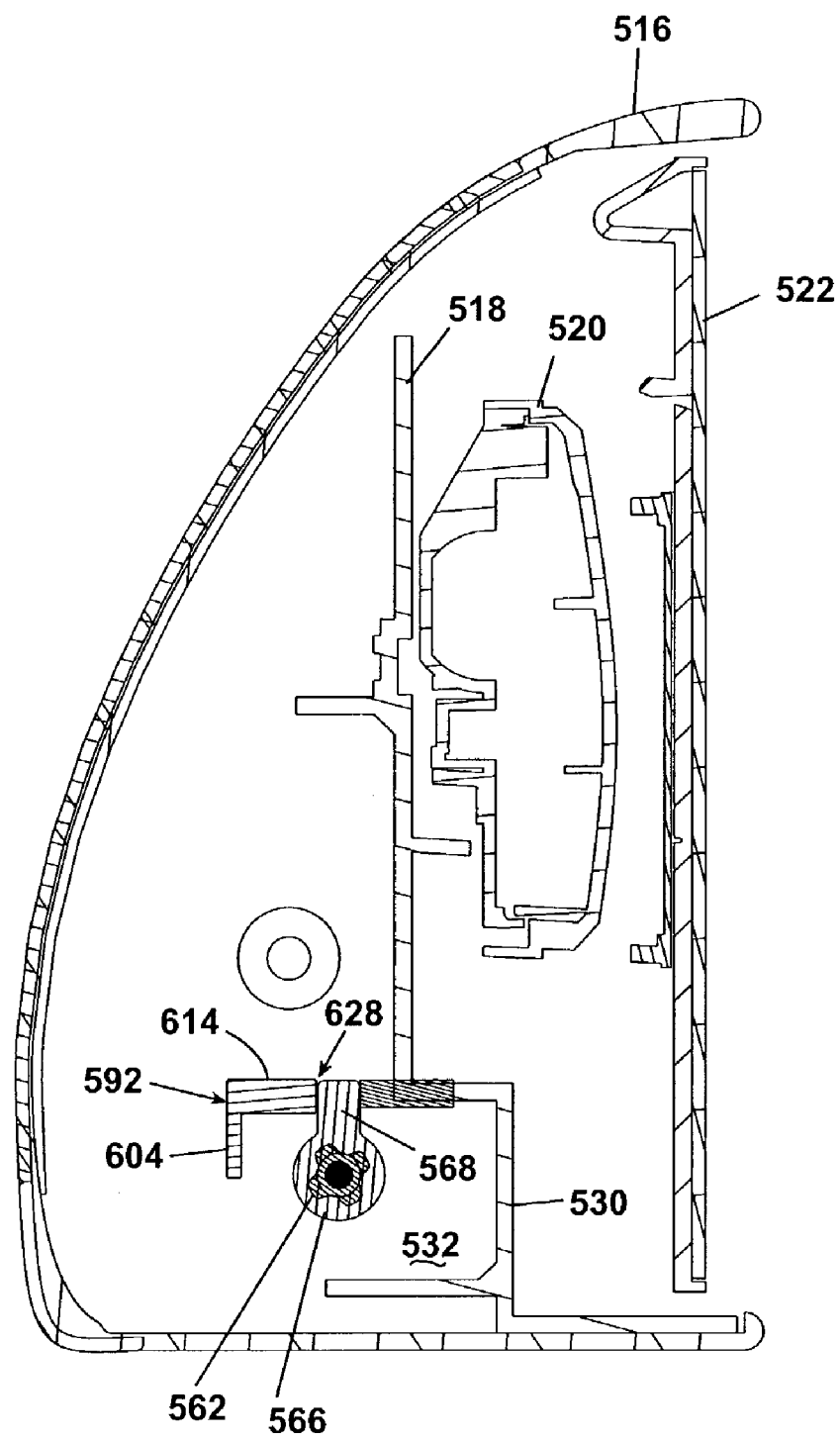
FIG. 61 is a sectional view taken along line 61—61 of FIG. 60 and illustrating the position of the drive nut relative to the mirror bracket and the guide bracket at the termination of the extension of the mirror from the retracted to extension position.

As best seen in FIG. 61, as the drive nut 566 traverses the drive screw 562, the pin 568 rides in a channel 628 formed between the upper edge of the C-shaped flange 530 and the outer edge of the guide flange 614. As the drive screw 562 is operated in a forward direction and rotates clockwise as viewed in FIG. 61, the drive nut 566 tries to rotate in the same direction causing the pin 568 to bear against the upper flange of the C-shaped flange 530. When the drive screw 562 is operated in a reverse direction and rotates counterclockwise as viewed in FIG. 61, the drive nut 566 tries to rotate in the same direction causing the pin 568 to bear against the outer edge of the guide flange 614. Thus, the upper edge of the C-shaped flange 530 limits the rotation of the drive nut 566 when the mirror assembly is moved from the retracted to the extended position, and the outer edge of the guide flange 614 limits the rotation of the drive nut 566 when the mirror assembly is moved from the extended to the retracted position.

Figure 62:
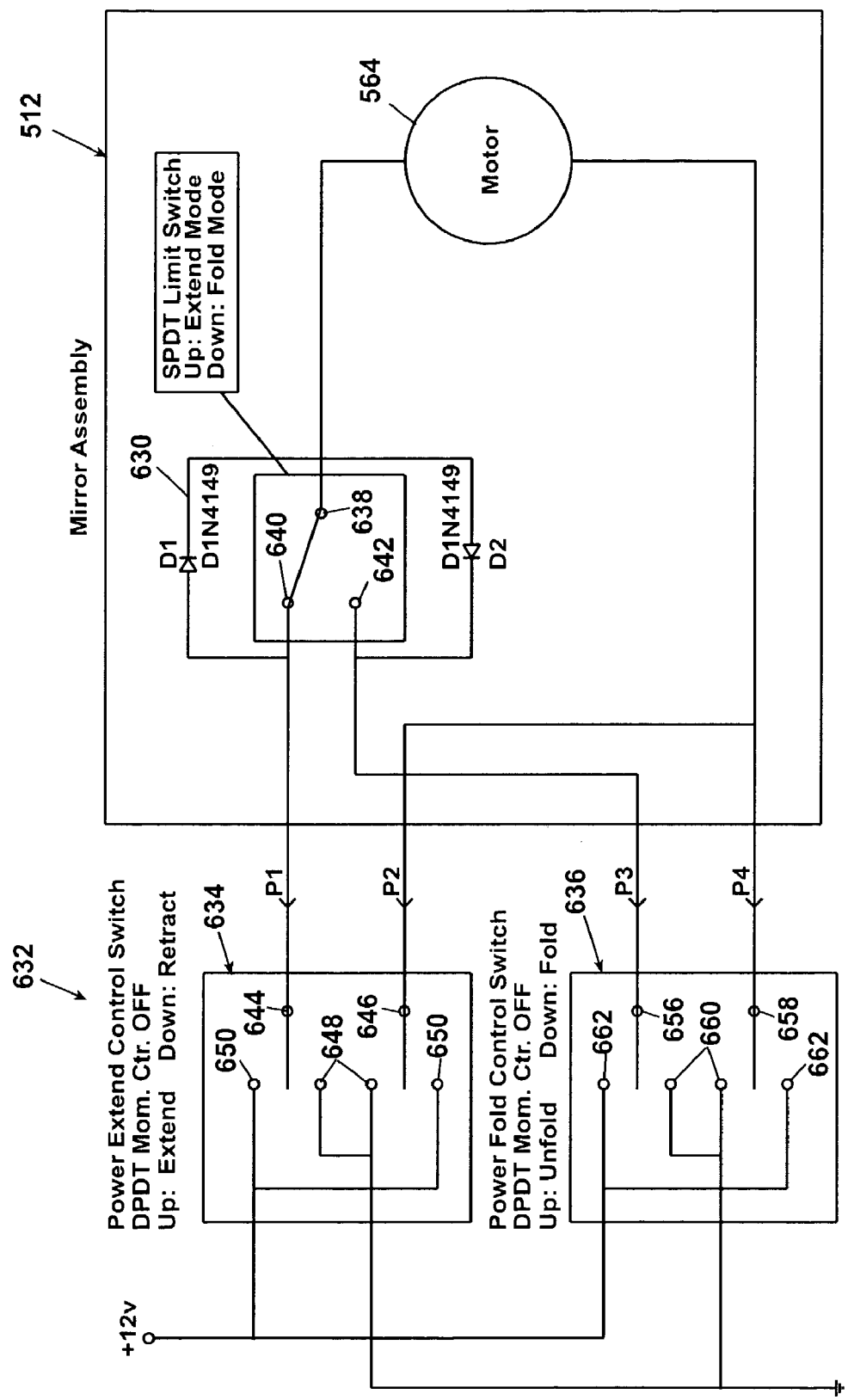
FIG. 62 is a schematic of a control circuit for controlling the folding and extending functions of the mirror.

FIG. 62 illustrates a simple control circuit suitable for controlling the folding and extending functions of the mirror in conjunction with the motor 564 and the limit switch 630. The control circuit 632 preferably comprises a power extend switch 634 and a power fold switch 636, both of which are connected to the limit switch 630 by switching diodes D1 and D2 to control both the forward and reverse operation of the motor 564 and the range of operation according to the selected fold and extend position of the mirror. The limit switch works in combination with the power extend and power fold switches 634, 636 to fold and extend the mirror based on the selected position of the switches 634, 636 and the position of the drive nut 566 as sensed by the state of the limit switch 630. Preferably, the switches are configured to be mutually exclusive so that a user cannot damage the control circuit (such as by causing a short) by trying to perform a disallowed function, e.g., by trying to fold and extend the mirror simultaneously. This wiring feature is not shown for purposes of simplicity but such a configuration would be apparent to one skilled in the art.

The limit switch 630 is preferably a single-pole double-throw micro switch having pole 638 and contacts 640, 642. The power extend and power fold switches are preferably double-pole double-throw switches. The power extend switch 634 has poles 644, 642 and ground contacts 648 and supply contacts 650. Similarly, the power fold switch 636 has poles 656, 658 and ground contacts 660 and supply contacts 662.

Switching diodes D1 and D2 connect the poles 640, 642 of the limit switch 630 to the pole 644 of the power extend switch 634 and the pole 656 of the power fold switch 636, respectively, and control the direction of the current flow therebetween. The pole 638 of the limit switch 630 connects to one side of the motor 564 and other side of the motor 564 connects to the poles 646, 658 of the power extend and power fold switches 634, 636, respectively, to complete the coupling of the motor to the power extend and power fold switches 634, 636 through the limit switch 630.

The power extend and power fold switches 634, 636 are both three-position switches having an Up, Center, and Down position when viewed in FIG. 62. For the power extend switch 634, the Up position corresponds to extending the mirror assembly, the Center corresponds to off, and the Down corresponds to the retracting the mirror assembly. For the power fold switch 636, the Up position corresponds to folding the mirror assembly, the Center corresponds to off, and the Down corresponds to unfolding the mirror assembly.

Depending on the selected positions of the power extend and power fold switches 634, 636 in combination with the limit switch 630, the control circuit 632 will effect the extension/retraction and folding/unfolding of the mirror assembly to move the mirror assembly into the position selected by the user.

Figure 63:
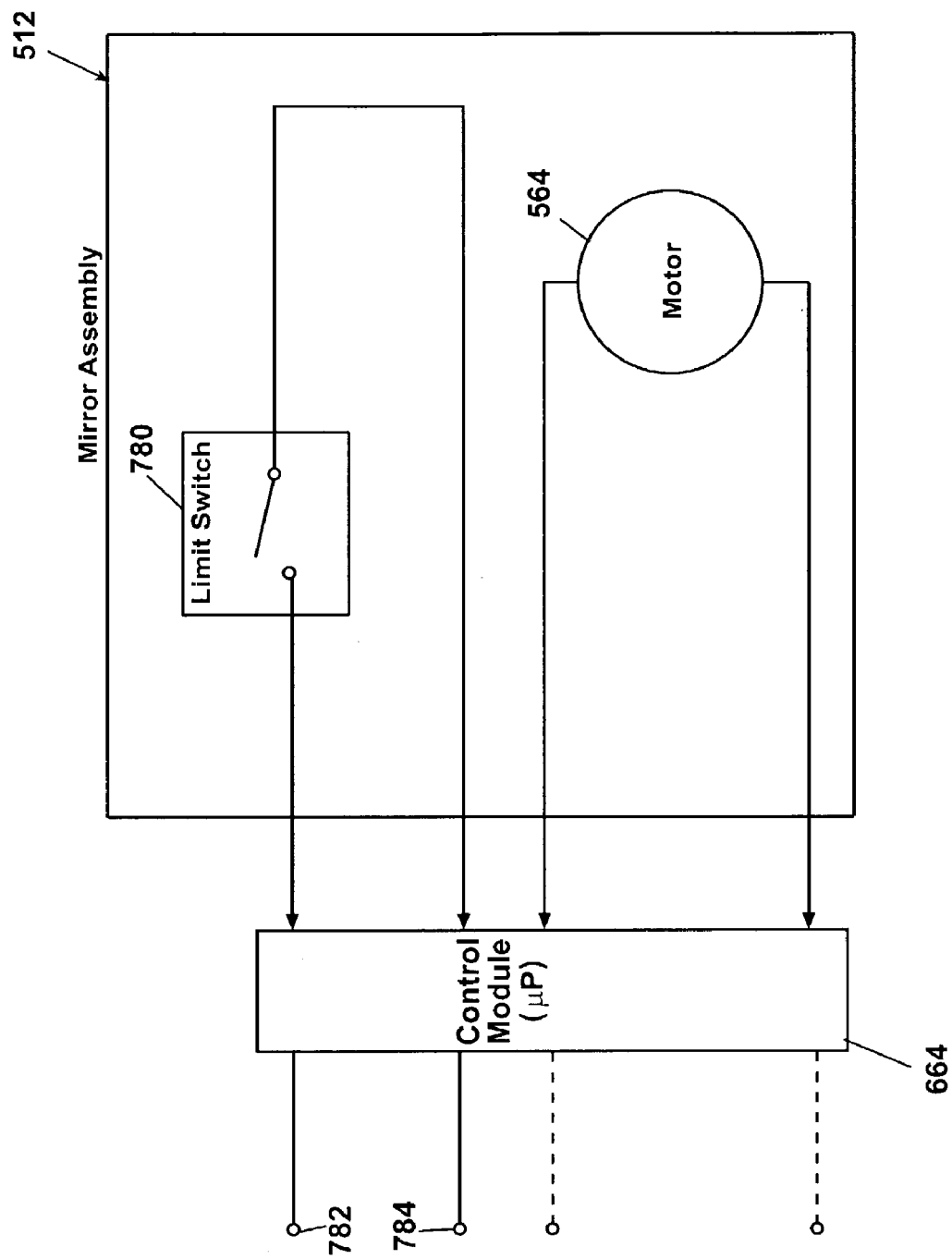
FIG. 63 is a schematic of another embodiment of a control circuit for controlling the folding and extending functions of the mirror.

FIG. 63 shows another embodiment of the control circuit 632 wherein a microcontroller 664 replaces much of the hard-wired circuitry in the previous embodiment. As can be seen in FIG. 63, the switches (such as those shown by reference numerals 634, 636 and the limit switch 630) are simply inputs to the microcontroller 664 and the motor 564 is connected as an output thereof whereby the microcontroller 664 can control the speed and direction of the motor 564 through a suitable onboard program.

While it is preferred that the folding and extending functions of the vehicle mirror 510 be accomplished by actuating the electric motor 564 of the drive assembly 515 using a suitable control such as that disclosed in FIG. 62, the vehicle mirror 510 has several features that permit the manual folding and extension of the mirror assembly 512. For example, the threads of the drive screw 562 have a sufficiently long lead compared to the diameter of the drive screw 562 to permit the manual extension and retraction of the mirror assembly when suitable force is applied. The electric motor 564 preferably has a clutch that permits the release of the drive screw 562 from the motor upon the application of the manual force, thereby eliminating the tendency for the electric motor to prevent the rotation of the drive screw 562.

Another feature useful for the manual operation of the mirror is the detent assembly 570 which enables the mirror assembly 512 to be rotated between the folded and unfolded positions in response to a suitable manual force. The manual force must be great enough to cause the dogs 584 on the spur gear 576 to ride up over the projections 554 on the base 550.

Figure 64:
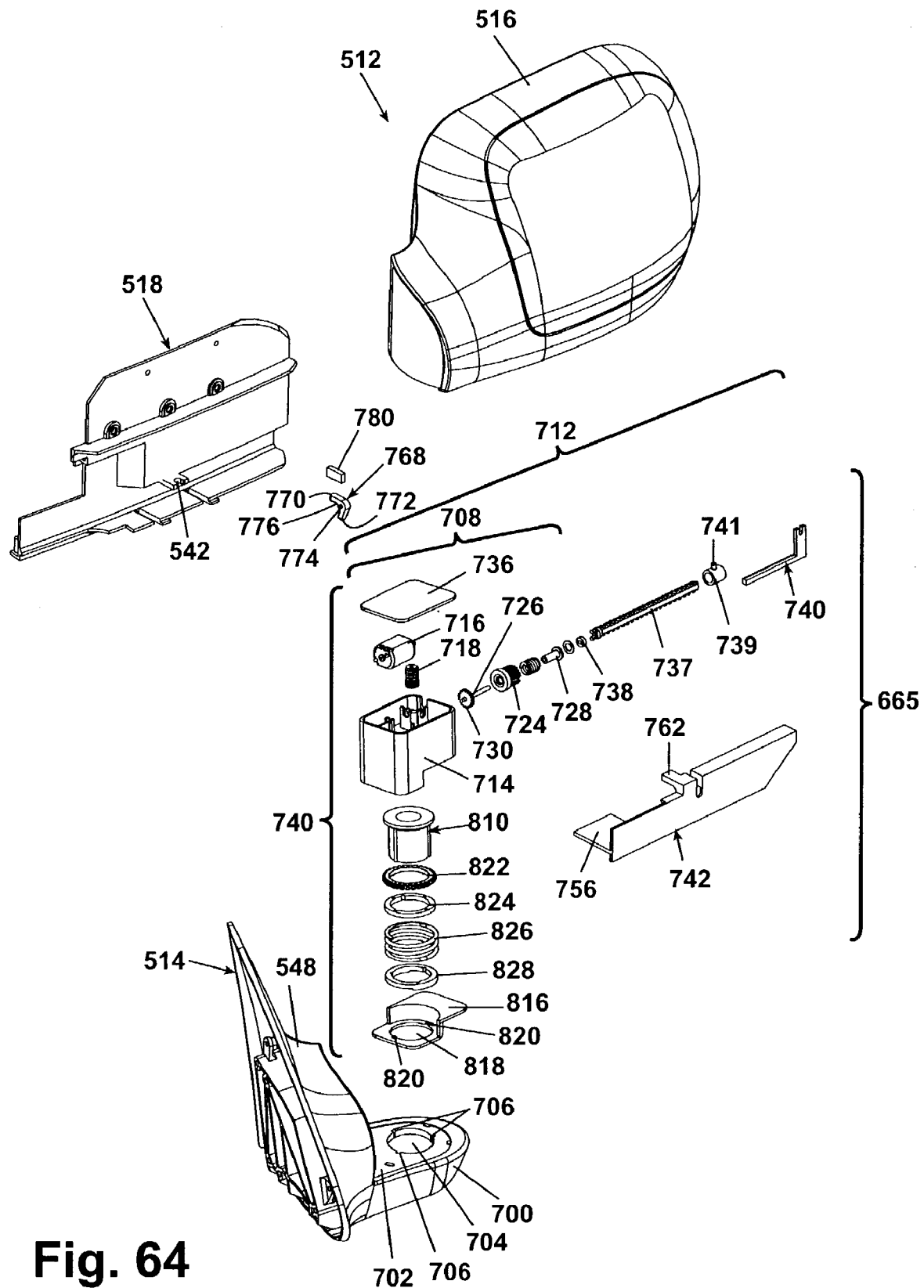
FIG. 64 is an exploded view of a fifth embodiment of the vehicular mirror assembly and illustrates the major components comprising a second embodiment of the drive assembly of FIG. 41 connecting the mirror assembly to the support bracket and for rotating and extending the mirror assembly relative to the vehicle, with the drive assembly comprising a drive screw having a drive nut guided by a guide bracket and that couples with either a rack gear to rotate the mirror housing or a mirror bracket to extend the mirror housing.

FIGS. 64–87 illustrate a fifth embodiment of the vehicle mirror assembly 510 having both a power-fold and a power-extend function. The vehicle mirror assembly 510 comprises a mirror assembly 512 and is mounted to a vehicle by a support bracket or arm 514. Referring to FIG. 64, the mirror assembly 512 is connected to the support arm 514 by a drive assembly 665, which is used to rotate the mirror assembly between folded and unfolded positions and extend the mirror assembly between retracted and extended positions. In this embodiment, the drive assembly 665 comprises components of three modules: a basic component module 708 (see also FIG. 84), a power-fold component module 710 (see also FIG. 86), and a power-extend component module 712 (see also FIG. 85). It will be understood that where the first embodiment illustrates all three modules in the drive assembly 665, other embodiments may incorporate less than all three modules or other modules, as explained below.

Figure 65:
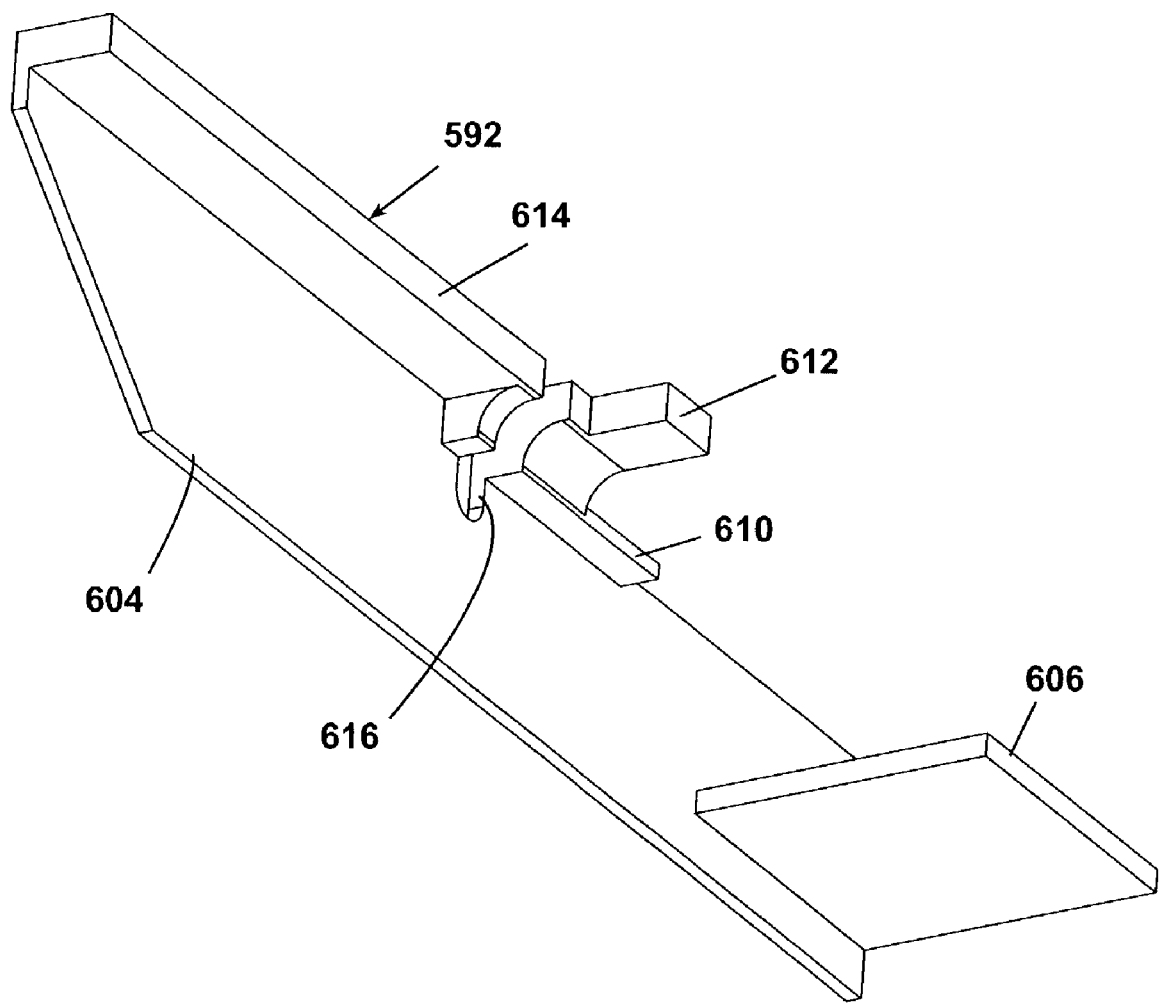
FIG. 65 is a lower-rear perspective view of a guide bracket for the mirror assembly illustrated in FIG. 64.
Figure 66:
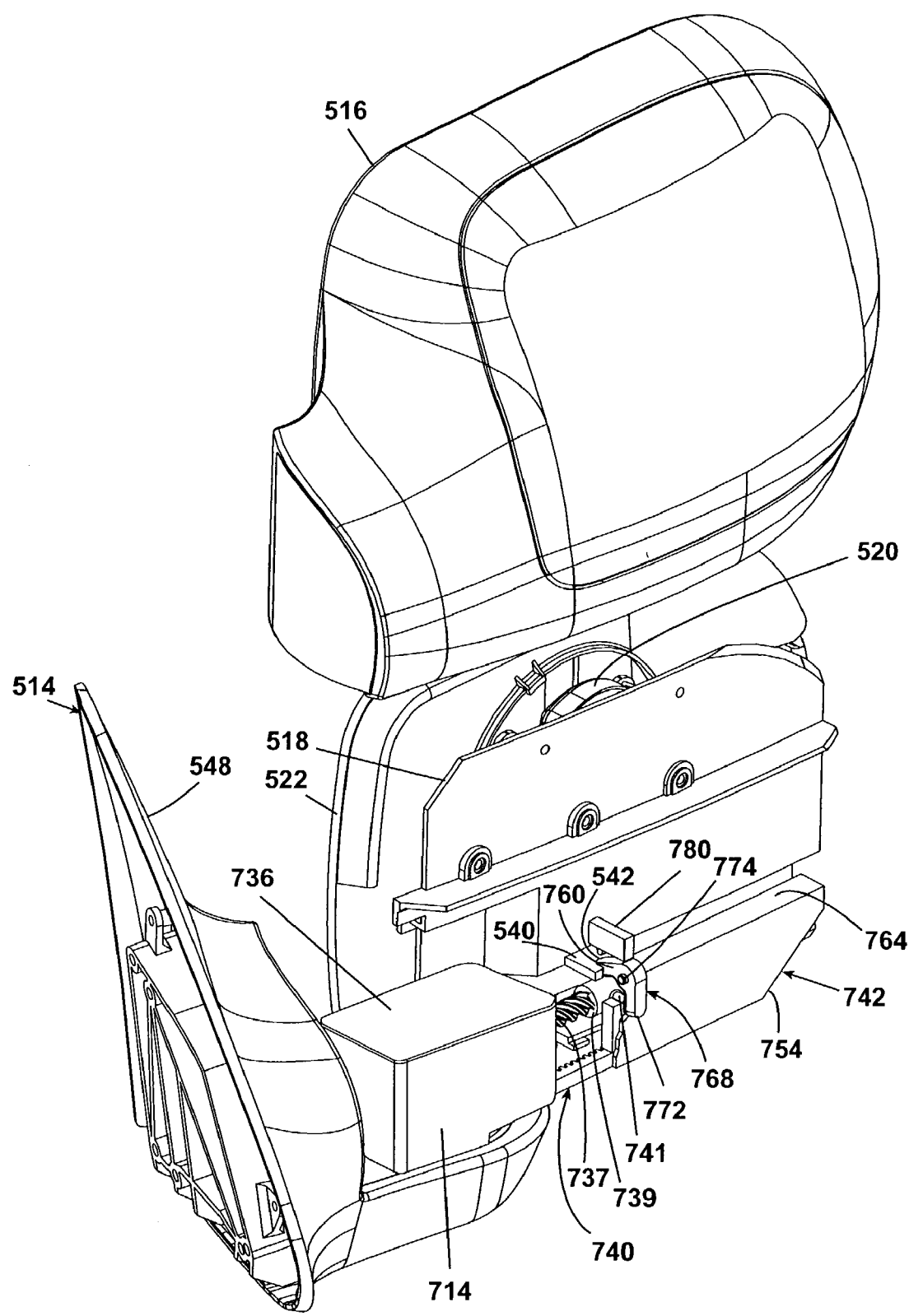
FIG. 66 is a perspective view of the partially assembled mirror assembly of FIG. 64 Figure illustrating a mirror housing of the mirror assembly partially exploded from the mirror assembly to illustrate the relationship of the drive assembly to the mirror assembly and the support bracket.

Referring now to FIGS. 64–66, the mirror assembly 512 comprises a mirror housing 516 in which is received a mirror bracket 518 that supports a mirror drive 520 for adjusting the position of the mirror 522 mounted to the mirror drive 520. The mirror drive 520 and mirror 522 are well known and will not be described in further detail.

Figure 68:
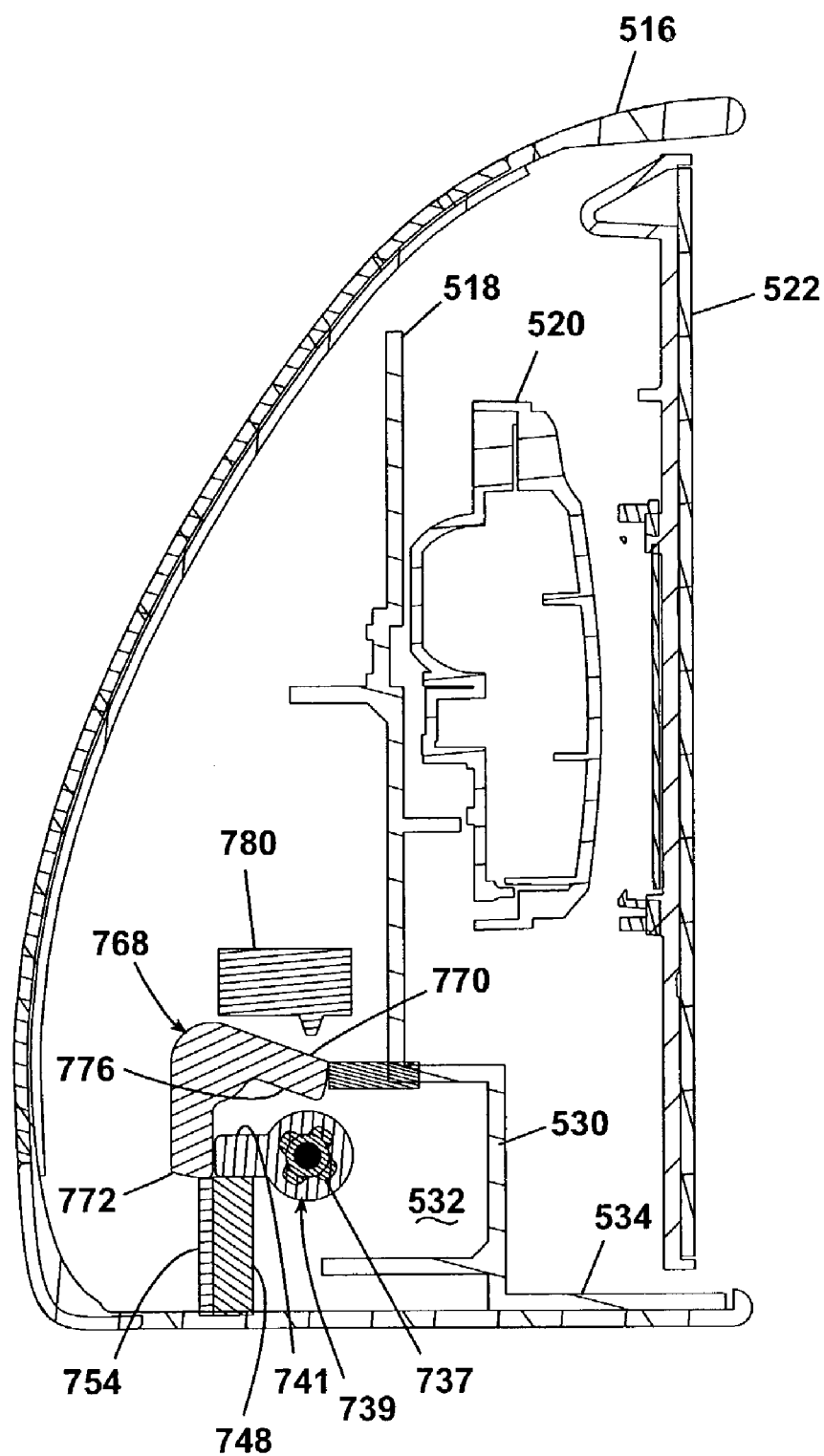
FIG. 68 is a sectional view taken along line 68—68 of FIG. 67 and illustrating the relative position of the drive nut and a cam pivotally mounted to the guide bracket as the drive nut is located on the drive screw at the position corresponding to the unfolded position and ready to transition from contact with the rack gear to the mirror bracket to initiate the extension of the mirror housing upon further rotation of the drive screw.
Figure 69:
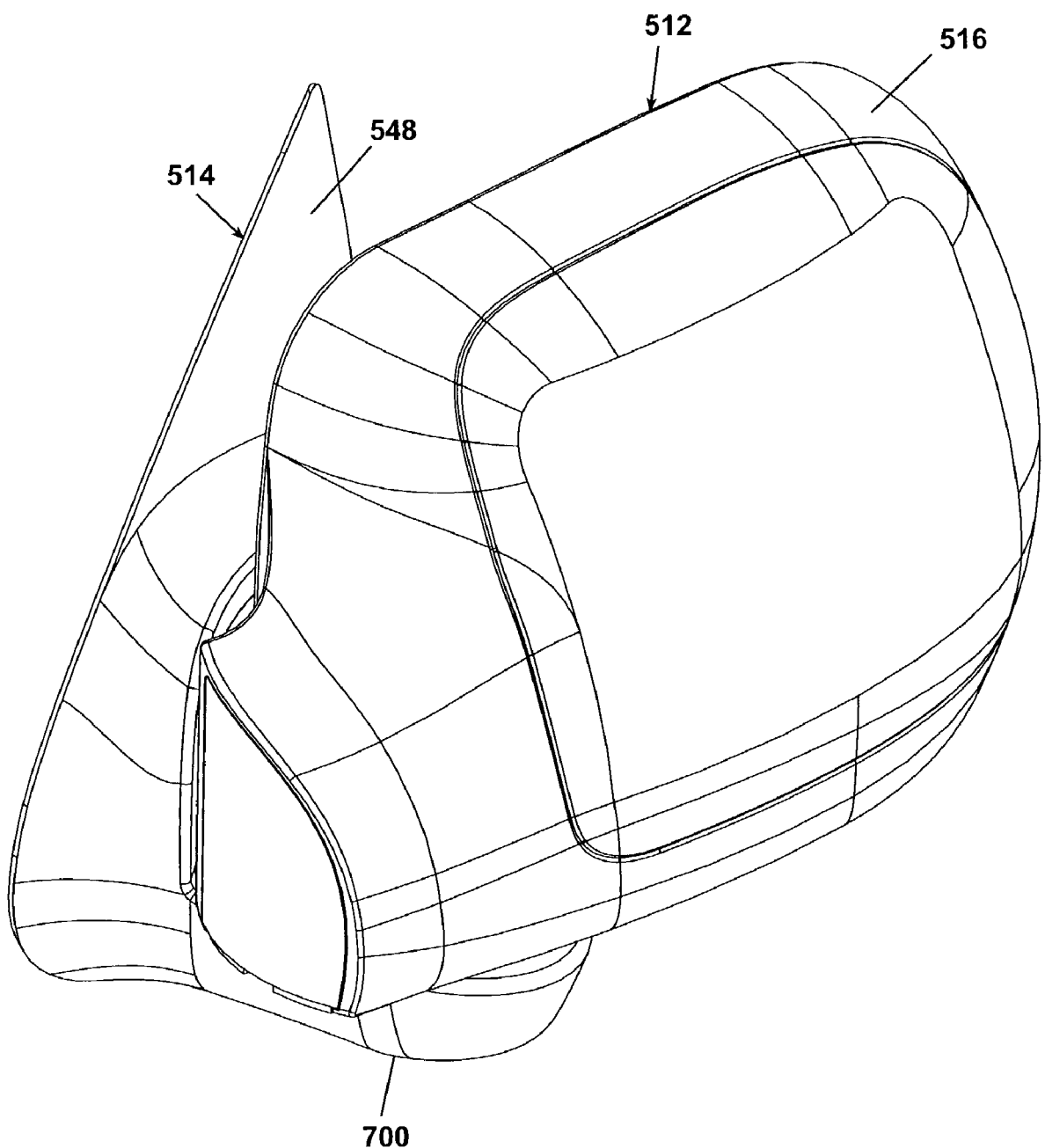
FIG. 69 is a front perspective view of the vehicular mirror assembly of FIG. 64 shown in a folded and retracted position.
Figure 70:
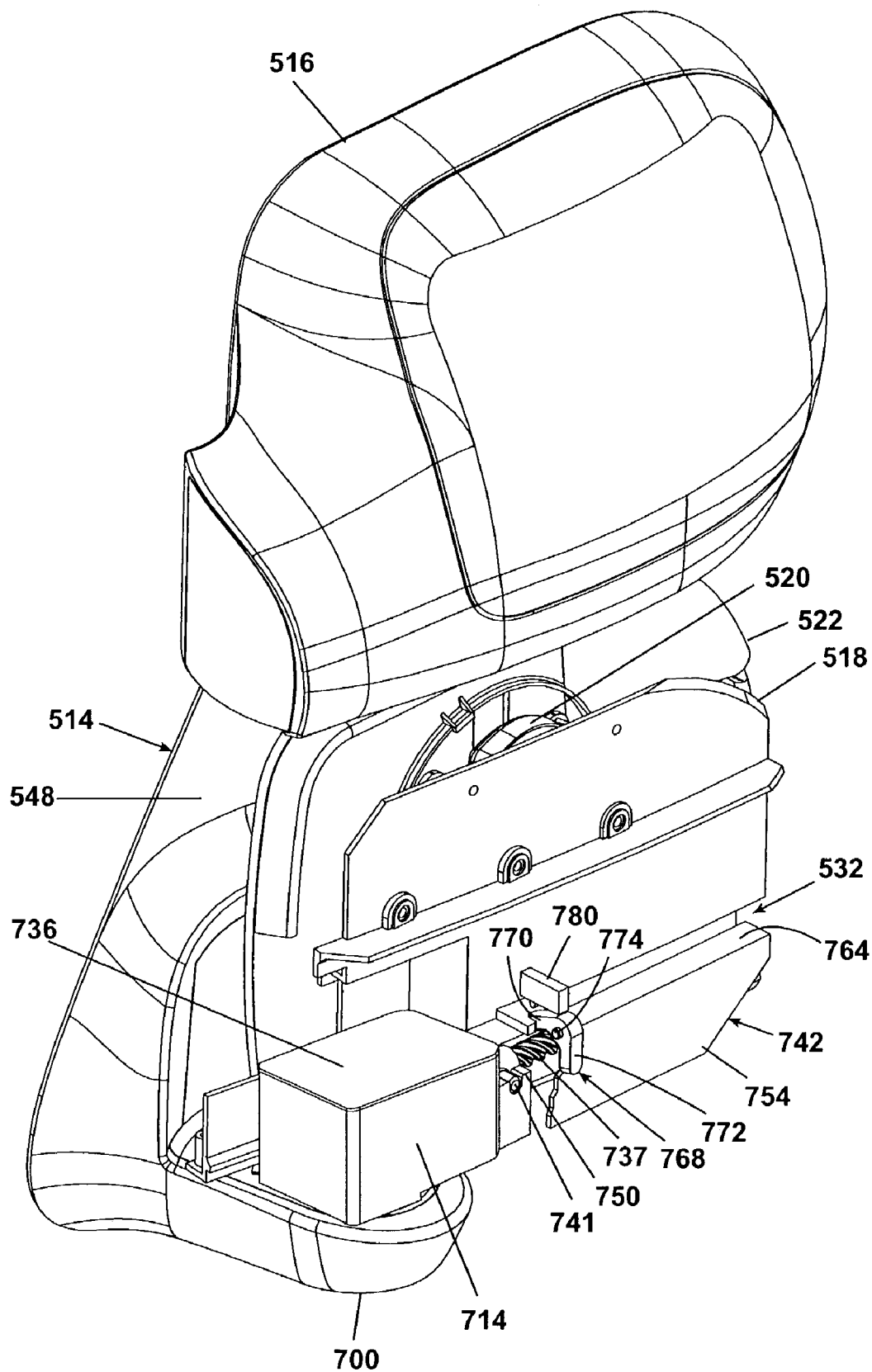
FIG. 70 is a partial exploded view similar to FIG. 66 and illustrating the mirror housing partially exploded from the mirror assembly to illustrate the relationship of the drive assembly to the mirror assembly and the support bracket when the mirror assembly is in the folded and retracted position, with the guide bracket partially broken away to show the connection between the drive nut and the rack gear.
Figure 71:
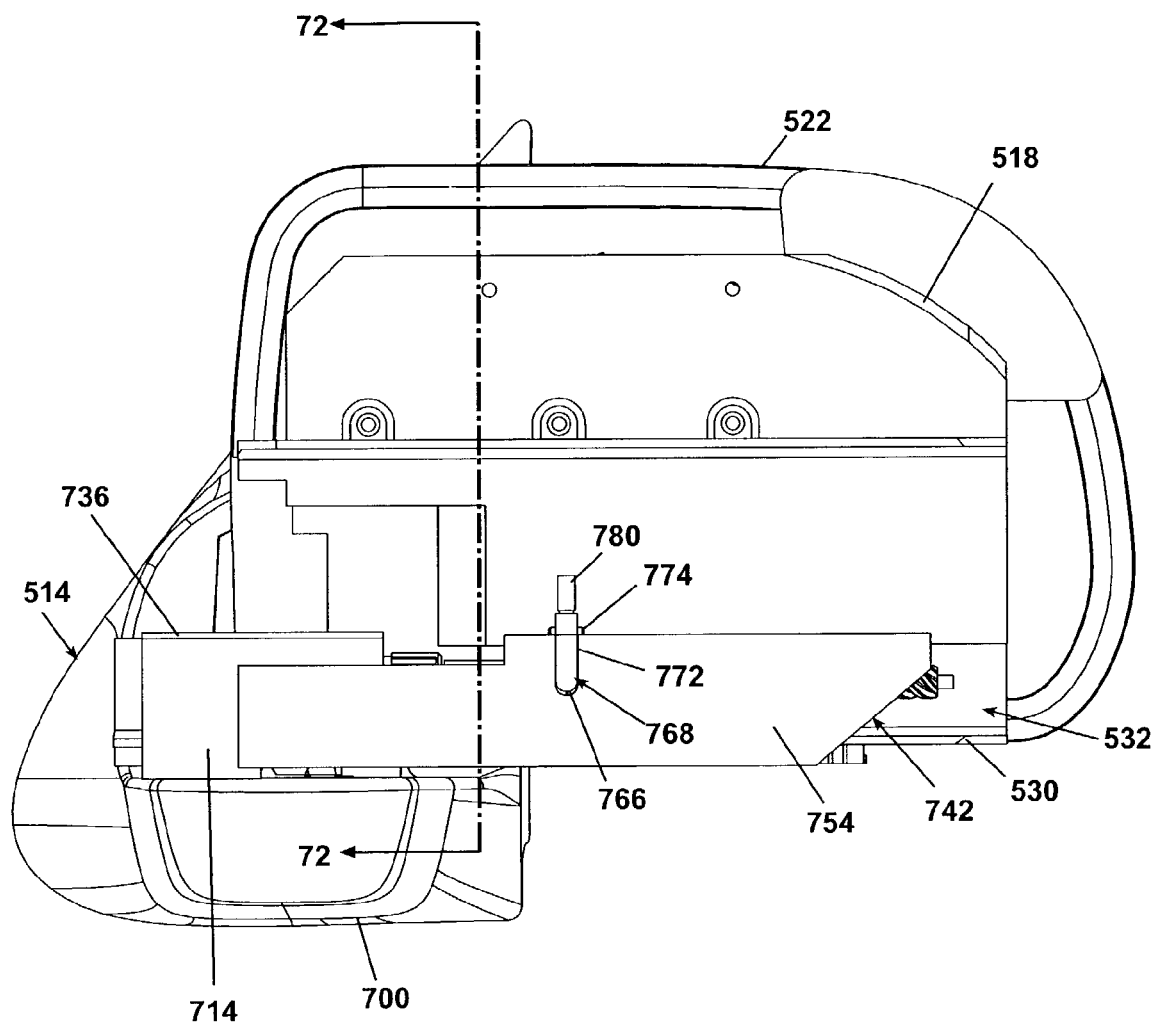
FIG. 71 is a view perpendicular to the mirror bracket of the mirror assembly of FIG. 68 with the mirror housing removed for clarity.

Referring specifically to FIGS. 66 and 68, the mirror bracket 518 comprises a generally planar upper face 528 on which the mirror drive 520 is conventionally mounted. A C-shaped flange 530 extends away from the planar face 528 and defines a forward-facing channel 532. A laterally extending plate 534 extends from the lower end of the flange 530.

Referring specifically to FIG. 64, slots 536 are formed in the lower wall of the flange 530. Tabs 538 extend from the lower edge of the flange 530 and are adjacent the slots 536. A catch 540 extends laterally from the planar face 528 on the side opposite the mirror drive 520 and has a U-shaped notch 542.

The support arm 514 comprises a shoulder 548 adapted to mount to the vehicle and a base 700 extending laterally from the shoulder. The base 700 has a generally flat upper surface 702 with an opening 704 having several notches 706 about its periphery.

The drive assembly 665 in the embodiment shown in FIG. 64 comprises a basic component module 708, a power-fold component module 710, and a power-extend component module 712. Looking now at FIGS. 64 and 81–84, the basic component module 708 comprises a main housing 714 in which is disposed an electric motor 716. A main gear 718 has a spur portion 720 and a worm portion 722 and rotates on a spindle in the main housing 714 in a position where the spur portion 720 engages a worm gear 723 on the shaft of electric motor 716. A helical gear 724 has external teeth that mesh with the worm portion 722 of the main gear 718. The helical gear 724 is also hollow, having a shaft 726 secured therein by a crimp 728 on its proximal end. The shaft 726 has a spur gear 730 on its distal end that abuts the helical gear 724. A spring 732 and a washer 734 between the crimp 728 and the shaft 726, inside the helical gear 724, provide a slip clutch that will enable the shaft 726 to rotate freely within the helical gear 724 when torque on the shaft exceeds a predetermined level, thus comprising a force-modifying device. An upper cover 736 secures the aforementioned components within the main housing 714.

Figure 85:
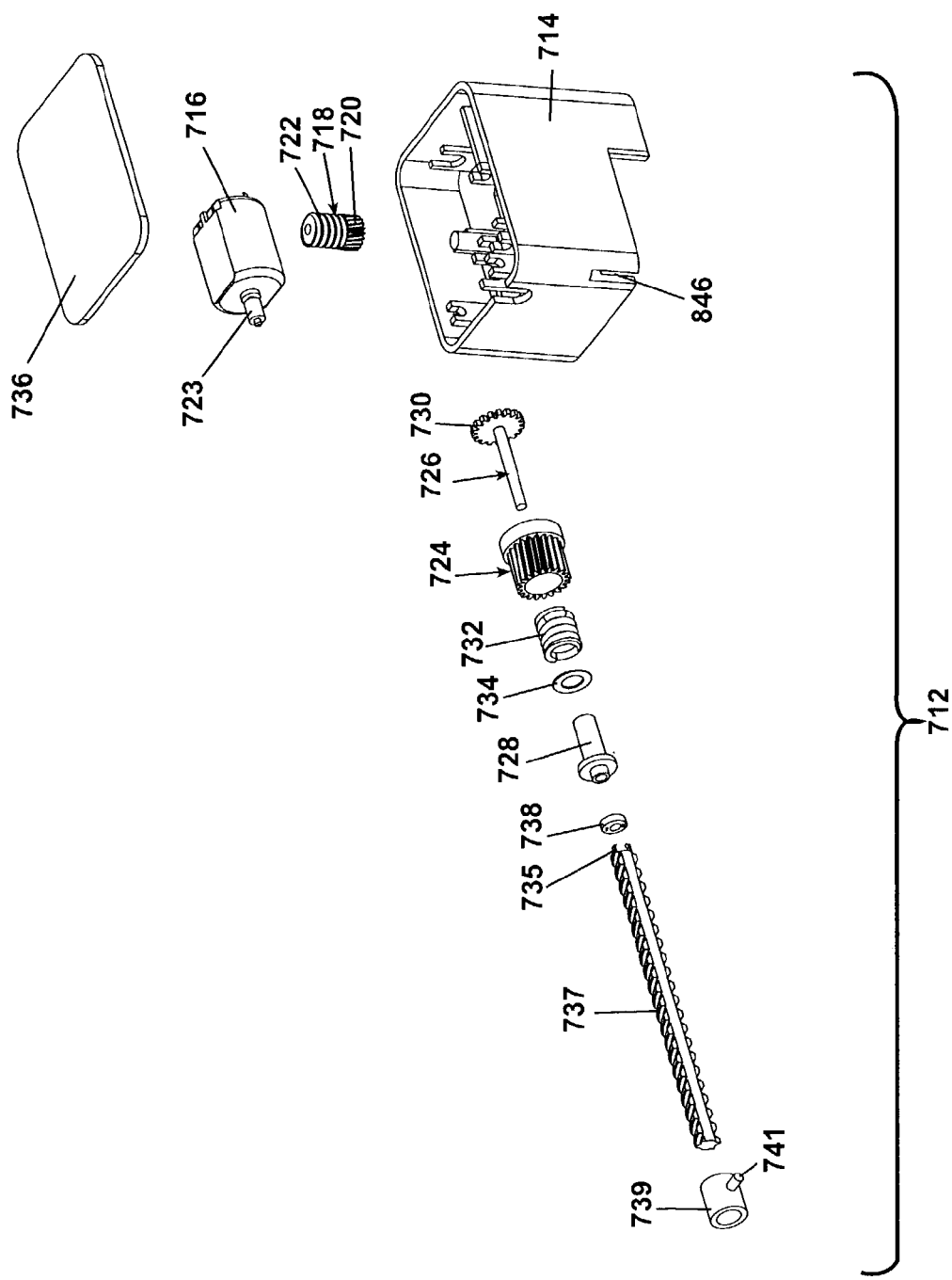
FIG. 85 is an exploded view of components in a module arranged for the power-extend function.

Looking now at FIG. 85, the power-extend component module 712 comprises a drive screw 737 adapted to be coupled to the electric motor 716 by an adapter 738 which clamps tabs 735 extending from the drive screw to the shaft 726. It is within the scope of the invention for the drive screw 737 to be secured to the shaft 726 in any conventional manner. It is important only that the electric motor 716 thus rotates the drive screw 737 about the longitudinal axis of the drive screw 737. An internally threaded drive nut 739 is threadably received on the drive screw 737 and comprises a pin 741 extending laterally from the drive nut 739 along an axis that is perpendicular to the longitudinal axis of the drive screw 737.

The power-fold and -extend component module 712 further comprises a rack gear 740 and a guide bracket 742. The rack gear 740 comprises a rail 744 having a series of teeth 746 on an inner surface thereof. The rail 744 terminates in a tab 748 having a notch 750.

Referring now more closely to FIGS. 65–66, the guide bracket 742 comprises a main plate 754 from which extends a mounting tab 756 adapted to couple the guide bracket 742 to the main housing 714. A limit flange 760 extends laterally from an upper end of the plate 754 and ends at a post 762, which transitions into a guide flange 764 having a slot 766 formed therein.

Figure 81:
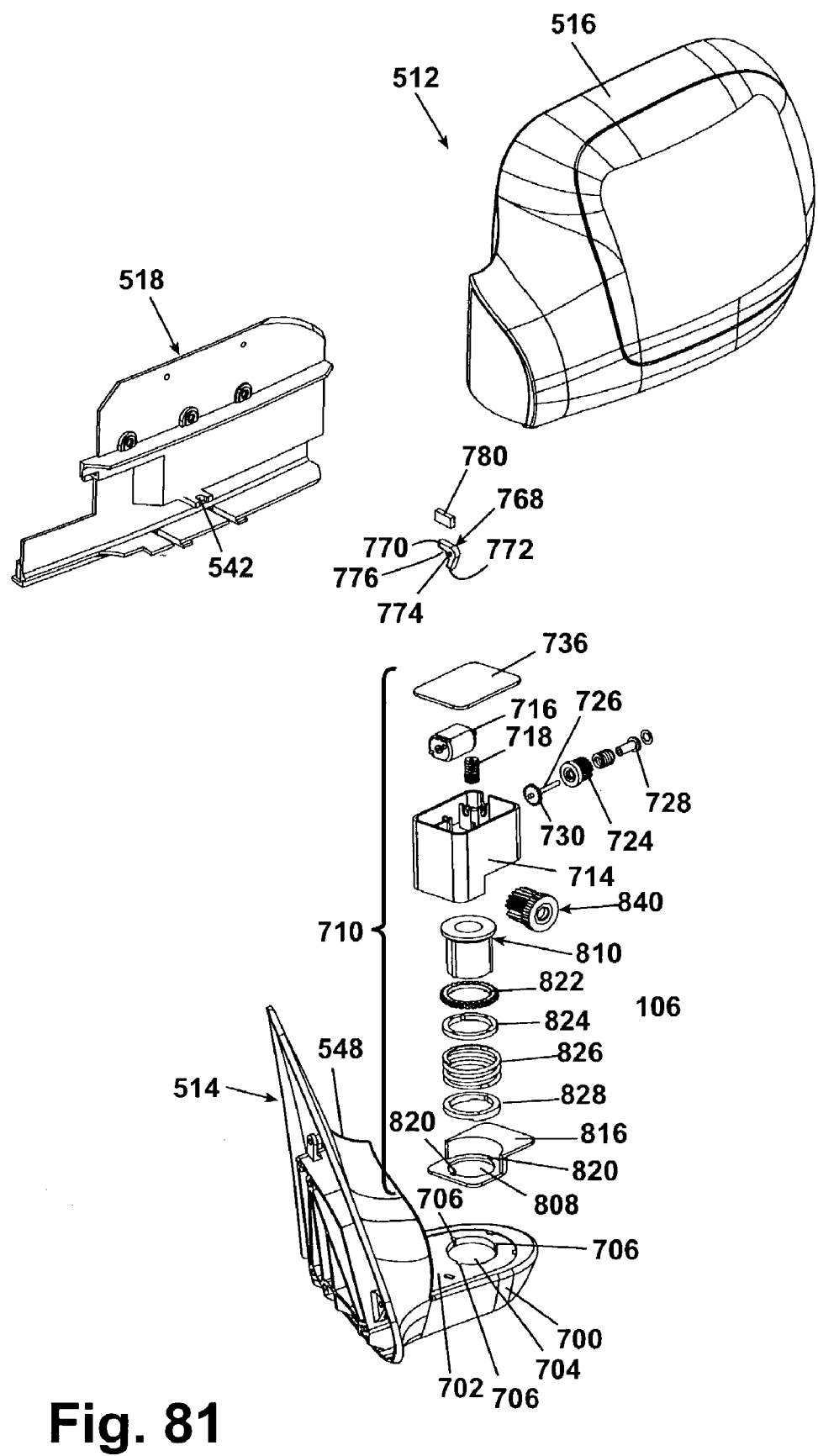
FIG. 81 is an exploded view of a vehicular mirror assembly similar to FIG. 64, but comprising only the components for the power-fold function.

Looking now at FIGS. 64 and 81, a slightly V-shaped cam 768 comprising upper and lower fingers 770, 772 is mounted to the post 762 by a pin 774 received within the post 762. A cam surface 776 is formed between the upper and lower fingers 770, 772. When the cam 768 is mounted to the post 762, the lower finger 772 is aligned with the slot 766. A limit switch 780 can optionally be mounted to the post 762 such that the switch 780 overlies the notch 542.

Figure 86:
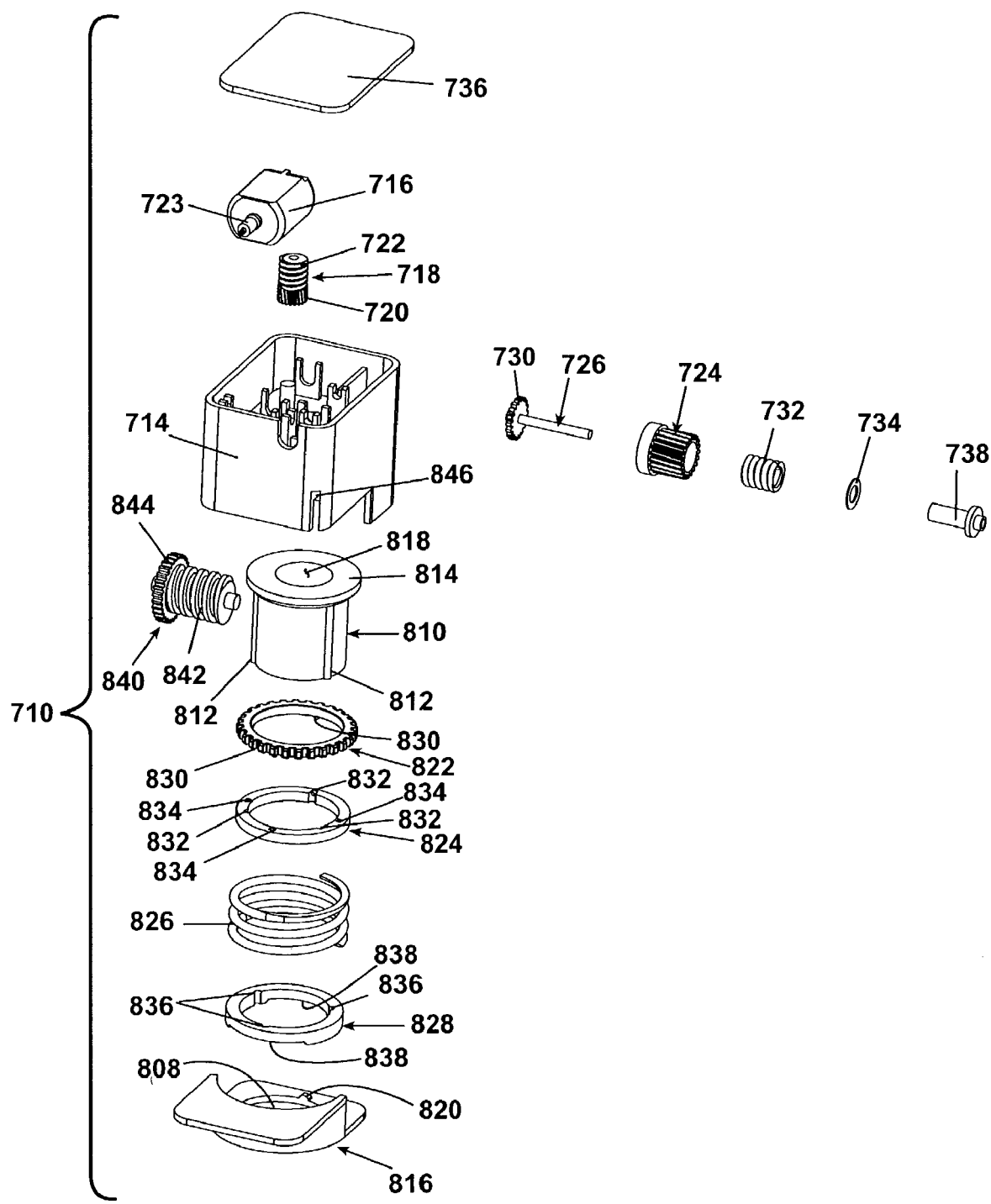
FIG. 86 is an exploded view of components in a module arranged for the power-fold function.

Referring to FIGS. 64 and 86, the power-fold component module 710 comprises an axle 810 having several longitudinal ribs 812 and a flange 814 at one end. The axle 810 is secured in the opening 704 of the base 700 with the longitudinal ribs 812 received in the notches 706. The flange 814 abuts a plate inside the main housing 714. A lower housing cover 816 is shaped to conform to a lower portion of the main housing 714, and has a central opening 818 having a diameter large enough to encompass the ribs 812 of the axle 810. Two bosses 820 extend upwardly from the lower housing cover 816 and are disposed opposite each other adjacent the central opening 818.

Surrounding the axle 810 between the flange 814 and the lower housing cover 816 are a ring gear 822, an upper detent 824, a coil spring 826, and a ramp 828. The internal diameter of the ring gear 822 is large enough to encompass the longitudinal ribs 812 of the axle 810. The ring gear 822 bears against the flange 814. The side of the ring gear 822 away from the flange 814 has a number of dogs 830 projecting therefrom. The upper detent 824 is a ring having an internal diameter substantially the same as the outside diameter of the axle 810 and a number of notches 832 corresponding to the longitudinal ribs 812. The upper detent 824 is received over the axle 810 and bears against the ring gear 822, so that the longitudinal ribs 812 engage the notches 832 to prevent rotation of the upper detent relative to the axle. The side of the upper detent 824 bearing against the ring gear 822 has detents 834 sized and located to correspond to the dogs 830 projecting from the ring gear 822. Thus, when the upper detent 824 is pressed against the ring gear 822, rotation of the ring gear 822 relative to the axle 810 is inhibited by interengagement of the dogs 830 and the detents 834.

The coil spring 826 is disposed over the axle 810 between the upper detent 824 and the ramp 828. The ramp 828 is a ring having an internal diameter substantially the same as the outside diameter of the axle 810, and, like the upper detent 824, has a number of notches 836 corresponding to the longitudinal ribs 812. The longitudinal ribs 812 engage the notches 836 to prevent rotation of the ramp 828 relative to the axle 810. One side of the ramp 828 bears against the coil spring 826, and the other side bears against the lower housing cover 816. The side of the ramp 828 facing the lower housing cover 816 has two axial recesses 838 complementary in shape to the bosses 820 extending upwardly from the lower housing cover 816. However, the axial recesses 838 extend over a predetermined radial angle, which in this embodiment is approximately 90 degrees, defined by terminal ends of the axial recesses 838. The preferred angle is the angle of motion desired between the folded and unfolded positions, since the terminal ends of the axial recesses will serve as stops for the bosses 820 on the lower housing cover 816.

When all of these elements of the power-fold complement module 710 are assembled, the coil spring 826 is under compression so that on the one hand, the upper detent 824 presses the ring gear 822 against the flange 814 and prevents rotation of the ring gear relative to the axle 810. On the other hand, the ramp 828 is held against the lower cover housing 816, but the lower cover housing 816 is permitted to rotate relative to the axle 810 within the limits of the axial recesses 838.

The power-fold component module 710 also includes a traverse gear 840 for use when the power-fold component module 710 is assembled without the power-extend complement module 712. In this configuration, best illustrated in FIG. 86, the traverse gear 840 comprises a worm portion 842 and a spur portion 844. The helical gear 724 is disposed 90 degrees from its earlier-described position, with the external teeth of the helical gear 724 engaging the worm portion 722 of the main gear 718. The traverse gear 840 is positioned in the main housing 714 immediately beneath the helical gear, with the worm portion 842 engaging the teeth of the ring gear 822, and the spur portion 844 engaging the teeth of the spur gear 730 on the shaft 726.

When the power-extend component module 712 is assembled to the power-fold component module 710 in the drive assembly 665, the rack gear 740 extends through a notch 846 in the main housing 714 (see FIGS. 84–87) so that its teeth mesh with the teeth of the ring gear 822 and the rail 744 rests on the tab 756. It will be apparent that actuation of the electric motor 716 will automatically urge the mirror assembly 512 to extend or retract and fold or unfold as described hereinafter.

Figure 67:
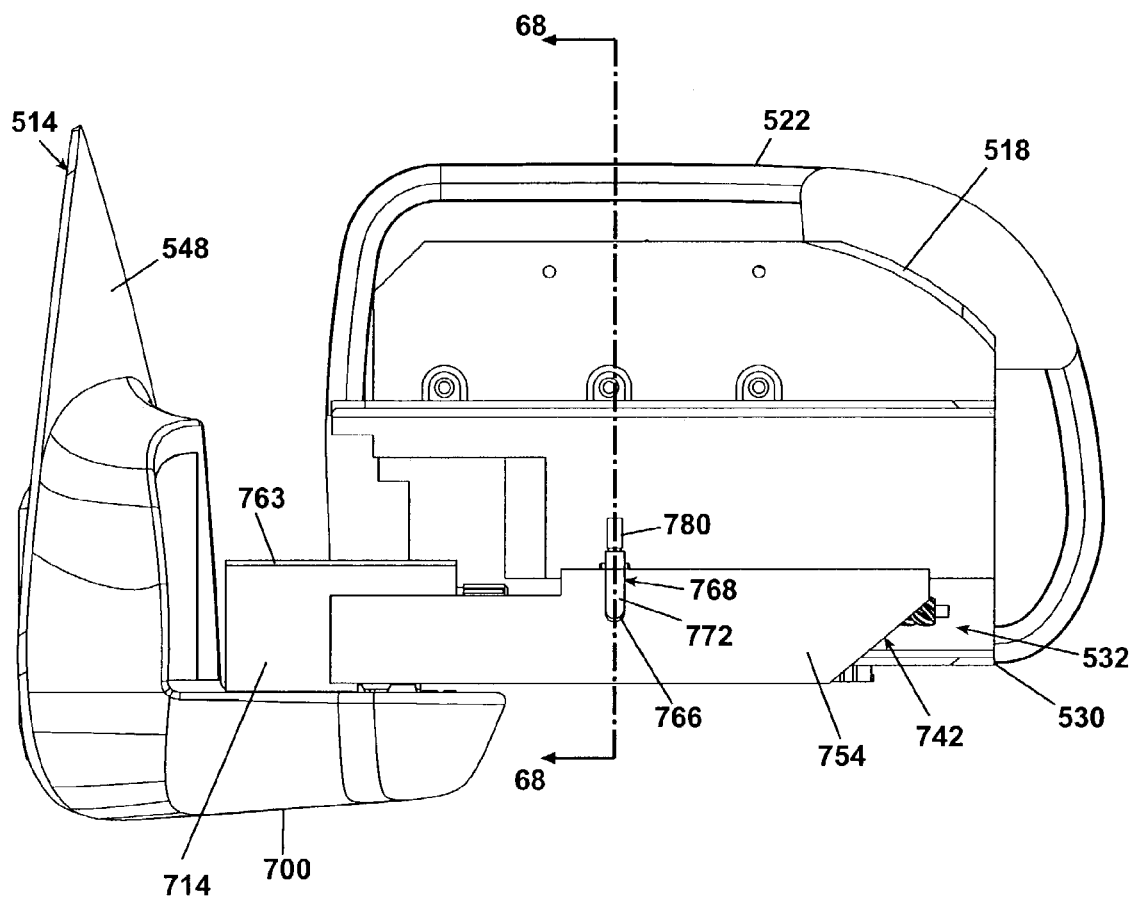
FIG. 67 is a view perpendicular to the mirror bracket of the vehicular mirror assembly of FIG. 72 with the mirror housing removed for clarity.

For convenience, the operation of the vehicle mirror assembly 512 will be described beginning with the mirror assembly 512 in the initially unfolded and retracted position as illustrated in FIGS. 66–68. In this position, the pin 741 of the drive nut 739 is received within the notch 750 of the rack gear 740, and the drive screw 737 has been rotated by the electric motor 716 a sufficient amount that the drive nut 739 is positioned longitudinally along the drive screw 737 such that the pin 741 lies beneath the cam surface 776 formed by the upper and lower fingers 770, 772 and in alignment with the slot 766. The lower finger 772 is rotated exteriorly of the slot 766, and the upper finger 770 is received within the notch 542 on the catch 540 of the mirror bracket 518. The upper finger 770 is also spaced from the switch 780, leaving the switch 780 in its naturally open state.

From the initial unfolded and retracted position as illustrated in FIGS. 66–68, the reverse operation (counter-clockwise rotation of the drive screw 737 as seen in FIG. 68) of the electric motor 716 will ultimately cause the mirror to rotate from the unfolded position to the folded position as illustrated in FIGS. 69–72, and the forward operation (clockwise rotation as seen in FIG. 68) of the electric motor will initially transition the drive nut 739 from coupling with the rack gear 740 to coupling with the mirror bracket 518 as illustrated in FIGS. 73–76 and ultimately cause the mirror assembly 512 to extend from the retracted position to the extended position as illustrated in FIGS. 77–80. The reverse operation of the electric motor 716 results in the drive nut 739 moving towards the electric motor 716 and the forward operation of the electric motor 716 results in the drive nut 73 moving away from the electric motor 716.

Referring to FIGS. 69–72, the movement of the mirror assembly 512 from the unfolded to the folded position will be described in further detail. Upon the reverse operation of the electric motor 716, the drive nut 739, whose pin 741 is still received within the notch 750, is drawn toward the electric motor 716, which, in turn, urges the rack gear 740 toward the shoulder 548 of the support arm 514. If the ring gear 822 were free to rotate about the axle 810 and were not constrained by the upper detent 824, the urging of the rack gear 740 toward the shoulder 548 would merely rotate the ring gear 822 relative to the axle 810. However, since the ring gear 822 is held by the upper detent 824, the motion of the rack gear 740 causes it to traverse the exterior of the ring gear 822, causing the rack gear 740 to rotate rearwardly carrying with it the main housing 714 and, thus, the mirror bracket 518 to rotate the mirror assembly 512 into the folded position.

Figure 72:
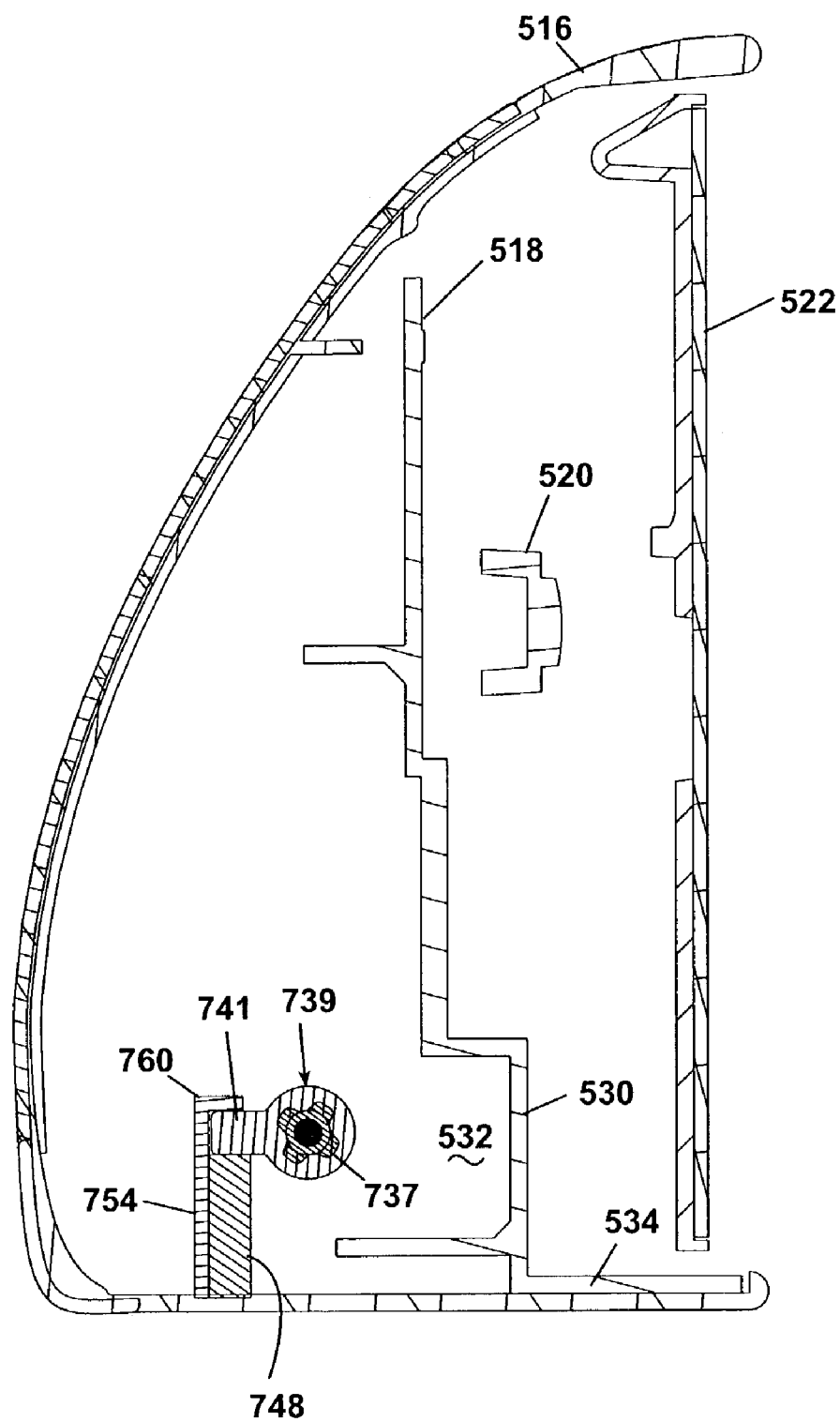
FIG. 72 is a sectional view taken along line 72—72 of FIG. 71 and illustrating the position of the drive nut relative to the guide bracket when the mirror is in the folded and retracted position.
Figure 73:
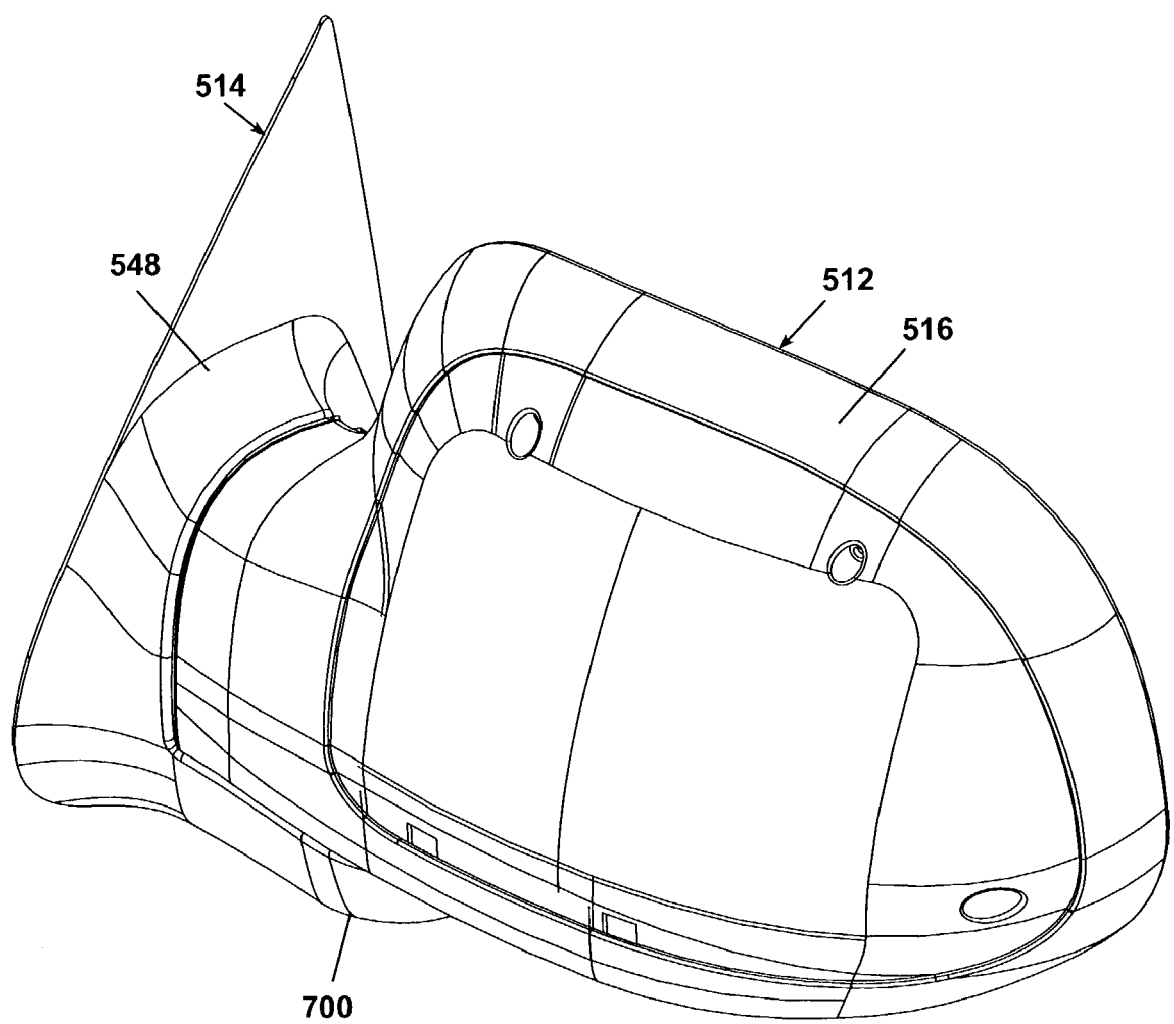
FIG. 73 is a top-right perspective view of the vehicular mirror assembly shown in the unfolded and retracted position.

Referring specifically to FIG. 72, when the drive screw 737 is rotated to effect the longitudinal movement of the drive nut 739 relative to the drive screw 737, the pin 741 is retained within the notch 750 by the limit flange 760. The limit flange 760 acting on the pin 741 prevents the nut 739 from rotating with the drive screw 737 as it naturally would instead of traversing along the drive screw 737 as desired. The combination of the notch 750 and the limit flange 760 effectively limits or prevents the relative rotation of the drive nut 739 to the drive screw 737, which causes the drive nut 739 to traverse the drive screw 737 upon the rotation of the drive screw 737.

To return the mirror assembly 512 from the folded position to the unfolded position, the electric motor 716 is operated in the opposite direction causing the rack gear 740 to once again traverse the exterior of the ring gear 822 and rotate in a forward direction, thereby rotating the mirror assembly 512 from the folded to the unfolded position. The forward and reverse operation of the electric motor 716 can therefore be used to cycle the mirror assembly 512 between the folded and unfolded positions as described. The limits of travel between the folded and unfolded positions are determined by the radial angle of the axial recesses 838, which effectively stop rotation of the mirror assembly 512 when the bosses 820 on the lower housing cover 816 contact the end of the axial recesses as the cover 816 rotates relative to the axle 810. Undue strain on the motor 716 is prevented when the stop is hit by the slip clutch in the helical gear 724.

Referring to FIGS. 66 and 73–76, the transition of the drive nut 739 from coupling with the rack gear 740 to coupling with the mirror bracket 518 for initiating the extension and retraction of the mirror assembly 512 will be described in further detail. As previously described, in the unfolded and retracted position as illustrated in FIG. 66, the pin 741 of the drive nut 739 is received within the notch 750 of the rack gear 740 to couple the drive nut 739 to the rack gear 740. However, the further forward operation of the drive screw 737 will not yield an extension of the mirror assembly 512, since the drive nut 739 is not directly coupled to the mirror bracket 518 or indirectly coupled to the mirror bracket through another structural item such as the guide bracket 742. Therefore, the drive nut 739 must be coupled to the mirror bracket 518 to effect the movement of the mirror assembly 512 from the retracted position to the extended position.

The forward operation of the drive screw 737 accomplishes the uncoupling of the drive nut 739 from the rack gear 740 and the coupling of the drive nut 739 to the mirror bracket 518. When the mirror assembly 512 is in the unfolded and retracted position illustrated in FIG. 66, the pin 741 is aligned with the slot 766 in the guide bracket 742. Since the pin 741 is no longer rotationally constrained by the limit flange 760, the continued forward operation of the drive screw 737 will result in the drive nut 739 rotating along with the drive screw 737 instead of longitudinally traversing the drive screw 737 until the pin 741 is received within the notch 542 of the catch 540 extending from the mirror bracket 518 to couple the drive nut 739 to the mirror bracket 518. As the drive nut 739 rotates with the drive screw 737, the pin 741 follows the cam surface 776 of the cam 768 causing the cam 768 to rotate, resulting in the lower finger 772 entering the slot 766 and the upper finger 770 moving out to the notch 542 and activating the limit switch 780 to indicate that the drive assembly 665 is now positioned for extension and retraction of the mirror assembly 512.

Figure 74:
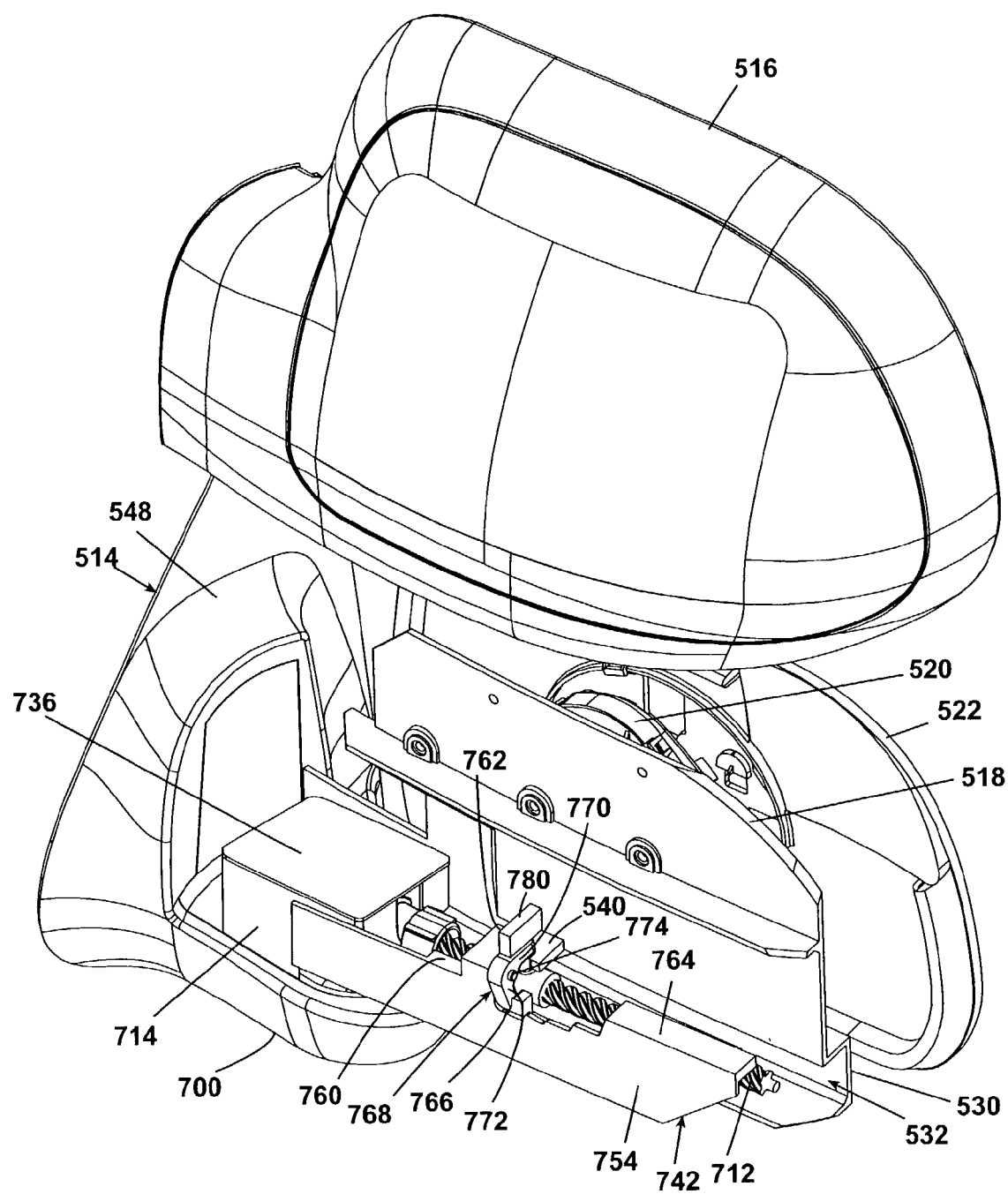
FIG. 74 is similar to FIGS. 66 and 70 except that the drive nut has transitioned from contact with the rack gear to contact with the mirror bracket to position the drive gear at the beginning of the extension of the mirror assembly.
Figure 75:
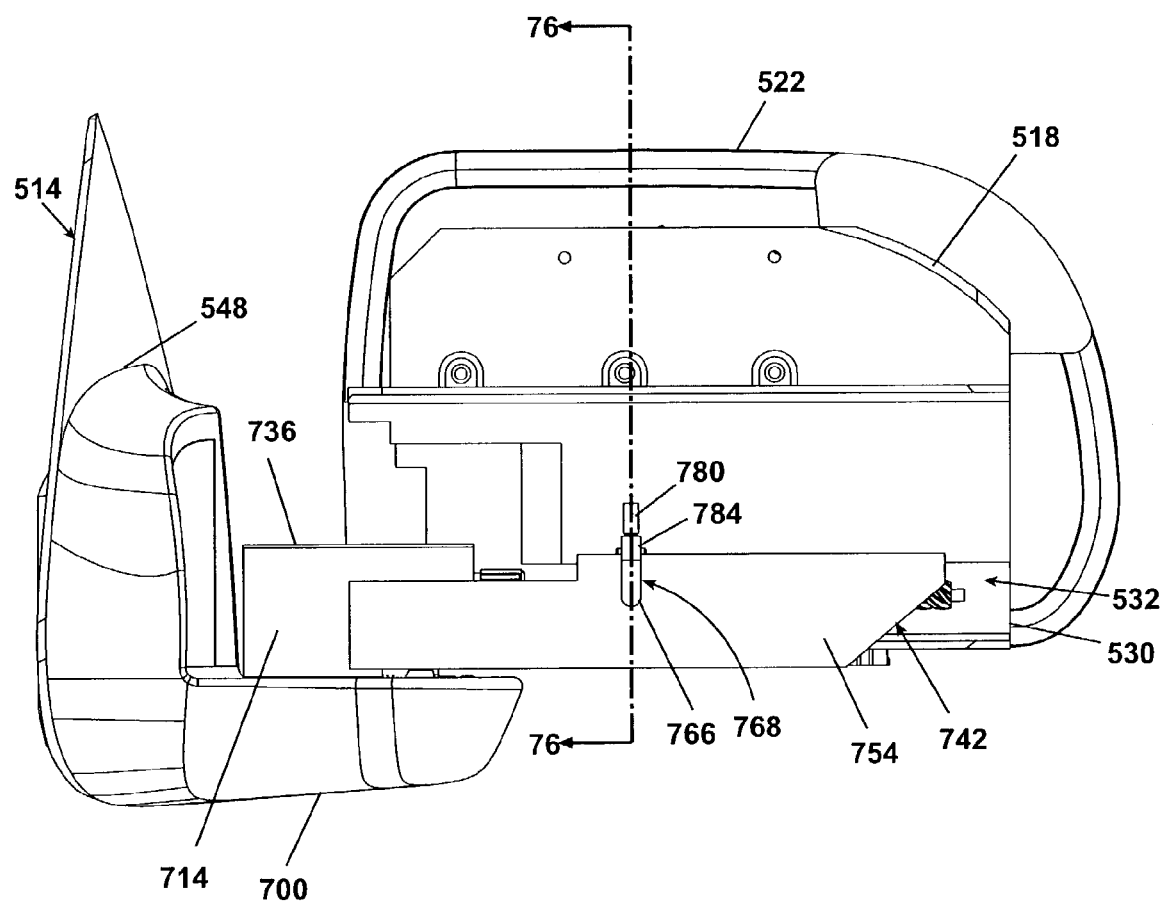
FIG. 75 is a view perpendicular to the mirror bracket of the mirror assembly of FIG. 74 with the mirror housing removed for clarity.
Figure 76:
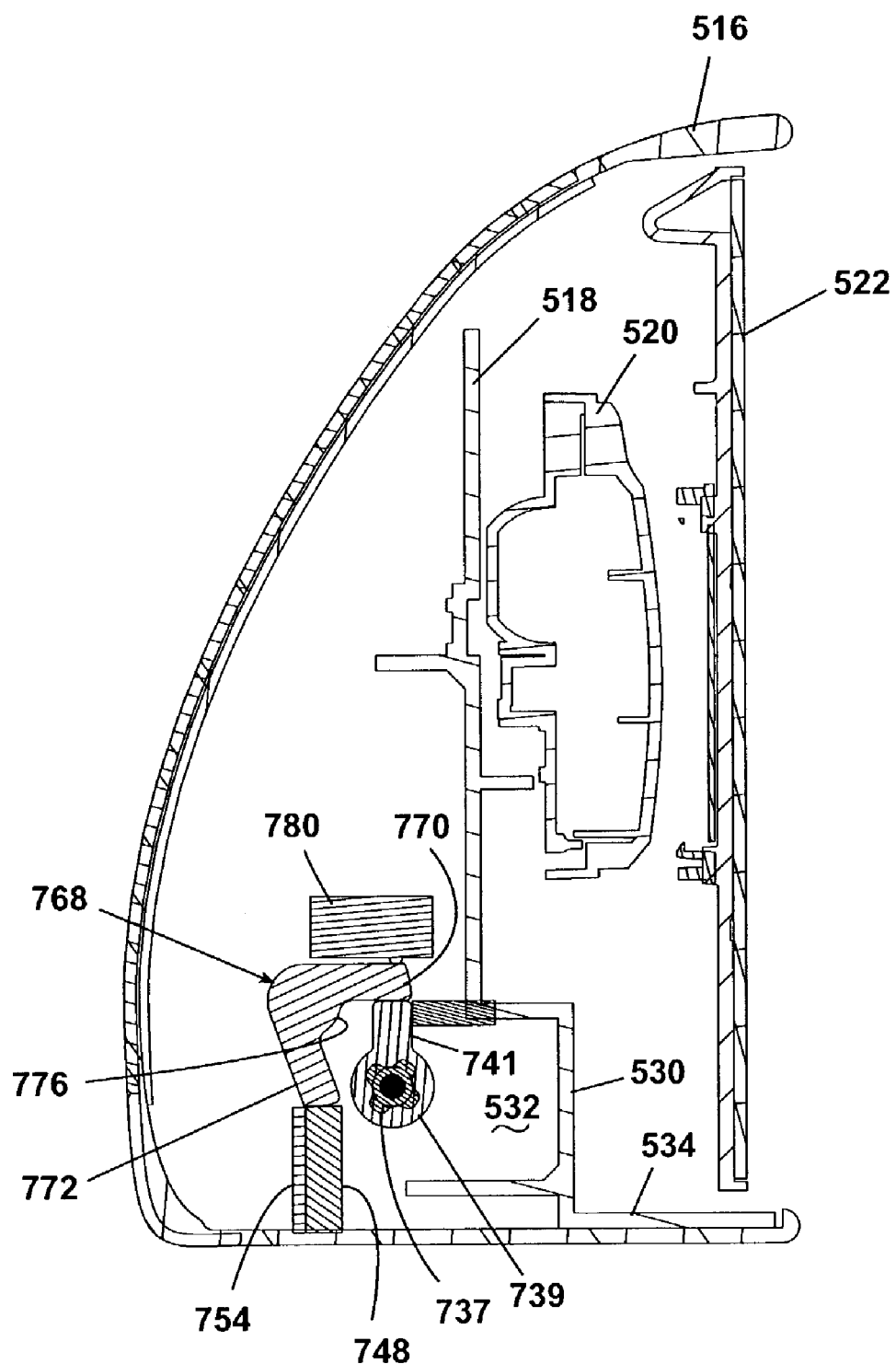
FIG. 76 is a sectional view taken along line 76—76 of FIG. 75 and illustrating the position of the drive nut relative to the mirror bracket at the initiation of the extension of the mirror from the retracted to extended position.

It should be noted that for convenience and to simplify the description of the invention, the mirror assembly is described as being in the unfolded and retracted position when the drive nut 739 is still coupled to the rack gear 740 as shown in FIG. 66, however, the unfolded and retracted position equally applies to when the drive nut 739 is initially coupled to the mirror bracket as shown in FIG. 74. During a normal driving position, the unfolded and retracted position is preferably defined with the drive nut 739 coupled to the mirror bracket 518 as shown in FIGS. 73–76 since the coupling of the drive nut 739 to the mirror bracket 518 allows for manual (or inadvertent) repositioning of the mirror housing with respect to the base.

Figure 77:
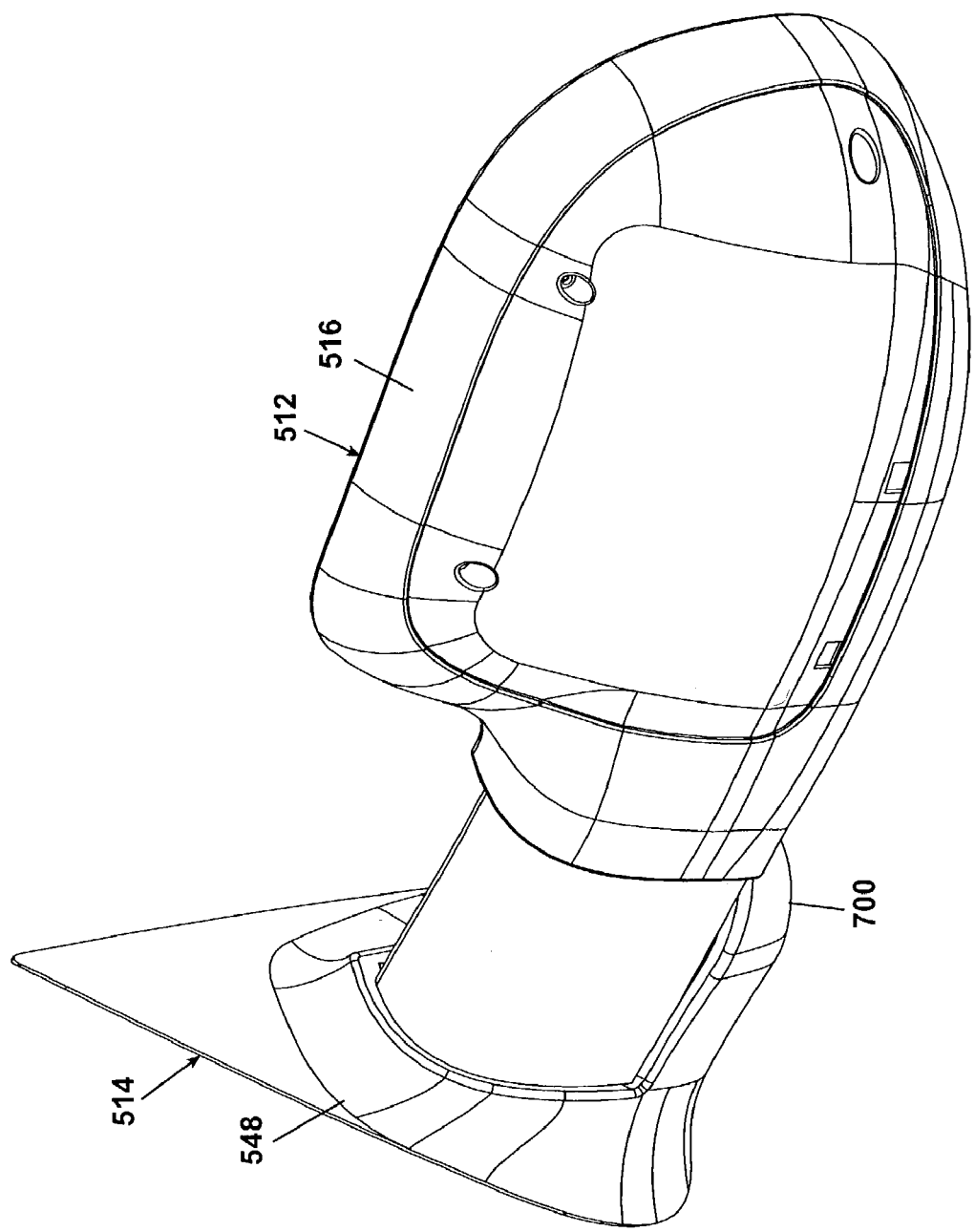
FIG. 77 is a top-right perspective view of the vehicular mirror assembly shown in the unfolded and extended position.
Figure 78:
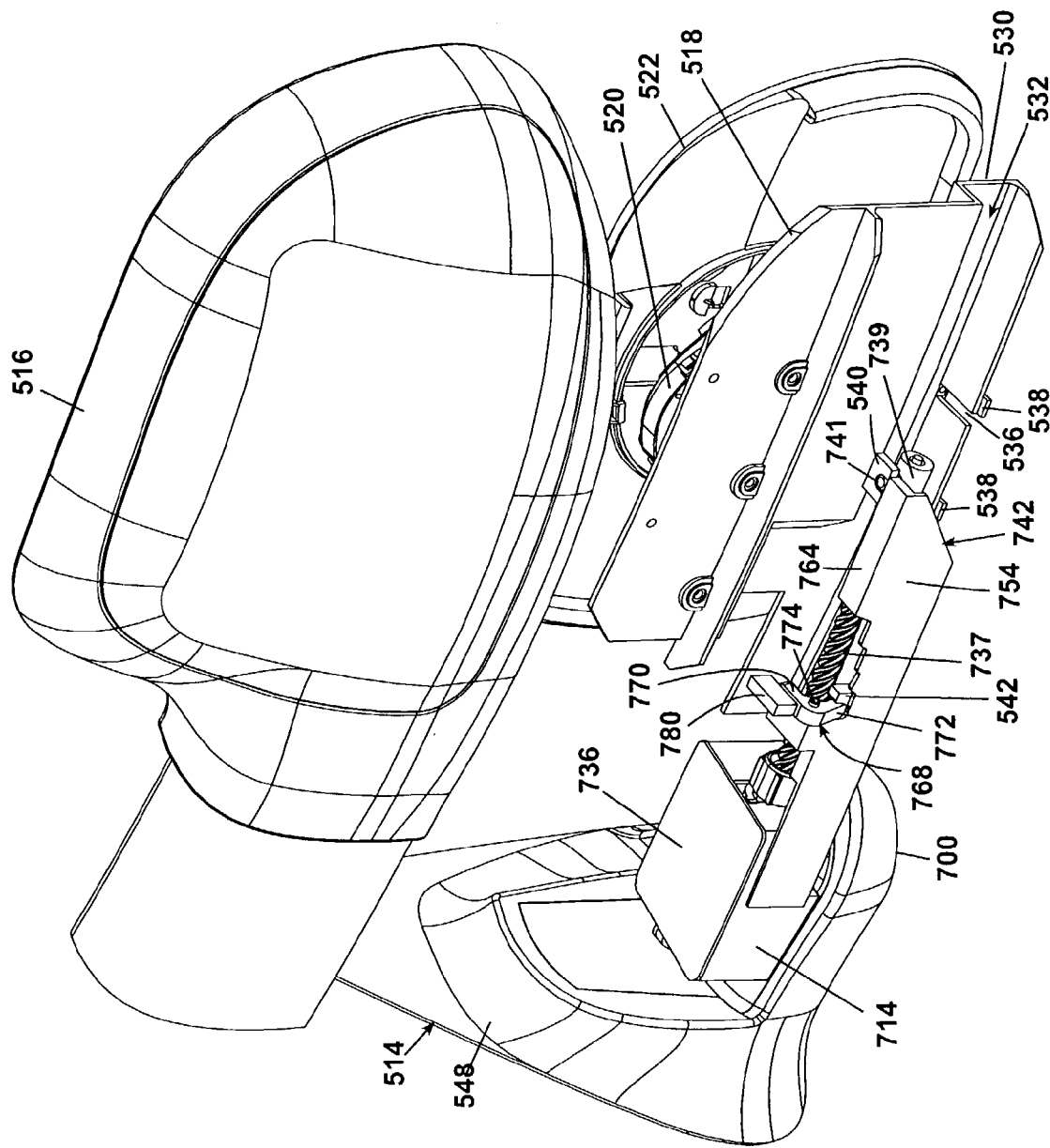
FIG. 78 is similar to FIGS. 66, 70 and 74 except that the drive nut is located on the drive screw at a position corresponding to the extended position of the mirror assembly.
Figure 79:
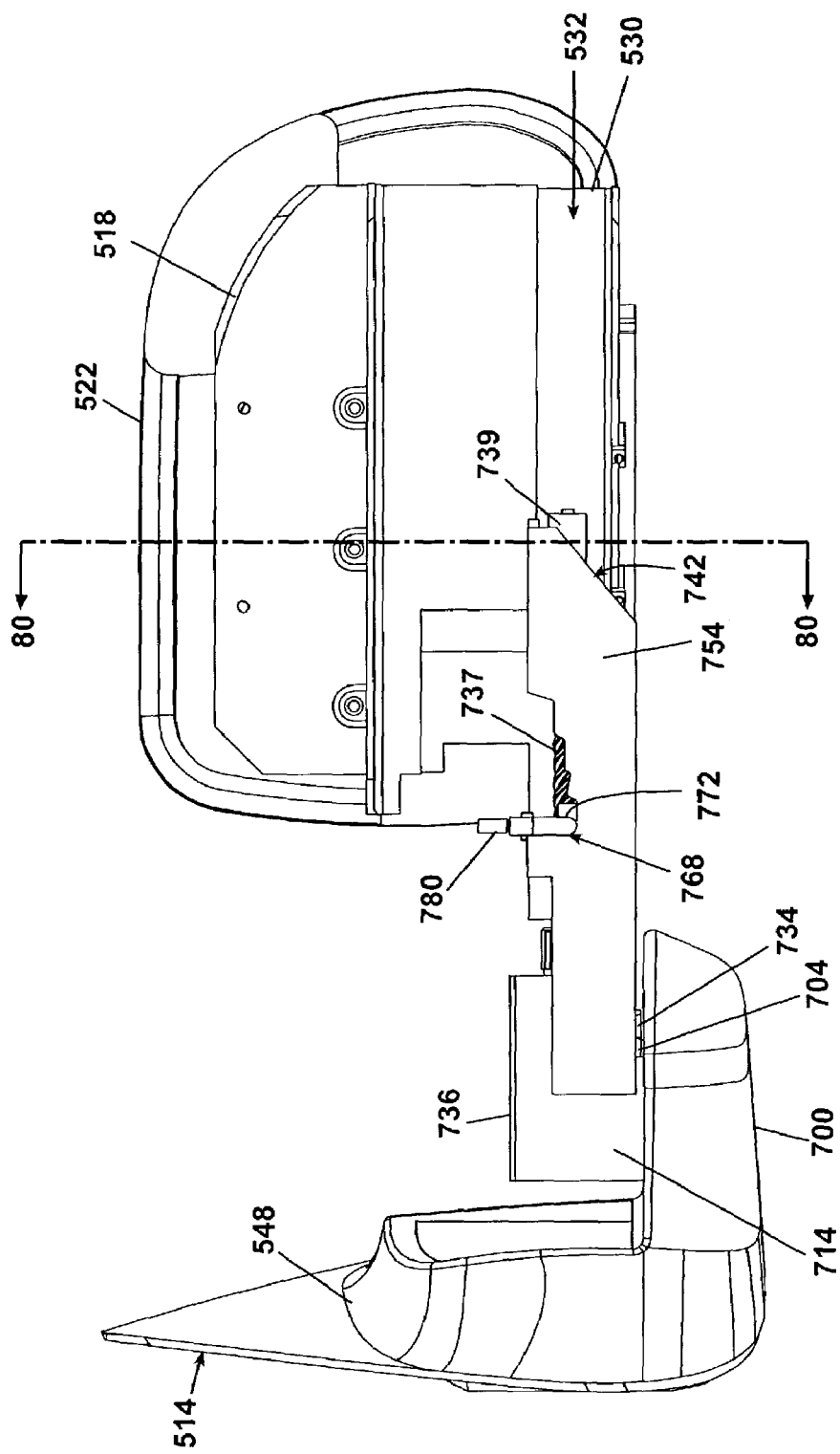
FIG. 79 is a view perpendicular to the mirror bracket of the mirror assembly of FIG. 78 with the mirror housing removed for clarity.

Returning to the description of the extension of the mirror assembly 512 with reference to FIGS. 77–80, once the drive nut 739 is coupled to the mirror bracket 518 by the receipt of the pin 741 in the notch 542, the continued forward operation of the drive screw 737 causes the drive nut 739 to traverse along the length of the drive screw 737, which causes the mirror assembly 512 to also move along with the drive nut 739 and move the mirror assembly 512 from the retracted position to the extended position shown in FIG. 77.

Figure 80:
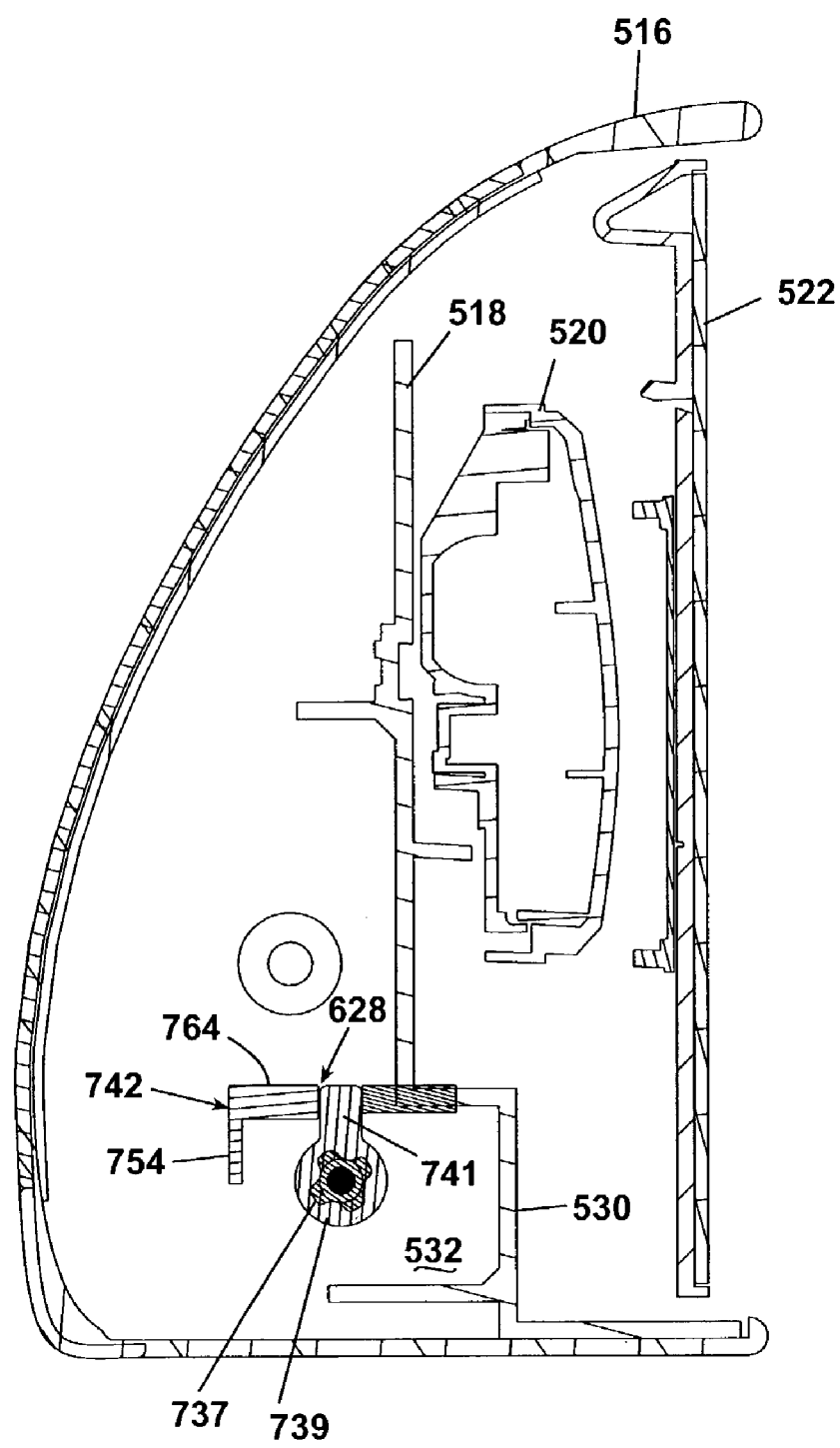
FIG. 80 is a sectional view taken along line 80—80 of FIG. 79 and illustrating the position of the drive nut relative to the mirror bracket and the guide bracket at the termination of the extension of the mirror from the retracted to extended position.

As best seen in FIG. 80, as the drive nut 739 traverses the drive screw 737, the pin 741 rides in a channel 778 formed between the upper edge of the C-shaped flange 530 and the outer edge of the guide flange 764. As the drive screw 737 is operated in a forward direction and rotates clockwise as viewed in FIG. 80, the drive nut 739 tries to rotate in the same direction causing the pin 741 to bear against the upper flange of the C-shaped flange 530. When the drive screw 737 is operated in a reverse direction and rotates counterclockwise as viewed in FIG. 80, the drive nut 739 tries to rotate in the same direction causing the pin 741 to bear against the outer edge of the guide flange 764. Thus, the upper edge of the C-shaped flange 530 limits the rotation of the drive nut 739 when the mirror assembly 512 is moved from the retracted to the extended position, and the outer edge of the guide flange 764 limits the rotation of the drive nut 739 when the mirror assembly 512 is moved from the extended to the retracted position.

As previously described herein with respect to the second embodiment of the mirror assembly, FIG. 62 illustrates a simple control circuit suitable for controlling the folding and extending functions of the mirror, which can be utilized for the embodiment of the mirror assembly described herein and which operates in the same fashion. Similarly, the control circuit shown in FIG. 63 can be used to control the folding and extending functions of the mirror in a fashion similar to the embodiment previously described.

Figure 82:
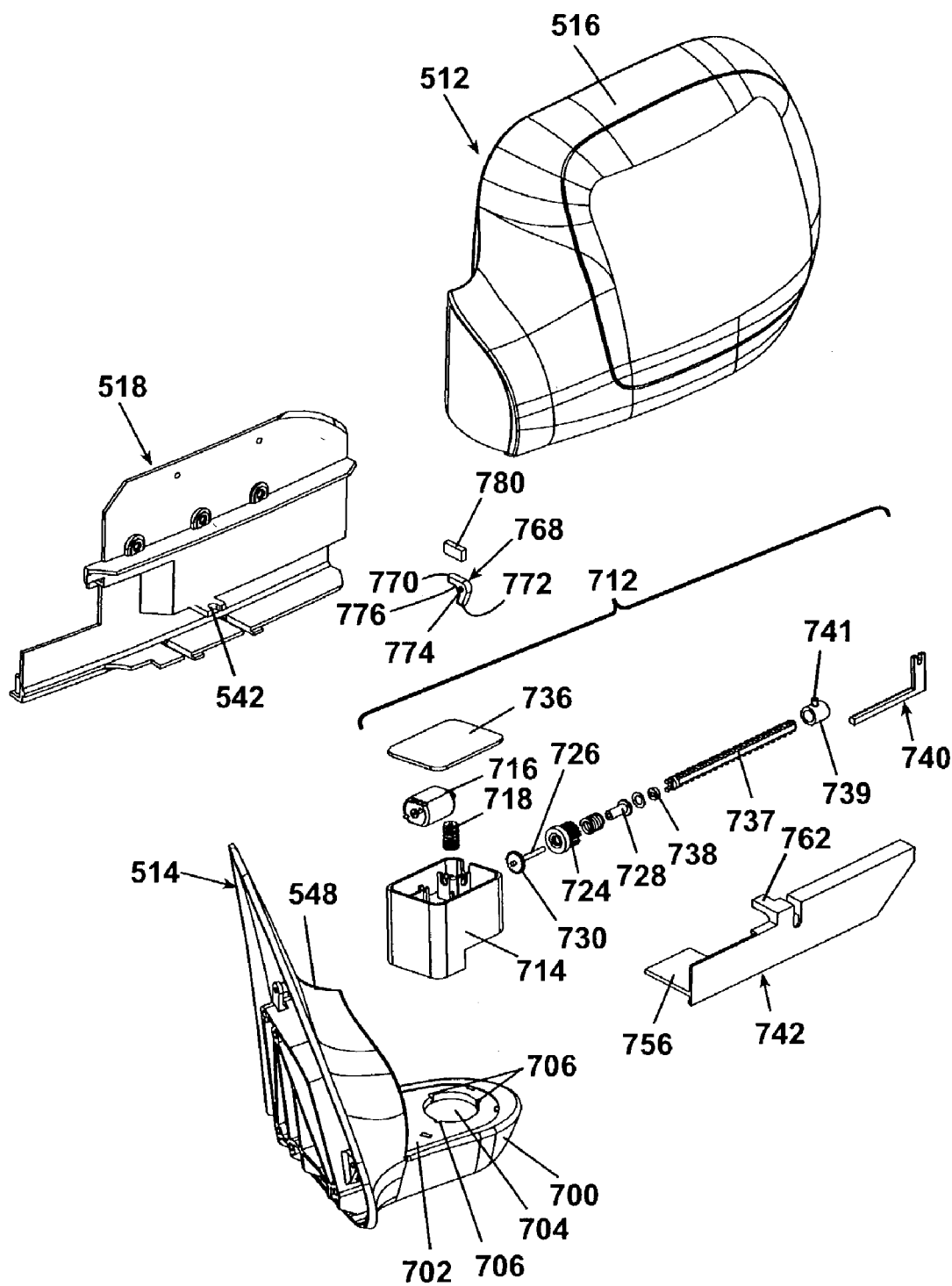
FIG. 82 is an exploded view of the vehicular mirror assembly similar to FIGS. 64 and 81, but comprising only the components for the power-extension function.

FIG. 81 illustrates an embodiment of the power-fold component module 710 as it would be installed in a vehicle mirror assembly 512. It will be noted that in this embodiment there is no functionality for the power-extend function. FIG. 82 illustrates an embodiment of the power-extend component module 712, as it would be installed in a vehicle mirror assembly 512. It will be noted that in this embodiment there is no functionality for the power-fold function.

While it may be preferred to have either or both the power-fold and power-extend functions in a vehicle mirror assembly 512, it will be appreciated that the unique structure of the modular components will permit manual folding and extension of the mirror assembly 512 notwithstanding the existence of the power functionality. The threads of the drive screw 737 preferably have a sufficiently long lead compared to the diameter of the drive screw 737 to permit the manual extension and retraction of the mirror assembly 512 when suitable force is applied. The slip clutch in the helical gear 724 permits the release of the drive screw 737 from the motor upon the application of the manual force, thereby eliminating the tendency for the electric motor to prevent the rotation of the drive screw 737. Moreover, application of manual force to fold the mirror assembly 512 when the power-fold component module 710 is installed can be accomplished by overcoming the force of the spring 826 holding the upper detent 824 in engagement with the ring gear 822. When rotational force is applied to the ring gear 822, as when the mirror assembly is manually urged to a folded position, the dogs 830 depending from the ring gear will be urged out of the detents 834 to depress the upper detent 824 against the force of the coil spring 826, i.e. the detents and the dogs comprise a force-modifying device. When the dogs 830 are freed from the detents 834, the ring gear 822 is then free to rotate relative to the axle 810, permitting manual rotation of the mirror assembly 512.

Figure 83:
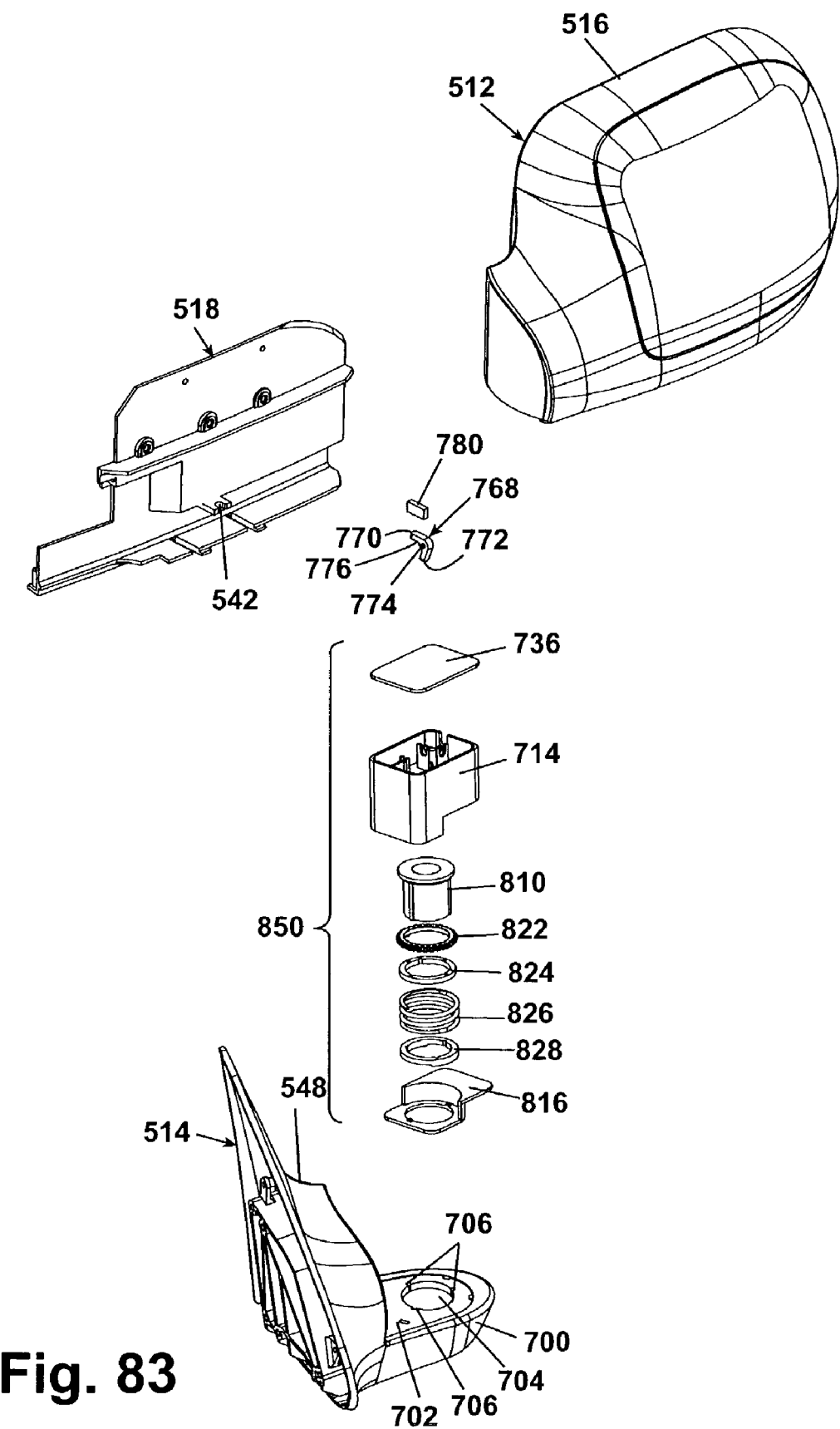
FIG. 83 is an exploded view of the mirror similar to FIGS. 64, 81, and 82, but comprising only the components for a manual-fold function.

A manual component module 850 is illustrated in FIG. 83. It will be apparent that the manual component module 850 comprises all of the elements of the power-fold complement module 710 other than those necessary for powered motion. In other words, the main housing 714, upper housing cover 736, lower housing cover 816, axle 810, ring gear 822, upper detent 824, coil spring 826, and ramp 828 are included in the manual component module 850. The motor 716, main gear 718, and traverse gear 840 are not included. Manual folding of the mirror between the folded and unfolded positions is accomplished by manually urging the mirror housing 512 toward the folded position.

Figure 84:
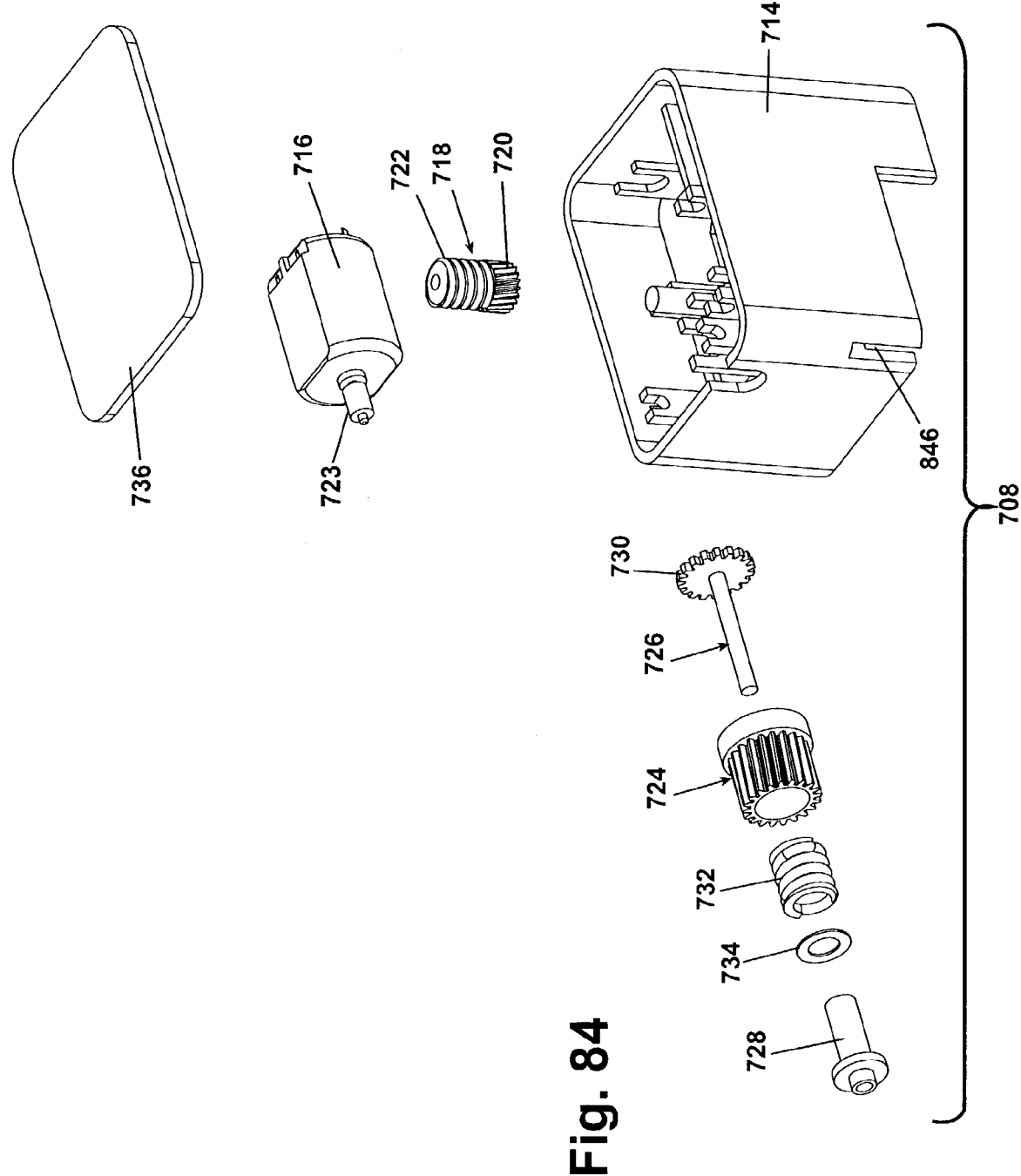
FIG. 84 is an exploded view of components arranged for a basic module according to the invention.
Figure 87:
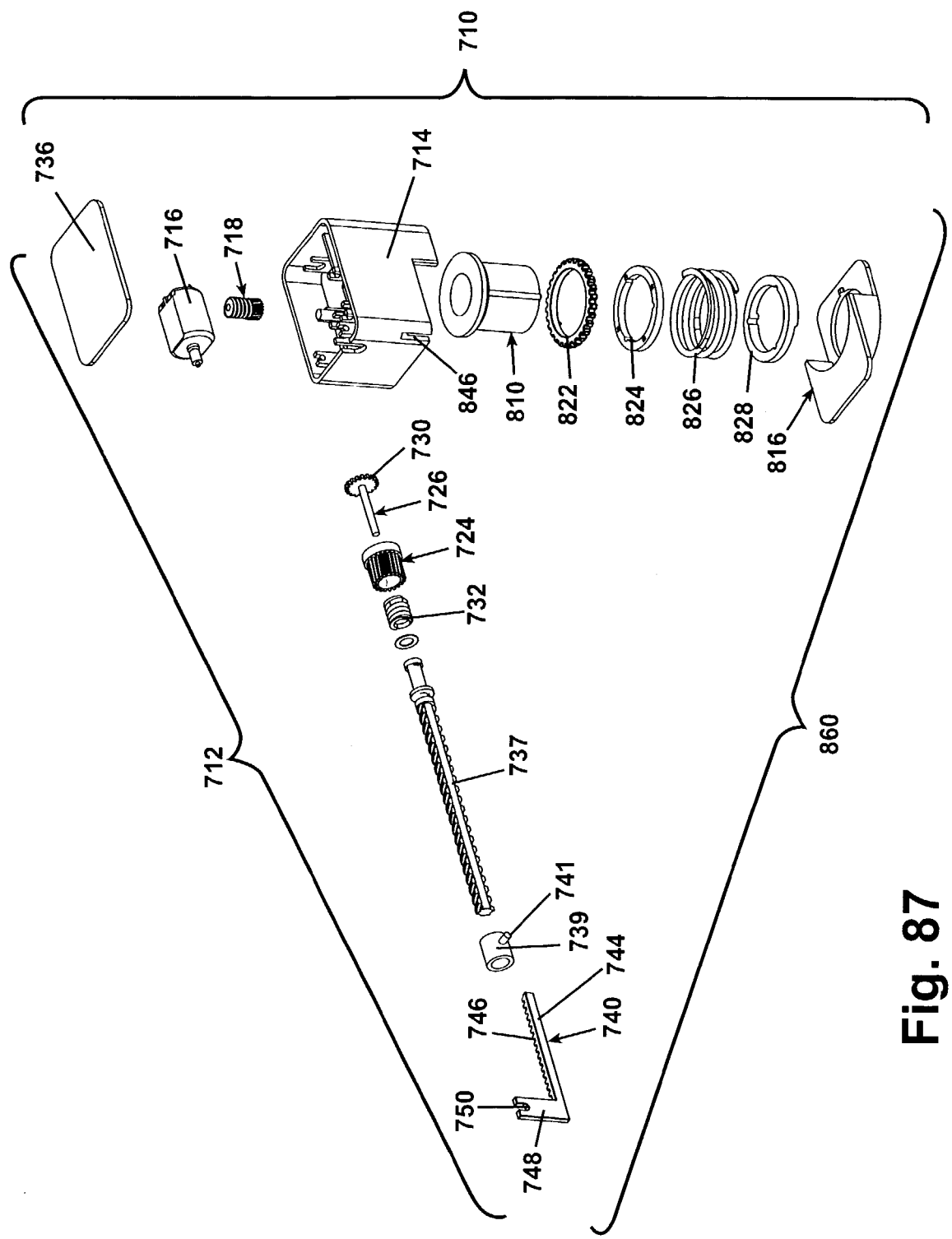
FIG. 87 is an exploded view of components in a module arranged for both the power-extend function and the power-fold function.
Figure 88:
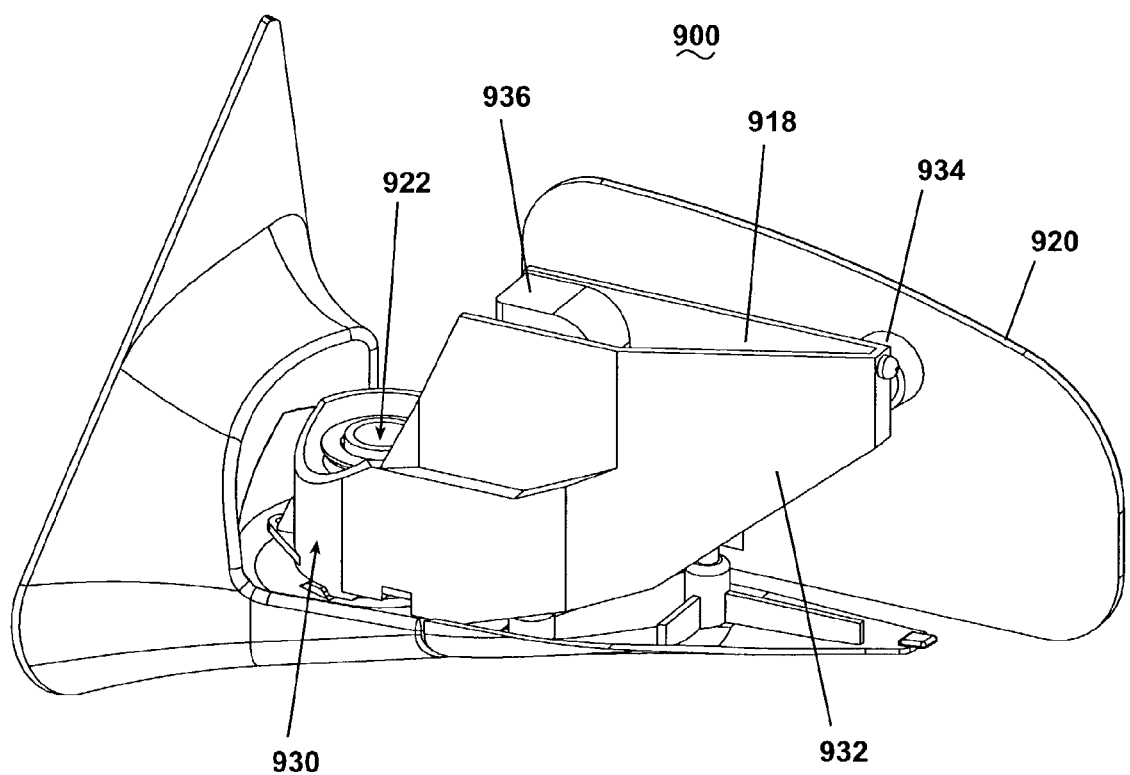
FIG. 88 is a close-up perspective view of the interior of the vehicular mirror assembly of FIG. 1 showing a sixth embodiment of a pivot mechanism for use with the vehicular mirror assembly of FIGS. 1 and 15.
Figure 89:
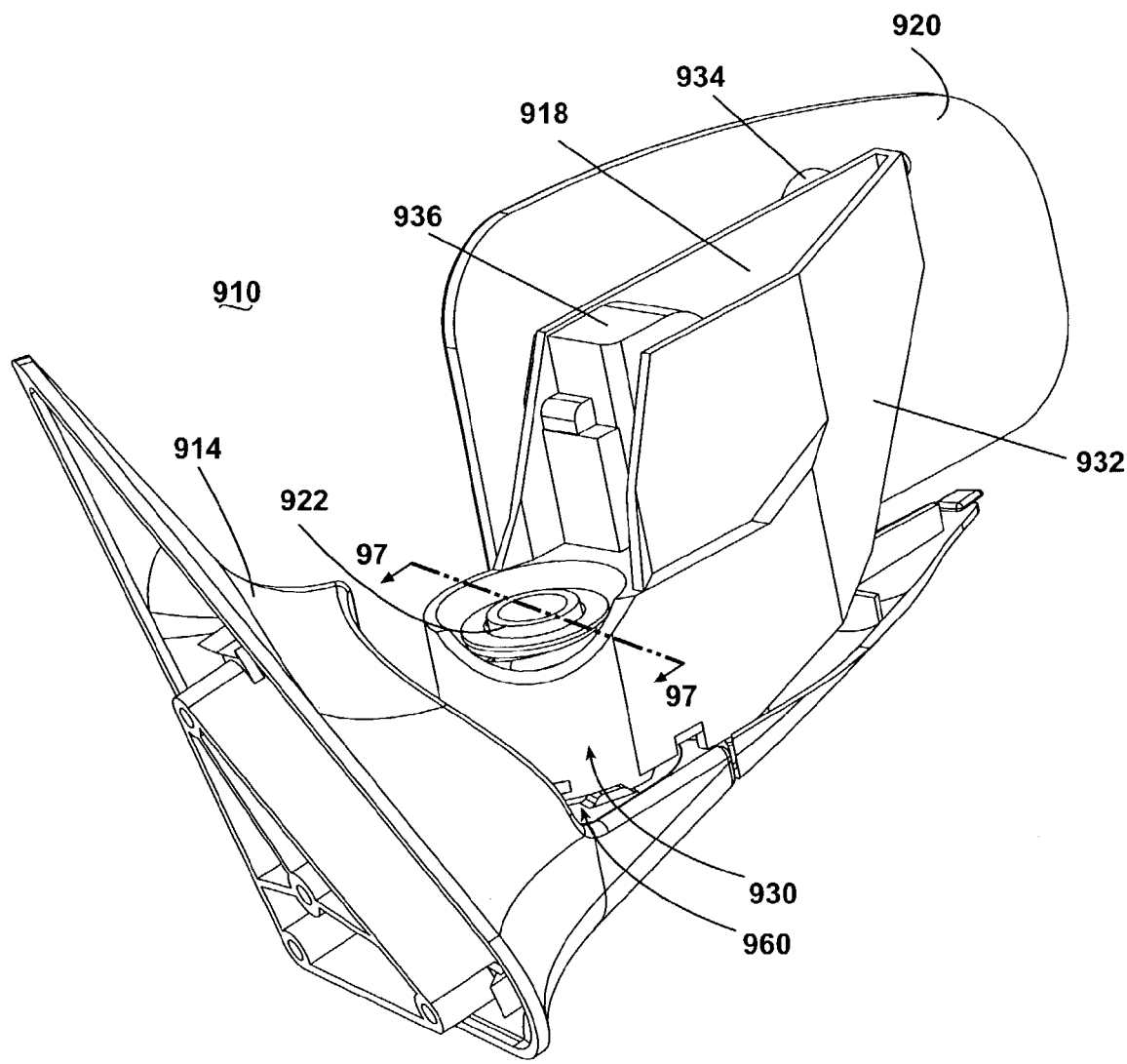
FIG. 89 is an alternate close-up perspective view of the interior of the vehicular mirror assembly shown in FIG. 88.

FIG. 84 shows the elements of the basic component module 708 which are common to both the power-fold component module 710 and the power-extend component module 712. FIG. 85 shows the elements of the power-extend component module 712 and FIG. 86 shows the elements of the power-fold component module 710. FIG. 87 shows the elements of both the power-fold component module 710 and the power-extend component module 712 combined as needed for a power-fold and extend component module 860.

The modular arrangement of these elements benefits the assembly of a vehicle mirror with preselected functionality. For example, the different modules can be color coded so that when a particular order appears on the assembly line for a mirror with a predetermined functionality, the assembler can easily select the components for a particular module. It is possible for the predetermined components to be delivered to the assembler automatically by a computerized system recognizing a color code or other code associated with the selected module.

A sixth embodiment comprising a pivot mechanism for a mirror assembly 910 is shown in FIGS. 88–98. The mirror assembly 910 is similar in several respects to the mirror assemblies previously described herein and comprises a frame 918, a reflective element assembly 920, and a pivot assembly 922 which is mounted to a vehicle (not shown) in a generally conventional manner. The mirror assembly comprises a shell (not shown) which houses the reflective element assembly 920, the pivot assembly 922, and, optionally, other mirror components such as a power tilt assembly, turn signals, and puddle lights.

Referring specifically to FIGS. 88–91, the frame 918 comprises an irregularly-shaped body configured and adapted for the purposes described herein, and comprising a pivot assembly housing 930 at a first end and a reflective element mounting arm 932 at a second end. The reflective element mounting arm 932 comprises a generally conventional reflective element pivot mount 934 for pivotably mounting the reflective element assembly 920 to the frame 918. Intermediate the pivot assembly housing 930 and the reflective element mounting arm 932 is a tilt actuator assembly housing 936 adapted for housing a tilt actuator assembly (not shown) for selectively tilting the reflective element assembly 920 about a horizontal and a vertical axis.

Figure 90:
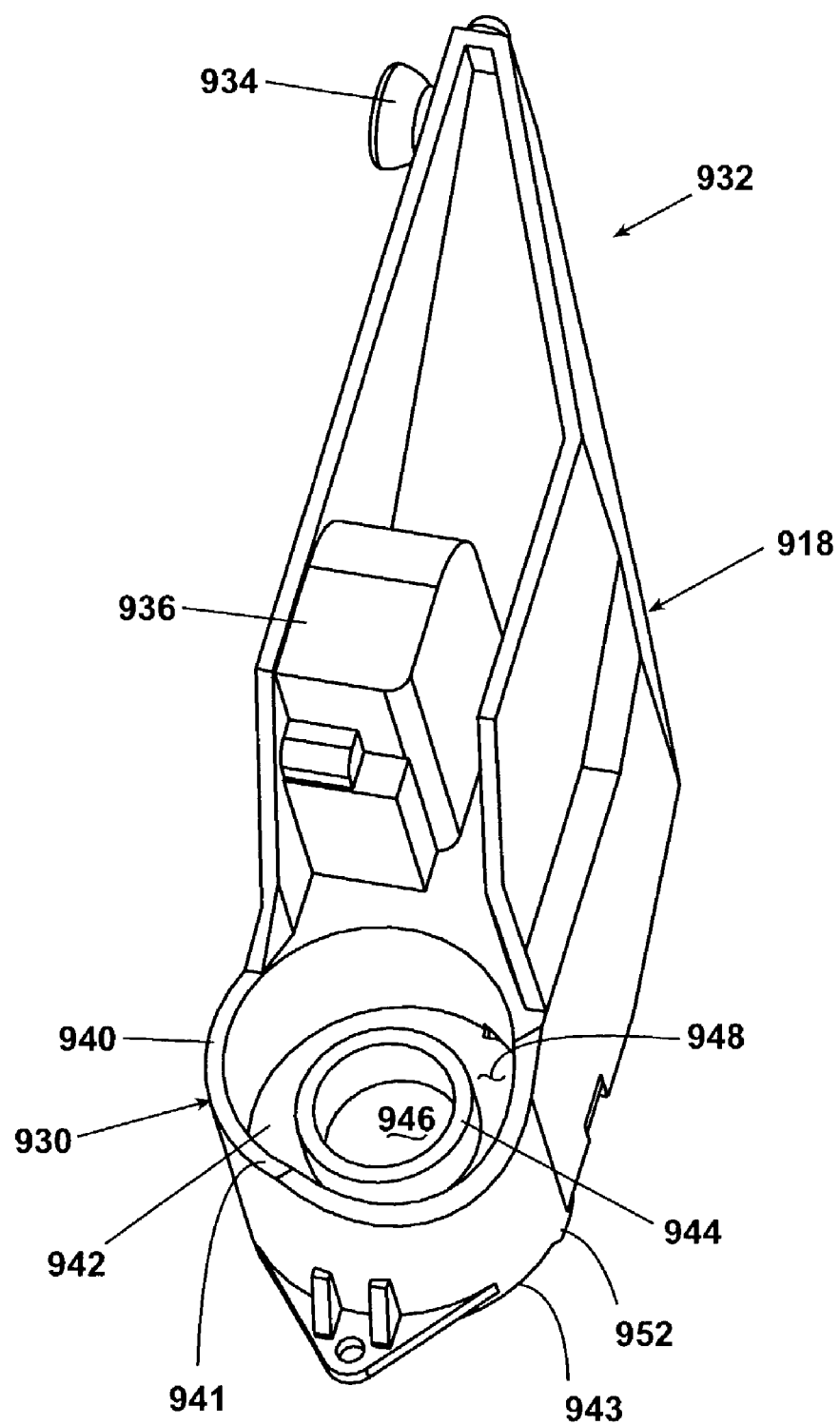
FIG. 90 is a perspective view of a frame comprising a portion of the vehicular mirror assembly of FIG. 88.

The pivot assembly housing 930 comprises a cylindrical wall 940 terminating in a first, upper rim 941 and a second, lower rim 943. Intermediate the upper rim 941 and the lower rim 943 is an annular floor 942 extending from the cylindrical wall 940 to an annular wall 944 extending upwardly from the annular floor 942 toward the upper rim 941 and defining a circular pivot bore 946. The cylindrical wall 940 annular floor 942, and annular wall 944 define an upper annular spring chamber 948. As shown in FIG. 90, the cylindrical wall 940 and annular floor 942 define a lower gear chamber 950, the gear chamber 950 being separated from the spring chamber 948 by the annular floor 942. Extending from the lower rim 943 are a plurality of bosses 952 comprising a generally truncated triangular-shaped body having a pair of juxtaposed inclined faces 954 terminating in a bottom face 956. In the preferred embodiment, three bosses 952 are positioned around the lower rim 943 at an interval of approximately 120°.

Figure 95:
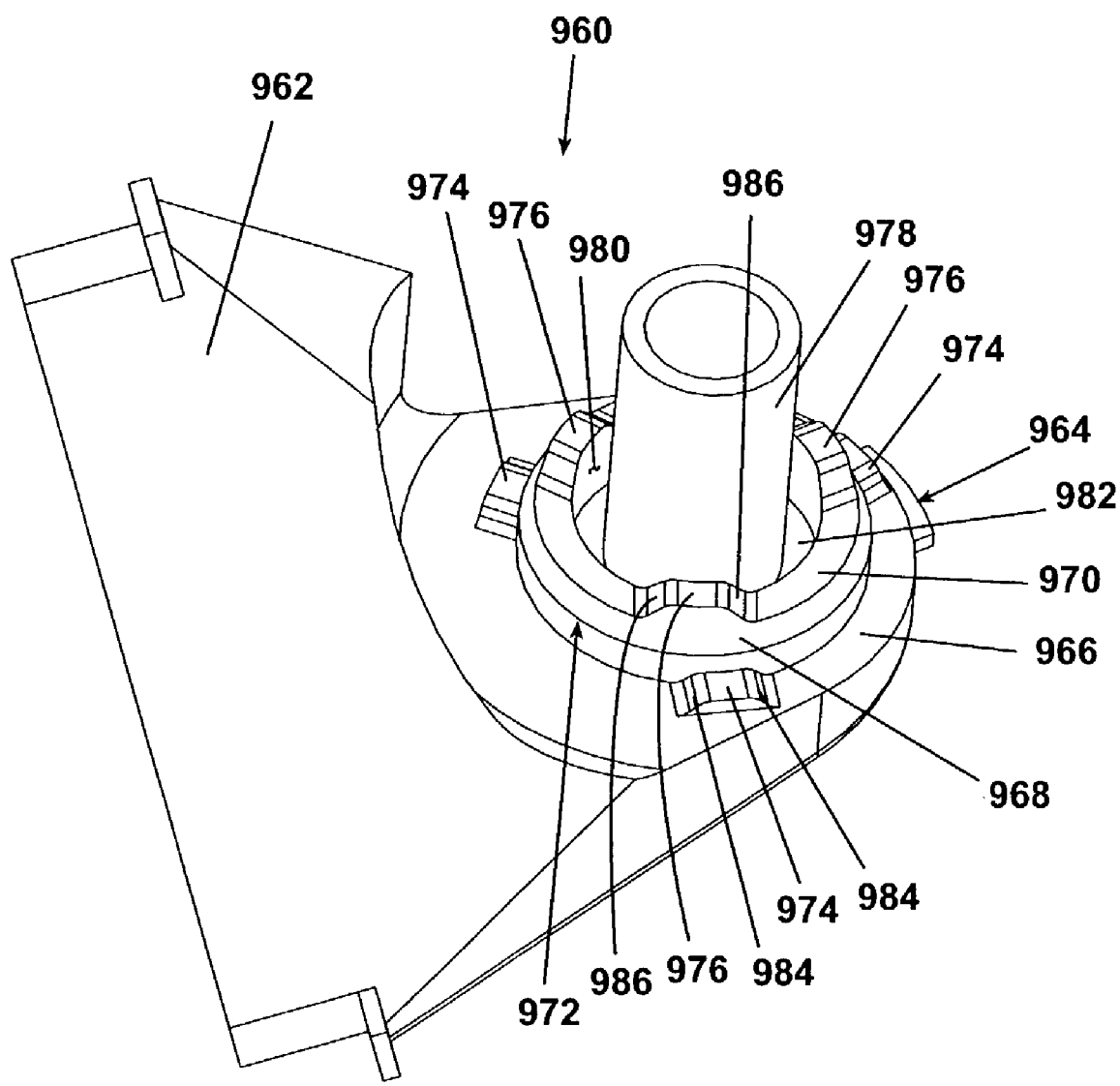
FIG. 95 is a perspective view of a pivot frame for pivotably mounting the frame, drive assembly, and pivot assembly of FIG. 91 thereto.
Figure 96:
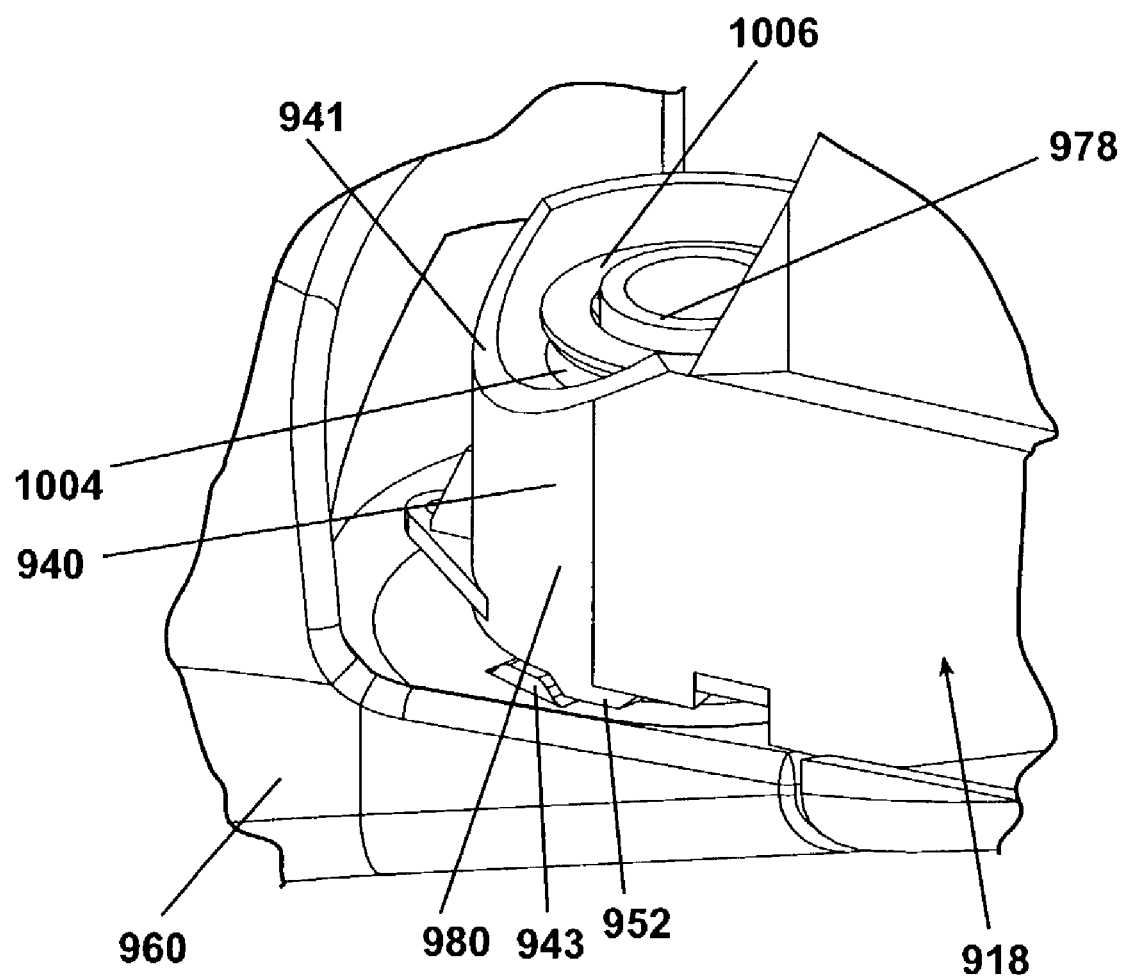
FIG. 96 is a close-up perspective view of a portion of the pivot frame of FIG. 95.

Referring now to FIG. 95, a pivot frame 960 is an irregularly-shaped member comprising a mounting portion 962 and a pivot base 964 in cantilevered juxtaposition to the mounting portion 962. The mounting portion 962 is adapted for mounting the vehicular mirror assembly 910 to the vehicle in a generally conventional manner. The pivot base 964 cantilevers laterally from the mounting portion 962 and comprises an annular floor 966 adapted to be generally horizontal when the vehicular mirror assembly 910 is mounted to the vehicle. The annular floor 966 transitions to an upwardly extending cylindrical wall 968 forming a collar 970 terminating in a rim 972. Extending upwardly from the annular floor 966 is a plurality of outer bosses 974. Extending upwardly from the rim 972 is a plurality of inner bosses 976. The outer bosses 974 comprise generally truncated triangular-shaped bodies having a pair of juxtaposed inclined faces 984. The inner bosses 976 comprise generally truncated triangular-shaped bodies having a pair of juxtaposed inclined faces 986. The outer bosses 974 are preferably positioned about the annular floor 966 for mating communication with the bosses 952 at an interval of approximately 120° so that the bosses 952 are brought into contact with the bosses 974 when the mirror assembly 910 reaches its fully extended position. The inner bosses 976 are also preferably positioned about the rim 972 at an interval of approximately 120°. The cylindrical wall 968 terminates in an annular floor 982 extending from the cylindrical wall 968 to a pivot post 978 extending upwardly from the annular floor 982 and defining an annular space 980.

Figure 91:
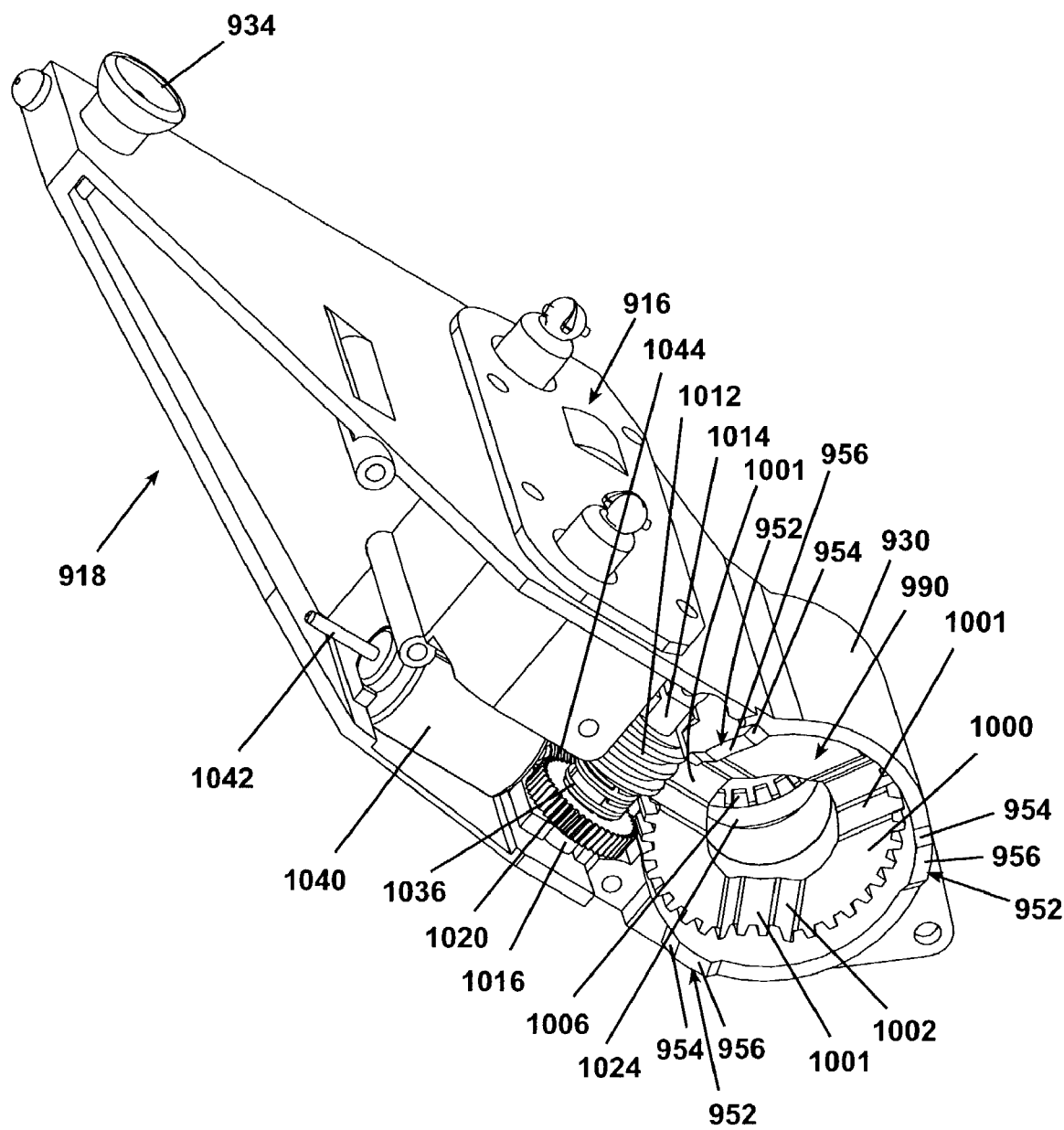
FIG. 91 is a perspective view from beneath the frame of a drive assembly and pivot assembly comprising a portion of the vehicular mirror assembly of FIG. 88.
Figure 92:
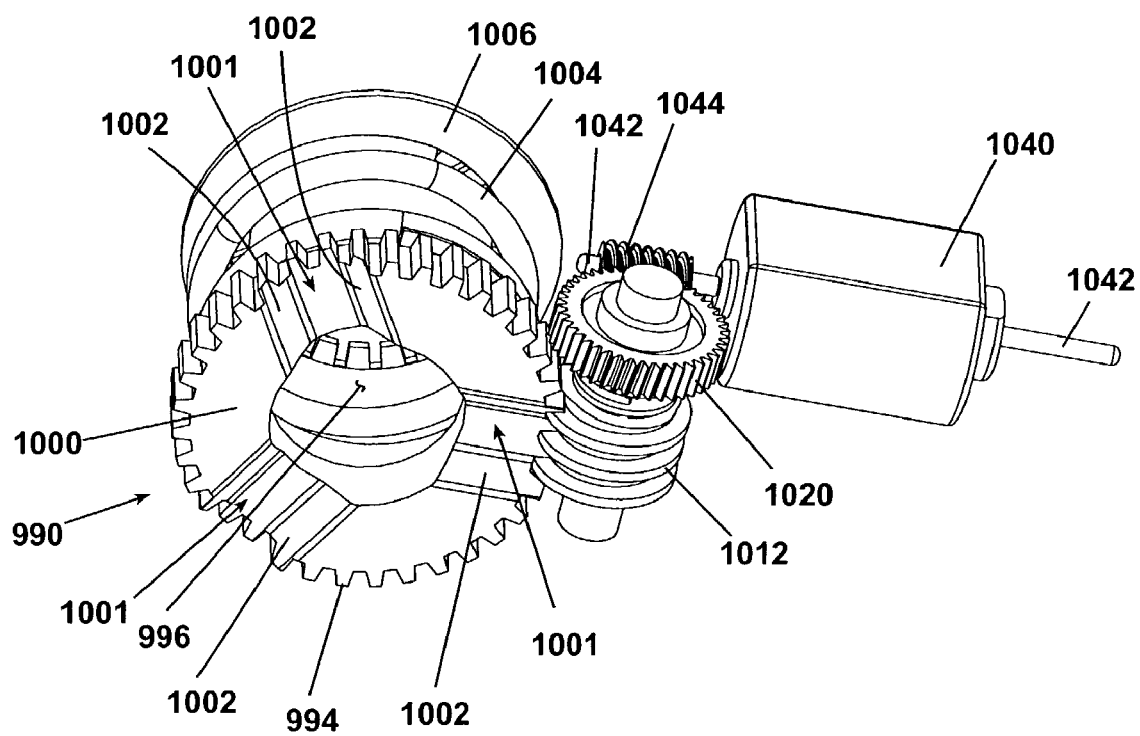
FIG. 92 is a perspective view of the drive assembly of FIG. 91 with non-essential elements removed for clarity.

Referring now to FIGS. 91 and 92, a pivot gear 990 comprises an annular body 992 having a plurality of circumferentially-spaced gear teeth 994 and a pivot post aperture 996 coaxially extending therethrough. The pivot post aperture 996 is adapted for slidable receipt of the pivot gear 990 over the pivot post 978.

Figure 98:
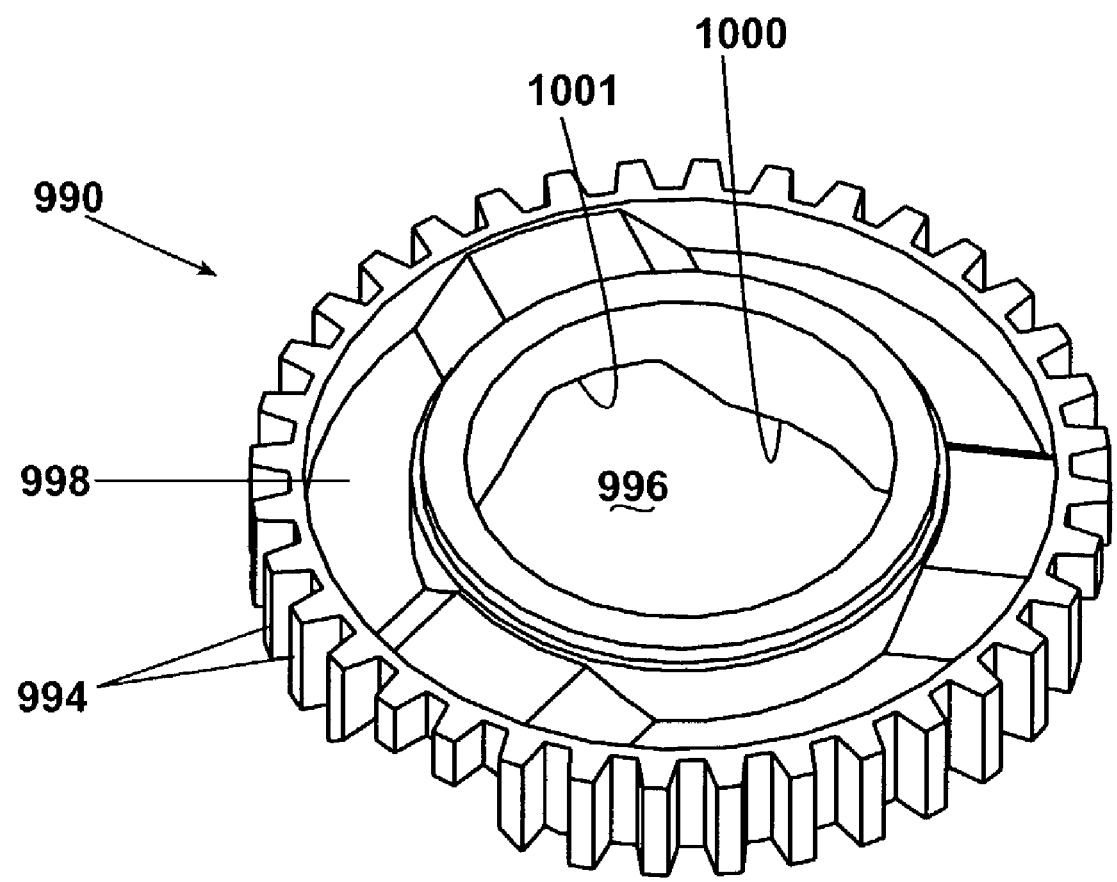
FIG. 98 is a perspective view of an element of the pivot assembly comprising a portion of the vehicular mirror assembly of FIG. 88.

Referring to FIG. 98, the pivot gear 990 has a generally planar top face 998 and a generally planar bottom face 1000 in parallel, spaced-apart relationship. The bottom face 1000 is provided with a plurality of radially extending detents 1001 comprising a pair of juxtaposed inclined walls 1002 for mating communication with the inner bosses 976.

In the preferred embodiment, the detents 1001 are positioned around the bottom face 1000 at an interval of approximately 120°. A helical spring 1004 having a size and spring rate sufficient for the purposes described herein is adapted for slidable insertion over the annular wall 944 to occupy the spring chamber 948. A generally conventional friction washer 1006 is adapted for frictional insertion over the pivot post 978 to be frictionally retained thereon.

Figure 93:
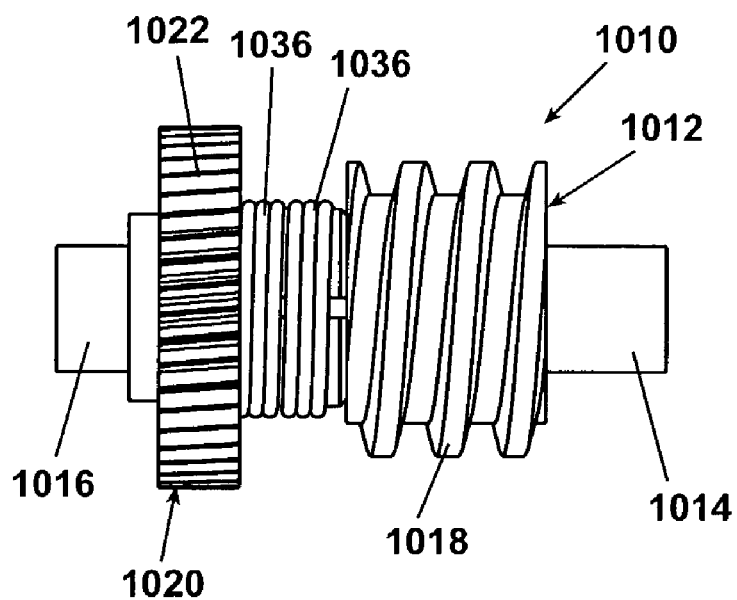
FIG. 93 is an elevation view of a helical gear and a clutch gear comprising a portion of the drive assembly of FIG. 92.
Figure 94:
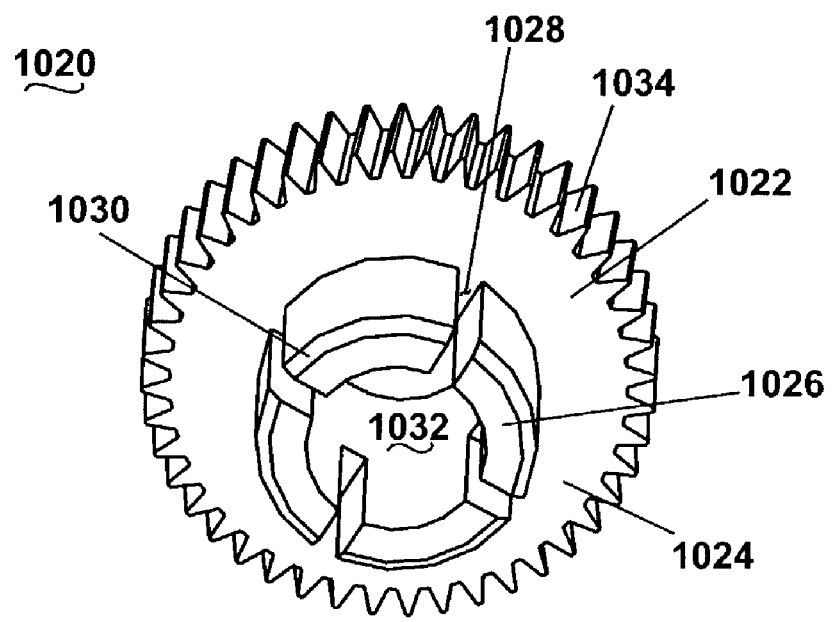
FIG. 94 is a perspective view of the clutch gear of FIG. 93.

Referring now to FIGS. 92–94, a drive assembly 1010 comprises a helical gear, such as the worm 1012 shown in FIGS. 92 and 93, a clutch gear 1020, an electric motor 1040, and a worm gear 1044. The worm 1012 is a somewhat cylindrically-shaped elongated member having a short shaft 1014, a long shaft 1016, and a gear portion 1018 in coaxial alignment. A clutch gear 1020 comprises an annular flange 1022 having a planar collar face 1024 transitioning to an annular collar 1026 extending coaxially from the annular flange 1022. The annular collar 1026 is provided with a plurality of radially-extending collar slots 1028 extending through the annular collar 1026 to divide the collar 1026 into arcuate collar fingers 1030. In the preferred embodiment, the slots are spaced at 90° to form four equally spaced collar fingers 1030. The annular collar 1026 defines a cylindrical shaft bore 1032 for slidably receiving the long shaft 1016. The circumference of the annular flange 1022 is provided with a plurality of gear teeth 1034. A clutch spring 1036 comprises a helical spring adapted for frictional insertion over the annular collar 1026 to exert an inwardly directed compressive force on the collar fingers 1030, thereby comprising a force-modifying device.

The motor 1040 is a generally conventional 12-volt DC electric motor having an axle 1042 extending therethrough fitted with a worm gear 1044 for rotation as the motor 1044 is operated. The worm gear 1044 is adapted for operable communication with the clutch gear 1020. The worm 1012 is adapted for operable communication with the pivot gear 990.

As assembled, the clutch spring 1036 urges the collar fingers 1030 into frictional communication with the long shaft 1016 so that the rotation of the clutch gear 1020 will urge the worm 1012 into rotation. However, if a resistance of a sufficient magnitude prevents the rotation of the worm 1012, the clutch gear 1020 will overcome the frictional resistance between the fingers 1030 and the long shaft 1016 and the clutch gear 1020 will rotate. As shown in FIG. 92, as the motor 1040 is operated, the rotation of the worm gear 1044 will rotate the clutch gear 1020 which will, in turn, rotate the worm 1012. Rotation of the worm 1012 will rotate the pivot gear 990. The assemblage of the motor 1040 and the drive assembly 1010 is fixedly retained in a suitable housing in the frame 918.

Figure 97:
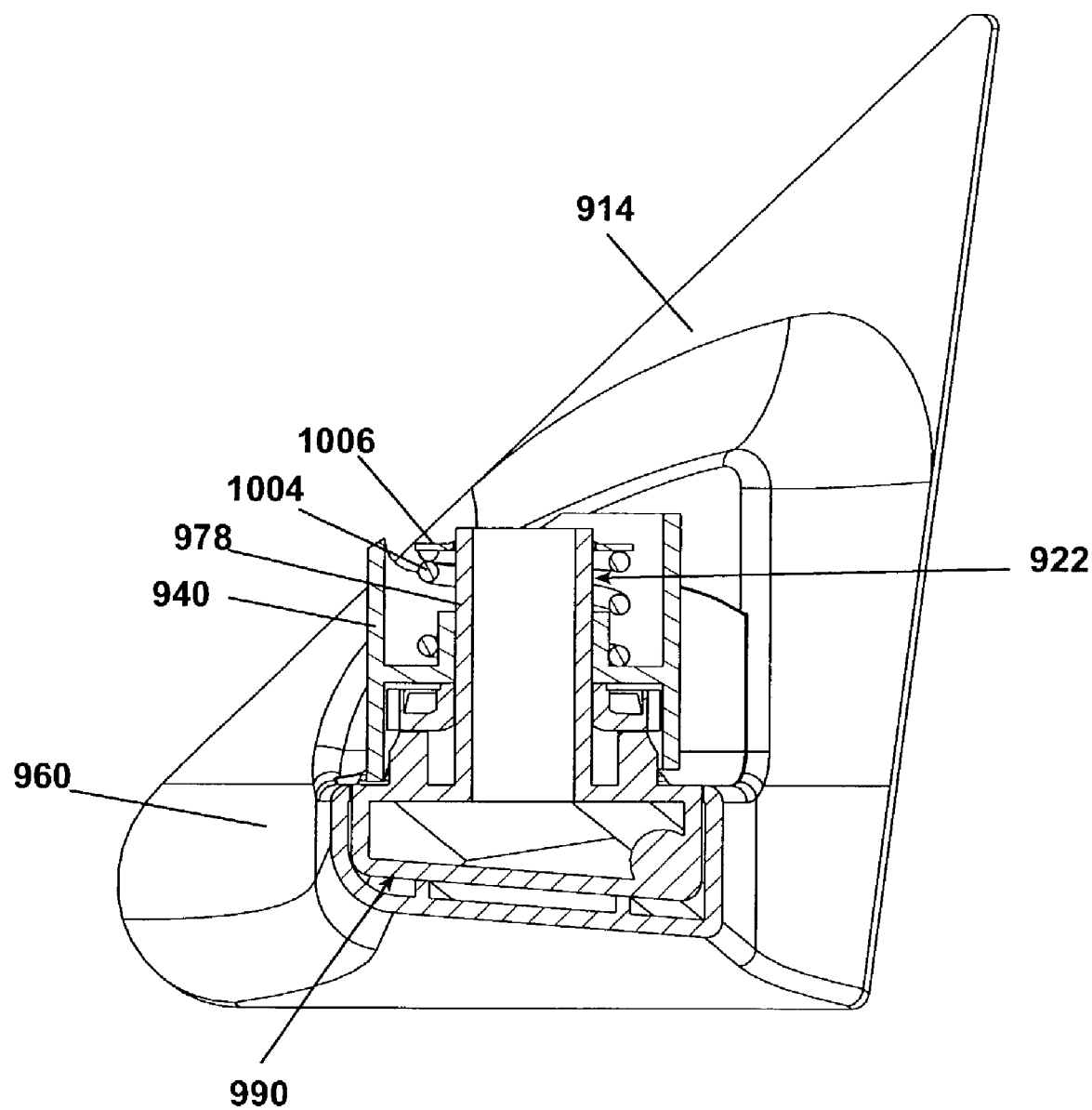
FIG. 97 is a sectional view taken along line 97—97 of FIG. 89.

As shown in FIG. 97, the pivot assembly 922 is assembled by placing the pivot gear 990 over the pivot post 978 for slidable rotation of the pivot gear 990 around the pivot post 978. The pivot gear 990 is initially oriented so that the inner bosses 976 engage the detents 1001. The pivot assembly housing 930 is then assembled to the pivot base 964 by inserting the pivot bore 946 over the pivot post 978 so that the annular floor 942 engages the top face 998 of the pivot gear 990. The pivot spring 1004 is then inserted over the pivot post 978 in contact with the annular floor 942 and secured in place by the friction washer 1006 inserted over the pivot post 978. As so assembled, the spring 1004 will tend to urge the pivot assembly housing 930 downwardly against the pivot gear 990, urging the pivot gear 990 downwardly against the collar 970. In the preferred embodiment, the bottom faces 956 of the bosses 952 will be spaced away from the annular floor 966. In its normally operated condition, the pivot gear 990 will remain fixed relative to the pivot frame 960.

As shown in FIGS. 91 and 92, as discussed above, the worm 1012 is in operable communication with the pivot gear 990 so that the worm 1012 will travel along the pivot gear 990 as the worm 1012 is rotated. In the assemblage described herein, rotation of the worm 1012 will cause the drive assembly 1010 to traverse the perimeter of the pivot gear 990, thus pivoting the frame 918 relative to the pivot frame 960. When the inclined faces 954 of the bosses 952 contact the inclined faces 984 of the outer bosses 974, the frame 918 will stop relative to the pivot frame 960, corresponding to either the fully extended or fully retracted position. If the motor 1040 continues to operate, the worm 1012 will be prevented from rotating. However, the clutch gear 1020 will slip relative to the worm 1012 and will continue to turn until the motor 1040 reaches a shutoff condition.

In the event that the vehicular mirror assembly 910 is forced from a fully extended position or a fully retracted position, such as by an unintended impact, the pivot gear 990 will rotate relative to the pivot frame 960 if the impact is sufficient to overcome the interlocking of the inner bosses 976 and the detents 1001. The bosses 952 will also be urged into moving relative to the outer bosses 974. The detents 1001 will disengage from the inner bosses 976 by the inclined walls 1002 traveling upwardly and along the inclined faces 986. At the same time, the frame 918 can rotate relative to the pivot frame 960 by the inclined faces 954 traveling upwardly and along the inclined faces 984 to translate the bosses 952 relative to the outer bosses 974. It will be obvious that this movement must overcome the compression of the spring 1004 tending to resist the upward movement of the pivot gear 990 and the frame 918. The compression of the spring 1004, and also the force needed to move the mirror assembly 910, can be adjusted by the positioning of the friction washer 1006 on the pivot post 978 to selectively provide a greater or lesser compressive force.

If the vehicular mirror assembly 910 is forced from a fully extended position or a fully retracted position as described above, the pivot gear 990 will pivot so that the bottom face 1000 intermediate the detents 1001 is in supported communication with the inner bosses 976, thereby "raising" the pivot gear 990 and the frame 918 relative to the pivot base 964. The outer bosses 974 are shorter than the inner bosses 976 so that, once the bottom face 1000 is supported on the inner bosses 976, the bosses 952 will clear the outer bosses 974 and the frame 918 can further rotate freely relative to the pivot base 964. The force of the spring 1004 will urge the bottom face 1000 against the inner bosses 976, and the frictional force between the bottom face 1000 and the inner bosses 976 will tend to resist movement between the bottom face 1000 and the inner bosses 976. In order to return the mirror assembly 910 to its operable condition with the pivot gear 990 positioned so that the inner bosses 976 are again received in the detents 1001, the mirror assembly 910 is activated by the driver of the vehicle for retraction. This will cause the worm gear 1012 to travel along the perimeter of the pivot gear 990, which will not rotate due to the frictional force between the bottom face 1000 and the inner bosses 976, and which will tend to pivot the frame 918 toward the fully retracted position. Once the frame 918 reaches the fully retracted position, further rotation of the frame 918 will be prevented, such as by a suitable assembly comprising mechanical stops as is well-known in the industry. Consequently, the frictional force between the bottom face 1000 and the inner bosses 976 will be exceeded, and the worm gear 1012 will begin to rotate the pivot gear 990 until the inner bosses 976 are received in the detents 1001, and the pivot gear 990 is returned to its normal operating position on the pivot base 964 for extension and retraction as previously described herein.

The novel pivot assembly provides a simplified clutch mechanism comprising a minimum of elements for operating a power folding mirror which provides protection against motor damage without complex motor shutoff devices. The pivot assembly also provides a simplified mechanism for accommodating unintended impact to the mirror assembly tending to force the mirror from its fully extended or fully retracted positions without damage to the pivot assembly or the mirror.

FIGS. 99–104 illustrate a seventh embodiment comprising a pivot connection for a mirror assembly having a circular array of electrical contacts incorporated into the pivot connection. The circular array of electrical contacts maintain electrical conductivity for power and control signals between the vehicle's power supply and control center and the various power functions incorporated into the mirror irrespective of the pivotal orientation of the mirror.

Figure 99:
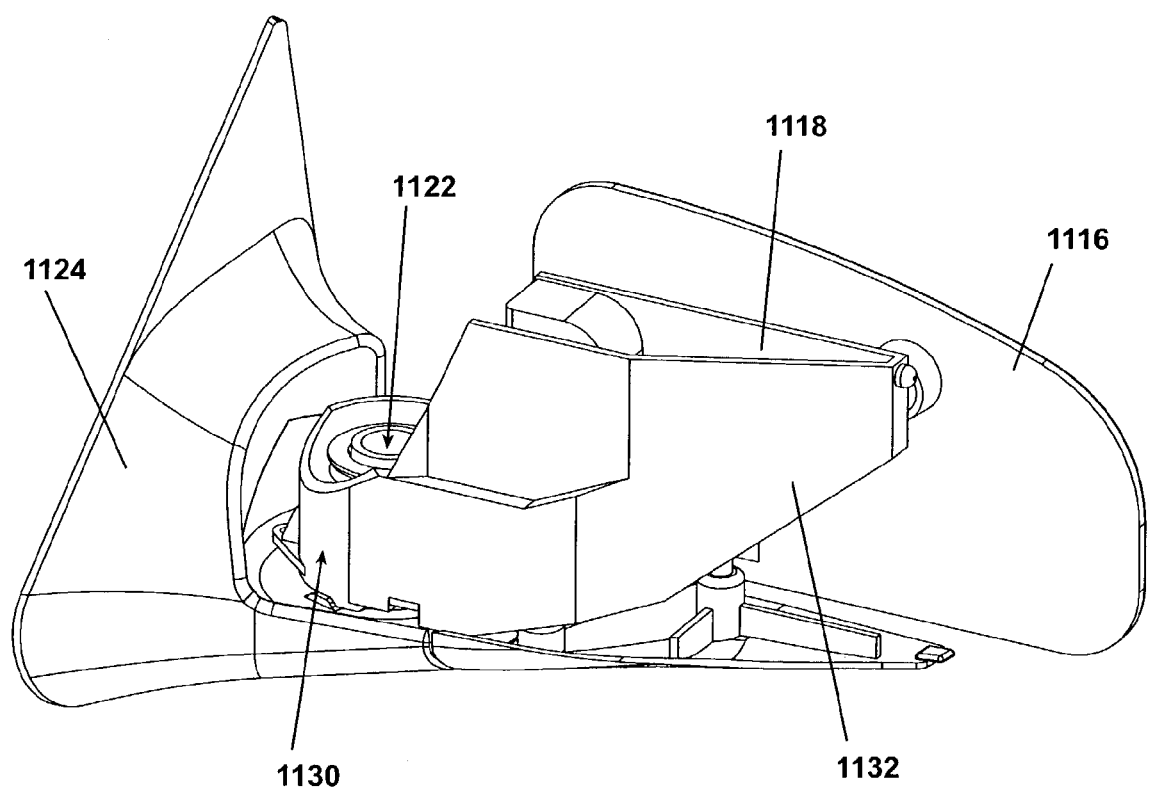
FIG. 99 is a close-up perspective view of the interior of the vehicular mirror assembly of FIG. 1 showing a seventh embodiment of a vehicular mirror assembly having a pivot connection connecting the reflective element assembly to the base for use with the vehicular mirror assembly of FIGS. 1 and 15.
Figure 103:
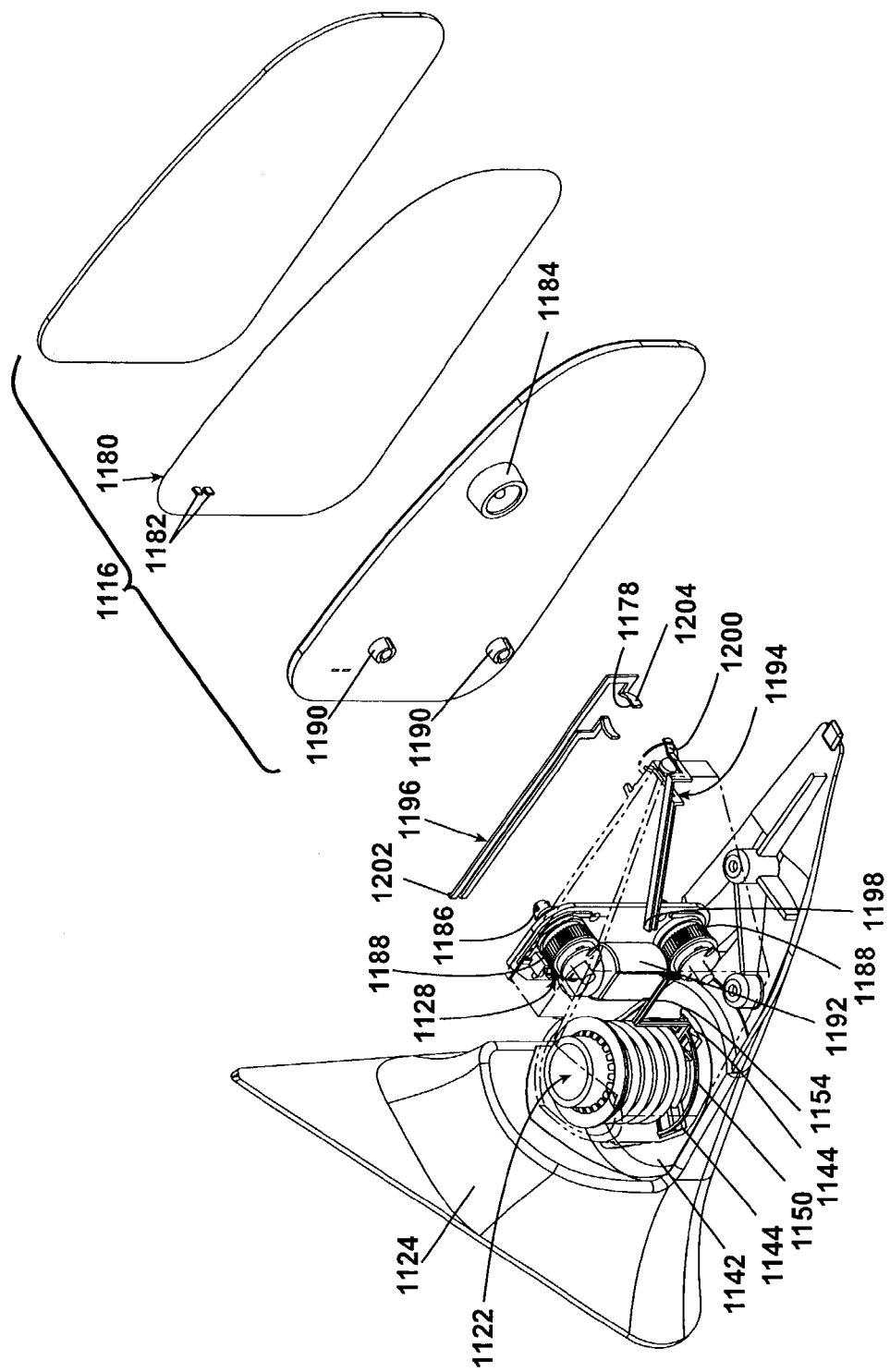
FIG. 103 is a perspective view of an alternative embodiment of the electrical routing assembly of FIGS. 99–102 showing a bracket portion of the mirror assembly in phantom and having the mirror housing removed both for purposes of clarity to show features of this embodiment relating to the provision of a routing system for a heater element through a mirror pivot portion.

Referring also to FIGS. 99 and 103, the reflective element assembly 1120 comprises a reflective element or mirror 1116 mounted to a glass case 1114, which is mounted in turn to a frame 1118 comprising a first portion having a reflective element mounting arm 1132 for mounting the reflective element 1116 and a second portion having a pivot assembly housing 1130 comprising a portion of the pivot assembly 1122.

Figure 100:
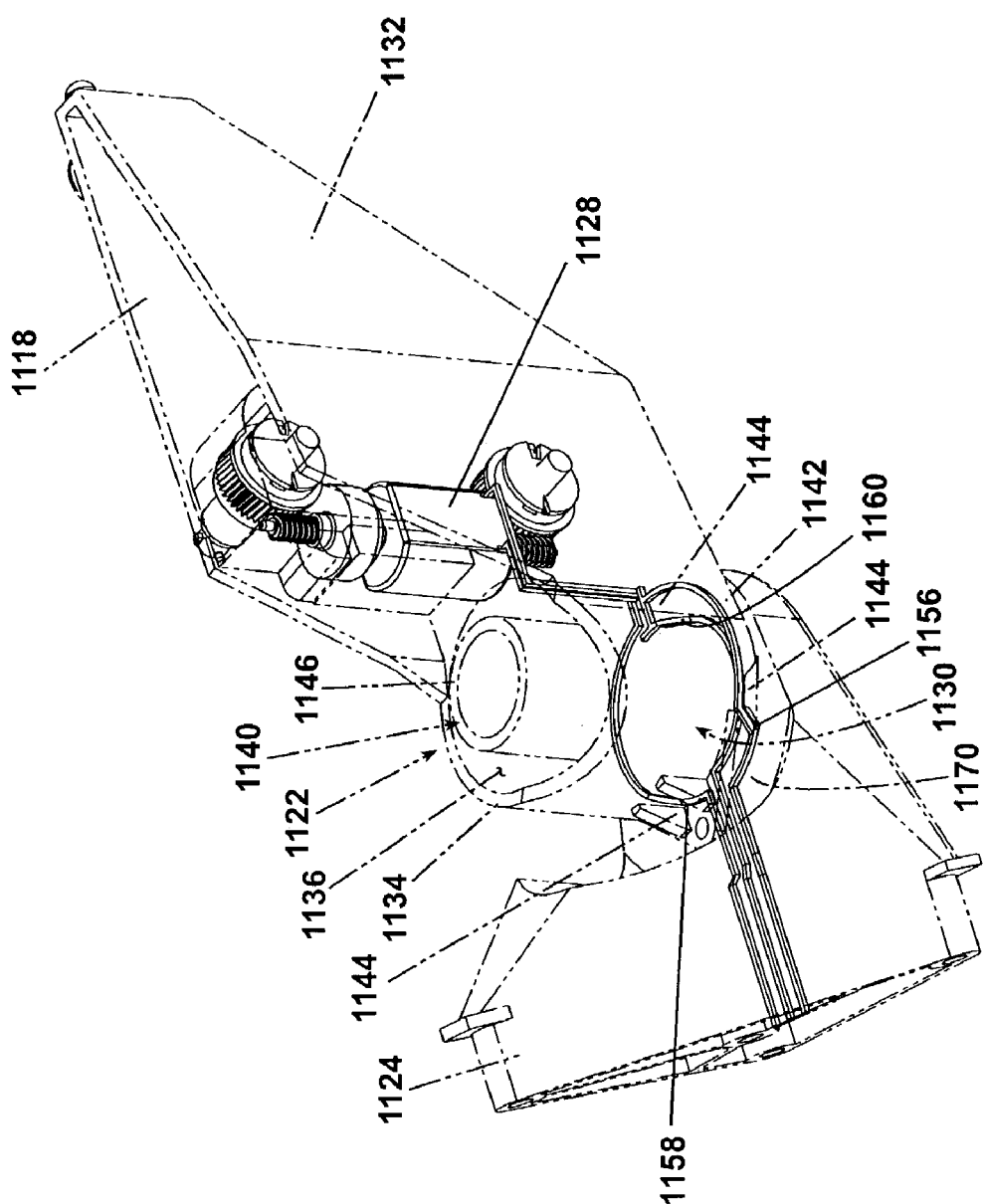
FIG. 100 is a perspective view with portions in phantom of the reflective element assembly and pivot connection of FIG. 99 showing the electrical connection of a motorized reflective element tilt actuator to the vehicle's power supply and on-board controls through an electrical routing assembly integrated into the pivot connection according to the invention.

As shown in FIG. 100, a single motor tilt actuator assembly 1128 is mounted to the frame 1118. The reflective element 1116 is mounted to the tilt actuator assembly 1128 for selectively tilting the reflective element 1116 about a horizontal axis and a vertical axis upon operation of the tilt actuator assembly 1128. Examples of a single motor actuator assembly are disclosed in U.S. Patent Applications No. 60/319,411 entitled "Single Motor Actuator With Selectable Multiple-Output Axes And Vehicle Mirror Incorporating Same," filed Jul. 19, 2002; 60/319,176 entitled "Single Motor Actuator With Selectable Multiple Output Axle And Vehicle Mirror Incorporating Same," filed Apr. 9, 2002; and 60/319,637 entitled "Electric Motor With Selective Dual Shaft Output," filed Oct. 21, 2002, all of which are incorporated herein by reference.

Figure 101:
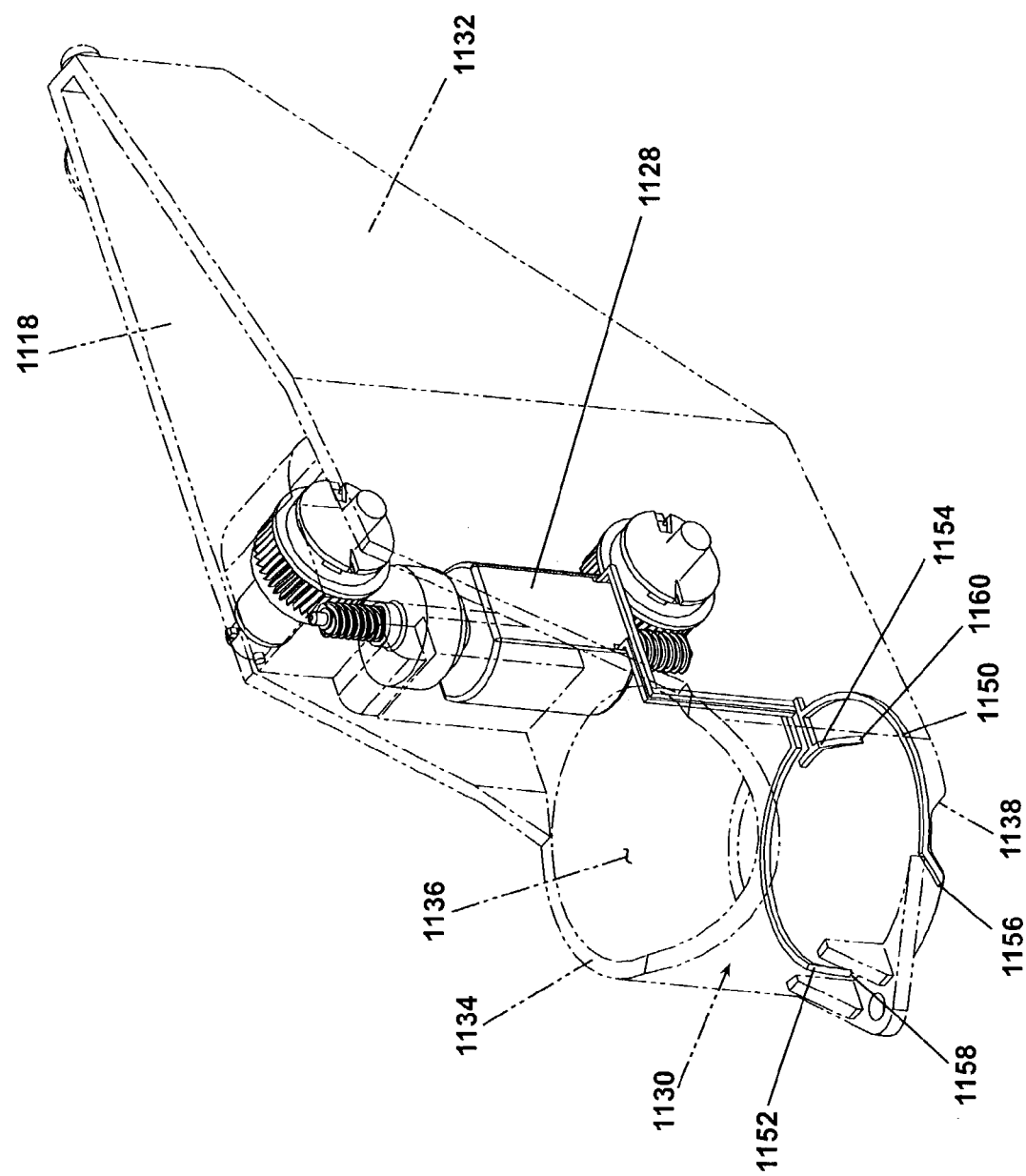
FIG. 101 is a perspective view with portions in phantom of the reflective element assembly shown in FIG. 100 illustrating a portion of the electrical routing assembly.

Referring also to FIG. 101, the pivot assembly housing 1130 comprises an annular wall 1134 defining a pivot chamber 1136. Spaced about the lower edge of the annular wall 1134 at regular intervals, preferably intervals of 120°, are recesses 1138. Electrodes, such as electrical leads 1150, 1152, 1154, comprise electrically-conductive conduits, such as copper wire or straps, and extend along the annular wall 1134 in radially-spaced juxtaposition and through the frame 1118 for operable communication with the tilt actuator assembly 1128. As shown in FIG. 101, the outer lead 1150 extends adjacent the outer periphery of the annular wall 1134 to terminate in a downwardly-depending outer contact 1156. The intermediate lead 1152 extends along the center of the annular wall 1134 to terminate in a downwardly-depending intermediate contact 1158. The inner lead 1154 extends adjacent the inner periphery of the annular wall 1134 to terminate in a downwardly-depending inner contact 1160. The contacts 1156, 1158, 1160 are in corresponding communication with the recesses 1138, and thus are spaced at regular intervals along the annular wall 1134, preferably intervals of 120°. As shown in FIG. 101, the contacts 1156, 1158, 1160 extend through the bottom of the annular wall 1134 to form regularly-spaced electrical contact points along the bottom of the annular wall 1134. The leads 1150, 1152, 1154 are adapted to carry electrical power and control signals to the tilt actuator assembly 1128 from the power supply and onboard controls in the vehicle (not shown).

Figure 102:
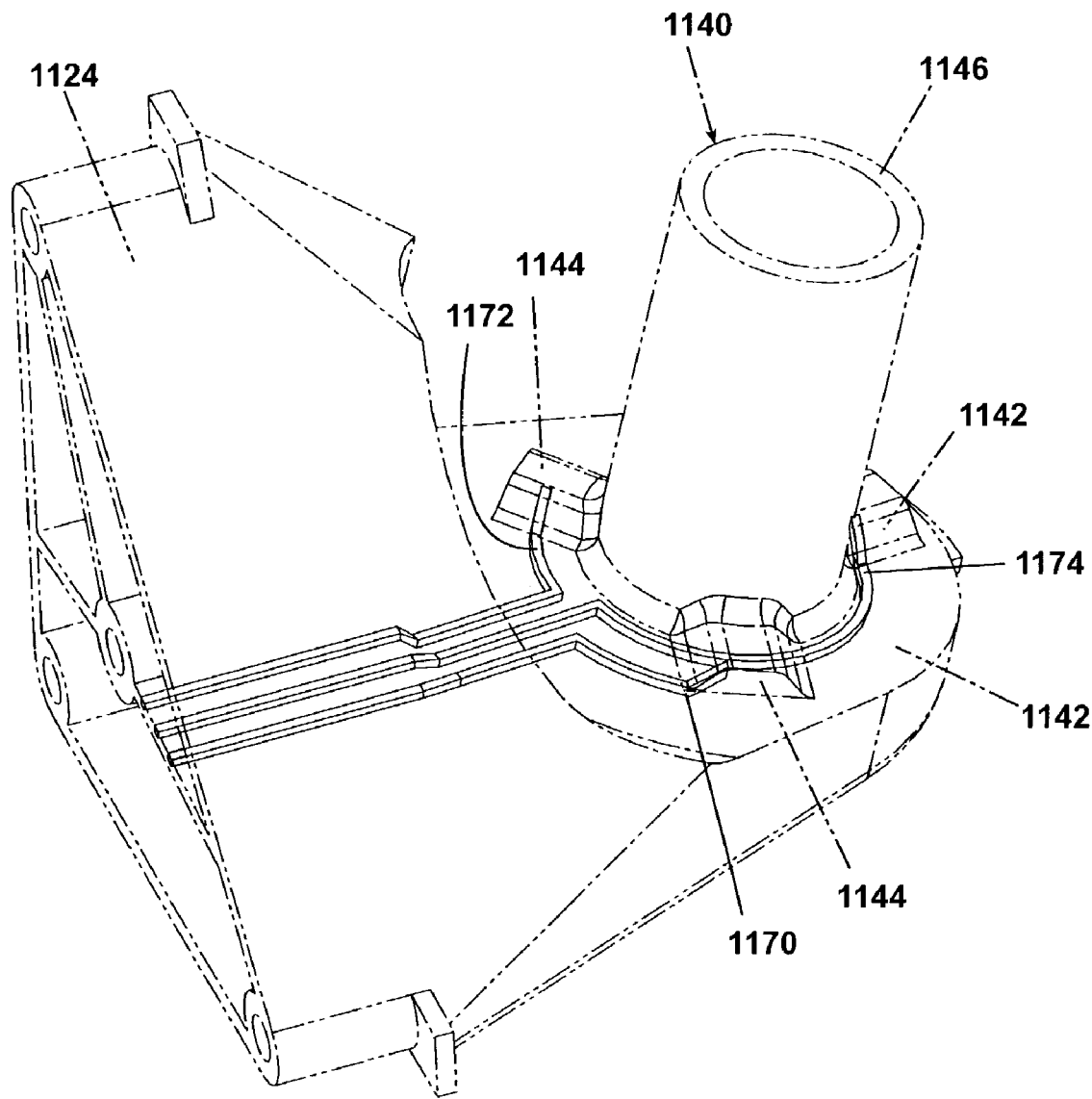
FIG. 102 is a perspective view with portions in phantom of the base shown in FIG. 100 illustrating a portion of the electrical routing assembly.

Referring also to FIG. 102, the base 1124 comprises a pivot portion 1140 comprising an annular floor 1142 and an annular wall 1146 extending upwardly therefrom for slidable insertion in the pivot chamber 1136 and pivotal movement of the frame 1118 relative to the base 1124. Spaced circumferentially about the annular wall 1146 for cooperative communication with the recesses 1138 are upwardly-extending bosses 1144. Electrodes, such as electrical feeds 1170, 1172, 1174, comprise electrically-conductive conduits, such as copper wire or straps, and extend in radially-spaced arcuate paths along the annular floor 1142 for operable communication with the contacts 1156, 1158, 1160, respectively. The outer feed 1170 is adapted for electrical contact with the outer contact 1156. The intermediate feed 1172 is adapted for electrical contact with the intermediate contact 1158. The inner feed 1174 is adapted for electrical contact with the inner contact 1160. As shown in FIG. 102, the electrical feeds 1170, 1172, 1174 extend onto the bosses 1144.

Referring again to FIG. 100, when the frame 1118 is assembled to the base 1124 so that the annular wall 1140 is received in the pivot chamber 1136, the outer contact 1156 will be in electrical communication with the outer feed 1170, the intermediate contact 1158 will be in electrical communication with the intermediate feed 1172, and the inner contact 1160 will be in electrical communication with the inner feed 1174. As the frame 1118 pivots relative to the base 1124, the contacts 1156, 1158, 1160 will travel along the feeds 1170, 1172, 1174, respectively, maintaining electrical communication of the tilt actuator assembly 1128 with the power supply and onboard controls in the vehicle. When the reflective element assembly 1120 is folded completely against the vehicle, the bosses 1144 will be displaced relative to the recesses 1138, thereby breaking the communication between the contacts 1156, 1158, 1160 and the feeds 1170, 1172, 1174. However, with the reflective element assembly 1120 folded against the vehicle, electrical communication of the tilt actuator assembly 1128 with the power supply and onboard controls in the vehicle will be unnecessary.

The leads 1150, 1152, 1154 can be integrated into the base 1124, the annular floor 1142, and the bosses 1144, and the feeds 1170, 1172, 1174 can be integrated into the frame 1118, the annular wall 1134, and the recesses 1138 through a suitable method of forming electrical circuits on or in a substrate, such as sputtering the material onto the substrate, or embedding the leads and feeds into the substrate.

Figure 104:
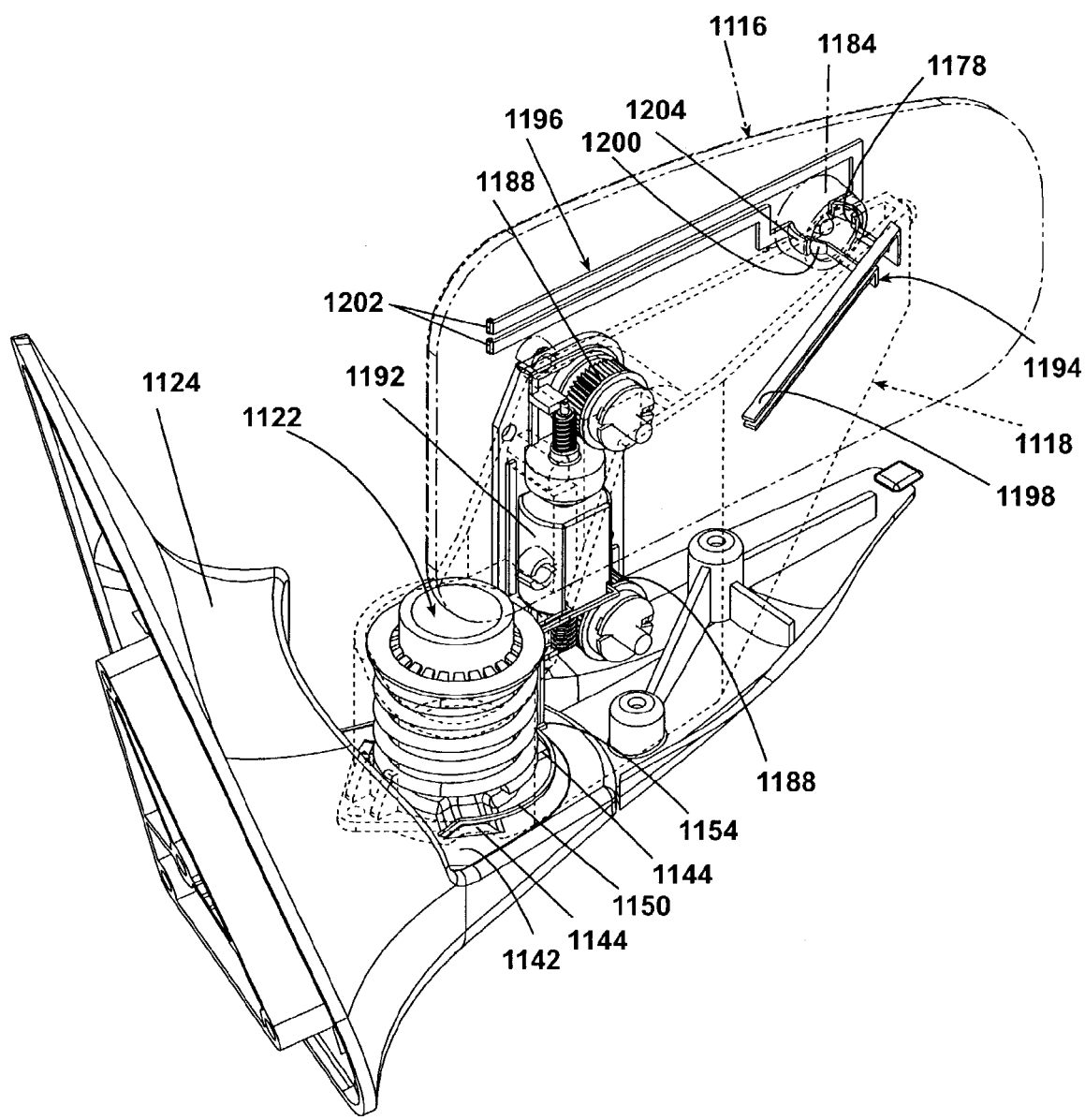
FIG. 104 is an enlarged perspective view paying particular attention to the interengagement of a pivot on the bracket portion with a socket portion on a mirror carrier with intergrated electrical routing straps for interconnecting an electrical routing assembly like that of the first embodiment of FIGS. 99–102 with the heater element.

A second embodiment of the electrical routing assembly shown in FIGS. 99–102 is shown in FIGS. 103–104. FIG. 103 is a perspective view showing the reflective element mounting arm 1132 in phantom and having an external housing removed both for purposes of clarity to show features of this embodiment relating to the provision of a routing system for a heater element (referred to herein with reference numeral 1180) through a mirror pivot mount 1178 on the mounting arm 1132.

The heater element 1180 can comprise any suitable heater, typically used for defrosting and other heating functions performed on the reflective element 1116. In this case, a generally planar heating pad is shown having a pair of conductive terminals 1182 thereon is shown as an exemplary structure suitable for the heater element 1180. It will be understood that any known heater element for a mirror can be employed herein without departing from the scope of this invention.

With reference to FIGS. 103–104, the pivot mount 1178 on the mounting arm 1132 is preferably gimbaled to a juxtaposted socket 1184 on the reflective element 1116. In addition, distal ends 1186 of actuators 1188 are interconnected in a known manner to the motor 1192 on the tilt actuator assembly 1128 are suitably mounted within juxtaposed recesses 1190 on the reflective element 1116, preferably on a backside thereof.

One feature of this embodiment is the provision of first and second jumper leads 1194 and 1196 located on the mounting arm 1132 and the reflective element 1116, respectively. The first jumper leads 1194 comprise elongated conductive members having a first end 1198 connected to at least one of the leads 1150–1154 and can be interconnected via the motor 1192. The first jumper leads 1194 also have a second end 12100 formed to the periphery of the pivot mount 1178 of the mounting arm 1132. As can be seen in FIGS. 103–104, the second end 1200 of the first jumper leads 1194 extend along a stem portion of the pivot mount 1178 and around a facial portion thereof.

The second jumper leads 1196 comprise elongated conductive members having a first end 1202 formed for connection the terminals 1182 on the heater element 1180. The second jumper leads 1196 also have a second end 1204 formed to the interior periphery of the socket 1184 of the reflective element 1116. As can be seen in FIGS. 103–104, the second end 1204 of the second jumper leads 1196 extend into the interior portion of the socket 1184 preferably in juxtaposition with the first jumper leads 1194 located on the pivot mount 1178 of the mounting arm 1132.

In assembly, the second embodiment of FIGS. 103–104 can be employed, according to the invention, to interconnect the heater element 1180 with the electrical circuit embedded in the mirror assembly formed by the leads and contacts 1150–1160 as described with respect to FIGS. 99–102. Each of the first and second jumper leads 1194 and 1196 can comprise any suitable conductive structure, such as the exemplary pair of parallel, conductive tracks shown in FIGS. 103–104.

The first end 1198 of the first jumper leads 1194 are electrically interconnected to one or more of the suitable leads and contacts 1150–1160 described with respect to FIGS. 99–102. The electrical connections to the motor 1192 can be employed, especially with respect to a common lead, as would be apparent to one skilled in the art. The second end 1200 of the first jumper leads 1194 are mounted as described above with the second end 1200 formed around the pivot mount 1178 of the mounting arm 1132.

The first end 1202 of the second jumper leads 1196 are electrically interconnected with the terminals 1182 on the heater element 1180 in a known manner. The second end 1204 of the second jumper leads 1196 are mounted as described above with the second end 1204 embedded into and extending into the interior periphery of the socket 1184 on the reflective element 1116. As can be seen in FIG. 104, the second end 1200 of the first jumper leads 1194 make an electrical connection with the second end 1204 of the second jumper leads 1196 when the pivot mount 1178 of the mounting arm 1132 is gimbaled within the socket 1184 on the reflective element 1116.

As will be appreciated by one skilled in the art, the leads 1194 and 1196, especially the second ends 1200 and 1204 thereof, are preferably sized and mounted to their corresponding pivot mount 1178 and socket 1184 so that no short circuiting can occur between the first and second jumper leads 1194 and 1196. As can be appreciated, as the reflective element 1116 is pivoted with respect to the mounting arm 1132 (such as through the action of the actuators 1188 of the tilt actuator assembly 1128), the position of the second end 1200 of the first mounting leads 1194 can angularly adjust with respect to the second end 1204 of the second mounting leads 1196. However, due to the juxtaposed relationship of the second ends 1200 and 1204 of the first and second jumper leads 1194 and 1196 as well as the gimbal mounting of the pivot mount 1178 within the socket 1184, an electrical connection is maintained between the first and second leads 1194 and 1196, respectively, without regard to the particular angular or gimbal movement of the reflective element 1116 with respect to the mounting arm 1132.

In this manner, the heater element 1180 can be electrically interconnected to the leads and contacts 1150–1160 without requiring a separate wiring routing and/or harness for such interconnection. It will also be understood that, although an interconnection between the heater element 1180 and the electrical routing system is shown as a pair of jumper leads interconnected through the gimbal connection at the pivot mount of 1178, the jumpers can also simply be conventional jumper wires/leads interconnecting the heater element 1180 (onboard with the reflective element 1116) with the electrical routing assembly onboard with the mounting arm and associated other portions of the mirror assembly without departing from the scope of this invention.

Another feature of the mirror assembly is also shown in FIGS. 103–104 in that a modified version of the leads and contacts 1150–1160 are shown. Specifically, the leads 1150–1154 are shown having a raised portion which extends above the bosses 1144 on the annular floor 1142 of the pivot portion 1140. In this manner, the electrical connection is maintained between the leads 1150–1154 and contacts 1156–1160 regardless of whether the pivot portion 1140 is placed into an overtravel condition through contact or other manual manipulation. That is, contrary to the previous embodiment of FIGS. 99–102, the mirror assembly maintains its electrical communication throughout the system during a normal range of travel of the pivot portion 1140 and any overtravel portions since the raised nature of the leads 1150–1154 maintain contact with the contacts 1156–1160 throughout all ranges of travel.

The electrical routing assembly described herein provides electrical communication between two pivoting parts without the complicated wiring and equipment failure experienced with conventional wire harnesses. The assembly of the electrical system is simplified and all electrical hookups are made upon assembling the reflective element assembly to the base, thereby eliminating a separate wiring step in the manufacturing process. All necessary electrical communication can be provided through a set of contacts which travel along mating electrodes.

Figure 105:
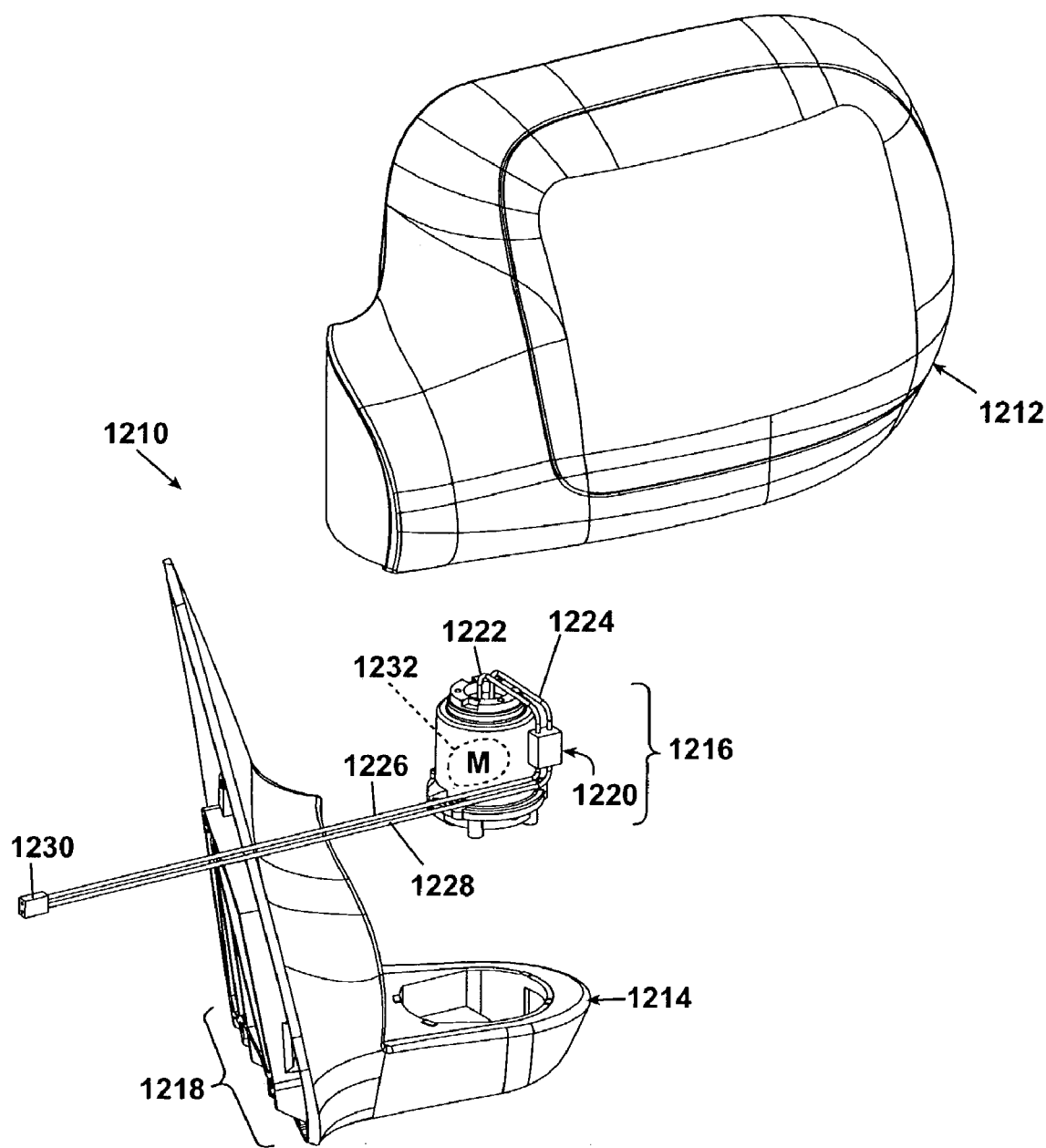
FIG. 105 is an exploded perspective view of an eighth embodiment of a vehicular mirror assembly having a mirror housing mounted to a base adapted to be mounted to a vehicle, the mirror assembly including a power assist device with a motor interconnected to a shut-off circuit according to the invention.

Referring now to FIG. 105, an eighth embodiment of a vehicular mirror assembly 1210 is shown comprising a housing 1212, a base 1214 and a power assist device 1216. The base 1214 includes mounting components (shown generally by reference numeral 1218) for attaching the base to an exterior portion of a vehicle.

The power assist device 1216, while shown by example as a device for pivotally moving the housing 1212 with respect to the base 1214, can be any motor-driven device including, but not limited to, a mirror adjustment motor, a linear mirror housing extender, and the like. Examples of these power assist devices 1216 can be found in U.S. Pat. Nos. 6,206,553, 6,276,808 and 6,213,609, issued, respectively, on Mar. 27, 2001, Aug. 21, 2001, and Apr. 10, 2001, each of which is respectively incorporated herein by reference and not further described herein.

Figure 106:
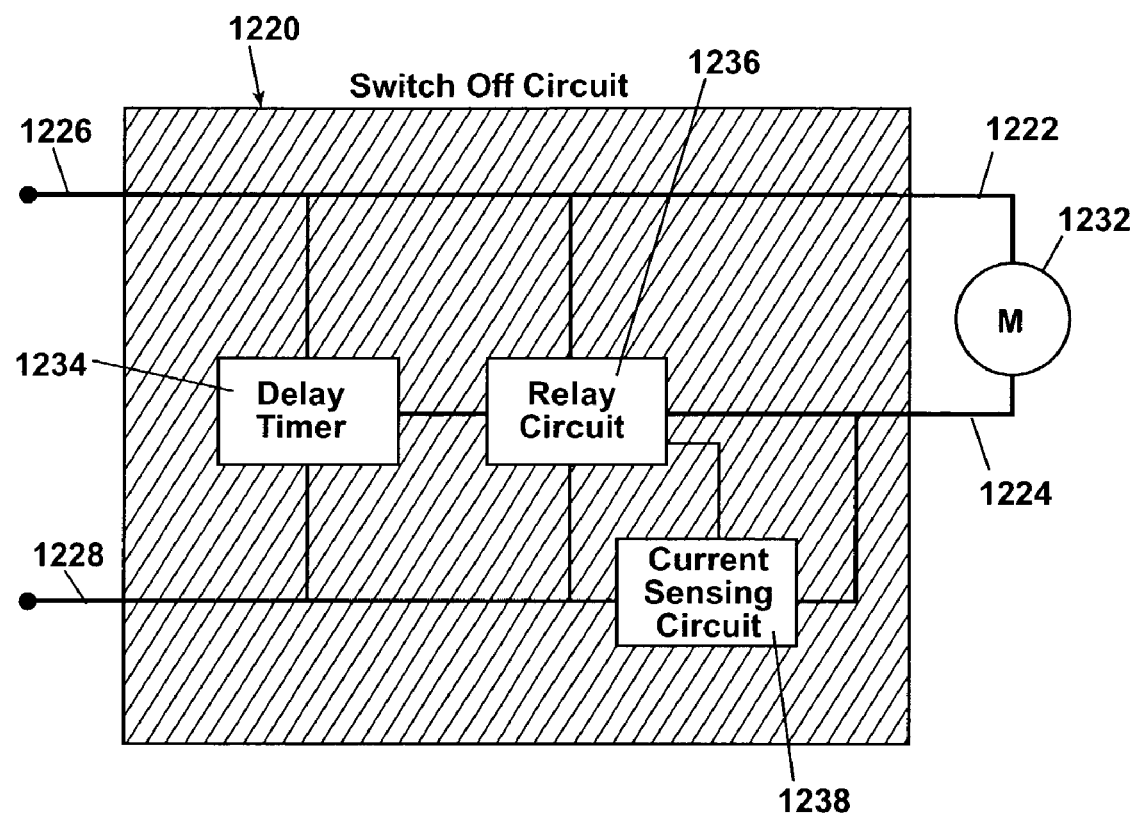
FIG. 106 is a schematic view of the shut-off circuit of FIG. 105.

With reference to FIGS. 105–106, the power-assist device 1216 includes a motor shut-off circuit 1220 which has first and second leads 1222 and 1224 preferably interconnected to a motor 1232 of the power-assist device 1216 and third and fourth leads 1226 and 1228 preferably interconnected to an on-board controller (not shown) via a connector 1230. The shut-off circuit 1220 comprises a delay timer 1234, a relay circuit 1236 and a current-sensing circuit 1238 interconnected between the third and fourth leads 1226, 1228, and a motor 1232 via the first and second leads 1222, 1224. The delay timer 1234 preferably prevents premature switching due to an inrush of current to the motor upon the startup of the motor 1232. The relay circuit 1236 and the current-sensing circuit 1238 operate as a latching mechanism which preferably resets at the instant supply power via the third and fourth leads 1226, 1228 is removed, thereby allowing the motor 1232 to be used again without delay.

The delay timer 1234, the relay circuit 1236 and the current sensing circuit 1238 incorporated within the motor shut-off circuit 1220 will now be described with respect to FIGS. 107–111 in greater detail. It will be understood that, the specific circuitry making up the motor shut-off circuit 1220 is shown by example as one appropriate configuration for accomplishing the structure and functions outlined herein, but shall not be construed as limiting on the scope of this invention. Rather, other circuitry components could be substituted for those shown in FIGS. 107–111 without departing from the scope of the invention. It will also be understood that particular characteristics of the circuitry components shown in FIGS. 107–111 are by example only, such as resistance and capacitance values, and such values should not be construed as limiting on the scope of the invention.

With respect to the circuit diagrams shown in FIGS. 107–111, it can be seen upon an examination of these figures that the motor shut-off circuit shown in the example of FIGS. 107–111 is made up of capacitors, diodes, resistors, and relays. In order to ensure consistency and clarity in the description provided herein as well as to comport with typical electrical/circuit diagram conventions the first character making up each identifier of a circuitry component is identified with a letter corresponding to the particular type of component followed by a unique numerical identifier. For example, reference numerals for capacitors begin with a "C" (e.g., C1, C2, . . . ), diodes begin with a "D" (e.g., D1, D2, . . . ), resistors begin with a "R" (e.g., R1, R2, . . . ), transistors begin with a "Q" (e.g., Q1, Q2, . . . ), and relays begin with a "U" (e.g., U1, U2, . . . ). Various nodes on the shut-off circuit 1220 have reference numerals which begin with an "N" (e.g., N1, N2. . . . ).

Figure 107:
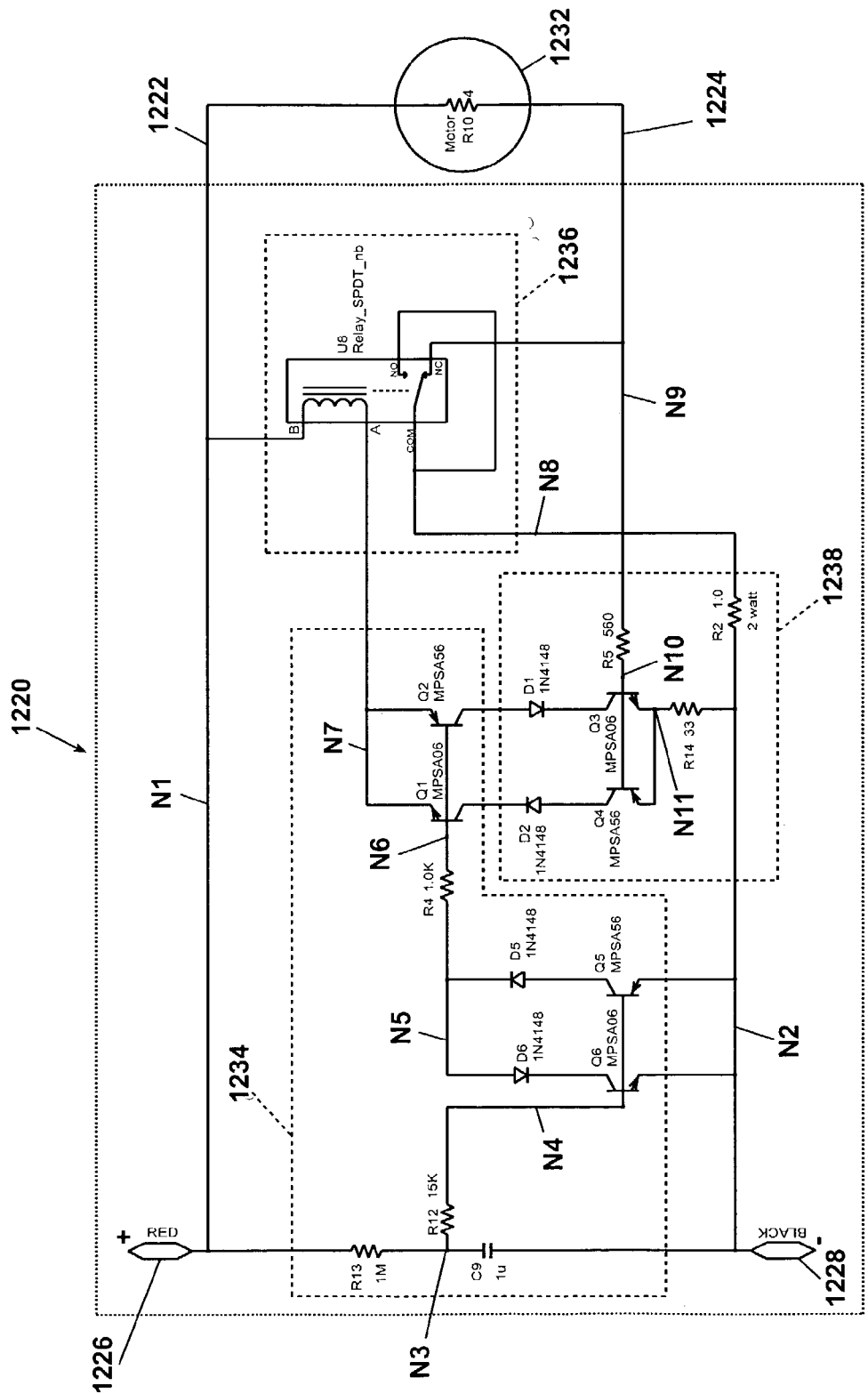
FIG. 107 is a circuit diagram of an embodiment of the shut-off circuit of FIG. 105.

Turning to the example configuration of the motor shut-off circuit 1220 shown in FIG. 107, nodes N1 through N11 are shown on the circuit diagrams. The third and fourth leads 1226, 1228 (respectively identified with typical wire identifiers RED and BLACK) are connected to separate nodes N1 and N2, respectively. Resistor R13 is located between nodes N1 and N3. Capacitor C9 is located between nodes N3 and N2. Resistor R12 is located between nodes N3 and N4. Node N4 terminates into base emitter junction of transistor Q6. Transistor Q6 and diode D6 are wired in parallel with transistor Q5 and diode D5 between nodes N5 and N2. Resistor R4 is located between nodes N5 and N6 which, in turn, terminates in a base emitter junction of transistor Q1. Transistor Q1, diode D2 and transistor Q4 are provided in parallel with transistor Q2, diode D1 and transistor Q3 between nodes N7 and N11. Resistor R14 is located between nodes N11 and N2.

Node N7 terminates into a port labeled "A" of relay U8. A port "B" of relay U8 is connected to node N1. The motor 1232 is connected between nodes N1 and N9. Node N9 is also connected to a normally-closed contacts NC of relay U8. Resistor R5 is connected between node N9 and node N10. Node N10 terminates in base emitter junction of transistor Q3. Resistor R2 is connected between nodes N2 and N8. Node N8 terminates in a control port COM for relay U8 that, in turn, is connected by a loop to normally-open contacts NO of relay U8.

As can be seen from the circuit diagrams of FIGS. 107–111, certain of the circuit components are provided in opposing configurations so that the motor 1232 of the shut-off circuit 1220 can be operated bi-directionally, i.e., with differing polarities applied to the third and fourth leads 1226, 1228. For example parallel configurations of components D6-Q6 and D5-Q5 are provided in opposing configurations. Parallel configurations of Q1-D2-Q4 and Q2-D1-Q5 are also provided in an opposing arrangement.

The timer circuit 1234, the relay circuit 1236, and the current sensing circuit 1238 of the motor shut-off circuit 1220 preferably have the boundaries indicated by the dashed lines with like reference numerals in the figures.

The operation of the motor shut-off circuit 1220 can generally be described with respect to four states of operation. A first state (see FIG. 108) is when power is initially applied to the shut-off circuit 1220 via leads 1226, 1228. A second state (see FIG. 109) is when the motor 1232 is running in a predetermined direction based on the polarity of the power applied to leads 1226, 1228. A third state (see FIG. 110) is when the motor 1232 has stopped, at an instant in time immediately prior to triggering of the shut-off circuit 1220. A fourth state (see FIG. 111) is when the motor 1232 has been switched off. Annotations of the proposed current paths inherent in each state are shown on the state diagrams of FIGS. 107–111 and are labeled as currents $I_1$, $I_2$, . . . .

Figure 108:
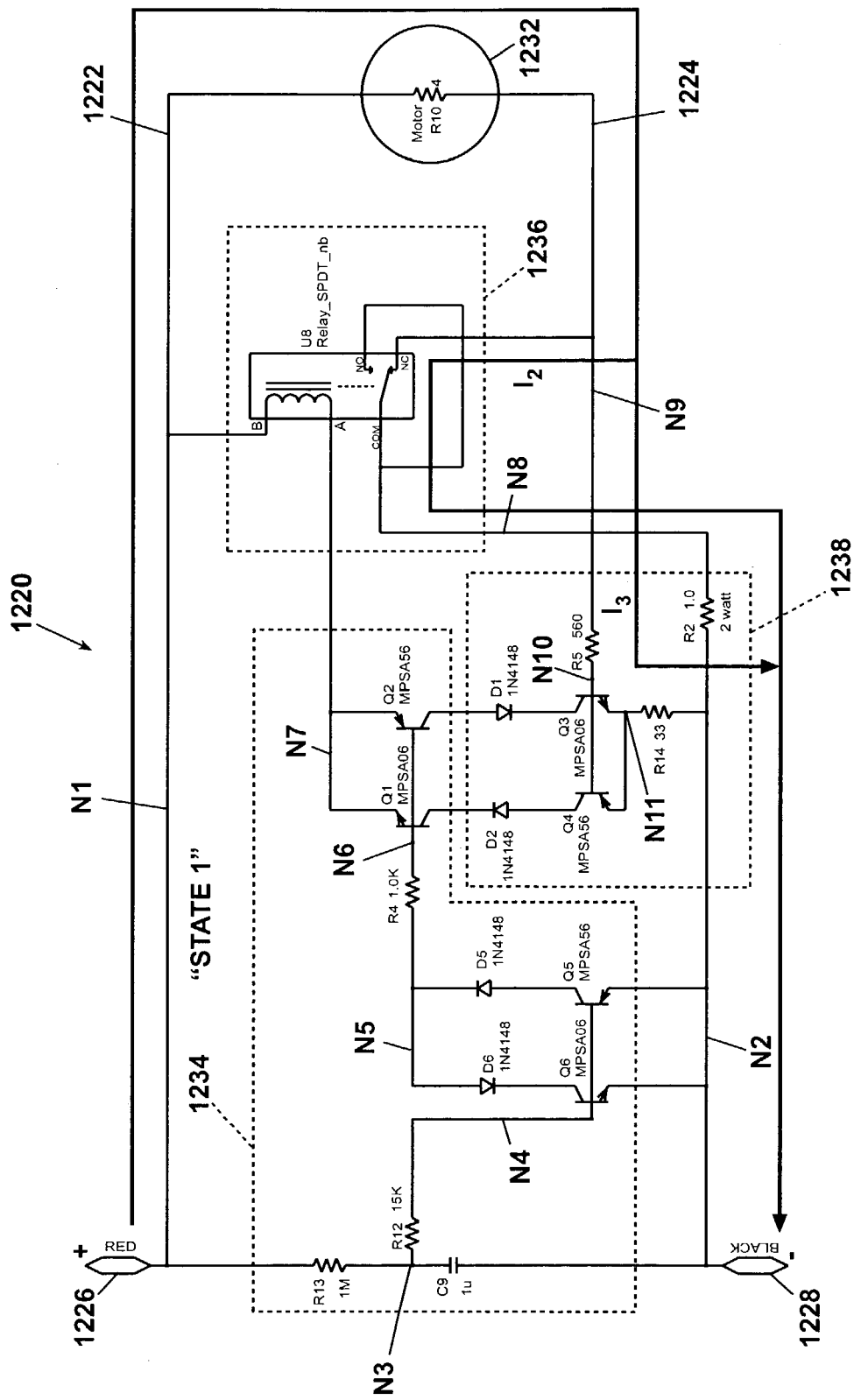
FIG. 108 is a circuit diagram of FIG. 107 showing the circuit in a first state.

The first state is described with respect to FIG. 108. When power is first applied to the leads 1226, 1228, capacitor C9 is discharged and the voltage thereacross is below the forward voltage drop of the base-emitter junction of Q6. Current I1 is therefore charging C9 and Q6 is in an off position. In this first state, the motor 1232 has not yet reached full operating speed and is drawing a large inrush current I2. The voltage drop across R2 exceeds the forward voltage drop of the base-emitter junction of Q3, so base current I3 also flows through Q3. Since Q6 is switched off, Q2 is also switched off and there is no current flow through the relay coil. The relay contacts are normally closed, so current flows through the contacts, and through R2, as long as the relay U8 is not energized.

Figure 109:
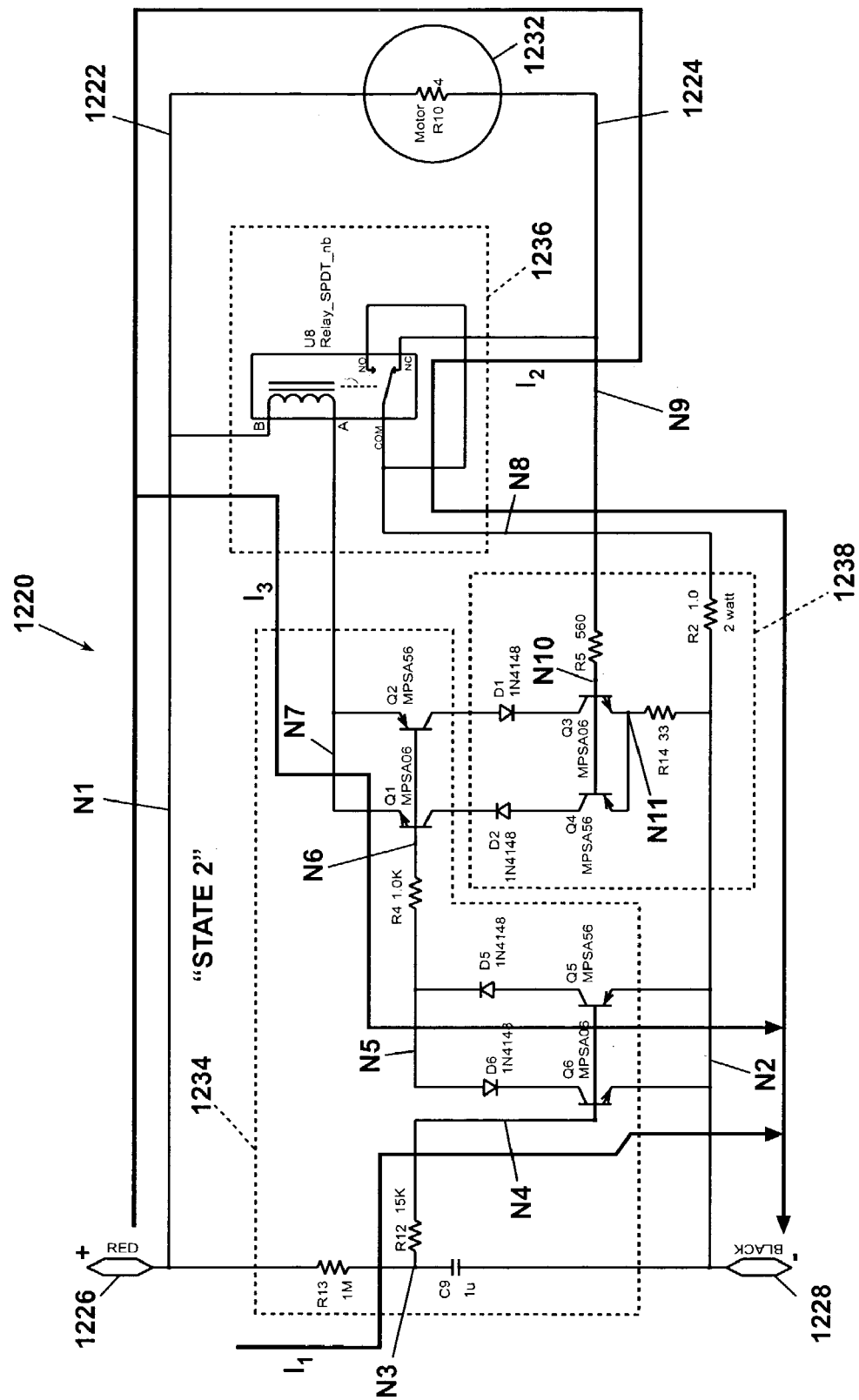
FIG. 109 is a circuit diagram of FIG. 107 showing the circuit in a second state.

The second state is described with respect to FIG. 109. After several milliseconds, C9 has sufficient charge to overcome the forward voltage drop of the base-emitter junction of Q6. A current I1 flows through the base of Q6, turning it on and thus allowing current flow I3 through R4 and Q2. Resistor R4 limits current I3 so that it is insufficient to energize the relay. By this time, the motor 1232 has reached full operating speed and the motor current I2 has dropped to a lower level. The resulting voltage drop across R2 is now insufficient to turn on Q3, and the relay U8 remains de-energized.

Figure 110:
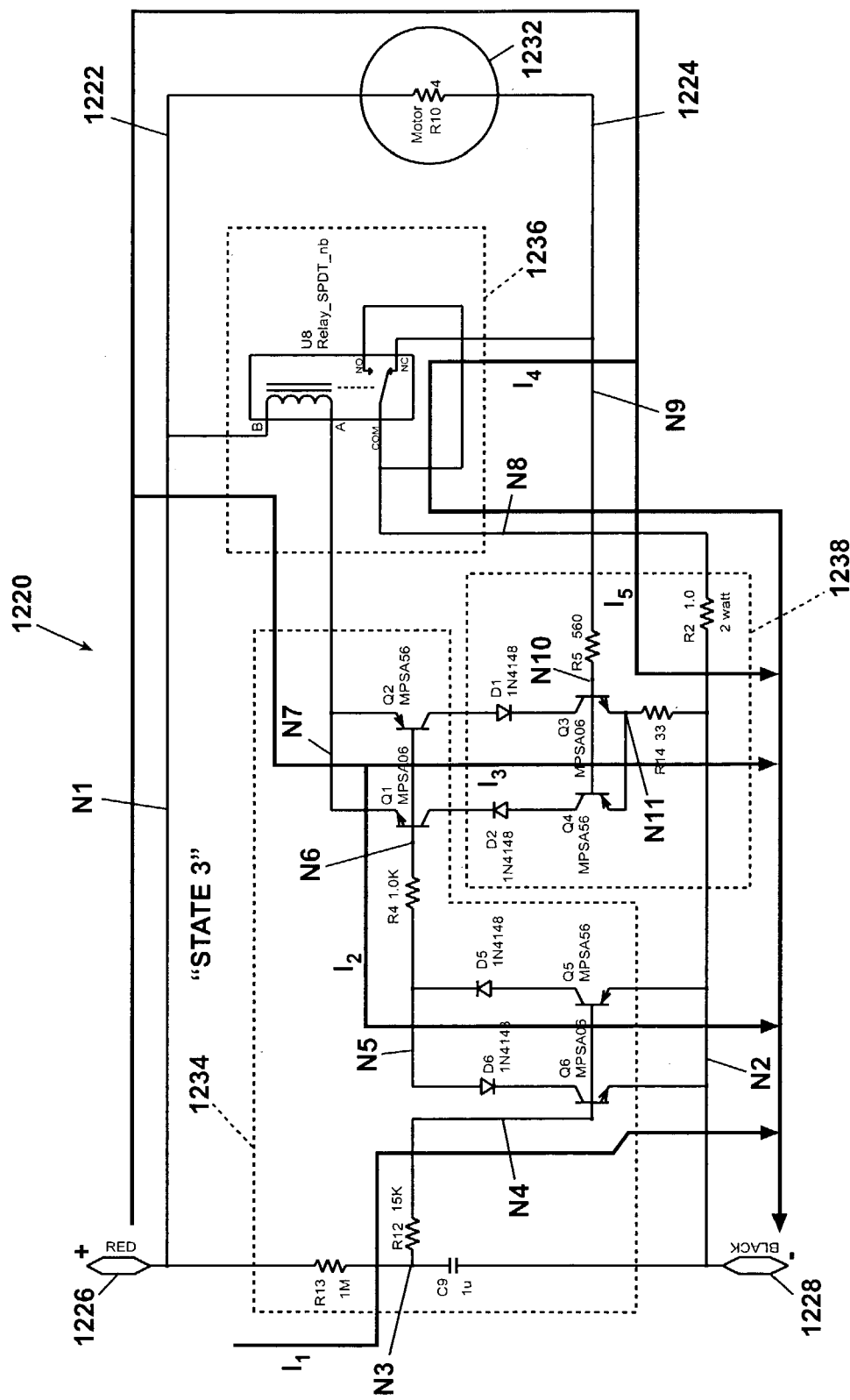
FIG. 110 is a circuit diagram of FIG. 107 showing the circuit in a third state.

The third state is described with respect to FIG. 110. As in State 2, C9 is charged, i.e., the time delay has expired. Current I1 flows through Q6, turning it on and allowing current flow through R4 and Q2, turning on Q2. The motor 1232 has either stalled or met sufficient resistance to its travel so motor current I4 has increased past the "switch-off" threshold. There is now sufficient voltage drop across R2 to cause base current I5 to flow through Q3, turning it on. Since Q2 is also turned on, due to the expiration of the time delay, a current I3 flows which is sufficient to energize the relay U8. This state depicts the instant before the contacts in the relay actually move.

Figure 111:
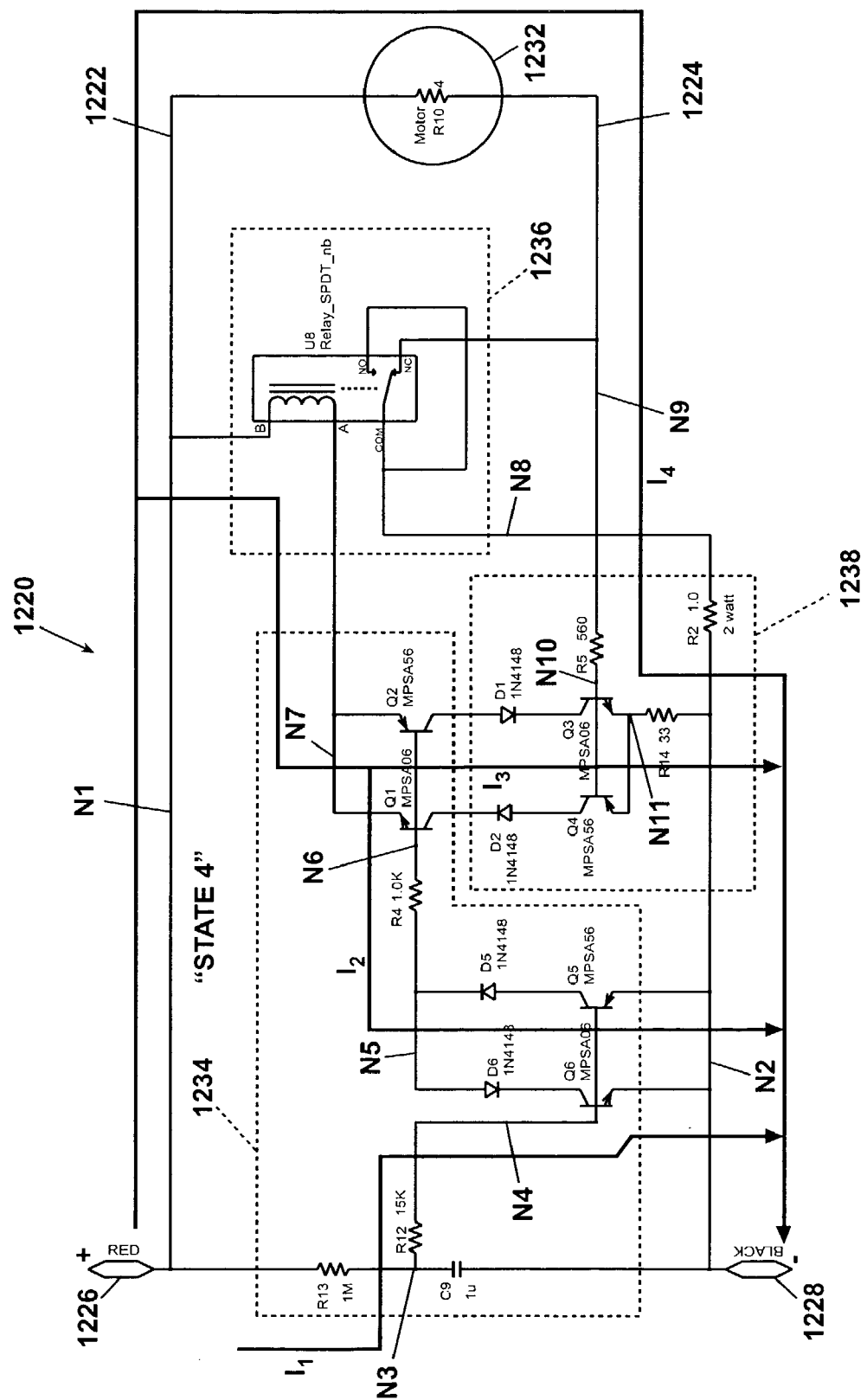
FIG. 111 is a circuit diagram of FIG. 107 showing the circuit in a fourth state.

The fourth state is described with respect to FIG. 111. As in the second and third states, currents I1 and I2 flow because the time delay has expired. The relay U8 is now energized and the contacts have opened, preventing current from flowing through R2. There is still a small current I4 flowing through the motor 1232. Current I4, because it is limited by R5 and R14, is insufficient to cause the motor 1232 to turn or cause significant heating of the motor winding, but it is sufficient to keep Q3 switched on and therefore current I3 continues to flow. This keeps the relay U8 energized and the circuit 1220 remains in this switched-off state until the supply power is removed.

The following is a general description of the operational features and benefits of the shut-off circuit 1220 for the motor 1232.

The shut-off circuit 1220 is preferably designed to turn on the relay U8 when the current through the motor 1232, and therefore resistor R2, reaches a preset amount. The motor 1232, however, draws an initial surge of current while starting, and it can be undesirable to have the shut-off circuit 1220 prematurely switch off as a result of this initial current surge. Therefore, the shut-off circuit 1220 also incorporates a time delay, which disables the sensitivity of the shut-off circuit 1220 for a predetermined period of time, such as several milliseconds (e.g., 100 ms) after the initial application of the supply voltage.

Because it is desired to operate the motor in more than one direction, the shut-off circuit 1220 is energized with an input voltage via the leads 1226, 1228 of either a positive or negative polarity. Since the circuit 1220 employs transistors which are typically designed to operate at a single polarity, the shut-off circuit 1220 incorporates a pair of transistors Q5, Q6 for each function, one of type NPN and one of type PNP. When one transistor Q5/Q6 of each pair is biased with the proper polarity, the other is protected by a diode D5/D6, which keeps it switched off.

FIGS. 107–111 show the case where the lead 1226 (RED) is positive and the lead 1228 (BLACK) is negative whereby diodes D2 and D5 are reverse biased, preventing transistors Q1, Q4, and Q5 from conducting. In this case, transistors Q2, Q3, and Q6 carry out the function of the shut-off circuit 1220. Of course, the converse is true when the polarity is reversed between the leads 1226, 1228.

The normally closed contacts NC of the relay U8 are wired in series with the motor 1232. This allows the motor 1232 to run as long as the relay U8 is not energized, i.e., the energizing current in the relay coil is insufficient to switch the relay U8. Also in series with the motor 1232 is a parallel circuit consisting of R2 on one branch and the series combination of R5, R14, and the base-emitter circuit of Q3 on another branch. Since the resistance of the R2 branch is relatively low, a majority of the current through the motor 1232 is also conducted by R2.

As the load on the motor 1232 increases, the current through the motor 1232 (and, therefore, R2) also increases. This produces a voltage drop across R2 which is nearly proportional to the motor 1232 current. When the voltage across R2 reaches a sufficient level to overcome the forward voltage of the base-emitter junction of Q3, current flows through R5, R14, and the base of Q3, switching Q3 on.

If Q2 and Q3 provide sufficient current to energize the relay U8, the normally closed contacts NC of the relay U8 open the R2 branch of the circuit, leaving the motor 1232 in series with R5, R14, and the base-emitter circuit of Q3. The resistance of the resulting series circuit is too high for the motor 1232 to run, so the motor 1232 is effectively shut off. However, there is preferably still a sufficient amount of current flow through the motor and the remaining branch to keep Q3 switched on and the relay energized, thereby latching the circuit 1220 in a shut-off state. The circuit remains in this state until power is removed.

The shut-off circuit 1220, as mentioned earlier, is prevented from shutting off within the first several milliseconds of the time power is applied. This is accomplished through the use of the timer circuit 1234, preferably an RC circuit in the figures composed of R13 and C9. At the instant power is applied to the shut-off circuit 1220 via the leads 1226,1 1228, C9 is discharged and R13 drops the full supply voltage. Therefore, at this same instant, Q6 is shut off and, since there is no base current at Q2, it is also shut off. This prevents the relay from energizing, even if Q3 is switched on due to initial motor startup current.

As the voltage across C9 increases over time, it eventually reaches a level sufficient to turn on Q6 through R12, which provides current through its collector and R4 to turn on Q2. By this time, the initial current spike drawn by the motor upon starting subsides to the point where Q3 does not conduct enough current to energize the relay U8. This state continues until the mechanism driven by the motor 1232 reaches the end of its travel, or encounters an obstruction, the point at which the motor current will again increase enough to turn on Q3 and finally energize the relay U8 as described previously, shutting off the motor 1232.

The operation of the shut-off circuit 1220 in the opposite polarity (with respect to the leads 1226, 1228) is very similar, with Q1 serving the same function as Q2, Q4 as Q3, and Q5 as Q6, respectively. In this case D1 and D6 are reverse biased, preventing Q2, Q3, and Q6 from conducting.

Figure 113:
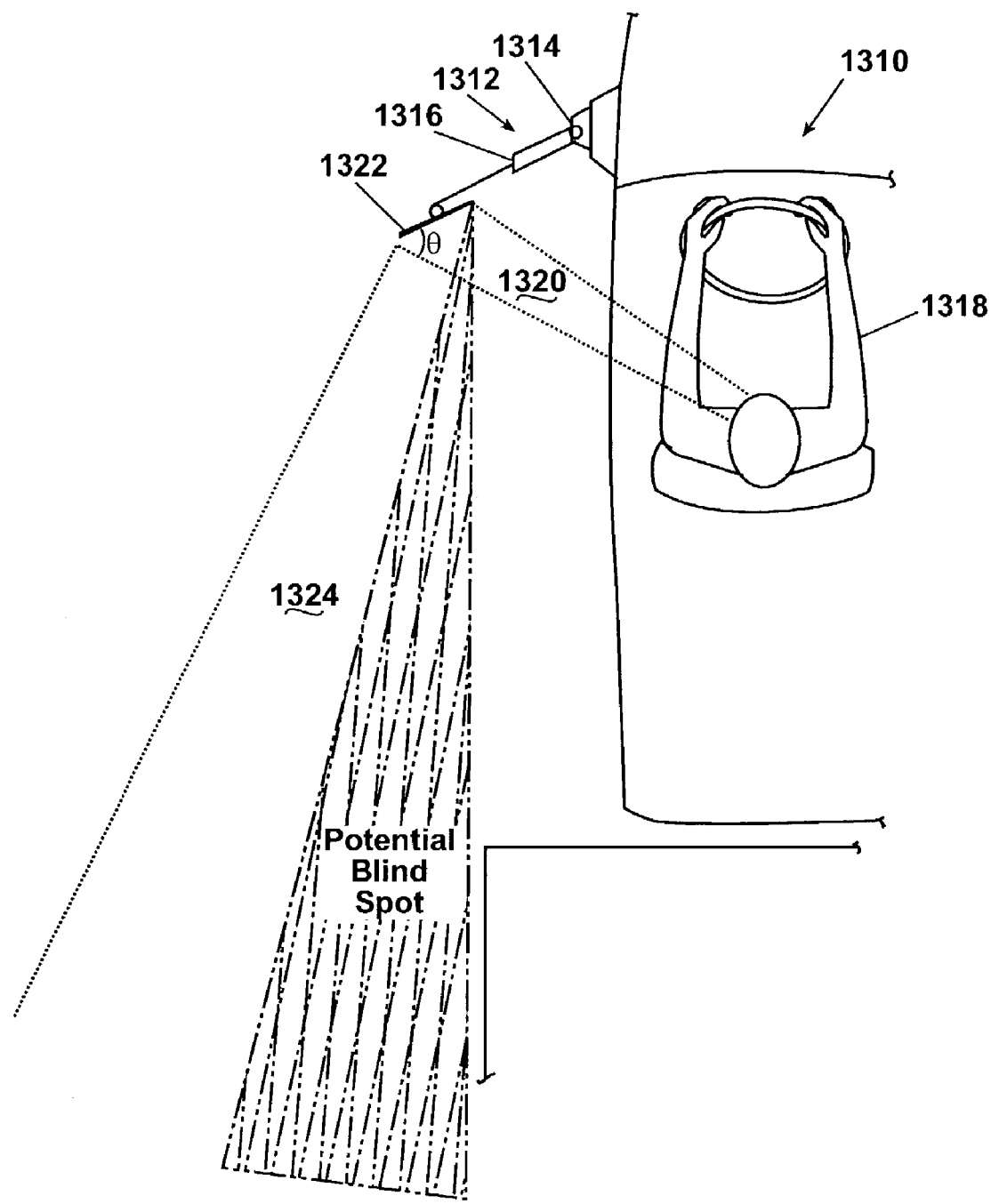
FIG. 113 is a schematic view in a similar orientation to that shown in FIG. 112 of the driver seated within a vehicle having a prior art externally-mounted rearview mirror, wherein the schematic view shows the mirror in an extended position with respect to the vehicle body and dashed lines indicate the driver's field of view with respect to the extended mirror and showing a blind spot created adjacent to the driver's field of view.
Figure 114:
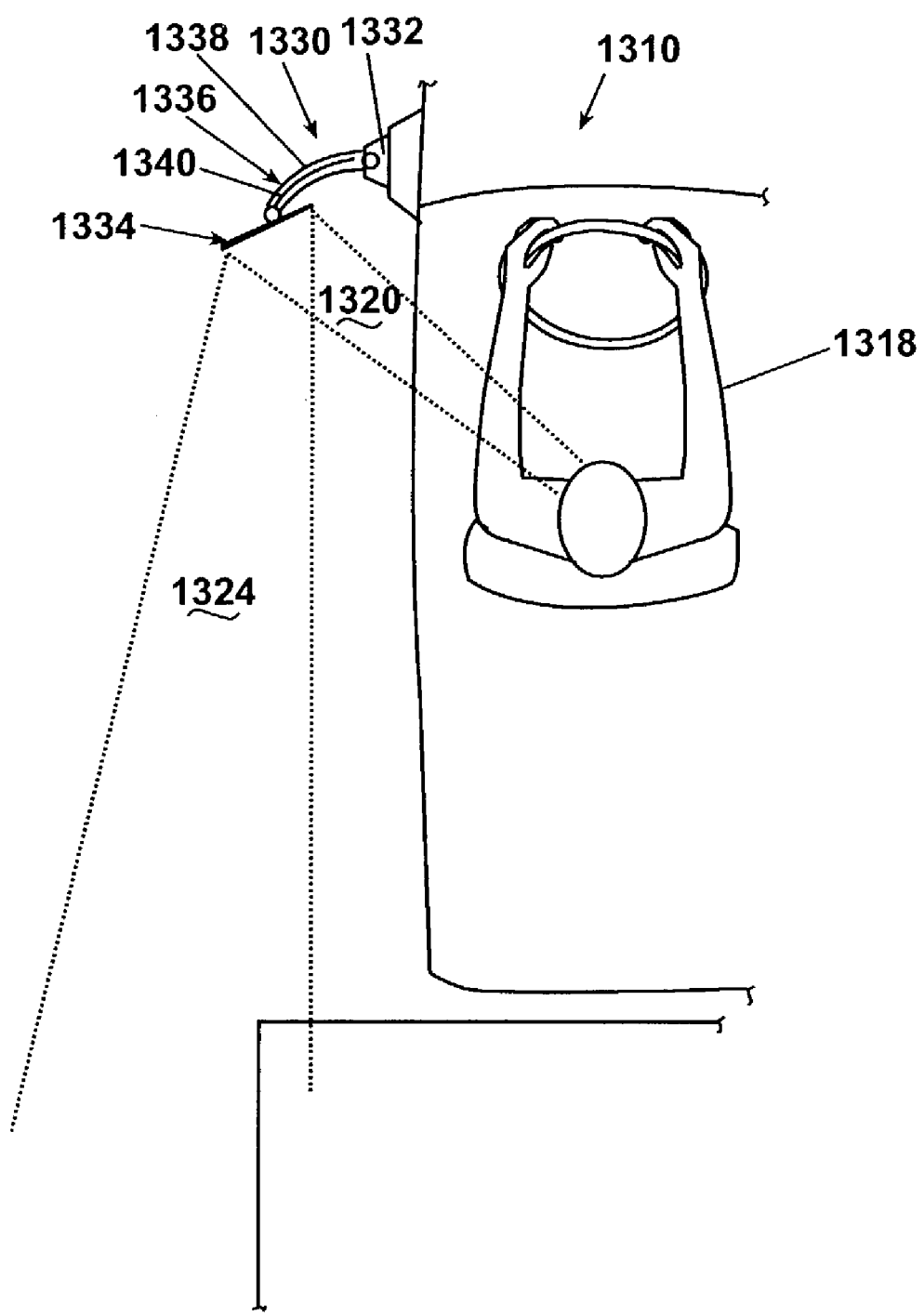
FIG. 114 is a schematic view in a similar orientation to that shown in the FIG. 112 of a driver seated within the vehicle comprising a ninth embodiment of a vehicular rearview mirror assembly according to the invention, wherein the schematic view shows the inventive mirror in a retracted position with respect to the vehicle body and dashed lines indicate the driver's field of view with respect to the retracted mirror.
Figure 115:
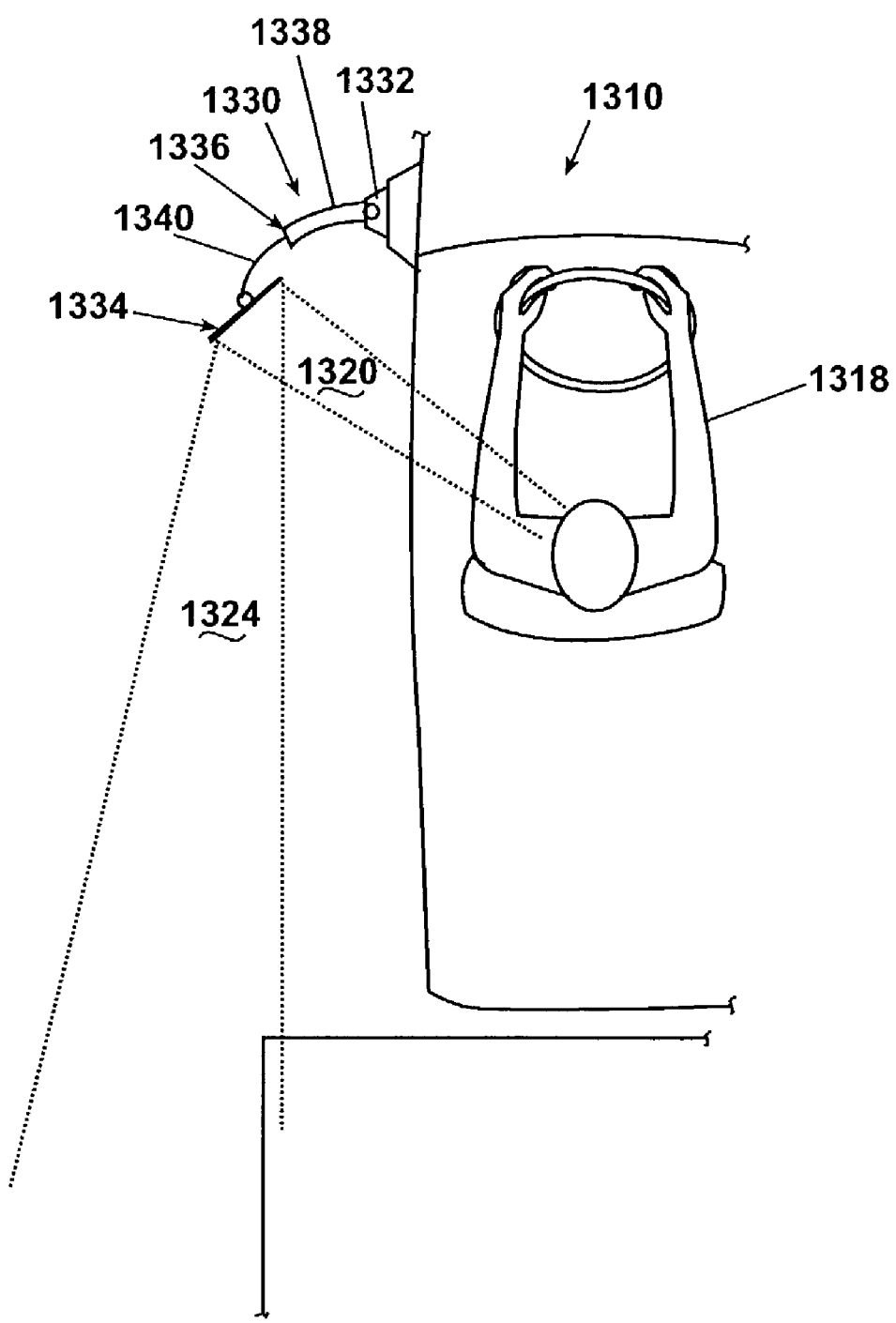
FIG. 115 is a schematic view in a similar orientation to that shown in FIG. 112 of a driver seated within a vehicle having a vehicular rearview mirror assembly according to the invention, wherein the schematic view shows the inventive mirror in an extended position with respect to the vehicle body and dashed lines indicate an adjusted field of view with respect to the extended mirror.

Referring now to FIGS. 114–115, a schematic drawing of a driver seated in a vehicle is shown, wherein a vehicle has a ninth embodiment of a rearview mirror assembly movable between a retracted and an extended position. It will be understood that, with respect to elements of the schematic drawings shown in the prior art version of FIGS. 112–113 and the inventive embodiment shown in FIGS. 114–115, elements common to both sets of drawings are identified with the same reference numerals.

A vehicle 1310 is shown having a rearview mirror assembly 1330 mounted thereto, wherein the rearview mirror assembly 1330 comprises a base 1332 mounted to the vehicle 1310 with a mirror 1334 mounted thereto for movement between a retracted position as shown in FIG. 114 and an extended position as shown in FIG. 115. A driver 1318 is shown seated within the vehicle 1310 and observing an image shown in the mirror 1334 through a first field of view 1320 defined between the eyes of the driver 1318 and the mirror 1334. The image captured by the mirror 1334 is defined by a second field of view 1324, shown in FIGS. 114–115, as capturing a generally rearward direction adjacent to the vehicle 1310 as is typically observed by drivers of vehicles.

The retractable and extendable movement of the mirror 1334 relative to the base 1332 is accomplished by an adjuster 1336 whose function is to reorient the mirror 1334 with respect to the base 1332. As seen in FIGS. 114–115, the adjuster 1336 comprises a first arcuate arm 1338 mounted to the base 1332 and a second arcuate arm 1340 mounted to the mirror 1334, wherein the second arcuate arm 1340 is telescopingly received by the first arcuate arm 1338 for movement between a retracted position as shown in FIG. 114 and an extended position as shown in FIG. 115. As can be seen from FIGS. 114–115, each of the first and second arcuate arms 1338, 1340 preferably has an arcuate configuration. In this embodiment, the reorientation of the mirror 1334 relative to the driver 1318 during the movement of the mirror between the retracted and extended positions is accomplished by the arcuate configuration of the adjuster 1336 and, particularly, the arcuate configuration of the first and second arcuate arms 1338, 1340.

Figure 112:
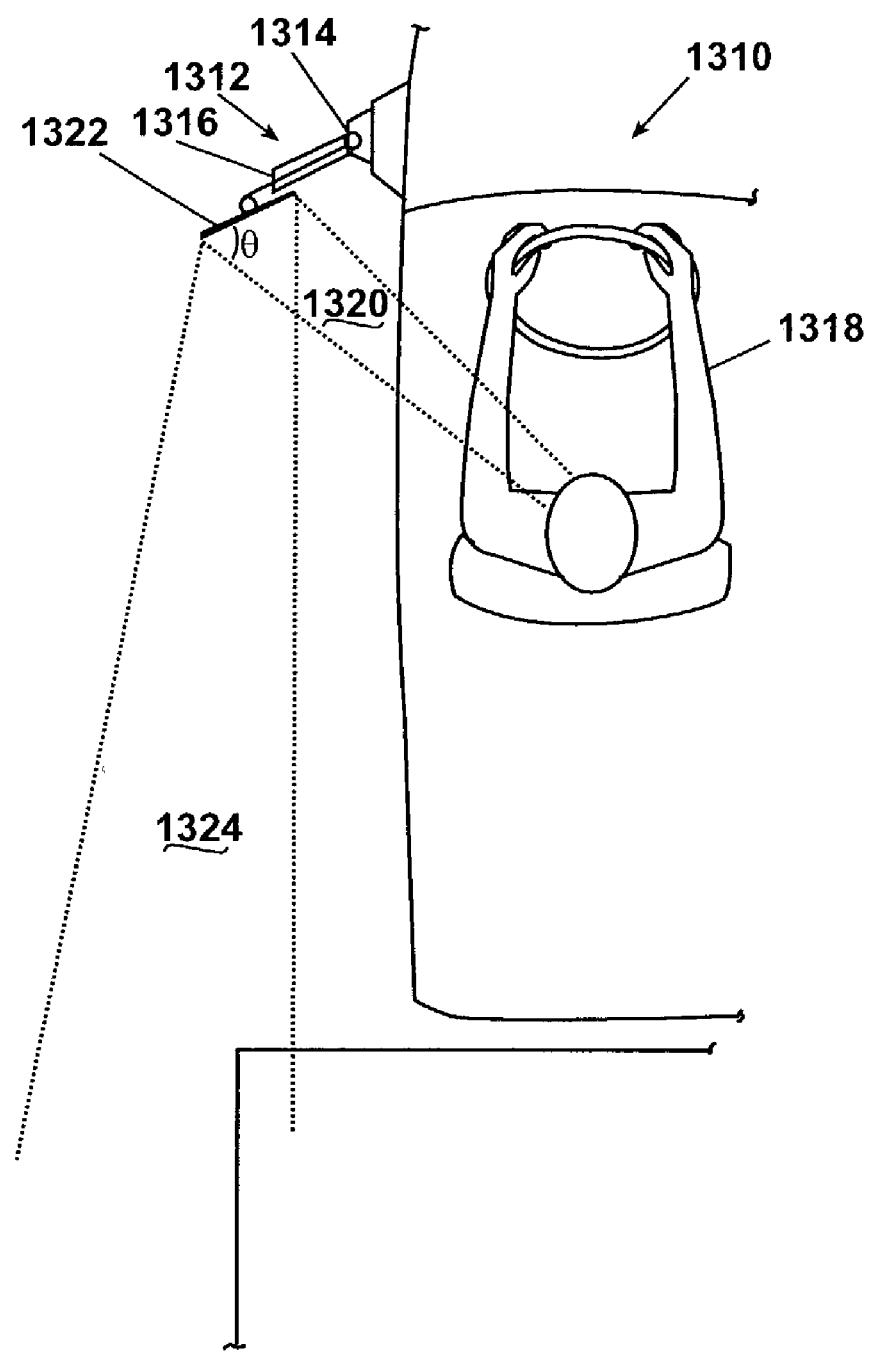
FIG. 112 is a schematic view of a driver seated within the vehicle having a prior art externally-mounted rearview mirror, or in the schematic view shows the mirror in a retracted position with respect to the vehicle body and dashed lines indicate the driver's field of view with respect to the retracted mirror.

Whereas in the prior art drawings shown in FIGS. 112–113, a linear extension of the mirror relative to the base can undesirably reposition (or, i.e., fail to reposition) the mirror so that an undesirable blind spot condition is created, the inventive configuration shown in FIGS. 114–115 automatically repositions the mirror 1334 relative to the base 1332 by extending and/or retracting the mirror 1334 relative to the base 1332 along an arcuate path. It will be understood that this invention is equally applicable to a manually-extendable mirror assembly as well as a powered-extend mechanism wherein a motor extends and retracts the mirror 1334 with respect to the base 1332.

Figure 116:
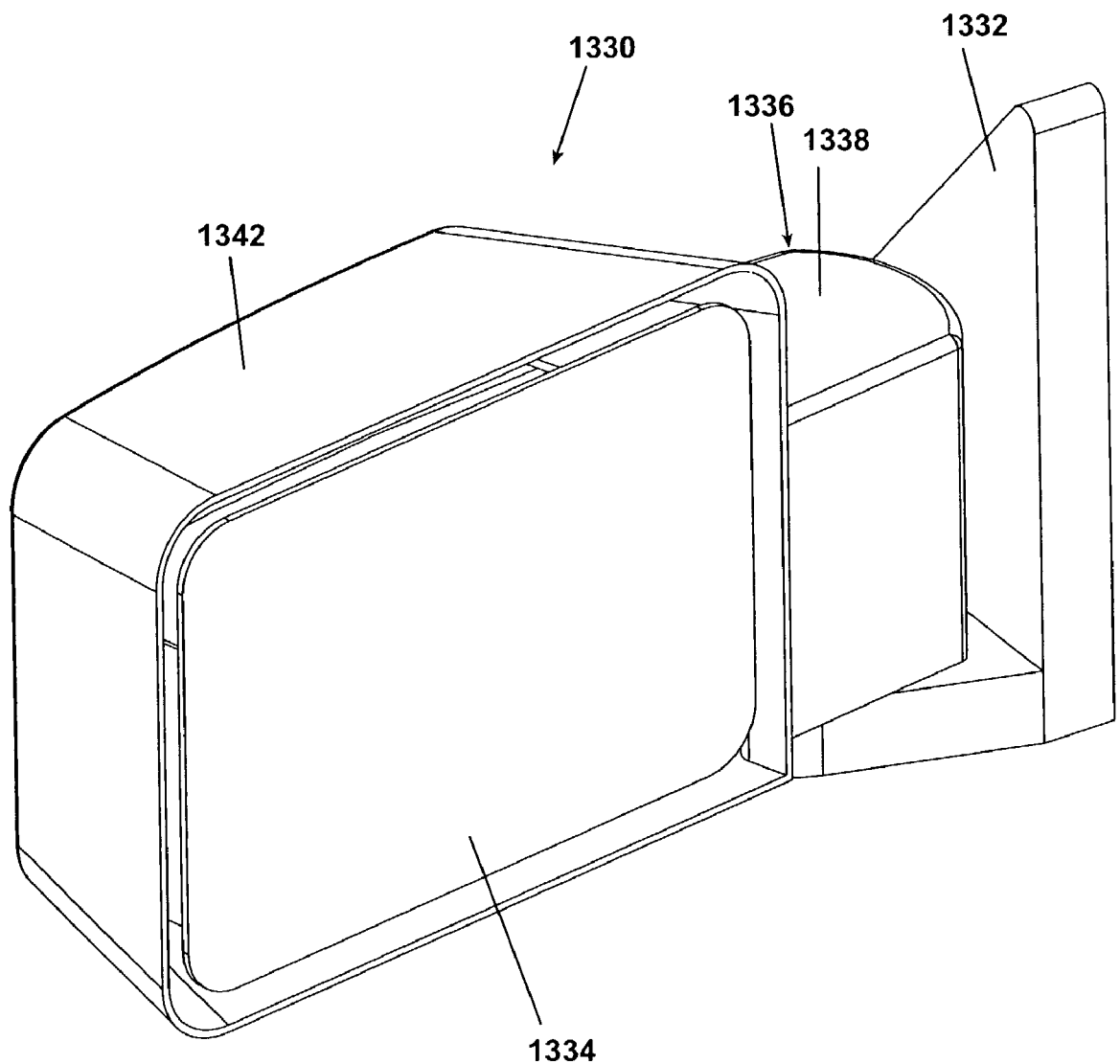
FIG. 116 is a perspective view of the vehicle rearview mirror shown schematically in FIGS. 114–115 in a retracted position.
Figure 117:
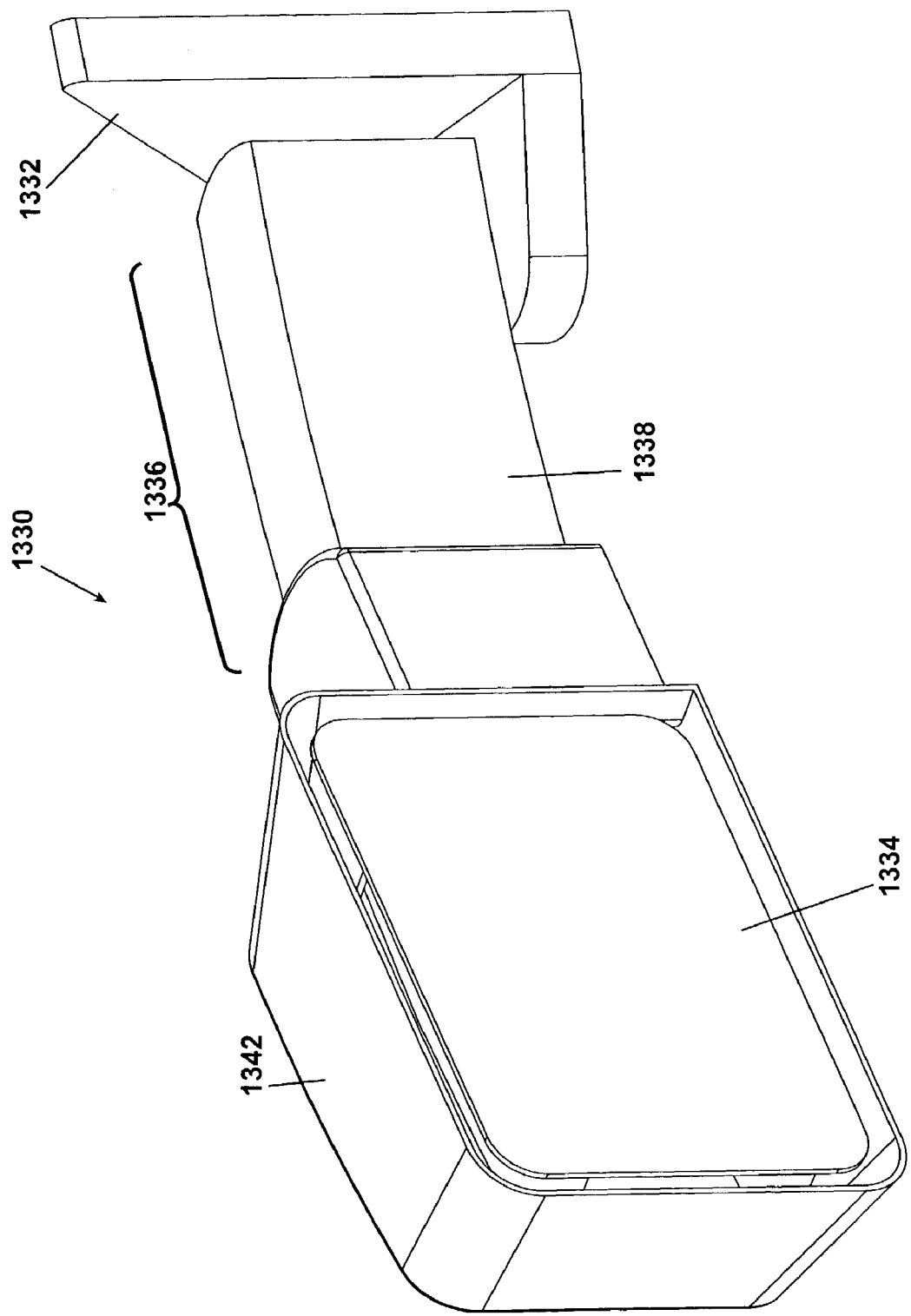
FIG. 117 is a perspective view of the vehicle rearview mirror shown schematically in FIGS. 114–115 in an extended position.
Figure 119:
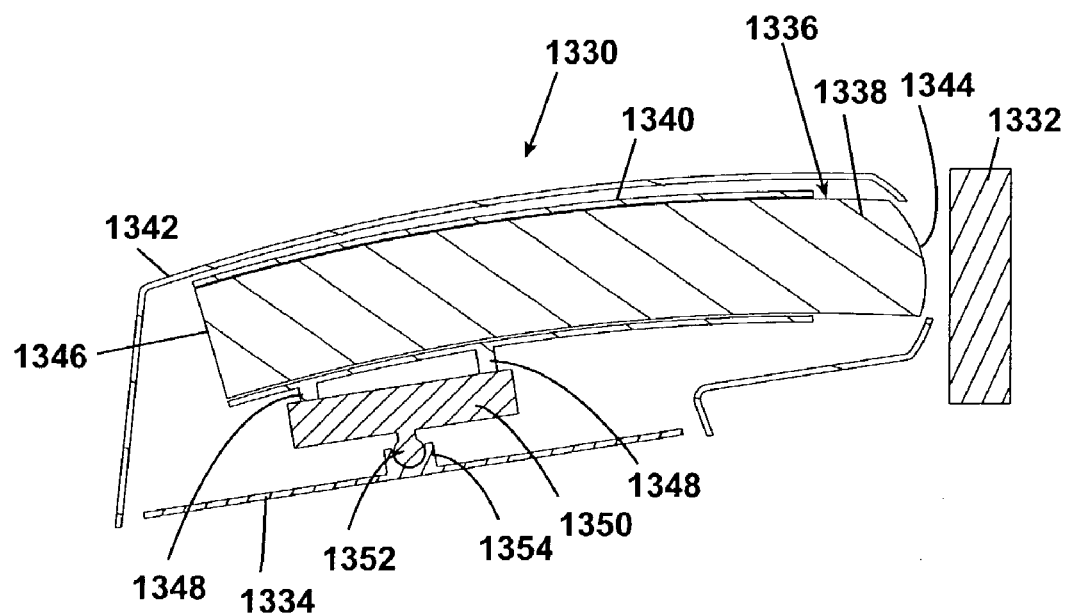
Figure 118:
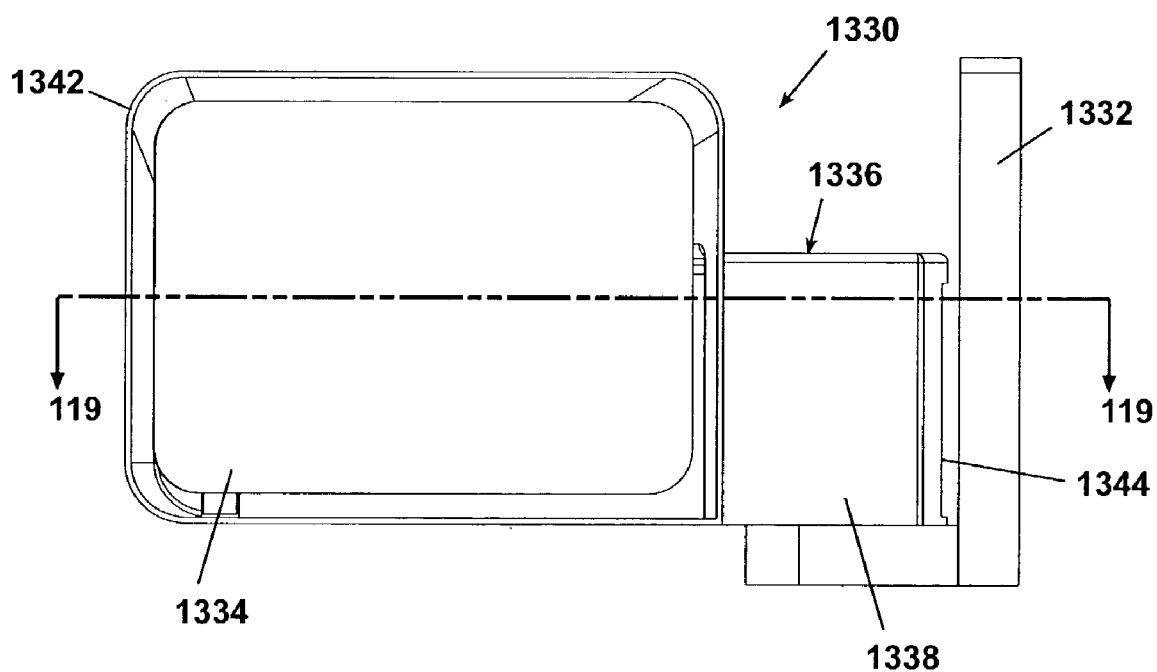
FIG. 118 is a front elevational view of the vehicle rearview mirror of FIG. 116 in a retracted position.

FIGS. 116–121 show an embodiment of the mirror 1330 which includes a housing 1342 enclosing the mirror 1334. FIGS. 116, 118 and 119 show the mirror assembly in a retracted position while FIGS. 117, 120 and 121 show the mirror assembly 1330 in an extended position. As best shown in FIGS. 119 and 121, a first end 1344 of the first arm 1338 is mounted to the base 1332, such as for pivotal movement with respect to the base 1332 if the mirror assembly 1330 is foldably mounted to the vehicle 1310 as is known in the art. A second end 1346 of the first arm 1338 is telescopingly mounted to the second arm 1340. Preferably, each arm 1338, 1340 has an arcuate configuration such as that which can be seen in the drawings. The second arm 1340 preferably has a mounting flange 1348 which supports a mounting plate 1350.

The mounting plate 1350, on an outboard surface of thereof, has a gimbal 1352 thereon which receives a socket 1354 on a rear surface of the mirror 1334 for pivotally mounting the mirror 1334 to the second arm 1346 in a "universal joint" fashion. The mirror assembly 1330 can also be provided with one or more automatic mirror actuators (not shown) for positioning the mirror relative to the housing 1342 as is known in the art, such as by actuation of a switch located within a passenger compartment of the vehicle 1310 to adjust the view plane of the mirror 1334. As is known, the mounting plate 1350 can include a "power pack", a motor and or conventional actuators as would be apparent to one skilled in the mirror-positioning art. Alternatively, the mirror 1334 can be adjusted by manually positioning the mirror relative to the housing 1342 by digitary force imparted to one or more of the edges of the mirror 1334 to pivot the mirror 1334 about the gimbal 1352.

The use of the embodiment of FIGS. 116–121 is relatively straightforward. When the mirror assembly 1330 is in the retracted position as shown in FIGS. 116, 118 and 119, the second arm 1340 is received by the first arm 1338. When the mirror assembly 1330 is to be moved to the extended position as shown in FIGS. 117, 120 and 121 such as by grasping the mirror housing 1342 and pulling outwardly or by an on-board actuator motor (not shown), the second arm 1340 is extended from the first arm 1338 because the second arm 1340 is attached to the mirror housing 1342 and the first arm 1338 is attached to the base 1332. As the mirror housing 1342 is moved to the extended position, the mirror housing 1342 and, in turn, the mirror 1334, moves along an arcuate path as defined by the first and second arms 1338, 1340, respectively. This movement does not change the position of the mirror 1334 with respect to the mounting plate 1350 and the positioning of the gimbal 1352 with respect to the mirror 1334 is unaffected as those are positions selected by the driver 1318. The mirror assembly 1330 can be returned to the retracted position by movement in the opposite direction.

While the embodiment shown in FIGS. 116–121 is suited for either manual or powered movement of the mirror 1334 between the retracted and extended positions, an additional embodiment of the mirror assembly 1330 according to the invention is shown in FIGS. 122–125, which further illustrates the concept of the addition of a powered-extend function to the mirror assembly 1330. It will be understood that reference numerals in FIGS. 122–125 have been increased by 100 for components common to the previous embodiments shown in FIGS. 114–121 and that these common components and/or elements need not be re-described.

FIGS. 122–123 and 124–11254 show the mirror assembly 1430 in a retracted and an extended position, respectively, in which a motor 1460 is mounted within the interior of the first arm 1438. The motor 1460 has an output shaft 1462 which is interconnected to a worm 1464. It will be understood that the motor 1460 and worm 1464 are preferably selected so that the length and volume occupied by these components do not interfere with the extension and retraction of the second arm 1440 with respect to the first arm 1438. Whereas in the previous embodiments of FIGS. 114–121 the movement of the mirror 1334 relative to the base 1332 was accomplished generally by manual movement of the mirror 1334 and/or the housing 1342 relative to the base 32, in this embodiment, the motor 1460 imparts motion to the adjuster 1436 via the first and second arms 1438, 1440.

A travel nut 1466 is threadingly mounted to the worm 1464 in a conventional manner. The nut 1466 comprises a conventional nut, however, the nut has been augmented with a radially-extending rib 1468 on the periphery thereof as can be best seen in FIGS. 123 and 125. A distal end of the second arm 1440 has been modified with an inwardly-extending rib 1470 as also can be seen in FIGS. 123 and 125.

A connector arm 1472 interconnects the nut 1466 with the second arm 1440. The connector arm has first and second ends 1474, 1476 provided with oppositely- and laterally-extending sockets 1478, 1480, respectively. The socket 1478 on the first end 1474 of the connector arm 1472 receives the rib 1468 on the nut 1466. The socket 1480 on the second end 1476 of the connector arm 1472 receives the rib 1470 on the second arm 1440. Each socket and rib combination forms a hinge pivotable about an axis normal to the drawing orientation of FIGS. 123–125 to contain movement of the nut along the worm 1464. In this manner, the second arm 1440 is interconnected with the nut 1466 and is moved with respect to the first arm 1438 when the motor 1460 is actuated, thus rotating both the output shaft 1462 and the worm 1464, causing the nut 1466 to travel along the worm 1464 with the rotation thereof.

Figure 123:
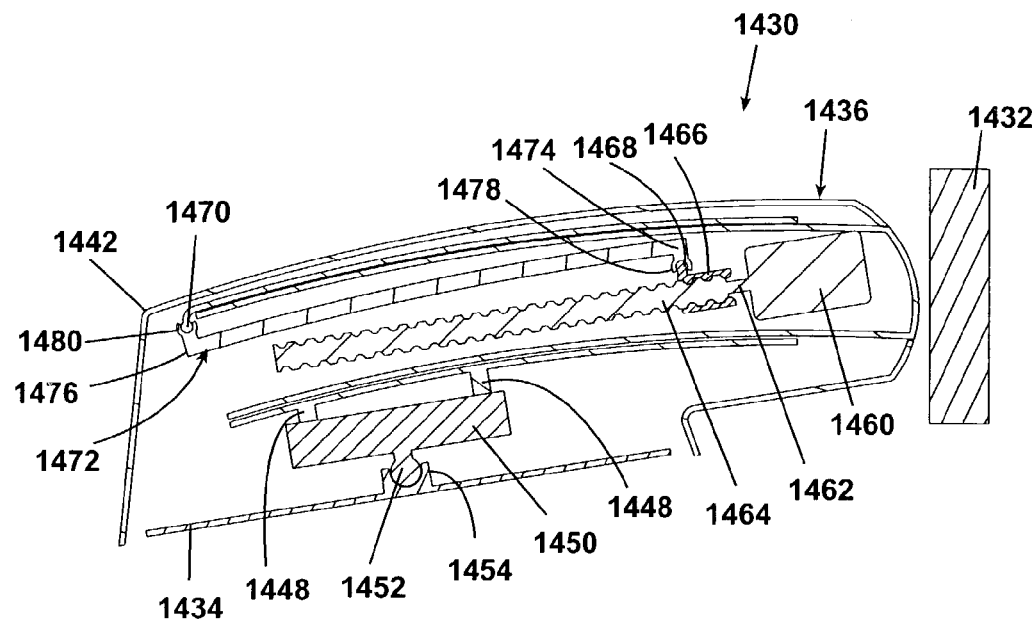
Figure 122:
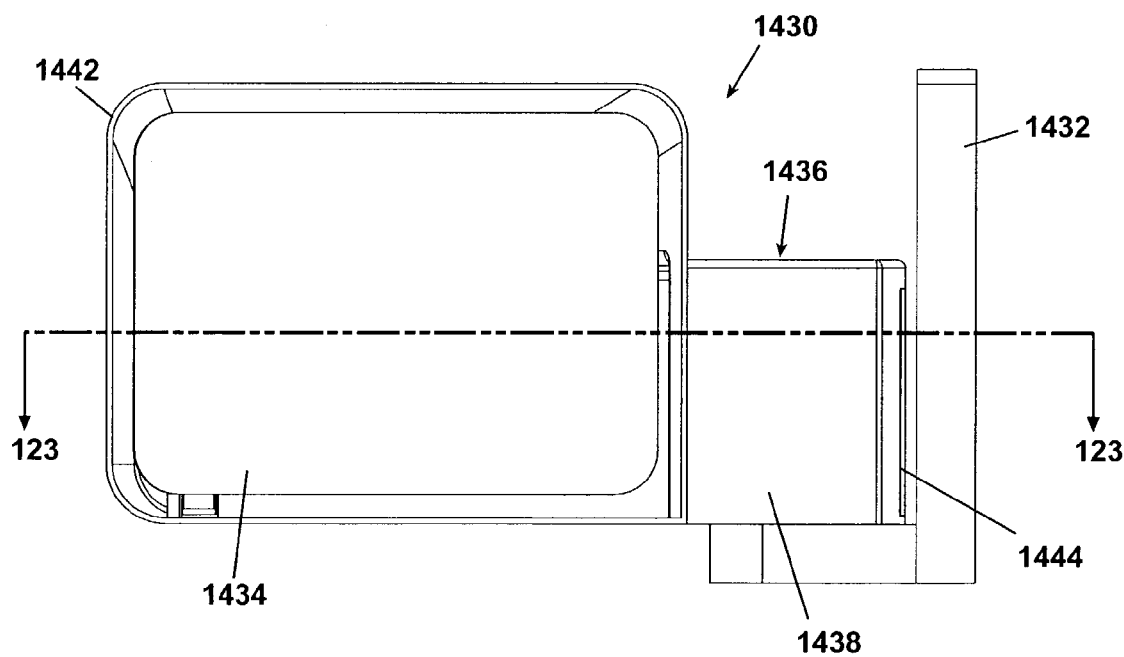

In use, when the mirror assembly 1430 is in the retracted position as shown in FIGS. 122–123, the driver 1318 actuates the motor 1460 through a switch (not shown) to signal the extension of the mirror assembly 1430 to begin moving to the extended position. Whatever the method by which the motor 1460 is actuated, the motor 1460 imparts rotation to the output shaft 1462 and, in turn, to the worm 1464 causing the nut 1466 to travel therealong. When the mirror assembly is being moved from the retracted to the extended position, the nut 1466 moves from an inner end of the worm 1464 adjacent to the output shaft 1462 toward the end distal therefrom. Conversely, the nut 1466 moves from the distal end of the worm 1464 toward the inner adjacent to the output shaft when the mirror assembly 1430 moves from the extended position to the retracted position.

It will be understood that the mirror assembly 1430 can also be signaled to move between the retracted and extended positions by a generally conventional microcontroller (not shown) which can be configured in a well-known manner to move the mirror assembly 1430 between the extended and retracted positions based upon a predetermined event. Examples of such triggering events can include, but are not limited to, ignition or shut-off of the vehicle motor, position of the vehicle transmission into a particular gear (e.g., reverse), closure of a vehicle door, and the like.

Figure 126:
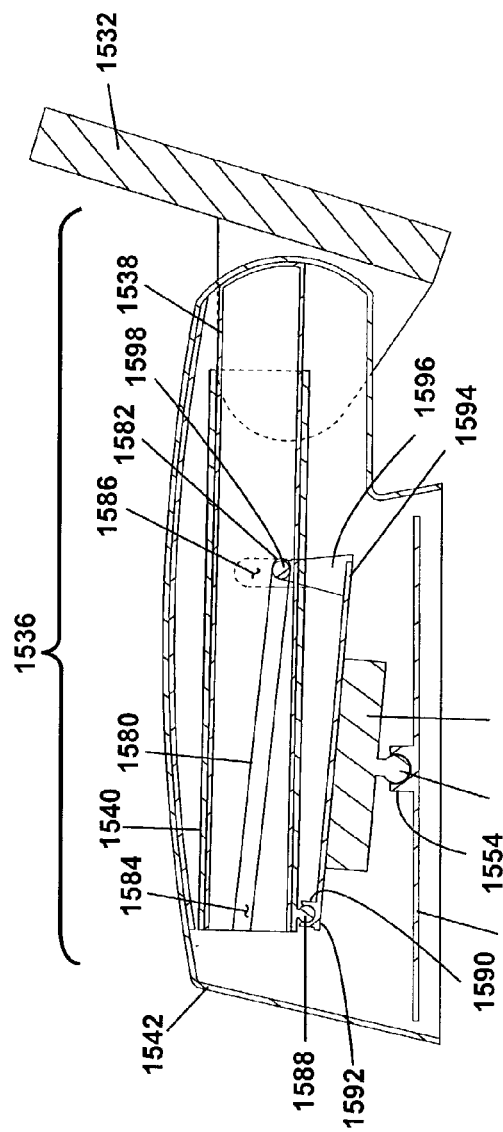
Figure 127:
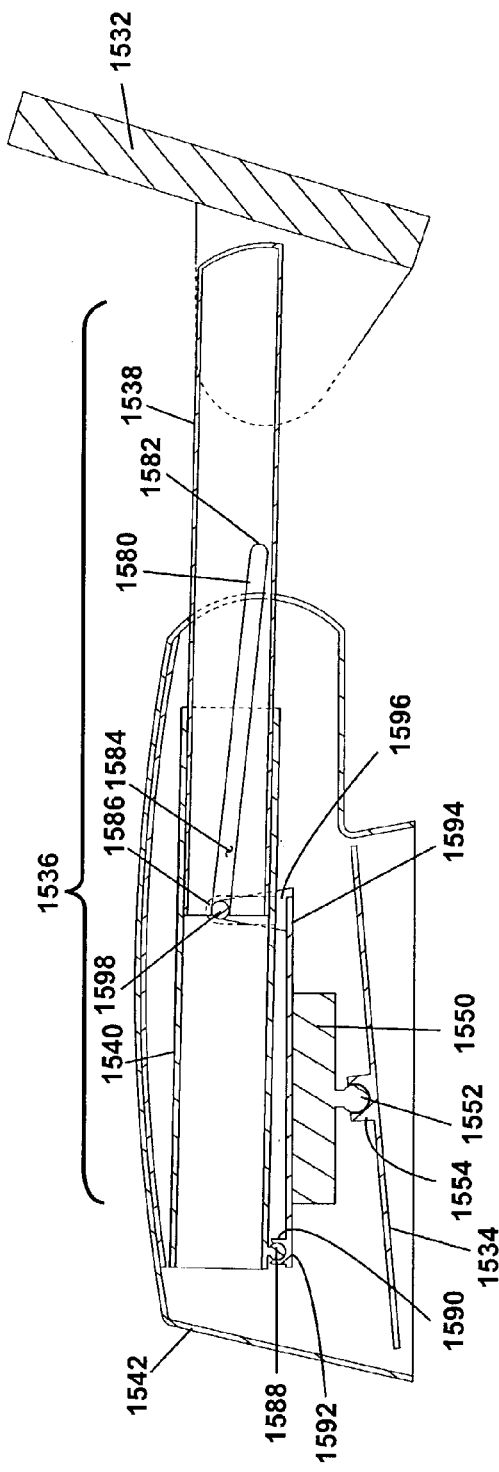

While the embodiments shown in FIGS. 114–125 accomplish the repositioning of the mirror 1334, 1434 by extension and retraction of the mirror housing along an arcuate path, it will be understood that this is but one method by which the automatic repositioning of the mirror 1334, 1434 relative to the housing 1342, 1442 can be accomplished. An additional embodiment of the invention incorporating this feature is shown in FIGS. 126–127 in which a mirror assembly with a linear extension is shown, and in which the adjuster for the mirror is a cam device which pivots the mirror relative to the mirror housing and the base to compensate for the movement of the mirror housing. It will be understood that reference numerals in FIGS. 126–127 have been increased by 200 for components common to the embodiments shown in FIGS. 114–121 and have been increased by 100 for components common to the embodiment shown in FIGS. 122–125. These common components and/or elements need not be re-described but their description can be incorporated by reference from the previous embodiments.

FIG. 126 shows this new embodiment in a retracted position and FIG. 127 shows this new embodiment in an extended position. It can be seen from an examination of these figures that the first and second arms 1538, 1540 of the adjuster 1536 are linear arms as contrasted with the arcuately-configured arms of the previous embodiments.

An outer surface of the first arm 1538 between a first end 1582 and a second end 1584 thereof.

The second arm 1540 has a rounded rectangular slot 1586 on an outer surface thereof in coaxial alignment with the slot 1580 on the first arm 1538 and extending circumferentially a sufficient extent to overlap the slot 1580 regardless of the particular longitudinal, angular or rotational position of the first arm 1538 with respect to the second arm 1540. A distal end of the second arm 1540 also has an outwardly-extending gimbal 1588 thereon.

The mounting plate 1550 is augmented with a backplate having a socket 1590 adjacent to a first end 1592 thereof, the opposite end 1594 of the backplate has an outwardly-extending flange 1596 thereon. The flange 1596 has a normally-extending pin 1598 thereon.

In assembly, the first and second arms 1538 and 1540 are telescopingly received by each other so that the slot 1580 in the first arm 1538 overlaps the slot 1586 in the second arm 1540. The mounting plate 1550 is attached to the second arm 1540 so that the gimbal 1588 on the distal end of the second arm 1540 is received by the socket 1590 on the backplate of the mounting plate 1550, thereby pivotally mounting the mounting plate 1550 (and therefore the mirror 1534) to the second arm 1540. The pin 1598 is thereby received in the aperture created by the overlap of the slots 1580 and 1586 in the first and second arms 1538 and 1540, thus pinning the pivotal position of the mounting plate 1550 to the position of the second arm 1540 with respect to the first arm 1538. When the mounting plate 1550 is so mounted, the angular position of the mounting plate 1550 and mirror 1534 subassembly is dependent upon the position of the second arm 1540 with respect to the first arm 1538.

The configuration and positioning of the slots 1580 and 1586 on the first and second arms 1538 and 1540 are preferably selected so that the field of view encountered by the driver 18 is virtually the same regardless of the amount of extension of the mirror housing 1542 with respect to the base 1532. In this manner, the driver 18 does not need to readjust the mirror when using the mirror extension function.

In use, when the mirror 1534 and housing 1542 are in the retracted positions, the pin 1598 on the mounting plate 1550 extends through the aligned slots 1580, 1586 in the first and second arms 1538, 1540, respectively, adjacent to the first end 1582 of the slot 1580. Then, after an appropriate actuation is received (i.e., actuation of a power extend motor or a user simply grasping the mirror housing 1542 and pulling it outwardly with respect to the base 1532), the mirror housing 1542 begins to move toward the extended position. In this manner, the pin 1598 moves within the slot 1580 toward the second end 1584 thereof. Because the movement of the pin 1598 is constrained within the aligned slots 1580 and 1586, the mounting plate 1550 (and, thus, the mirror 1534) pivots about the gimbal 1588 and socket 1590 mounting between the second arm 1540 and the mounting plate 1550, respectively.

It can be seen from the drawings that the mounting plate 1550 and the mirror 1534 will pivot counterclockwise (in the orientation shown in FIGS. 126–127) when the adjuster 1536 moves from the retracted position (see FIG. 126) to the extended position (see FIG. 127). It can also be seen that the converse is true in that the mounting plate 1550 and the mirror 1534 pivot clockwise (in the orientation shown in FIGS. 126–127) when the adjuster 1536 moves from the extended position (see FIG. 127) to the retracted position (see FIG. 126).

It will be understood that the embodiment shown in FIGS. 126–127, although shown in a manual form, can also be combined with a motor for a power-extend feature as shown in the previous embodiments.

It will also be understood that a combination of the cam device shown in FIGS. 126–127 with a set of linear extension arms can be combined with a mirror assembly having arcuate extension arms (see components labeled with reference numerals 1238, 1240, 1438, 1440) for additional facilitation and control of the movement of the mirror assembly between the retracted and extended positions while providing desirable compensation for the mirror view plane angle as previously described.

A tenth embodiment of the invention is applicable in any situation where it is desirable to drive at least two independent outputs from a single motor. One such application is illustrated in FIG. 128 in a vehicle rear view mirror 1700. This application shows the use of a single motor according to the invention in two environments: (1) as a driver for a power fold function of the rearview mirror 1700, and (2) as a driver for a power extend function of the rearview mirror 1700. The power fold and extend embodiment is illustrated in FIGS. 128–141. In this embodiment, one output shaft of the motor drives the power fold function and the other output shaft drives the power extend function.

Looking at FIGS. 128–141, the rearview mirror 1700 comprises a support 1704 adapted to mount to the vehicle 12, and which is made of a cover 1706 and a mirror receptacle 1708, nested within the cover 1706. A pivot mechanism 1710 is fixedly secured in a socket 1712 in the mirror receptacle 1708. A carriage arm 1714 pivots on the pivot mechanism 1710 and carries a motor assembly 1716 according to the invention. A power fold drive shaft 1718 and a power extend drive shaft 1720 extend from the motor assembly 1716. The power fold drive shaft 1718 engages the pivot mechanism 1710 in a manner hereinafter described to cause the carriage arm 1714 to pivot relative to the support 1704. The power extend drive shaft 1720 is a worm screw that carries a threaded nut 1722 secured to a shaft 1724. A carriage bracket 1726 and a shell bracket 1728 are mounted to each other and to the shaft 1724. The carriage bracket 1726 carries a conventional mirror assembly 1730 which may or may not include a tilt mechanism 1732. The shell bracket 1728 provides support for a mirror housing 1734.

Figure 129:
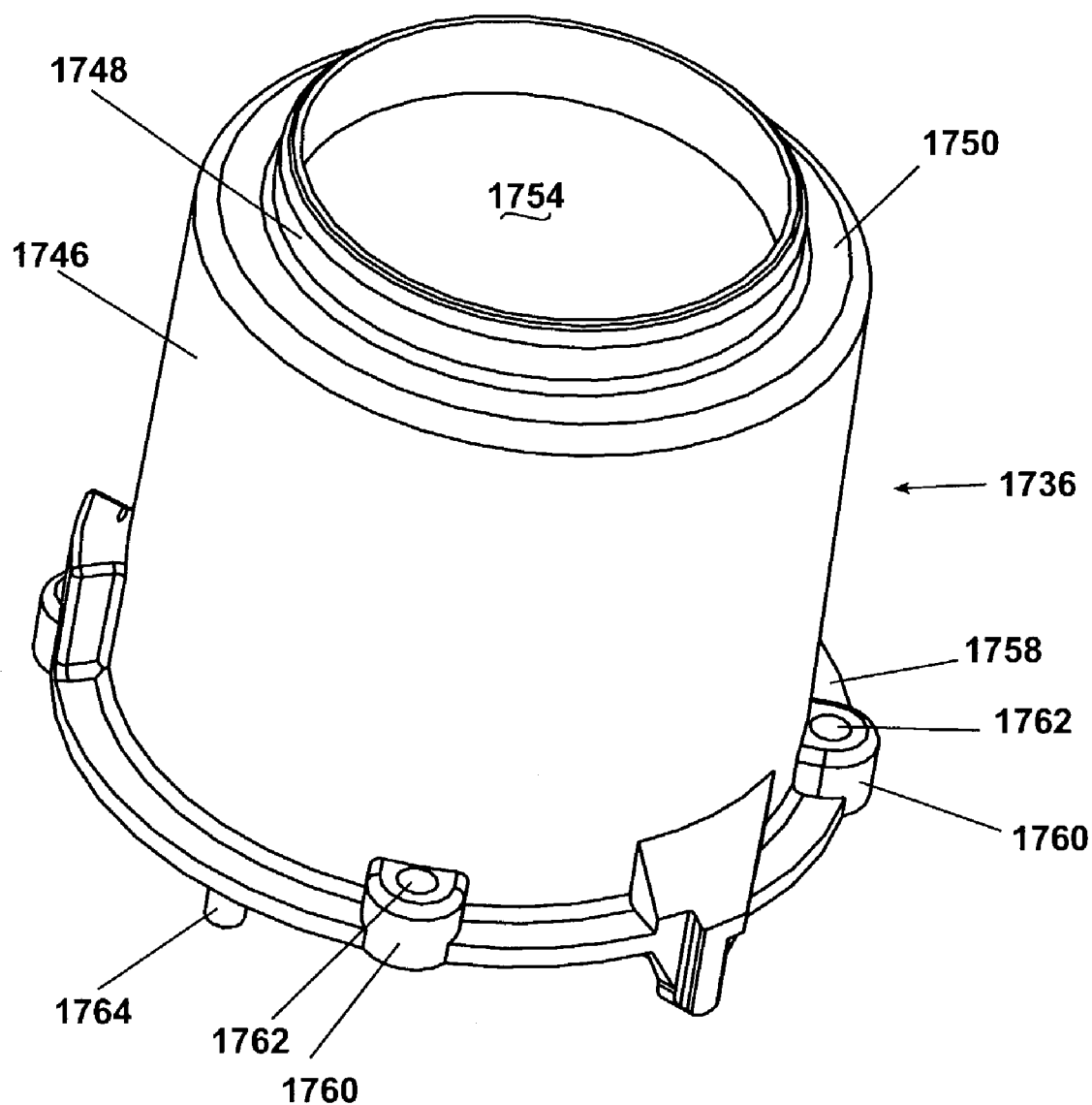
Figure 130:
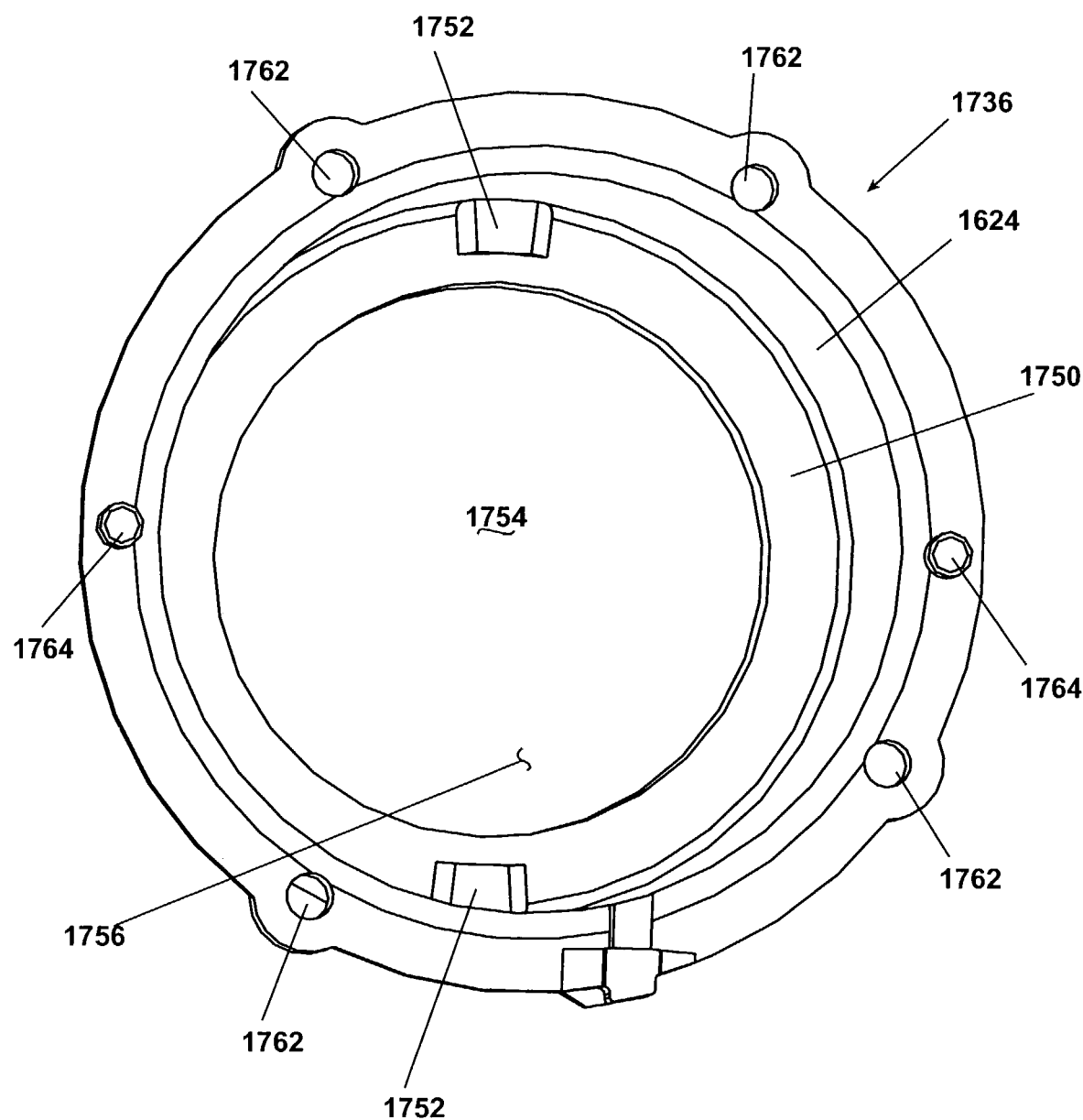

Looking more closely at FIG. 128, the pivot mechanism 1710 comprises an outer housing 1736 and a cover 1738 which enclose a ramp 1740, a wave spring 1742, and an actuator sub 1744. Referring also to FIGS. 129 and 130, the outer housing 1736 is a generally cylindrically-shaped body comprising a cylindrical wall 1746 and a collar 1748 connected to the cylindrical wall 1746 by an annular wall 1750 and coaxial therewith. The annular wall 1750 extends orthogonally inwardly from the cylindrical wall 1746 to the collar 1748. Referring to FIG. 130, the inner surface of the annular wall 1750 is provided with a pair of diametrically-opposed inner bosses 1752 extending downwardly from the annular wall 1750. The collar 1748 comprises a generally ring-shaped structure defining a circular opening 1754. The cylindrical wall 1746 defines a cylindrical chamber 1756. Extending orthogonally outwardly from the cylindrical wall 1746 at an opposite end from the collar 1748 is a base ring 1758 circumscribing the cylindrical wall 1746. The base ring 1758 is provided with a plurality of mounting bosses 1760 spaced above the periphery of the cylindrical wall 1746 and having a mounting bore 1762 extending therethrough generally parallel to the longitudinal axis of the outer housing 1736. Extending downwardly from the base ring 1758 are a pair of diametrically-opposed mounting pegs 1764 generally parallel to the longitudinal axis of the outer housing 1746.

Referring now to FIGS. 131–135, the ramp 1740 is a ring-like body comprising a pair of diametrically-opposed thin ring segments 1766 in alternating juxtaposition with a pair of diametrically-opposed raised segments 1768. The raised segments 1768 transition to the thin ring segments 1766 through terminal ends defined by a first inclined face 1770 and a second inclined face 1772. The thin ring segments 1766 and the raised segments 1768 define a circular inner wall 1774 defining a generally circular center opening 1776. Regularly spaced along the inner wall 1774 are a plurality of notches 1778. In the embodiment shown in FIG. 131, six notches 1778 are shown in diametrically-opposed pairs. One pair of notches 1778 bisect the raised segments 1768, and the remaining notches 1778 are formed at each end of the thin ring segments 1766.

The wave spring 1742 is a generally helical spring formed of a flat ribbon of metal, preferably spring steel having alternating crest portions 1780 and trough portions 1782. The spring 1742 is formed so that the trough portions 1782 of one coil contact the crest portions 1780 of the adjoining coil. Preferably, the portions in contact with one another are fixedly connected, such as by spot welding. The spring 1742 defines a circular center opening 1784.

The actuator sub 1744 is a generally cylindrically-shaped body comprising a generally cylindrical lower housing 1786 and a generally cylindrical upper housing 1788. The lower housing 1786 comprises a lower cylindrical wall 1790 transitioning to an inwardly-extending annular wall 1792 which, in turn, transitions to an upper cylindrical wall 1794 of the upper housing 1788. The lower cylindrical wall 1790 is provided with a plurality of peripheral slots 1796 spaced thereabout at an opposite end from the upper housing 1788. The upper cylindrical wall 1794 transitions to an annular top wall 1798 having a depending inner peripheral wall 1810 defining a circular opening 1812. The upper cylindrical wall 1794 is provided with a plurality of regularly-spaced ribs 1814 extending longitudinally along the upper cylindrical wall 1794 from the annular wall 1792. The ribs 1814 are adapted to slidably engage the notches 1778 in the ramp 1740 when the upper housing 1788 is inserted through the center opening 1776. A plurality of seats 1816 are spaced regularly around the upper housing 1788 at the inner face of the top wall 1798 and the upper cylindrical wall 1794. Preferably, the seats 1816 are spaced at 120 degrees around the periphery of the upper cylindrical wall 1794. Upper housing sockets 1818 comprise circular apertures through the top wall 1798 at regularly-spaced intervals. Preferably, the sockets 1818 are spaced at 120 degrees around the top wall 1798.

As shown in FIGS. 136 and 137, the wave spring 1742 is placed over the upper housing 1788 so that the upper housing 1788 extends through the center opening 1784. The ramp 1740 is then placed over the upper housing 1788 to abut the wave spring 1742 so that the upper housing 1788 extends through the center opening 1776. The wave spring 1740 will urge the ramp 1740 in a direction away from the annular wall 1792.

Referring to FIG. 134, a plurality of actuator sub ring channels 1820 comprise longitudinal channels in the inner portion of the lower cylindrical wall 1790 generally parallel to the longitudinal axis of the actuator sub 1744. The channels 1820 extend along the lower cylindrical wall 1790 from the open end of the actuator sub 1744. In this embodiment, three channels 1820 are spaced at 120 degrees along the interior of the lower cylindrical wall 1790. A circumferential C-ring channel 1822 extends around the periphery of the lower cylindrical wall 1790 along the inner surface thereof adjacent the opening to the actuator sub 1744.

Referring again to FIGS. 135–136, an actuator sub ring 1830 is a generally ring-like body comprising an annular wall 1832 defining a circular opening 1834. A plurality of slots 1836 are cut into the ring 1830 at regularly spaced intervals, preferably 90 degrees, to define segments 1838. A plurality of outwardly-extending ribs 1840 is spaced about the outer periphery of the ring 1830, preferably at 120 degrees. The actuator sub ring 1830 is adapted to be slidably inserted into the actuator sub 1744 and the ribs 1840 are adapted to be slidably inserted into the actuator sub ring channels 1820 as shown in FIG. 136.

A ring gear 1842 comprises an annular body 1844 defining a circular opening 1846. An upper surface of the annular body 1844 includes a plurality of bosses 1848, preferably at regularly-spaced radial locations thereon. In the preferred embodiment, four bosses 1848 are spaced at intervals of 90 degrees. The inner surface of the annular body 1844 is provided with a plurality of teeth 1850 in longitudinal alignment with the axis of the ring gear 1842. The bosses 1848 are adapted to slidably engage the slots 1836 in the actuator sub ring 1830. The ring gear 1842 is adapted to be slidably inserted into the actuator sub 1744, as shown in FIG. 136.

As also shown in FIG. 136, a spring 1852 comprises a generally conventional helical spring adapted to be slidably inserted into the actuator sub 1744 and abut the annular wall 1832 and the actuator sub ring 1830. A conventional C-ring 1854 is adapted to be retained within the C-ring channel 1822 in a generally conventional manner. As shown in FIG. 136, the spring 1852 is slidably inserted into the actuator sub 1744 to abut the annular wall 1792. The actuator sub ring 1830 is then inserted into the actuator sub 1744 so that the ribs 1840 slidably communicate with the actuator sub ring channels 1820, to abut the slots 1836 extending away from the spring 1852. The ring gear 1842 is then slidably inserted into the actuator sub 1744 so that the bosses 1848 engage the slots 1836. The spring 1852, the actuator sub ring 1830, and the ring gear 1842 are retained in the actuator sub 1744 by compressively inserting the C-ring 1854 into the C-ring channel 1822.

The pivot mechanism 1710 is assembled as shown in FIGS. 128 and 131. The wave spring 1742 is inserted over the upper housing 1788 of the actuator sub 1744. The ramp 1740 is then inserted over the upper housing 1788 of the actuator sub 1744 to abut the wave spring 1742 so that the raised segments 1768 extend axially away from the lower housing 1786. The spring the 1852, the actuator sub ring 1830, and the ring gear 1842 are assembled into the lower housing 1786 of the actuator sub 1744 as previously described and retained therein with the C-ring 1854. The assembled actuator sub 1744 is then inserted into the outer housing 1736 so that the upper housing 1788 extends through the opening 1754 and the actuator sub 1744 is in slidable communication with the outer housing 1736 for rotational movement relative thereto. The cover 1738 is secured to the outer housing 1736 to retain the actuator sub 1744 therein. The cover 1738 has a hole 1872 to receive the power fold drive shaft 1718. The seats 1816 and sockets 1818 in the top wall 1798 of the actuator sub 1744 are used to locate and secure the actuator sub 1744 in the socket 1712.

Referring now to FIGS. 128, and 138–140, the carriage arm 1714 has a turret 1874 sized to fit over the cover 1738 and outer housing 1736 of the pivot mechanism 1710 and rotate relative thereto. The carriage arm 1714 includes a seat 1876 sized and shaped to receive and retain the motor assembly 1716. An aperture 1878 in a bottom wall 1879 of the seat 1876 is open to the turret 1874 and positioned to be in registry with the hole 1872 in the cover 1738 of the pivot mechanism 1710. When the motor assembly 1716 is seated in the seat 1876, the power fold drive shaft 1718 extends downwardly through the aperture 1878 and the hole 1872 into the pivot mechanism 1710. A gear 1880 on the power fold drive shaft 1718 engages the teeth 1850 of the ring gear 1842.

The carriage arm 1714 also includes an elongated channel 1882 which receives the power extend drive shaft 1720, which in turn carries the threaded nut 1722 and the shaft 1724. A pair of upstanding pins 1884 extend upwardly from the channel 1882 adjacent to one side and some guide surfaces 1886 are provided on the outside of the channel 1882. The distal end of the channel 1882 has a seat 1888 with a semi-circular bearing surface 1890 therein. The shaft 1724 is sized to reciprocate on the bearing surface 1890 of the seat 1888, which provides support for the shaft 1724 as it moves with the nut 1722 by the power extend drive shaft 1720.

Looking also at FIG. 141, the shell bracket 1728 is secured by conventional means to the carriage bracket 1726 with the carriage arm 1714 between them. The shaft 1724 has pair of wings 1892 at its distal end. The shell bracket 1728 has a bearing surface 1902 adapted to ride on one of the guide surfaces 1886 of the carriage arm 1714. It also has a mounting tab 1904 positioned to connect to one of the wings 1892 of the shaft 1724. The carriage bracket 1726 also has a guide surface 1906 adapted to ride on another of the guide surfaces 1886 of the carriage arm 1714, and it also has a mounting tab 1908 positioned to connect to the other of the wings 1892 of the shaft 1724. It will be apparent that with this structure, as the shaft 1724 moves, so does the shell bracket 1728 and the carriage bracket 1726.

Looking now more closely at FIGS. 139 and 140, the motor assembly 1716 will be described, as it is adapted to the present application in the rearview mirror 1700. Like numerals will be used to identify like elements except as otherwise indicated. The motor assembly 1716 comprises a case 1913 having a compartment 1614 in which a motor 1615, a drive shaft 1616, and a spring 1634 are disposed. The spring 1634 biases the motor 1615 so that a first clutch 1650 engages a first output shaft 1652 in driving engagement with the drive shaft 1616 at a low motor speed. Simultaneously, a second clutch 1654 disengages a second output shaft 1656 from the drive shaft 1616. At a higher motor speed, a fly 1636 causes the motor 1615 to move against the bias of the spring 1634 so that the clutch 1654 engages the second output shaft 1656 with the drive shaft 1616 and disengages the first output shaft 1652 from the drive shaft 1616.

A first transfer gear 1914 is disposed adjacent to a worm gear 1664 on the first output shaft 1652 to transfer power to a first drive gear 1916. The transfer gear 1914 will have a toothed portion to engage the worm gear 1664 and a worm portion to engage the first drive gear 1916. Similarly, a second transfer gear 1918 is disposed adjacent to a worm gear 1674 on the second output shaft 1656 to transfer power to a second drive gear 1920. Like the first transfer gear 1914, the second transfer gear 1918 will have a toothed portion to engage the worm gear 1674 and a worm portion to engage the second drive gear 1920. The second drive gear 1920 further has an extension shaft 1922 that terminates in a first pinion gear 1924 which engages a second pinion gear 1926 at the upper end of the power fold drive shaft 1718. The first drive gear 1916 is connected axially to the power extend drive shaft 1720.

Operation of the power extend function is accomplished by energizing the motor 1615 at a low voltage B, thus driving the first output shaft 1652 and the power extend shaft 1720 via the first transfer gear 1914 and the first drive gear 1916. Rotation of the power extend shaft 1720 causes a threaded nut 1722 to traverse the shaft 1720, depending upon the direction of rotation. As the nut 1722 moves, so does the shaft 1724 and also the rest of the mirror structure connected thereto by way of the shell bracket 1728 and the carriage bracket 1726. When the motor 1615 is operated in one direction, the mirror assembly 1730 is thus urged away from the mirror support 1704, and when the motor 1615 is operated in the opposite direction, the mirror assembly 1730 is urged toward the mirror support 1704.

When the motor 1615 is energized at a high voltage A, centrifugal force on the fly 1636 due to higher speed of the motor 1615 causes disengagement of the first output shaft 1652 and engagement of the second output shaft 1656, driving the power fold drive shaft 1718 via the second transfer gear 1918, the second drive gear 1920, the extension shaft 1922 and the pinion gears 1924, 1926. Rotation of the gear 1880 on the power fold drive shaft 1718 acting against the teeth 1850 of the ring gear 1842 in the pivot mechanism 1710 walks the gear 1880 around the ring gear 1842, causing the entire carriage arm 1714 to rotate relative to the pivot mechanism 1710.

If the mirror assembly 1730 is forcibly pivoted, such as would occur if it were to strike an immovable object, the actuator sub ring 1830 is separated from engagement with the ring gear 1842. The actuator sub ring 1830 can ride against the underside of the ring gear 1842 against the bias of the spring 1852 until the detents 1848 re-engage with the slots 1836 on the actuator sub ring 1830 whereupon the motor 1615 can once again drive the rotation of the carriage arm 1714.

While the invention has been specifically described in connection with certain specific embodiments thereof, it is to be understood that this is by way of illustration and not of limitation. Reasonable variation and modification are possible within the scope of the foregoing disclosure and drawings without departing from the scope of the invention.

What is claimed is:

1. An external mirror system for a vehicle comprising:
a fixed portion adapted to be mounted to the vehicle;
a moveable portion pivotally mounted to the fixed portion through a normal range of movement between a folded position and an unfolded, retracted position defined by a pair of terminal ends, the moveable portion having a reflective element mounted therein defining a rearwardly-directed field of view for a driver of the vehicle;
an actuator including a motor having at least one output shaft adapted for bi-directional rotational movement, wherein driven rotation of the output shaft of the motor causes the movable portion to be pivoted with respect to the fixed portion; and
at least one of:
a force-modifying device operably interconnected to the actuator for reducing a drive force required to pivot the movable portion relative to the fixed portion within the normal range of movement corresponding to the folded and unfolded, refracted positions and increasing the drive force required to pivot the movable portion relative to the fixed portion beyond one of the terminal ends of the normal range of movement;
a transmission operably interconnected to the actuator, the actuator operably interconnected to the moveable portion for continuous movement in a first stage and a second stage, wherein the transmission operably cooperates with the actuator for movement between the first stage and the second stage, wherein in the first stage rotational movement of the motor pivots the movable portion between a folded position to an unfolded, retracted position and in the second stage translates the moveable portion between the unfolded, retracted position and an extended position; and an adjuster operably interconnected to the reflective element, wherein the reflective element is positioned at a first angle of reflectance and the adjuster positions the reflective element at a second angle of reflectance as the reflective element is moved between the unfolded, retracted and an extended position to adjust the field of view of the reflective element for the driver of the vehicle.

2. The external mirror system of claim 1 wherein one of the fixed portion and the non-rotatable portion of the actuator has one of a detent thereon and a recess therein defining the terminal ends of the normal range of movement corresponding to the folded and unfolded positions, and one of the moveable portion and the rotatable portion of the actuator has the other of the detent and the recess.

3. The external mirror system of claim 2 and further comprising at least one spring biasing the detent and the recess together.

4. The external mirror system of claim 1 wherein the force-modifying device comprises a pin interconnected to the actuator for preventing contact between the detent and the recess during the normal range of movement.

5. The external mirror system of claim 1 wherein at least one output shaft of the motor has a proximal portion thereof interconnected to a first linkage for pivoting the movable portion between the folded position and the unfolded, retracted position.

6. The external mirror system of claim 5 wherein the first linkage comprises a rack gear operably connected to a spur gear, and the spur gear is prevented from movement relative to the fixed portion during the first stage.

7. The external mirror system of claim 1 wherein:
the fixed portion includes a first conductor located along a pivotal movement region;
the moveable portion includes a second conductor maintained in operable interaction with the first conductor in the pivotal movement region along the normal range of movement; and
the actuator has at least one terminal operably interconnected to the second conductor;
whereby operable interconnection between the actuator and the first conductor is maintained during pivotal movement of the moveable portion relative to the fixed portion throughout at least the normal range of movement thereof.

8. The external mirror system of claim 7 wherein at least one of the first and second conductors comprise a conductive material deposited onto the surface of the corresponding fixed portion and moveable portion.

9. The external mirror system of claim 1 wherein the adjuster defines an arcuate path between the retracted and extended positions and the adjustment of the field of view of the reflective element between the first angle of reflectance and the second angle of reflectance occurs as the reflective element is moved along the arcuate path.

10. The external mirror system of claim 1 wherein the adjuster further comprises one of a cam and a cam follower operably interconnected to one of the reflective element and the moveable portion, and the other of the cam and cam follower operably interconnected to the fixed portion, wherein following movement of the cam follower with the cam positions the reflective element between the first angle of reflectance and the second angle of reflectance when the movable portion is moved between the unfolded, retracted and extended positions.

11. The external mirror system of claim 1 wherein the adjuster comprises:
a first arm mounted to the fixed portion and adapted to extend laterally-outwardly from a vehicle having one of a cam and cam follower thereon; and
a second arm mounted to one of the movable portion and the reflective element and received by the first arm for lateral extendable and retractable movement therewith, the second arm having the other of the cam and cam follower thereon.

12. An external vehicular mirror system for a vehicle comprising:
a fixed portion adapted to be mounted to the vehicle;
a moveable portion adapted for a normal range of movement including a reflective element mounted therein;
an actuator including a motor having at least one output shaft adapted for bi-directional rotational movement, the actuator operably interconnected to the moveable portion for continuous movement in a first stage and a second stage, wherein in the first stage rotational movement of the motor pivots the movable portion between a folded position to an unfolded, retracted position and in the second stage translates the moveable portion between the unfolded, retracted position and an extended position; and
a transmission for transitioning rotational movement of the motor between the first and second stages.

13. The external mirror system of claim 12 wherein the at least one output shaft of the motor has a proximal portion thereof interconnected to a first linkage for pivoting the movable portion between the folded position and the unfolded, retracted position.

14. The external mirror system of claim 13 wherein the first linkage comprises a rack gear operably connected to a spur gear, and the spur gear is prevented from movement relative to the fixed portion during the first stage.

15. The external mirror system of claim 14 wherein the spur gear is moveable relative to the fixed portion when the fixed portion is forced beyond the normal range of movement.

16. The external mirror system of claim 14 and further comprising at least one spring for biasing the spur gear and the fixed portion together.

17. The external mirror system of claim 12 wherein the at least one output shaft of the motor has a distal portion thereof interconnected to a first linkage for translating the movable portion between the unfolded, refracted position and the extended position.

18. The external mirror system of claim 17 wherein the first linkage comprises a drive nut operably connected to a catch, and the drive nut moves along the output shaft for translational movement of the catch during the second stage.

19. The external mirror system of claim 17 wherein the transmission comprises the drive nut wherein the drive nut is operably engaged to the at least one output shaft of the motor, a first bracket comprising a first slot, and a second bracket comprising a second slot wherein, when the motor reaches a point between the proximal and distal portions of the jackscrew, the drive nut oscillates from the first slot to the second slot between the first linkage and a second linkage to transfer movement of the moveable portion between pivotal movement and extension movement.

20. The external mirror system of claim 12 wherein the motor is pivotally mounted to the fixed portion.

21. The external mirror system of claim 12 and further comprising a drive nut, a spur gear and a rack gear, wherein the spur gear is associated with the fixed portion and the rack gear is associated with the moveable portion, and the rack gear is operably engaged with both the spur gear and the drive nut during the first stage.

22. The external mirror system of claim 21 wherein the drive nut is disengaged from the rack gear and operably engaged with the reflective element during the second stage for extendable movement along the jackscrew.

23. The external mirror system of claim 12 and further comprising a shut-off circuit for controlling the operation of the motor.

24. The external mirror system of claim 23 wherein the shut-off circuit comprises a switch for selecting one of operation of the first stage and operation of the second stage.

25. The external mirror system of claim 23 wherein the shut-off circuit comprises a switch for controlling the operation of the first stage.

26. The external mirror system of claim 23 wherein the shut-off circuit comprises a switch for controlling the operation of the second stage.

27. The external mirror system of claim 12 wherein the transmission comprises a clutch mounted to the at least one output shaft of the motor and to the actuator, wherein the clutch driveably interconnects the at least one output shaft of the motor to drive the actuator in the first stage at a first motor speed, and wherein the clutch driveably interconnects the at least one output shaft of the motor to drive the actuator in the second stage at a second motor speed.

28. The external mirror system of claim 27 wherein the clutch comprises a drive surface and a driven surface.

29. The external mirror system of claim 28 wherein the drive surface and the driven surface are biased together by at least one spring.

30. The external mirror system of claim 27 wherein the motor comprises a first output shaft connected to the actuator to drive the actuator in the first stage for pivotal movement of the moveable portion and a second output shaft connected to the actuator to drive the actuator in the second stage for extension movement of the moveable portion.

31. The external mirror system of claim 30 wherein the clutch is disposed between the first output shaft and the actuator.

32. The external mirror system of claim 31 wherein the clutch comprises a drive surface and a driven surface.

33. The external mirror system of claim 32 wherein the drive surface is operably engaged with the driven surface when the first output shaft is rotated at a first speed, and is operably disengaged with the driven surface when the first output shaft is rotated at a second speed which is slower than the first speed.

34. The external mirror system of claim 30 wherein the second output shaft is operably disengaged from the actuator when the second output shaft is operated at a first speed, and is operably engaged with the actuator when the second output shaft is rotated at a second speed which is slower than the first speed.

* * * * *